United States Patent
Walker, Jr. et al.

(10) Patent No.: US 11,773,858 B2
(45) Date of Patent: Oct. 3, 2023

(54) CEILING FAN MOTOR ADAPTER

(71) Applicant: Hunter Fan Company, Memphis, TN (US)

(72) Inventors: William Walter Walker, Jr., Walls, MS (US); Douglas Troy Mason, Horn Lake, MS (US); Matthew McPherson, Memphis, TN (US); Charles William Botkin, Cordova, TN (US); Rickey Thomas Jones, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 18/162,633

(22) Filed: Jan. 31, 2023

(65) Prior Publication Data
US 2023/0175516 A1    Jun. 8, 2023

Related U.S. Application Data

(63) Continuation of application No. 16/163,967, filed on Oct. 18, 2018, now Pat. No. 11,598,341.
(Continued)

(51) Int. Cl.
*F04D 25/08*    (2006.01)
*F04D 25/06*    (2006.01)
(Continued)

(52) U.S. Cl.
CPC ....... *F04D 25/0606* (2013.01); *F04D 25/088* (2013.01); *F04D 29/601* (2013.01); *F16B 7/105* (2013.01); *F05D 2260/30* (2013.01)

(58) Field of Classification Search
CPC .. F04D 25/088; F04D 25/068; F04D 25/0606; F04D 25/06; F04D 25/08; F04D 29/646
See application file for complete search history.

(56) References Cited

U.S. PATENT DOCUMENTS

| 3,742,807 A | 7/1973 | Manning |
| 4,793,646 A | 12/1988 | Michaud, Jr. |

(Continued)

FOREIGN PATENT DOCUMENTS

| CN | 2444076 Y | 8/2001 |
| CN | 2577020 Y | 10/2003 |

(Continued)

OTHER PUBLICATIONS

Https://www.gamut.com/p/headless-clevis-pin-steel-zinc-plated-grooved-5-16-in-shank-dia-NTE0NDM, gamut A Grainger Company, Headless Clevis Pin: Steel, Zinc Plated,Grooved, 5/16 in Shank Dia, 1 1/4 in Usable Lg, 1 19/32 in Overall Lg, Item No. 554U541, accessed Oct. 5, 2017.
(Continued)

*Primary Examiner* — David E Sosnowski
*Assistant Examiner* — Maxime M Adjagbe
(74) *Attorney, Agent, or Firm* — McGarry Bair PC

(57) ABSTRACT

A motor adapter assembly can couple a motor shaft for a ceiling fan motor to a downrod. The motor adapter assembly can include a base plate, a cradle with arms extending through the base plate, and a threaded bushing secured between the arms of the cradle. Threading a cap to the threaded bushing can be used to pivot the downrod between an upright position and a pivoted position.

15 Claims, 115 Drawing Sheets

Related U.S. Application Data

(60) Provisional application No. 62/721,223, filed on Aug. 22, 2018, provisional application No. 62/658,828, filed on Apr. 17, 2018, provisional application No. 62/595,635, filed on Dec. 7, 2017, provisional application No. 62/573,945, filed on Oct. 18, 2017.

(51) Int. Cl.
*F16B 7/10* (2006.01)
*F04D 29/60* (2006.01)

(56) References Cited

U.S. PATENT DOCUMENTS

| | | | |
|---|---|---|---|
| 5,349,513 | A | 9/1994 | Taylor, III |
| 6,203,279 | B1 | 3/2001 | Moody et al. |
| 6,311,943 | B1 * | 11/2001 | Tang ............... F04D 25/088 416/246 |
| 6,644,928 | B1 * | 11/2003 | Tang ............... F04D 25/088 416/246 |
| 6,821,091 | B2 | 11/2004 | Lee |
| 6,872,039 | B2 | 3/2005 | Baus et al. |
| 6,981,678 | B2 | 1/2006 | Fu-Liang |
| 7,147,420 | B2 | 12/2006 | Baus et al. |
| 7,278,620 | B2 | 10/2007 | Blateri |
| 7,785,077 | B2 | 8/2010 | Richardson et al. |
| 3,047,795 | A1 | 11/2011 | Pearce |
| 9,587,518 | B2 * | 3/2017 | Oleson ............... F04D 29/601 |
| 9,605,687 | B1 | 3/2017 | Zauhar et al. |
| 2003/0210982 | A1 | 11/2003 | Chen |
| 2005/0265848 | A1 | 12/2005 | Tseng |
| 2013/0076213 | A1 | 3/2013 | McCloud et al. |
| 2016/0102670 | A1 * | 4/2016 | Frampton ............ F04D 25/088 248/343 |
| 2017/0175773 | A1 | 6/2017 | McKee et al. |
| 2017/0204869 | A1 | 7/2017 | Horng et al. |
| 2017/0284406 | A1 | 10/2017 | Santolucito et al. |

FOREIGN PATENT DOCUMENTS

| | | |
|---|---|---|
| CN | 2644742 Y | 9/2004 |
| CN | 2661972 Y | 12/2004 |
| CN | 101368577 A | 2/2009 |
| CN | 101802398 A | 8/2010 |
| CN | 103208882 A | 7/2013 |
| CN | 105201893 A1 | 12/2015 |
| CN | 105317714 A | 2/2016 |
| CN | 105736443 A | 7/2016 |
| CN | 105782128 A | 7/2016 |
| WO | 2017181350 A1 | 10/2017 |

OTHER PUBLICATIONS

Http://www.specialty-fasteners.co.uk/products/quick-release-fasteners/quick-release-pins/item/headless-pins, Clarendon Specialty Fasteners, Headless Pins, access Oct. 5, 2017.

Gulf Coast Fans, Product Evaluation of Trinidad Outdoor Fan, Model No. 2000-04W 05002, year published 2002, date found Jan. 8, 2020, 5 pages, product origin of Taiwan.

* cited by examiner

CEILING FAN MOTOR ADAPTER

CROSS-REFERENCE TO RELATED APPLICATION(S)

This application claims priority to U.S. patent application Ser. No. 16/163,967, filed Oct. 18, 2018, now allowed, which claims priority to U.S. Provisional Patent Application No. 62/573,945, filed Oct. 18, 2017, U.S. Provisional Patent Application No. 62/595,635, filed Dec. 7, 2017, U.S. Provisional Patent Application No. 62/658,828, filed Apr. 17, 2018, and U.S. Provisional Patent Application No. 62/721,223, filed Aug. 22, 2018, all of which are incorporated herein by reference in its entirety.

BACKGROUND OF THE INVENTION

Typical ceiling fans are electrically powered, being electrically coupled to a building electrical supply. The ceiling fans include an electric motor that is suspended beneath a ceiling by a hollow downrod through which electrical wires extend from the building electrical supply to the motor. An annular array of fan blades are coupled to the motor such that the blades can rotate about the motor, pushing a flow of air.

Ceiling fans can utilize a motor adapter to couple a motor shaft to the downrod to support a motor for the ceiling fan. The motor adapter can extend through the motor housing to couple the motor shaft to the downrod. Downrods commonly couple to the motor adapter by securing the two with locking pin or a screw through complementary apertures in each member. With this design, however, the weight of the ceiling fan rests upon the locking pin, often resulting in ceiling fan swing, movement, noise, or wobble. Similarly, the use of a screw to lock the downrod to the motor adapter can loosen during fan operation, which can lead to disconnecting of the downrod from the motor adapter during operation, or even falling of the ceiling fan.

BRIEF DESCRIPTION OF THE INVENTION

In one aspect, the disclosure relates to a motor adapter assembly for coupling a motor shaft of a ceiling fan to a downrod having opposing downrod apertures through a motor housing and adapted to pivot between an upright position and a pivoted position, the motor adapter assembly comprising: a wedge having an peripheral wall defining a passage configured to receive the downrod and the peripheral wall including opposing wedge apertures; a cradle with a body having two spaced arms that at least partially define a seat, with an arm aperture in each arm that are aligned with the wedge apertures; a pin extending through the wedge apertures and the arm apertures to couple the cradle and the wedge and configured to couple the wedge and the cradle to the downrod; and a cap provided around the wedge and covering the pin.

BRIEF DESCRIPTION OF THE DRAWINGS

In the drawings:

FIG. 119 is a cross-sectional view of a cap of the motor adapter assembly of FIG. 117.

FIG. 120 is a perspective view of a retainer pin of the motor adapter assembly of FIG. 117.

FIG. 121 is an exploded view of a portion of the motor adapter assembly of FIG. 117 illustrating an assembly sequence of the motor adapter assembly.

FIG. 122 is an exploded view of the motor adapter assembly continuing the assembly sequence of FIG. 121.

FIG. 123 is an exploded view of the motor adapter assembly continuing the assembly sequence of FIG. 122.

FIG. 124 is a cross-sectional view of the assembled motor adapter assembly of FIG. 117, showing the interaction between the bushing of FIG. 118 and the cap of FIG. 119.

FIG. 125 is a perspective view of the completed motor adapter assembly of FIG. 117 with a tab retaining the cap of FIG. 119, shown in an upright position.

FIG. 126 is a perspective view of the motor adapter assembly of FIG. 125 in a pivoted position.

FIG. 127 is an exploded view of another motor adapter assembly including a cap and a lock washer.

FIG. 128 is an exploded view of the cap and the lock washer of the motor adapter assembly of FIG. 127 illustrating attachment of the cap at the lock washer.

FIG. 129 is a partially exploded view of the motor adapter assembly of FIG. 127 illustrating attachment of the cap to the remainder of the motor adapter assembly at the lock washer.

FIG. 130 is a perspective view of the assembled motor adapter assembly of FIG. 127 in the upright position with the cap fastened to the lock washer.

DESCRIPTION OF EMBODIMENTS OF THE INVENTION

The present disclosure is directed to a motor adapter assembly or a pivoting motor adapter assembly for coupling a ceiling fan motor shaft to a downrod for suspending a ceiling fan from a structure. For purposes of illustration, the present disclosure will be described with respect to an exemplary ceiling fan motor housed in an exemplary ceiling fan housing. It will be understood, however, that the disclosure is not so limited and can have general applicability in all ceiling fan or mounting applications, such lighting or suspension for industrial, commercial, and residential applications, as well as a plurality of different ceiling fan designs. It can also have application to ceiling fans comprising multiple motors or angularly oriented motors. Furthermore, the motor adapter assembly as described herein will be compatible with all ceiling fan accessory downrods.

It should be appreciated that a "set" as used herein can include any number of elements, including one or more of the particular element. A "flexure" or "spring" as used herein can be any flexible or depressible element that can be actuated from a first position to a second position, and then return to the first position after actuation. Non-limiting examples of a "flexure" or "spring" can be a coiled spring, a clock spring, a compression spring, a tension spring, a torsion spring, a helical spring, a leaf spring, a Belleville spring, a spring finger, elastic or an elastic member, a resilient member, bendable element, a metal strip, a spring strip, wire, bendable sheet, or otherwise.

Figure 1:
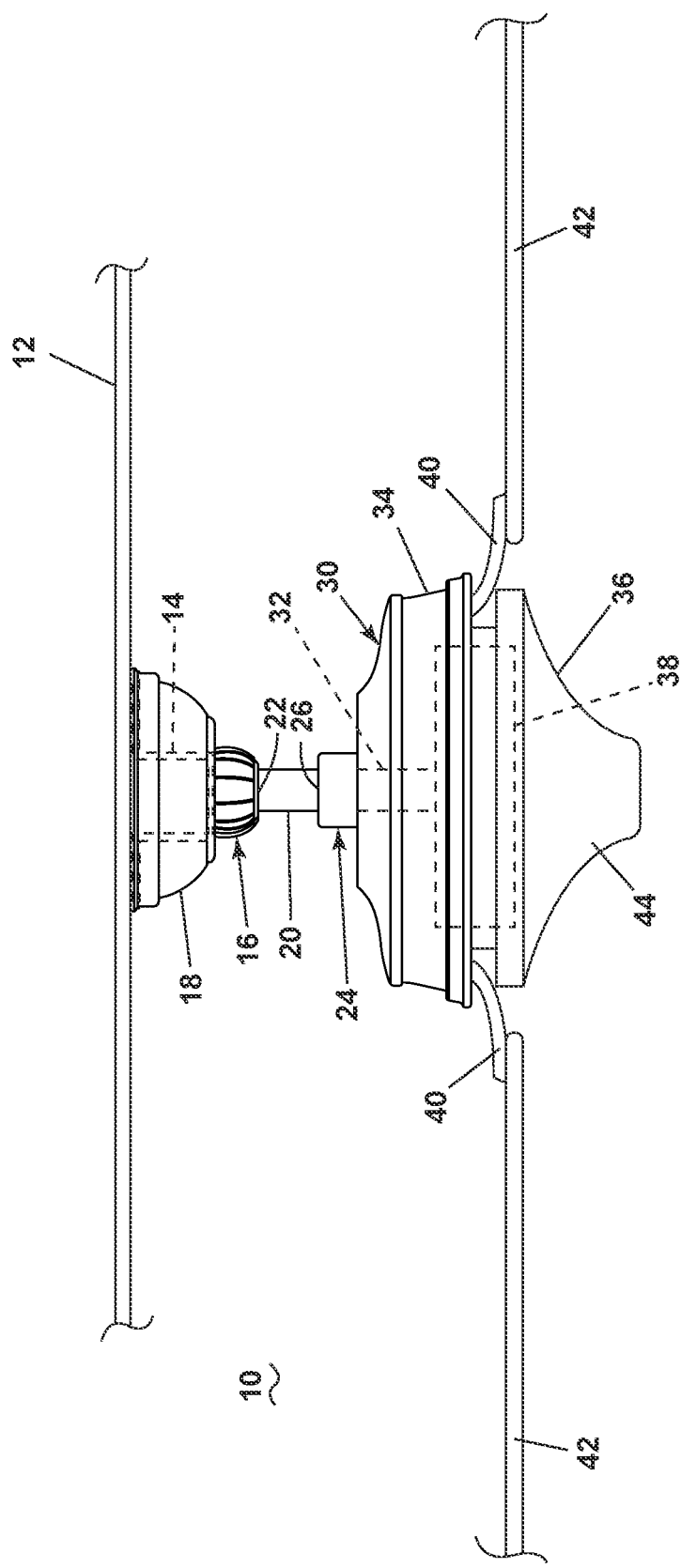
FIG. 1 is a side view of a ceiling fan mounted to a structure having a motor adapter assembly.

Referring now to FIG. 1, a ceiling fan 10 is suspended from a structure 12, such as a ceiling of a building. A structure mount 14 secures to the structure 12 and seats a ball mount assembly 16. A canopy 18 encloses the structure mount 14, providing an aesthetically pleasing junction between the ball mount assembly 16 and the structure 12. A downrod 20 couples to the ball mount assembly 16 at a first end 22. In one non-limiting example, the downrod 20 can be a three-inch downrod, while any size is contemplated. A motor adapter assembly 24 couples to the downrod 20 at a second end 26, opposite of the ball mount assembly 16. A motor housing 30 and a motor shaft 32 couple to the motor adapter assembly 24 opposite of the downrod 20. The motor housing 30 can be separated into an upper housing 34 and a lower housing 36, with the upper housing 34 coupling to the motor adapter assembly 24. A motor 38 is encased within the motor housing 30, with the motor shaft 32 extending from the motor 38 to the motor adapter assembly 24.

A set of blade irons 40 can couple a set of complementary blades 42 to the motor 38. The motor 38 can be electrically powered to rotatably drive the blades 42 to push a volume of air. Optionally, a light kit 44 or switch housing can be provided on the motor housing 30, and is shown positioned at the bottom of the lower housing 36.

Figure 2:
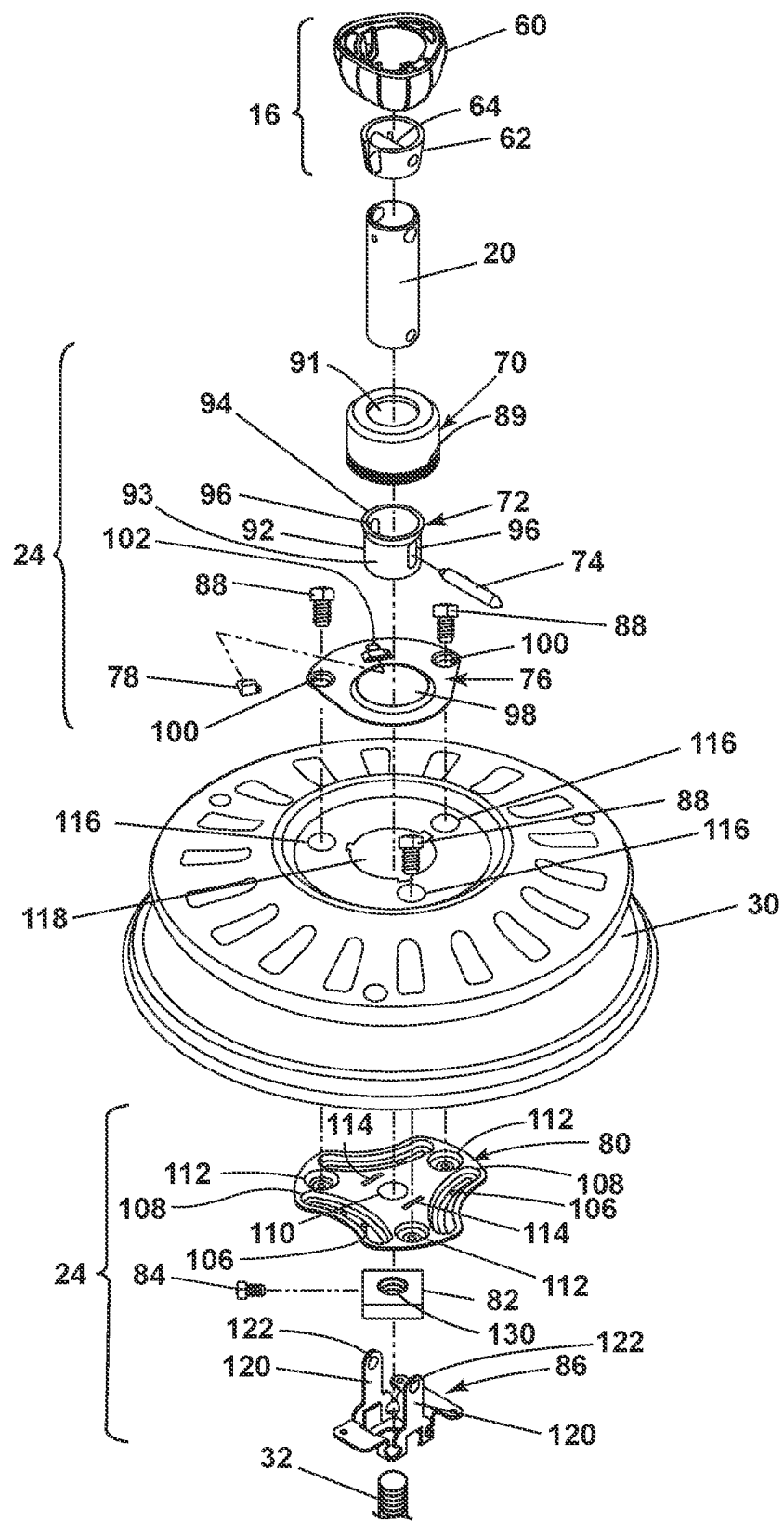
FIG. 2 is an exploded view of the motor adapter assembly of FIG. 1, with a motor housing and a ball mount assembly.

Referring now to FIG. 2, the ball mount assembly 16 includes a ball 60 and a ball coupler 62. A pin 64 can be used to couple the downrod 20 to the ball coupler 62. The ball coupler 62 can be tapered to secure within the ball 60, and the pin 64 can extend exterior of the ball coupler 62 and seat within the ball 60, to suspend the downrod 20 from the ball mount assembly 16.

The motor adapter assembly 24 can include a cap 70, a wedge 72, a pin 74, a first plate 76, a clip 78, a second plate 80, a shaft fastener 82 shown as a square nut with a screw fastener 84, a bracket 86, and a set of fasteners 88. In one example, the components of the motor adapter assembly 24 can be made of cold rolled steel, and can be stamped in order to form the required geometry.

The cap 70 can include a top wall 91 including a central aperture 90 adapted to receive the downrod 20 and a set of grooves 89 on the exterior of the cap 70. While shown as grooves 89, it is contemplated that the grooves 89 can be formed as ridges, or any other suitable surface structure. The cap 70 can be sized to surround the wedge 72. The wedge 72 can include a cylindrical-shaped body 92 having a peripheral wall 93, having a flared portion 94 at one end. A set of apertures 96 can be provided on opposite sides of the body 92, formed as racetrack-shaped slots, adapted to receive the pin 74 and terminating at the flared portion 94. The flared portion 94 reduces noise and wobble at the junction between the downrod 20 and the motor adapter assembly 24. The apertures 96, while shown as having a racetrack-shape, can be circular, oval, or any other shape, while any shape is contemplated suitable to receive the pin 74.

The first plate 76 includes a central aperture 98 wider than the wedge 72. A set of fastener apertures 100 are formed in the first plate 76, as well as a slot 102 adapted to receive the clip 78. The clip 78 can secure the cap 70 to the first plate 76. The first plate 76 can have an asymmetric shape, having only two fastener apertures 100, and an enlarge portion on one side in order to provide room for the slot 102.

The second plate 80 can include a central aperture 110, three fastener apertures 112, and two slots 114 positioned on opposing sides of the central aperture 110. The second plate 80 can further include a set of valleys 108 having fastener openings 106. The first and second plates 76, 80 can be adapted to secure to one another at the fastener apertures 100, 112, sandwiching the motor housing 30 between the two plates 76, 80. The motor housing 30 can include a set of fastener apertures 116 complementary to the fastener apertures 100, 112 of the first and second plates 76, 80, in order to secure the motor housing 30 to the plates 76, 80. The motor housing 30 can further include a central aperture 118, with the fastener apertures 116 positioned around the central aperture 118. The set of fasteners 88, which can be screws or any other suitable fastener, can extend through the fastener apertures 100, 112, 116 to secure the plates 76, 80 to one another and sandwiching the motor housing 30. In one example, the fastener apertures 100, 112, 116 can be threaded to secure to the fasteners 88. Alternatively, a nut or other similar element can be used to secure the fasteners 88 within the fastener apertures 100, 112, 116.

The bracket 86 can include a set of legs 120 having a set of downrod apertures 122 adapted to insert through the slots 114 within the bottom plate 80, through the central aperture 118 of the motor housing 30, through the central aperture 98 of the first plate 76, and align along the apertures 96 at the exterior of the wedge 72.

The shaft fastener 82 can include a central aperture 130 adapted to threadably receive the motor shaft 32. The screw fastener 84 can be adapted to insert through the shaft fastener 82 to secure the inserted motor shaft 32 within the shaft fastener 82, as well as secure the shaft fastener 82 within the bracket 86. In one example, the screw fastener 84 can be a setscrew to save space. While the shaft fastener 82 is preferably a square nut to prevent rotation of the nut within the bracket 86, any suitable fastener having any shape or design is contemplated.

Figure 3:
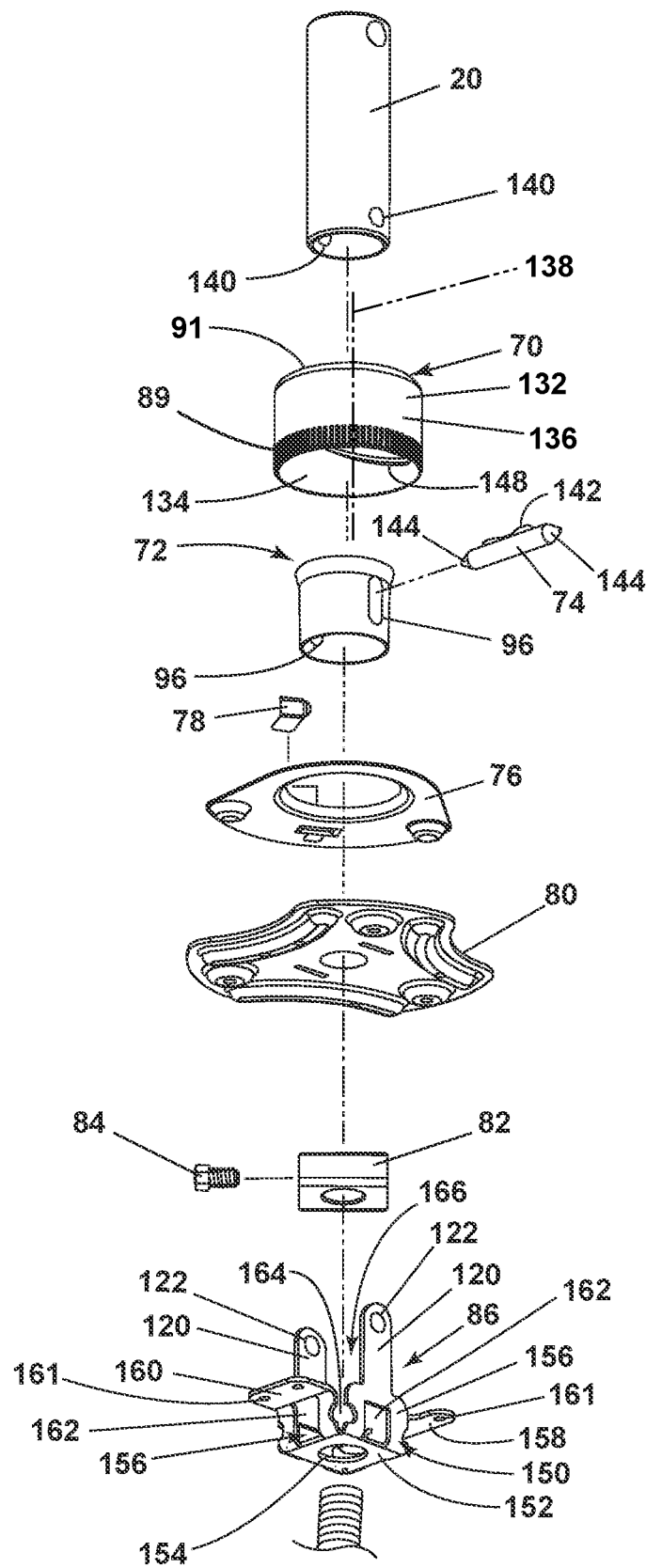
FIG. 3 is an exploded view of the motor adapter assembly of FIG. 1 illustrating the interior of a cap.

Referring now to FIG. 3, the bracket 86 includes a body 150 having a base wall 152 with a motor shaft aperture 154. The body 150 further includes four sidewalls 156, with two opposing sidewalls 156 having the legs 120 extending therefrom. It should be appreciated that the sidewalls 156 can be a single sidewall extending from the base wall 152, or can be separated into discrete wall segments, such as the four sidewalls 156 as shown. The combined four sidewalls 156 and the base wall 152 form a seat 166, adapted to seat the shaft fastener 82. The seat 166 captures the shaft fastener 82, in order to secure the motor shaft to the bracket 86. The remaining opposing sidewalls 156 without the legs 120 include a first projection 158 and a second projection 160. The first and second projections 158, 160 can include fastener apertures 161 adapted to align with fastener apertures in the second plate 80 to secure the bracket 86 to the second plate 80. Each of the sidewalls 156 can include a sidewall aperture 162 adapted to receive a corner of the shaft fastener 82 as a square nut, for example. During manufacture or factor assembly, the bracket 86 can be stamped, and the sidewalls 156 can be bent and raised to secure the corners of the shaft fastener 82 within the sidewall apertures 162. Additionally, a fastener opening 164 at the corners between the sidewalls 156 of the bracket 86 can be formed to permit the screw fastener 84 to extend into the shaft fastener 82 from exterior of the bracket 86.

The downrod 20 can include a set of apertures 140 complementary to the apertures 96 on the wedge 72 and the downrod apertures 122 on the legs 120. The downrod 20 can insert through the cap 70 and into the wedge 72. The wedge 72 can insert between the legs 120. The pin 74 can extend through the apertures 96 in the wedge 72, the apertures 140 in the downrod 20, and the downrod apertures 122 in the legs 120 to secure the downrod 20 to the bracket 86 through the wedge 72. An elongated spring 142 or similar suitable flexure or spring member can be included on the pin 74 to secure the pin 74 within the combined wedge 72, bracket 86, and downrod 20. The pin 74 can terminate in opposing ends 144, each end 144 having a conic shape. The ends 144 can further be knurled, increasing surface contact during installation and facilitating handling by the user or installer. The ends 144 or a portion of the pin 74 adjacent the ends 144 can include the knurl, and can have a straight knurl, for example.

The cap 70 includes an interior surface 134 having a set of threads 148. The threads 148 can be adapted to rotate about the conic ends 144 of the pin 74 inserted through the downrod 20, wedge 72, and bracket 86 to rotatable secure the cap 70 about the downrod 20, the wedge 72, and the bracket 86. Additionally, the clip 78 can be adapted to secure the cap 70 to the first plate 76 at the grooves 89, after securing the cap 70 about the wedge 72.

Figure 4:
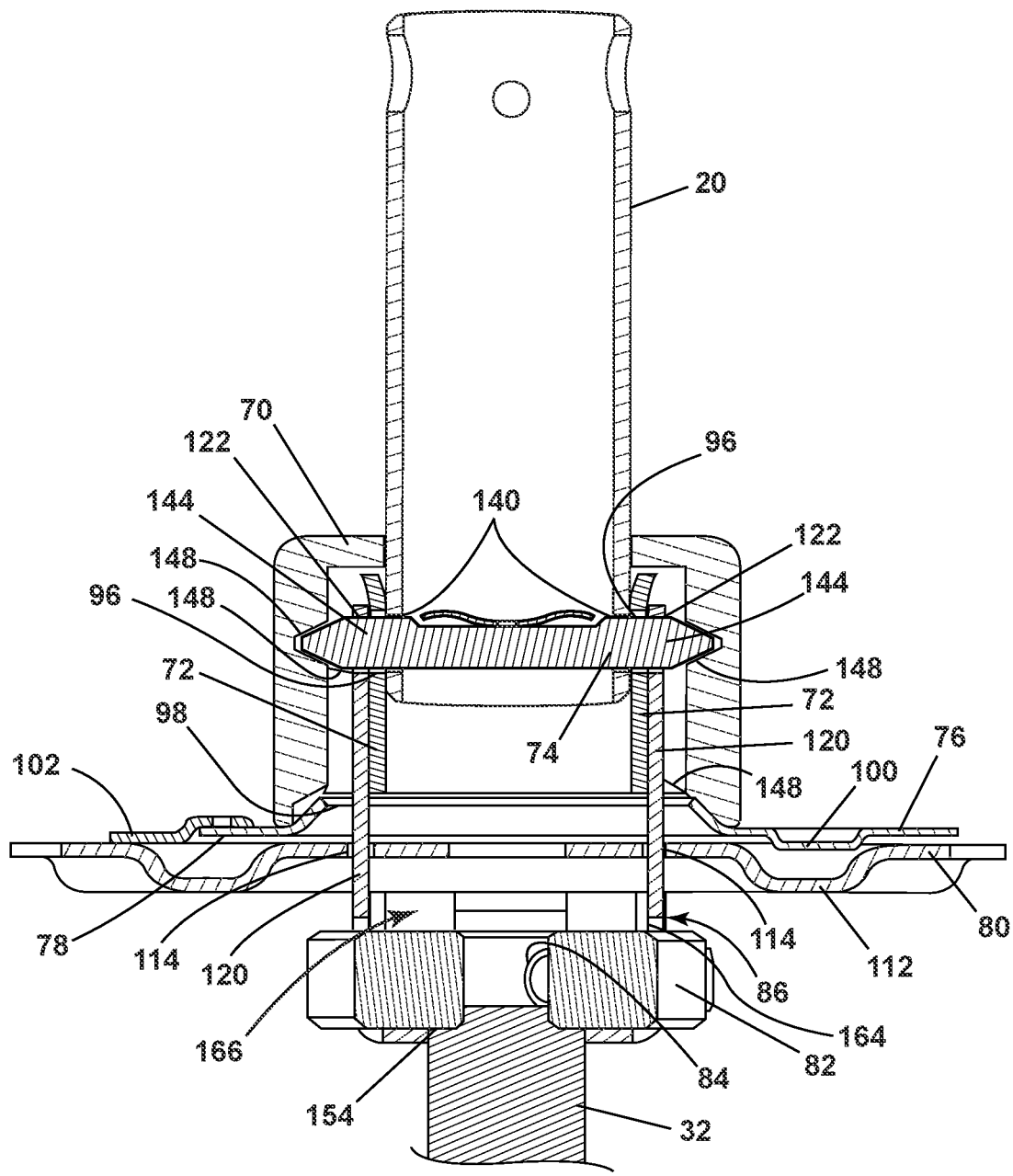
FIG. 4 is cross-sectional view of the motor adapter assembly of FIG. 3 assembled to couple a downrod to a motor shaft.

Referring now to FIG. 4, the motor adapter assembly 24 couples the motor shaft 32 to the downrod 20. The motor shaft 32 threadably secures to the shaft fastener 82. The shaft fastener 82 is held within the seat 166 of the bracket 86, to secure the motor shaft 32 to the bracket 86. The screw fastener 84 can extend through one of the fastener openings 164 in the bracket 86 and through the shaft fastener 82 to secure the shaft fastener 82 to the motor shaft 32 and resist rotational movement of the motor shaft 32 within the shaft fastener 82.

The first and second plate 76, 80 stack on one another, adapted to secure a motor housing therebetween, with the fastener apertures 100, 112 aligned for accepting a fastener to secure the first and second plate 76, 80. The legs 120 of the bracket 86 extend through the slots 114 in the second plate 80 and through the central aperture 98 in the first plate 76. The wedge 72 positions between the legs 120, aligning the apertures 96 of the wedge 72 with downrod apertures 122 in the legs 120. The downrod 20 positions within the wedge 72, aligning the set of apertures 140 in the downrod 20 with the downrod apertures 122 in the legs 120 and the apertures 96 in the wedge 72. The pin 74 extends through the downrod apertures 122 in the legs 120, the set of apertures 140 in the downrod 20, and the apertures 96 of the wedge 72 to secure the wedge 72 to the bracket 86 at the legs 120, and to the downrod 20.

A peripheral wall 132 for the cap 70 extends from the top wall 91. The peripheral wall 132 includes an interior surface 134 and an exterior surface 136, and defines a centerline 138 with the threads 148 provided about the centerline 138. The cap 70 receives the downrod 20 and threadably and rotatably secures to the pin 74, having the ends 144 of the pin 74 keyed to the threads 148 of the cap 70. Rotation of the cap 70 fastens the ends 144 of the pin 74 within the threads 148 of the cap 70, to secure the cap 70 around the legs 120 and the wedge 72. The cap 70 can be threadably rotated to abut the first plate 76. The clip 78, secured within the slots 102 on the first plate 76, can be used to secure the cap 70 to the first plate 76, preventing rotational movement of the cap 70. Additionally, the cap 70 prevents movement of the pin 74 from moving out of the legs 120, the wedge 72, or the downrod 20. Therefore, the motor shaft 32 secures to the motor adapter assembly 24 at the shaft fastener 82 secured within the bracket 86, and the downrod 20 secures to the motor adapter assembly 24 at the pin 74; with the motor adapter assembly 24 securing the downrod 20 to the motor shaft 32.

Figure 5:
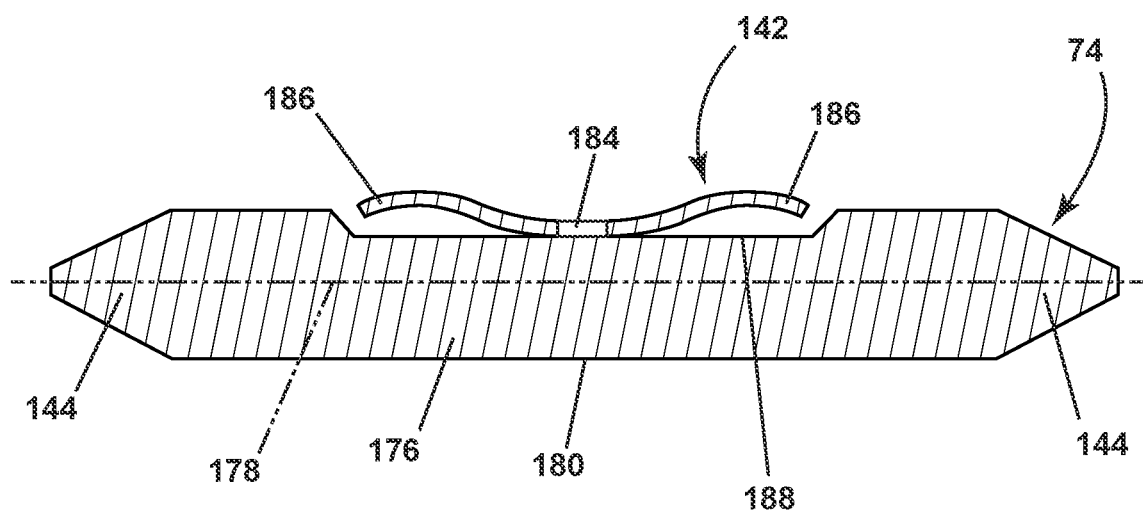
FIG. 5 is longitudinal sectional view of a pin of FIG. 4 having a two-way spring lock.

Referring now to FIG. 5, the pin 74 includes an elongated body 176 defining a longitudinal axis 178. The elongated body 176 includes a peripheral surface 180 extending between the opposing ends 144. The elongated spring 142 is provided on the pin 74, and can be positioned in the middle of the pin 74. The elongated spring 142, can mount at a mount portion 184, with two spring fingers 186 extending from the mount portion 184 in opposite directions. The elongated spring 142 extends parallel to the longitudinal axis 178. A recess 188 can be formed in the peripheral surface 180 with the mount portion 184 mounted in the recess 188 and the spring fingers 186 deformable into the recess 188. The spring fingers 186 can have an arcuate shape, adapted to flex and depress for insertion of the pin 74 into the downrod 20, the wedge 72, or the legs 120 of the bracket 86 of FIG. 4. After insertion, the spring fingers 186 extend out of the recess 188 to prevent the pin 74 from sliding out of the downrod 20, wedge 72, and legs 120, in the position shown in FIG. 4. As such, the elongated spring 142 forms a self-locking mechanism on the pin 74. The self-locking pin 74 cannot be removed without depressing the elongated spring 142 once inserted into the downrod 20, the wedge 72, and the legs 120 or the bracket 86. The symmetric design for the pin 74 and the elongated spring 142 provides for insertion in any direction, as well as resisting sliding of the pin 74 out of the inserted area in two directions. Furthermore, the ends 144 provide for forming a threaded extension for attaching a member, such as the cap 70 as described in FIG. 4.

FIGS. 6-12 illustrate an exemplary sequence of assembling the downrod 20 to the motor shaft 32 with the motor adapter assembly 24. A manufacturer can complete such assembly prior to packaging and shipping a ceiling fan for sale, while it is contemplated that this can be completed by the consumer, installer, or any other suitable assembler. The described sequence is just one possible sequence of assembly and is not meant to be limiting.

Figure 6:
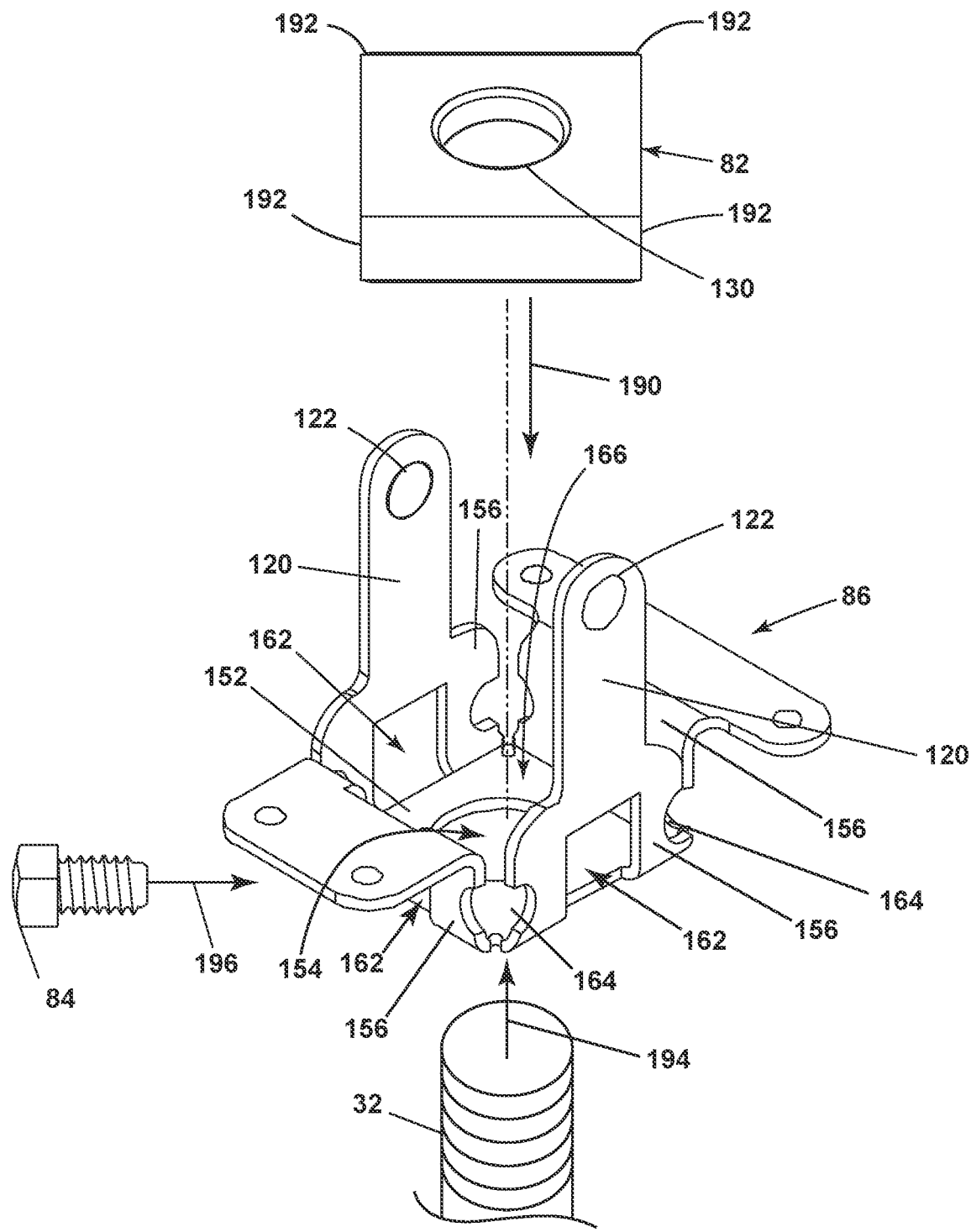
FIG. 6 illustrates an assembly sequence for coupling a bracket to the motor shaft with a shaft fastener.

Referring now to FIG. 6, an exploded view illustrates the motor shaft 32, the bracket 86, and the shaft fastener 82 arranged for assembly. As illustrated by arrow 190, the shaft fastener 82 can couple within the seat 166 of the bracket 86. Corners 192 of the shaft fastener 82 can be positioned within the sidewall aperture 162 on the bracket 86. In order to couple the corners 192 within the sidewall aperture 162, the manufacture can bend the sidewalls 156 of the bracket 86 to position the corners 192 within the sidewall aperture 162. Therefore, the assembly of the shaft fastener 82 to the bracket 86 can be completed by a manufacturer. In alternative examples, where the shaft fastener 82 may have a different shape, the shaft fastener 82 can seat within the seat 166 of the bracket 86 by a user or installer positioning the shaft fastener 82 within the seat 166.

After seating the shaft fastener 82 within the bracket 86, as illustrated by arrow 194, the motor shaft 32 can insert through the unthreaded motor shaft aperture 154 in the base wall 152 of the bracket 86 and threadably couple to the central aperture 130 in the shaft fastener 82.

Once the shaft fastener 82 is positioned within the bracket 86 and the motor shaft 32 has been fastened to the shaft fastener 82, as illustrated by arrow 196, the screw fastener 84 can insert through one of the fastener openings 164 between the sidewalls 156 to secure the shaft fastener 82 within the seat 166 and secure the motor shaft 32 within the shaft fastener 82.

Figure 7:
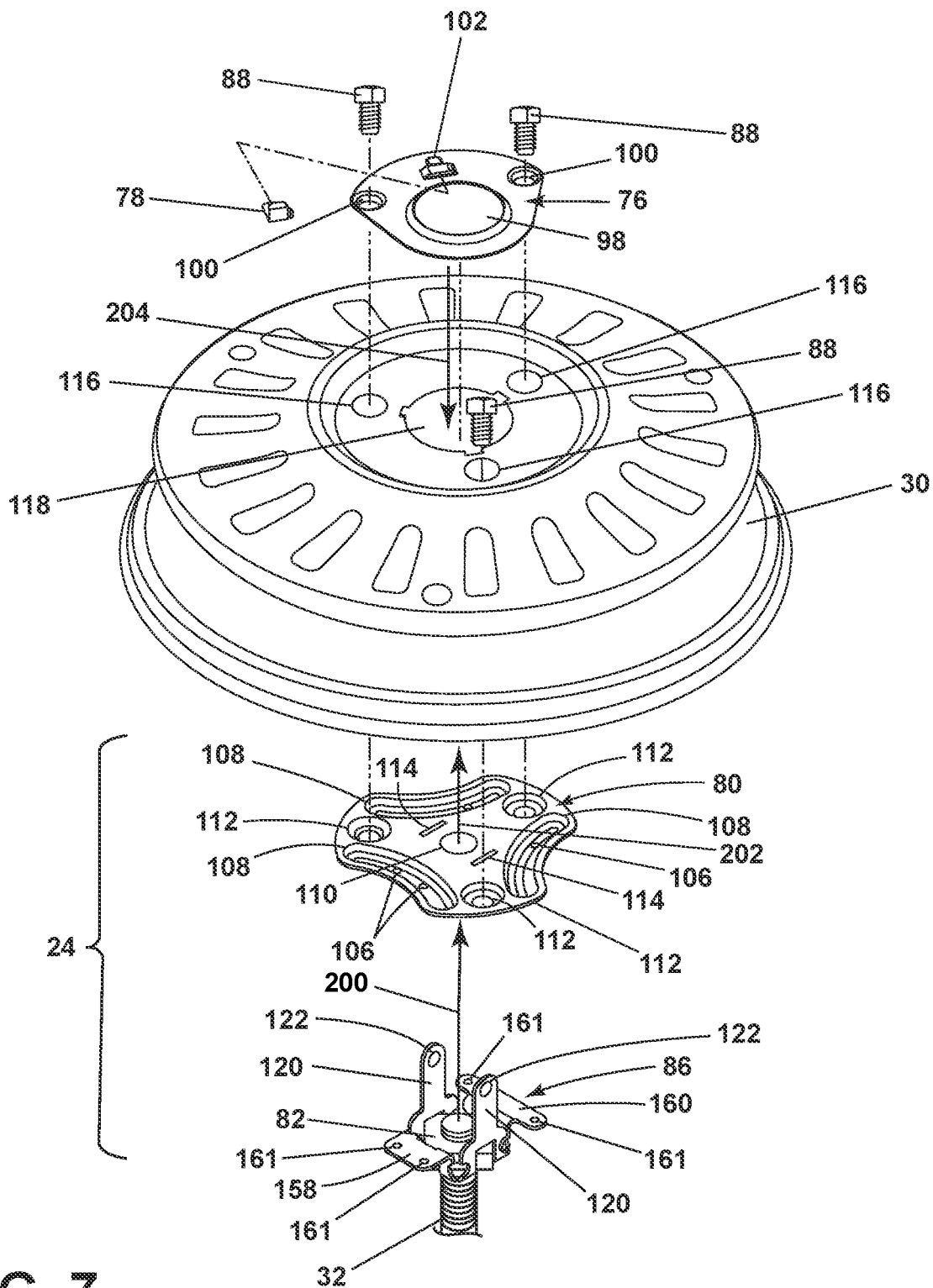
FIG. 7 illustrates the assembly sequence following FIG. 6 for coupling the assembled bracket to a motor housing with two plates.

Referring now to FIG. 7, the assembly of the motor shaft 32, the shaft fastener 82, and the bracket 86 of FIG. 6 is exploded from the first plate 76, the motor housing 30, and the second plate 80. As illustrated by arrow 200, the bracket 86 can extend through the slots 114 in the second plate 80. The second plate 80 can couple to the bracket 86 using any suitable fastener to couple the apertures 161 in the first or second projections 158, 160 to the openings 106 in the valleys 108 of the second plate 80.

As illustrated by arrow 202 and arrow 204, the first plate 76 can couple to the second plate 80, sandwiching the motor housing 30 between the first and second plate 76, 80. The fasteners 88 can extend through the fastener apertures 100 in the first plate 76, the fastener apertures 116 in the motor housing 30, and the fastener apertures 112 in the second plate 80, to secure the first plate 76, the motor housing 30, and the second plate 80 together; effectively coupling the bracket 86 and the motor shaft 32 to the first plate 76 and the motor housing 30 through the second plate 80. In such an assembly, the legs 120 of the bracket 86 can extend through the slots 114 in the second plate 80, the central aperture 118 in the motor housing 30, and the central aperture 98 in the first plate 76, with the legs 120 extending beyond the first plate 76.

Figure 8:
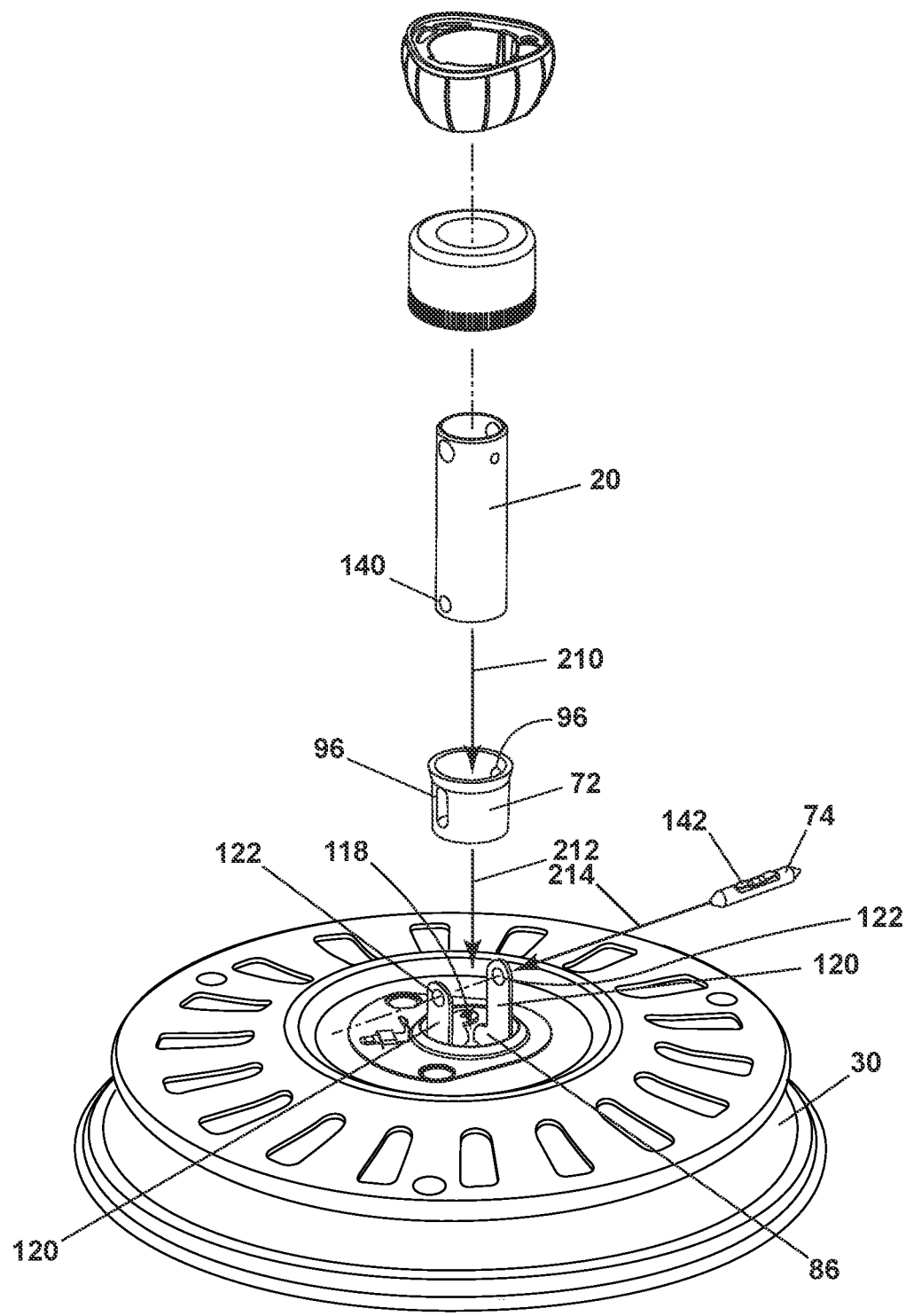
FIG. 8 illustrates the assembly sequence following FIG. 7 for coupling the downrod to the bracket with a wedge and the pin.

Referring now to FIG. 8, the legs 120 are visible extending through the central aperture 118 of the motor housing 30 and the central aperture 98 of the first plate 76. As illustrated by arrow 210, the downrod 20 inserts within the wedge 72, aligning the set of apertures 140 in the downrod 20 with the set of apertures 96 in the wedge 72. As the apertures 96 in the wedge 72 are elongated, the apertures 140 in the downrod 20 can align with any portion of the apertures 96 in the wedge 72. As illustrated by arrow 212, the combined downrod 20 and wedge 72 insert between the legs 120 of the bracket 86 extending through the motor housing 30 and the first plate 76. The set of apertures 96 in the wedge 72 and the apertures 140 in the downrod 20 align with the downrod apertures 122 in the legs 120.

As illustrated by arrow 214, the pin 74 inserts through the aligned apertures 96, 122, 140 in the aligned downrod 20, wedge 72, and legs 120 of the bracket 86, to secure them together. The elongated spring 142 on the pin 74 is depressed during insertion and can be shaped to depress during insertion. The elongated spring 142 is a self-locking mechanism and secures the pin 74 within the downrod 20, the wedge 72, and the legs 120 of the bracket 86 after insertion.

Figure 9:
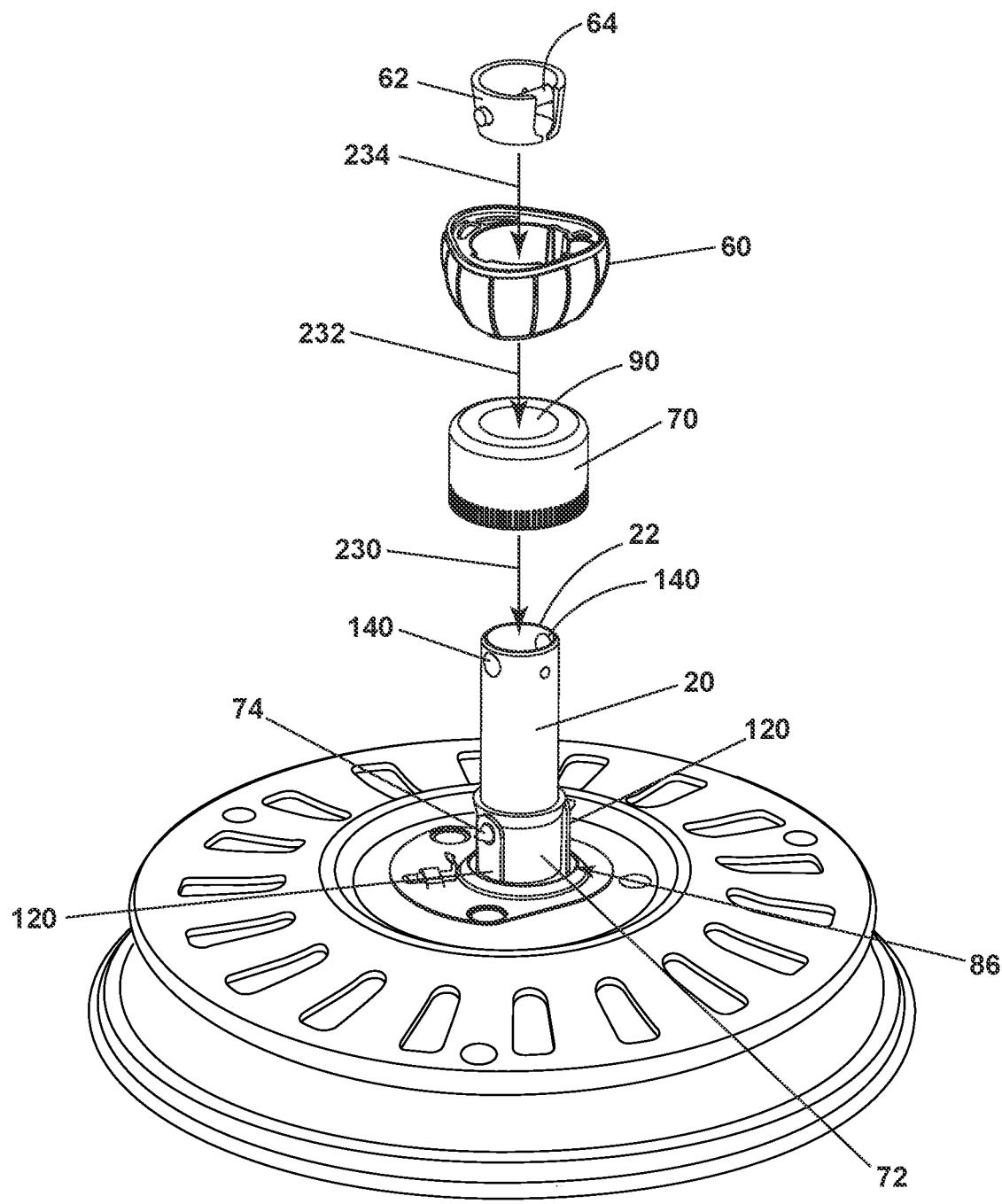
FIG. 9 illustrates the assembly sequence following FIG. 8 for positioning a cap about the downrod and coupling the ball mount assembly to the downrod.

Referring now to FIG. 9, the downrod 20, the wedge 72, and the legs 120 of the bracket 86 fasten with the pin 74, as described in FIG. 8. As illustrated by arrow 230, the cap 70 inserts along the downrod 20, with the downrod 20 extending through the central aperture 90 of the cap 70. As illustrated by arrow 232, the ball 60 can position around the downrod 20, and can rest adjacent to the cap 70. As illustrated by arrow 234, the ball coupler 62 can secure to the downrod at the first end 22, with the pin 64 of the ball coupler 62 extending through apertures 140 in the first end 22 of the downrod 20. The ball 60 can slide up the downrod 20 to seat the ball coupler 62 within the ball 60.

Figure 10:
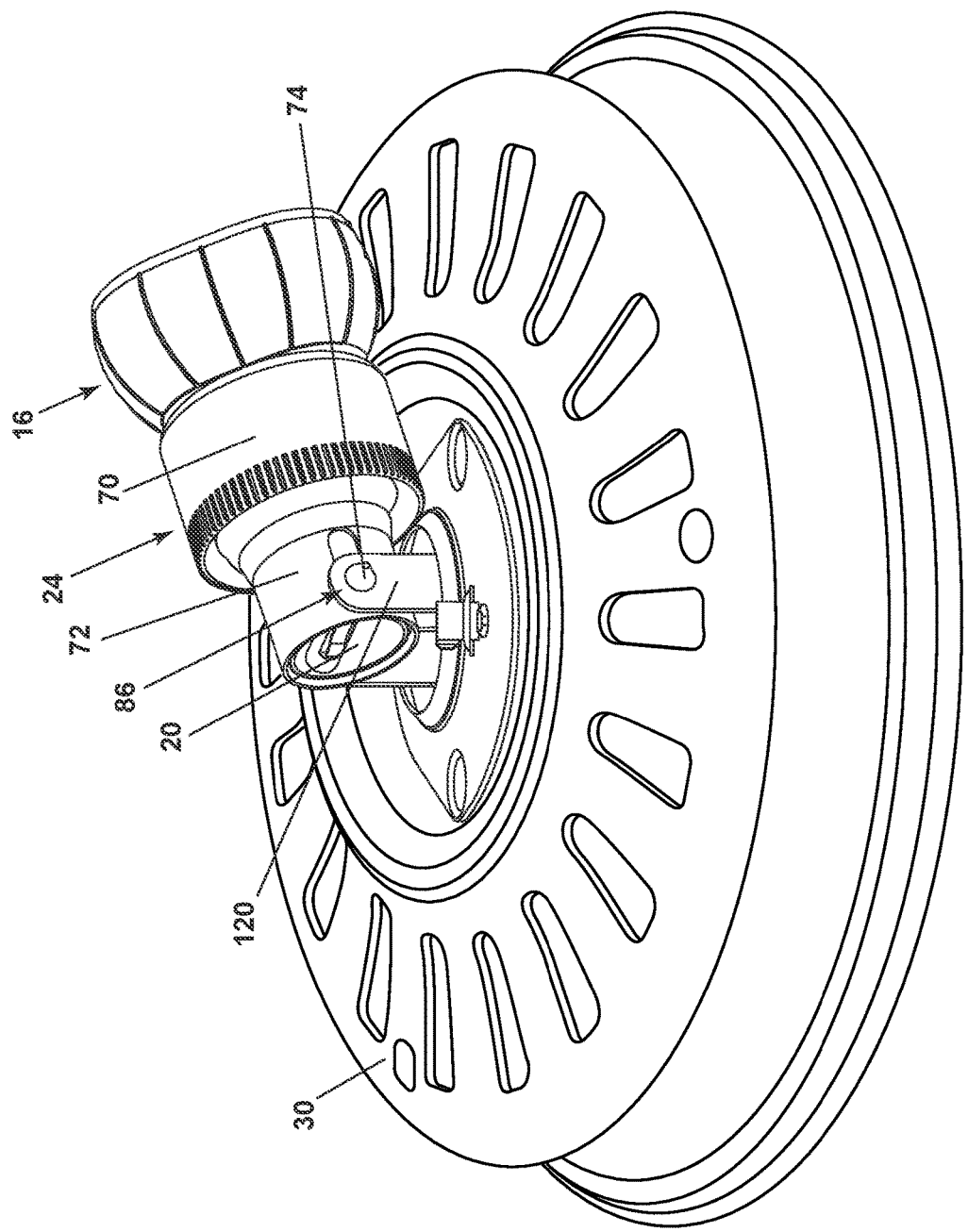
FIG. 10 illustrates the completed assembly of FIG. 9 with the downrod pivotable about the pin orienting the downrod in a pivoted position.

Referring now to FIG. 10, the cap 70 and the ball mount assembly 16 have been coupled to the downrod 20 as described in FIG. 9. The ball mount assembly 16, the cap 70, the downrod 20, and the wedge 72 are oriented in a pivoted position, pivotable about the pin 74. As such, the pin forms a rotational axis for the wedge 72 relative to the bracket 86 at the legs 120. In the pivoted position, the motor adapter assembly 24 provides a compact design suitable for packaging and shipping.

Figure 11:
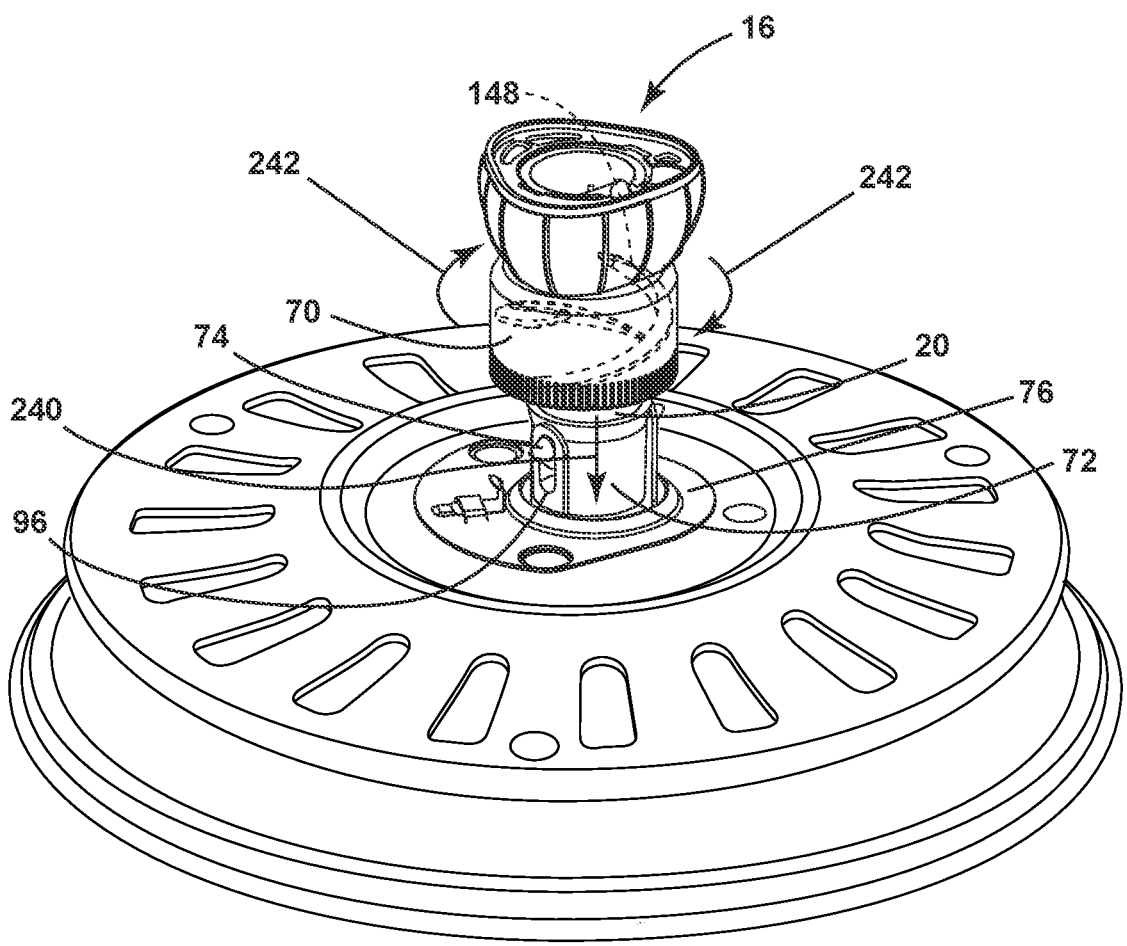
FIG. 11 illustrates the assembly sequence following FIGS. 9 and 10 for threading the cap about the pin.

Referring now to FIG. 11, the downrod 20 with the ball mount assembly 16, the cap 70, and the wedge 72 can pivot into an upright position about the pin 74. As illustrated by arrow 240, the cap 70 can be moved downward toward the motor housing 30, to position the threads 148 on the interior of the cap 70 adjacent the pin 74. As illustrated by arrow 242, the cap 70 can be rotated to thread the interior threads 148 of the cap 70 along the pin 74, which simultaneously moves the cap 70 downward along arrow 240. As the cap 70 is rotated about the pin 74, the cap 70 continues to move downward along the threads 148 to abut the first plate 76. Simultaneously, the downward movement of the cap 70 pushes the wedge 72 downward, pushing the pin 74 to top of the apertures 96 in the wedge 72, which secures the downrod 20 in the upright position with the flared portion 94 of the wedge 72 abutting the top of the cap 70, preventing the wedge 72 from being pivotable to the pivoted position as shown in FIG. 10. Preventing the wedge 72 from pivoting prevents the downrod 20 from pivoting, as well as minimizes wobble, noise, and vibration generated at the junction between the downrod 20 and the motor adapter assembly 24.

Figure 12:
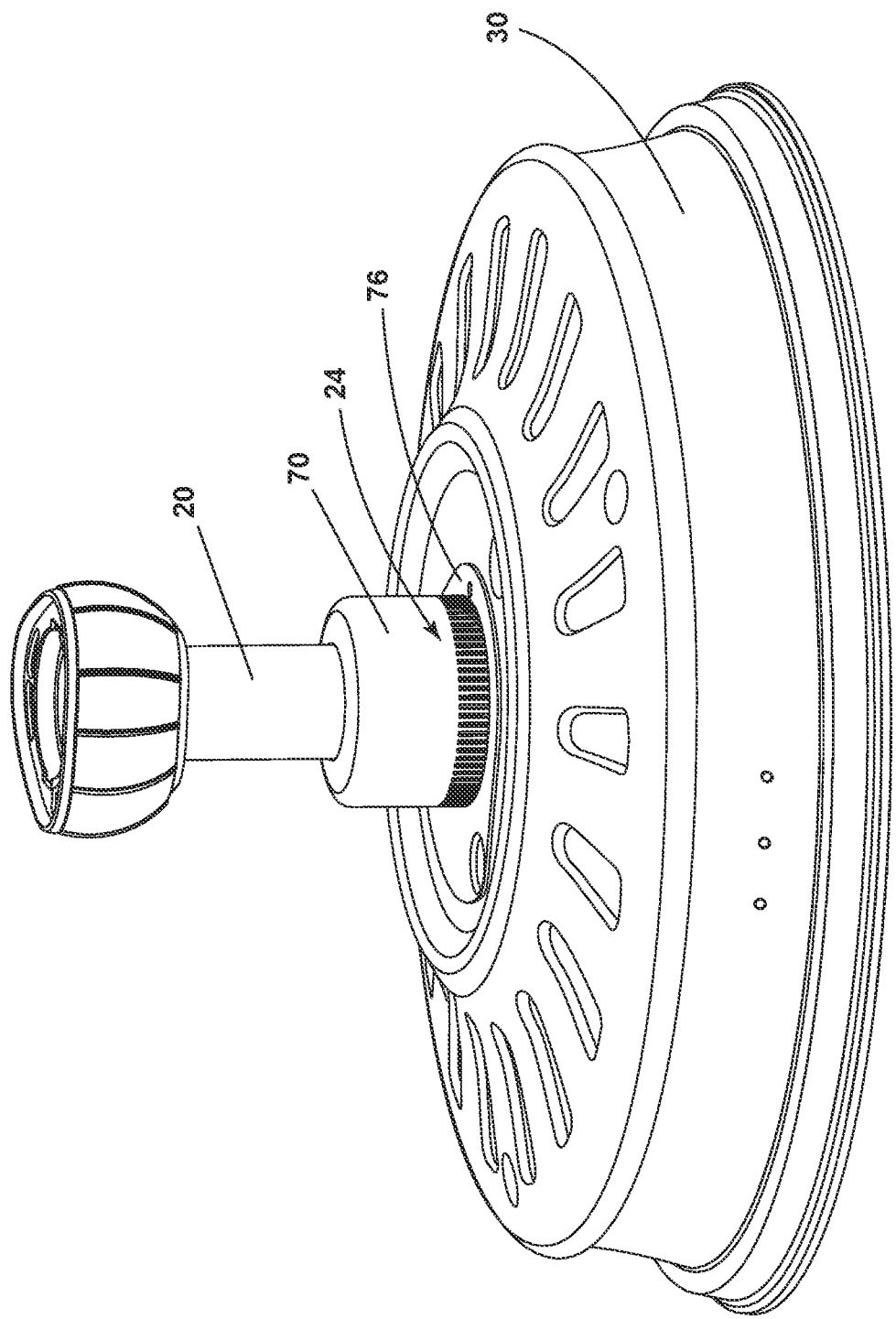
FIG. 12 illustrates the completed assembly of FIG. 11 with the cap fully threaded about the pin orienting the downrod in an upright position.

Referring now to FIG. 12, the cap 70 has been fully rotated downward toward the motor housing 30 into the final installed position, securing the downrod 20 in the upright position. The downrod 20 secures to the legs 120 of the bracket 86 with the pin 74 to mount the downrod 20 to the motor shaft 32.

The motor adapter assembly 24 as described herein is adapted to secure a motor shaft 32 to a downrod 20 for suspending the ceiling fan with reduced vibration, noise, or wobbling resultant generated with typical motor adapters or motor couplers. Additionally, the motor adapter assembly 24 is pivotable between an upright installed position (FIG. 6) with the cap 70 threaded to abut the first plate 76, and a pivoted position (FIG. 7) minimizing the space required for packaging, shipping, and sale of a ceiling fan.

Figure 13:
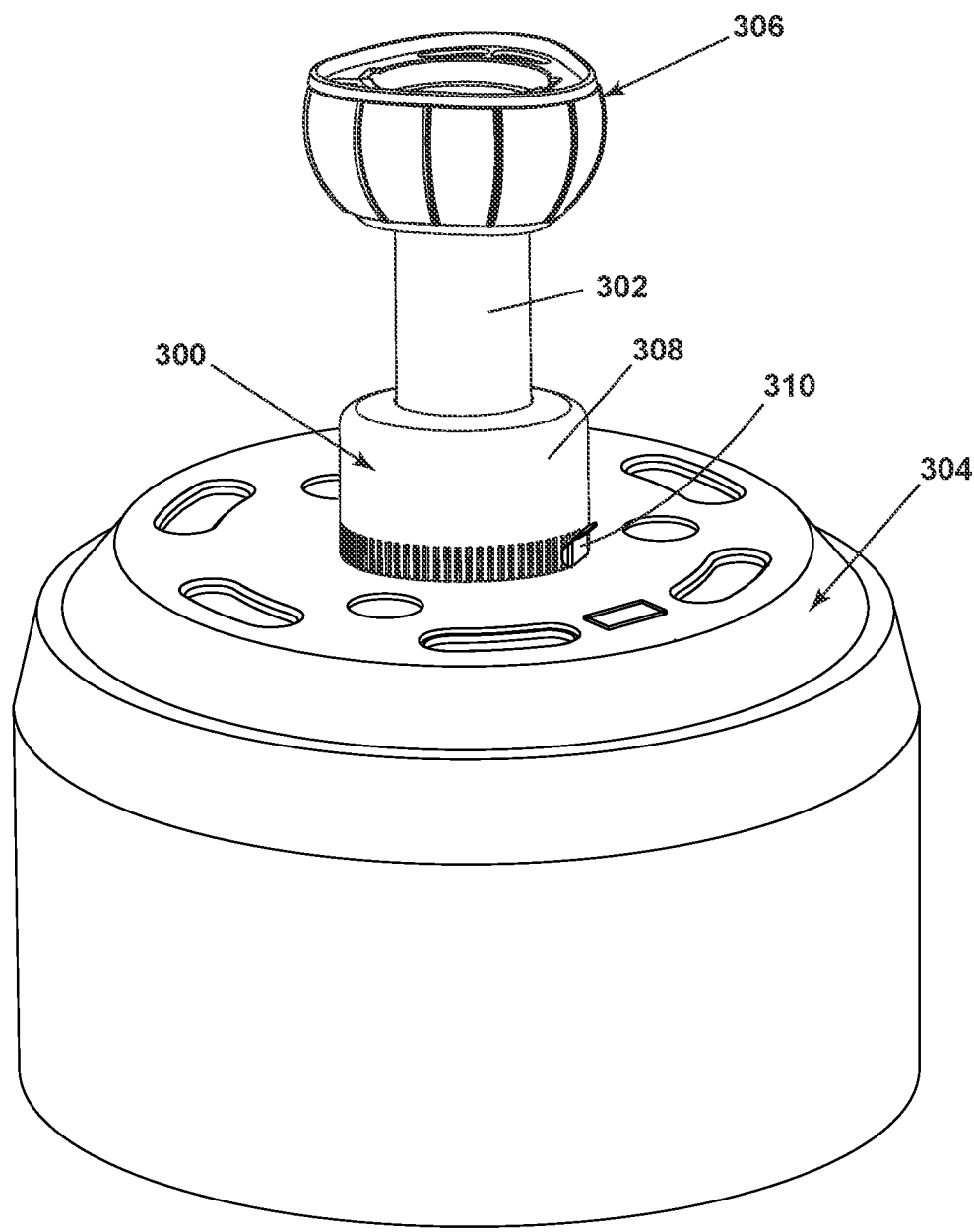
FIG. 13 is a perspective view of an alternative motor adapter assembly for a ceiling fan in the upright position coupled to a motor housing.

Referring now to FIG. 13, another exemplary motor adapter assembly 300 couples a downrod 302 to a motor shaft (FIG. 14) and motor housing 304. The motor adapter assembly 300 couples to the downrod 302 to orient the downrod 302 in the upright, extended position. A ball mount assembly 306 couples to the downrod 302 opposite of the motor adapter assembly 300. A cap 308 can form the exterior for the motor adapter assembly 300. A clip 310 can secure the cap 308 at the motor housing 304.

Figure 14:
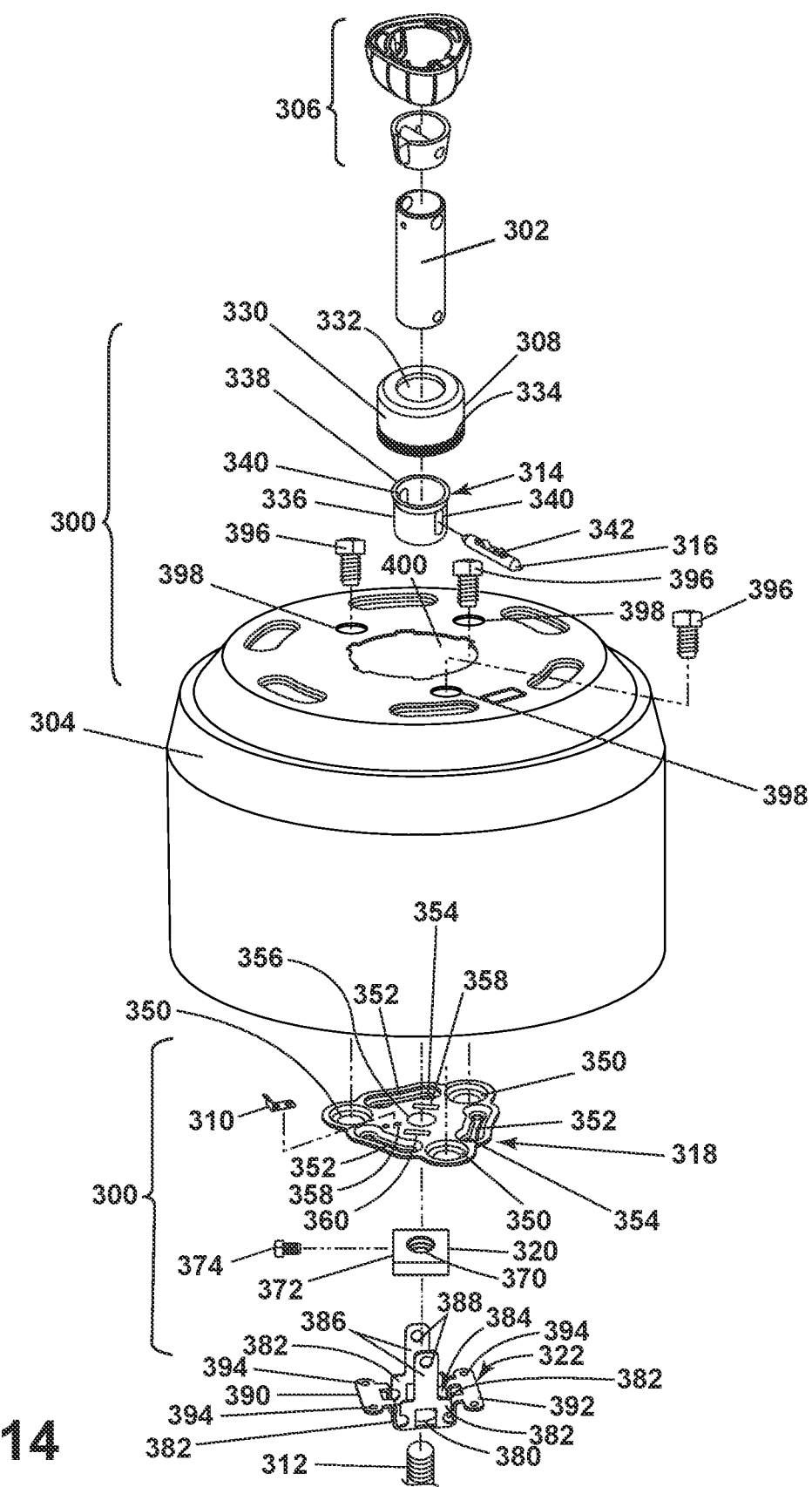
FIG. 14 is an exploded view of the motor adapter assembly of FIG. 13 for coupling a downrod to a motor shaft.

Referring now to FIG. 14, the motor adapter assembly 300 is adapted to couple the downrod 302 to a motor shaft 312. The ball mount assembly 306 couples to the downrod 302 opposite of the motor adapter assembly 300 to suspend a ceiling fan from a structure, such as that shown in FIG. 1. The motor adapter 300 further couples the motor housing 304 to the downrod 302 and the motor shaft 312, providing for coupling of the downrod 302 to the motor shaft 312 through the motor housing 304.

The motor adapter assembly 300 includes the cap 308, a wedge 314, a pin 316, a mount plate 318, the clip 310, a shaft fastener 320, and the bracket 322. The cap 308 includes a body 330 having a central aperture 332. A set of grooves 334 are provided on the exterior of the body 330. The wedge 314 includes a body 336 having a flared portion 338 and a set of opposing apertures 340. The pin 316 includes a spring member 342 adapted to insert through the set of opposing apertures 340 in the wedge 314 to couple the wedge 314 to the downrod 302.

The mount plate 318 can include a set of three housing mount apertures 350, while any number is contemplated. A set of valleys 352 can be provided in the mount plate 318 between the housing mount apertures 350, each valley 352 having a set of openings 354. A central aperture 356 can be provided in the center of the mount plate 318. A set of slots 358 can be arranged around the central aperture 356. The slots 358 can include two slots 358 arranged parallel to one another. A pair of clip apertures 360 can be provided in the mount plate 318, adapted to couple to the clip 310 with one or more fasteners, for example.

The shaft fastener 320 can include a central aperture 370, and a side aperture 372 adapted to receive a fastener 374. The bracket 322 can include a base wall 380 having four sidewalls 382 extending from the base wall 380 to define a seat 384. The seat 384 can be adapted to seat the shaft fastener 320. The sidewalls 382 can be spaced from one another, as well as including apertures in each sidewall 382. Two of the sidewalls 382 can include legs 386 each having a leg aperture 388 provided in each leg 386. The remaining sidewalls 382 without the legs 386 can bend to form a first projection 390 and a second projection 392. Apertures 394 can be provided in the first and second projections 390, 392 adapted to secure to the mount plate 318 at the apertures provided in the valleys 352. A central aperture 394 can be provided in the base wall 380 adapted to receive the motor shaft 312 to couple the motor shaft 312 to the shaft fastener 320 seated in the seat 384. The central aperture 394 need not be threaded and need not fasten to the motor shaft 312, while a threaded central aperture 394 is contemplated.

For assembly, the shaft fastener 320 can seat in the seat 384, and the motor shaft 312 can extend through the central aperture 394 in the bracket 322 to couple to the shaft fastener 320. The shaft fastener 320 can be secured by orienting corners of the shaft fastener 320 in the spaces between the sidewalls 382 of the bracket 322, preventing rotation of the shaft fastener 320 from the motor shaft 312.

The legs 386 of the bracket 322 can extend through the slots 358 in the mount plate 318. The bracket 322 can fasten to the mount plate 318 with fasteners securing the first and second projections 390, 392 at the openings 354 in the valleys 352 of the mount plate 318. The clip 310 can couple to the mount plate 318 at the clip apertures 360 with any suitable fastener.

The mount plate 318 can couple to the motor housing 304 with fasteners 396 extending through the housing mount apertures 350 and motor housing apertures 398 in the motor housing 304. Upon mounting the mount plate 318 to the motor housing 304, the legs 386 and the clip 310 extend through a central aperture 400 in the motor housing 304.

The ball mount assembly 306 can mount to the downrod 302 at one end. The cap 308 can position around the downrod 302. The end of the downrod 302 opposite of the ball mount assembly 306 can position within the wedge 314, aligning apertures in the downrod 302 with the apertures 340 in the wedge 314. The combined wedge 314 and downrod 302 can position within the legs 386 of the bracket 322, aligning all apertures. The pin 316 can insert through the apertures in the downrod 302, the wedge 314, and the bracket 322 to secure the elements together; effectively coupling the downrod 302 to the motor shaft 312 through the shaft fastener 320, the bracket 322, the wedge 314, and the pin 316, while coupling to the motor housing 304 with the mount plate 318.

The cap 308 can be threaded, similar to the cap 70 of FIG. 3, and can threadably couple to the pin 316 extending from the legs 386. Rotating the cap 308 can move the cap 308 downward toward the motor housing 304, pushing the wedge 314 downward. Pushing the wedge 314 downward moves the flared portion 338 of the wedge 314 to abut the legs 386, orienting the downrod 302 in an upright position. The flared portion 338 reduces noise and wobble at the junction between the downrod 302 and the motor adapter assembly 300. When the cap 308 is threaded fully, it can abut the motor housing 304 where the clip 310 can secure the cap 308 in the final position adjacent to the motor housing 304, securing the downrod 302 in the upright position, as shown in FIG. 13.

Figure 15:
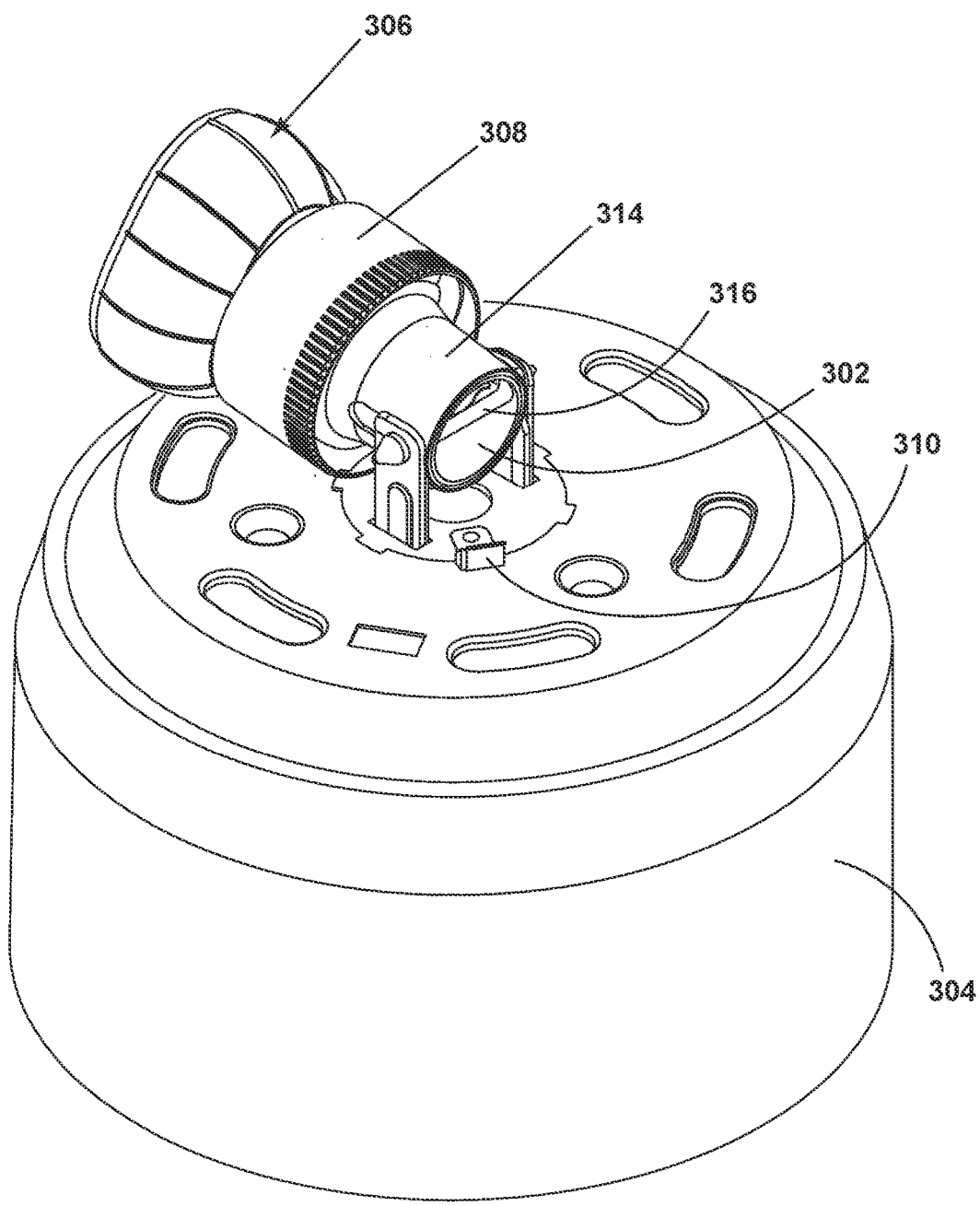
FIG. 15 is perspective view of the motor adapter assembly of FIG. 13 in a pivoted position coupled to the motor housing.

Referring now to FIG. 15, prior to rotating the cap 308 about the pin 316, the combined wedge 314, downrod 302, and the attached ball mount assembly 306 can pivot into a pivoted position, as shown. The pivoted position can provide for convenient packaging or storage, prior to installation of the ceiling fan. When installation is desired, a user, installer, or similar can position the downrod 302 in the upright position, and thread the cap 308 about the pin 316 to secure the downrod 302 into the upright position. The cap 308 can then secure at the clip 310 to secure the cap 308 adjacent the motor housing 304.

Figure 16:
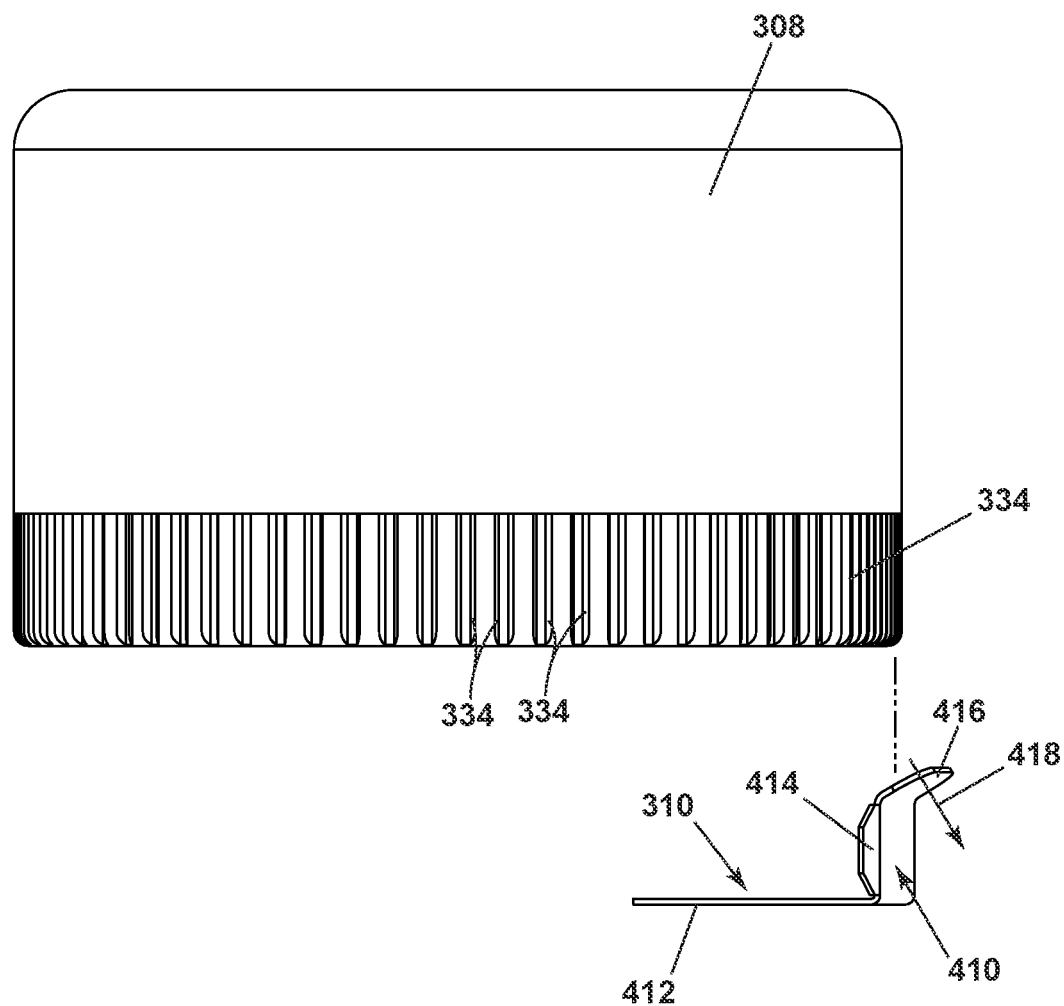
FIG. 16 is an isolated view of a cap and a clip for the motor adapter assembly of FIG. 14.

Referring now to FIG. 16, the clip 310 can include a body 410 having a mount plate 412, a lock arm 414, and a spring clip 416. The mount plate 412 can be secured to the mount plate 318 of FIGS. 13-15. The lock arm 414 can be adapted to secure within the grooves 334 on the cap 308 as the cap 308 is threadably secured about the pin 316 of the motor adapter assembly 300. Securing the clip 310 at the grooves 334 with the lock arm 414 can provide audible feedback to the installer, such as a clicking noise caused by the lock arm 414, to indicate that the cap 308 is being secured at the motor housing 304. Additionally, the clip provides visual feedback that the cap 308 is secure. When a user or installer wants to release the clip 310, the spring clip 416 can be depressed along arrow 418 to bend the lock arm 414 away from the grooves 334, permitting the cap 308 to be loosened.

The motor adapter assembly as described herein provides for an improved mount assembly for coupling a downrod to a motor shaft, including decreased noise, movement, and wobble. Additionally, the mount adapter assembly permits easy assembly, as well as quickly converting the downrod from a pivoted position to an upright position, facilitating installation after shipping or sale.

Figure 17:
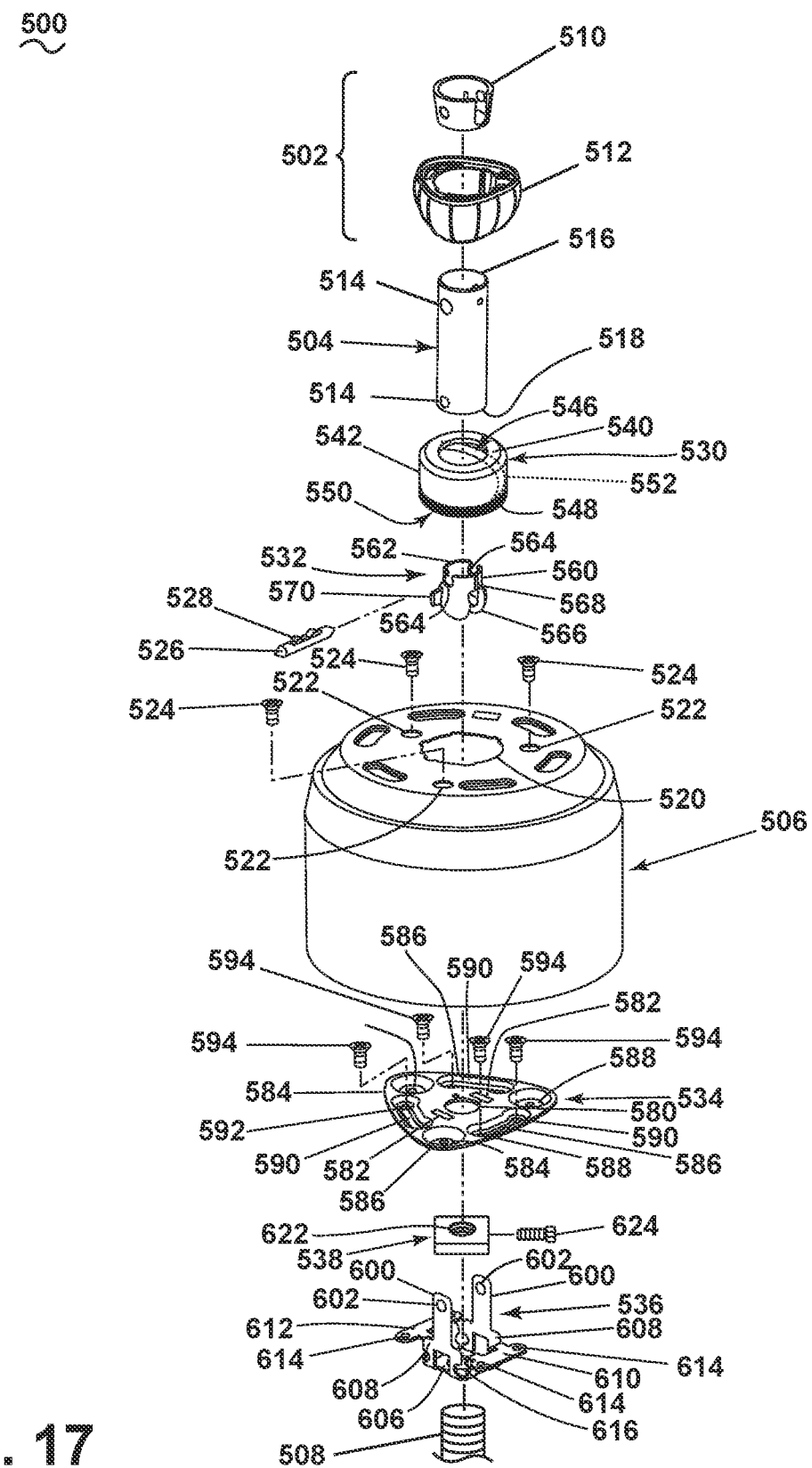
FIG. 17 is an exploded, top perspective view of another alternative motor adapter assembly for a ceiling fan including an interference coupler.

Referring now to FIG. 17, an alternative motor adapter assembly 500 is shown exploded from a ball mount assembly 502, a downrod 504, a motor housing 506, and a motor shaft 508. The ball mount assembly 502 can include a ball 510 and a ball coupler 512, and can be similar to the ball mount assembly 16 of FIG. 2. The downrod 504 can include two pair of mount apertures 514, one pair at a first end 516 adjacent the ball mount assembly 502 and one pair at a second end 518 adjacent the motor housing 506. The motor housing 506 includes a central aperture 520, with a set of fastener apertures 522 arranged around the central aperture 520, shown as three fastener apertures 522. A set of fasteners 524 can be insertable into the fastener apertures 522. In one example, the motor shaft 508 can threadably couple to the motor adapter assembly 500, while the motor shaft 508 can alternatively include a pin aperture configured to couple to the motor adapter assembly 500.

The motor adapter assembly 500 includes a pin 526, a cap 530, an interference coupler 532, a mount plate 534, a bracket 536, and a shaft fastener 538 shown as a square nut including a central aperture 622. The pin 526 can be any pin as described herein, having a flexure shown as a spring member 528. The cap 530 can include a top wall 540 extending to a peripheral wall 542, with a downrod aperture 544 in the top wall 540, and the peripheral wall 542 defining an interior 546. The peripheral wall 542 terminates at a bottom edge 548 to define a bottom opening 550. A set of threads 552 are formed along peripheral walls 542 in the interior 546, and can be similar to the other caps as described herein.

The interference coupler 532 can be an interference ball, as shown, having at least a portion of the interference coupler 532 having a spherical shape. Alternatively, any suitable shape for the interference coupler 532 is contemplated. The interference coupler 532 includes a peripheral wall 560 terminating at an upper edge 562. A set of pin apertures 564 are formed along the upper edge 562. Opposite of the upper edge 562, the peripheral wall 560 transitions to having a spherical shape and includes a wire aperture 566 opposite of the upper edge 562. The peripheral wall 560 can be discontinuous, defining a slot 568 extending along the peripheral wall 560 between the upper edge 562 and the wire aperture 566. A set of shoulders 570 extends from the peripheral wall 560.

The mount plate 534 includes a central aperture 580 with a set of slots 582 on opposing sides of the central aperture 580. The mount plate 534 can have a substantially rounded-triangular shape, with three rounded corners 584 having sidewalls 586 extending between the corners 584, while any shape is contemplated having any number of corners 584 and sidewalls 586. A set of three housing apertures 588 are arranged in the mount plate 534 adjacent and slightly spaced from the corners 584. A set of channels 590 extend between the housing apertures 588, each channel 590 including a set of bracket apertures 592. A set of fasteners 594 can be arranged to insert into the bracket apertures 592 to couple the mount plate 534 to the bracket 536.

The bracket 536 can be substantially similar to the bracket 86 of FIG. 2, having a set of legs 600, each including a set of leg apertures 602. A seat 604 is formed by a bottom wall 606 and a sidewall 608 shown as four discrete walls 608. The legs 600 extend from two opposing sidewalls 608, while the remaining two sidewalls 608 terminate at a first projection 610 and a second projection 612. Apertures 614 are provided in the first and second projections 610, 612. A shaft aperture 616 can be provided in the bottom wall 606.

The shaft fastener 538 can include a central aperture 620. Alternatively, the shaft fastener 538 can be any suitable fastener, and need not be a square nut as illustrated. A set screw 624 can couple to the shaft fastener 538 extending into the central aperture 620.

Figure 18:
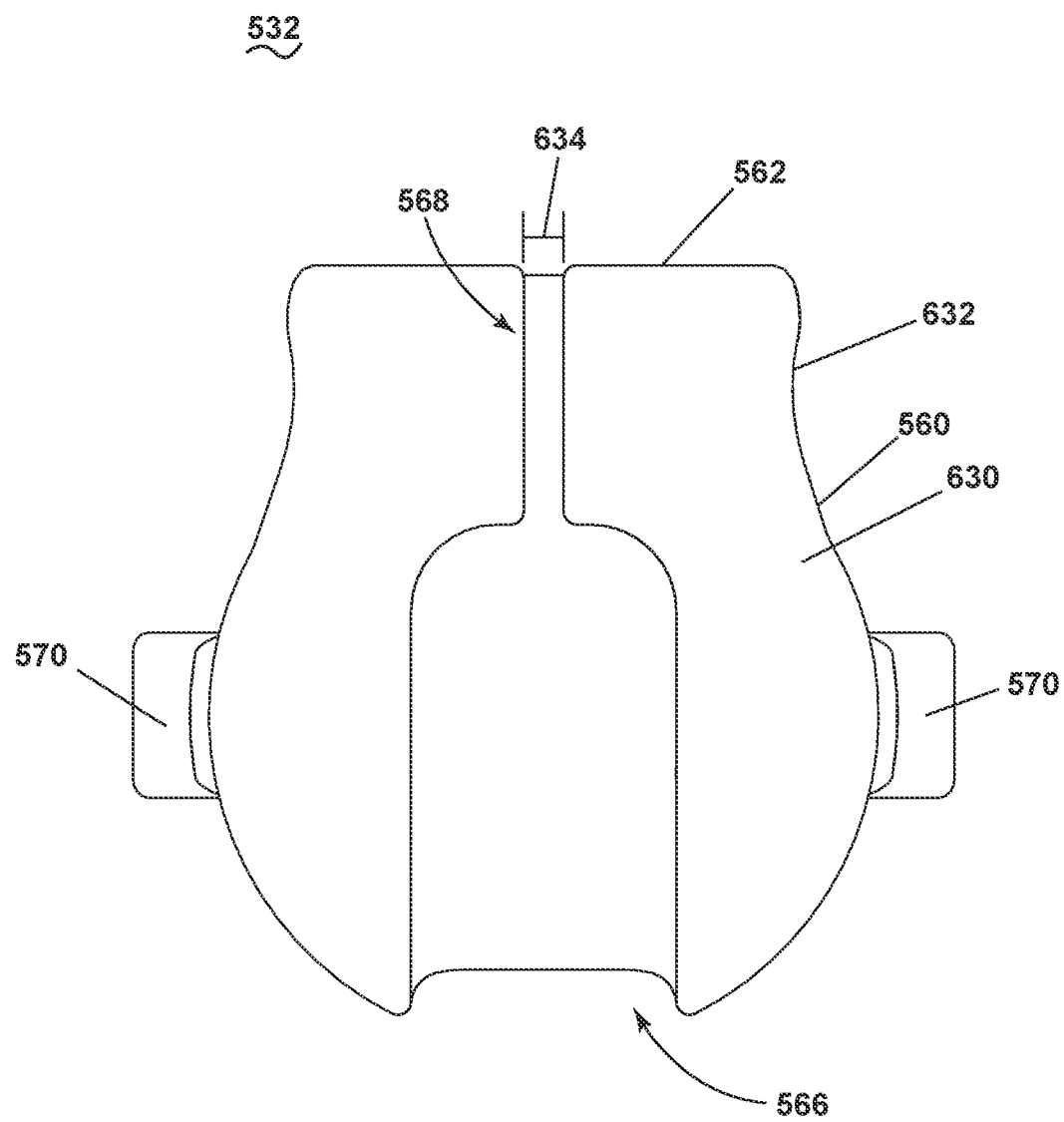
FIG. 18 is a front view of the interference coupler of FIG. 17 having a channel.

Referring now to FIG. 18, the peripheral wall 560 of the interference coupler 532 includes a rounded portion 630 provided about the wire aperture 566. The rounded portion 630 can include a substantially circular profile. The rounded portion 630 terminates at a neck 632, which slightly widens extending toward the upper edge 562. The slot 568 extend from the upper edge 562 downward and terminates at the wire aperture 566 near the transition from the rounded portion 630 to the neck 632. The slot 568 provides for minimal movement, flexion, or compliance at the interference coupler 532. The slot 568 can include gap distance 634 that is sized to permit maximum flexion of the interference coupler 532 until opposing sides for the peripheral wall 560 at the slot 568 contact one another, to prevent over-extension or undesired flexion by contact of the opposing sides of the peripheral wall 560. The wire aperture 566 is enlarged as compared to the slot 568 to permit wiring to extend from a downrod to a motor. Additionally, the wire aperture 566 is elongated to provide for wiring during pivoting movement of the interference coupler.

Figure 19:
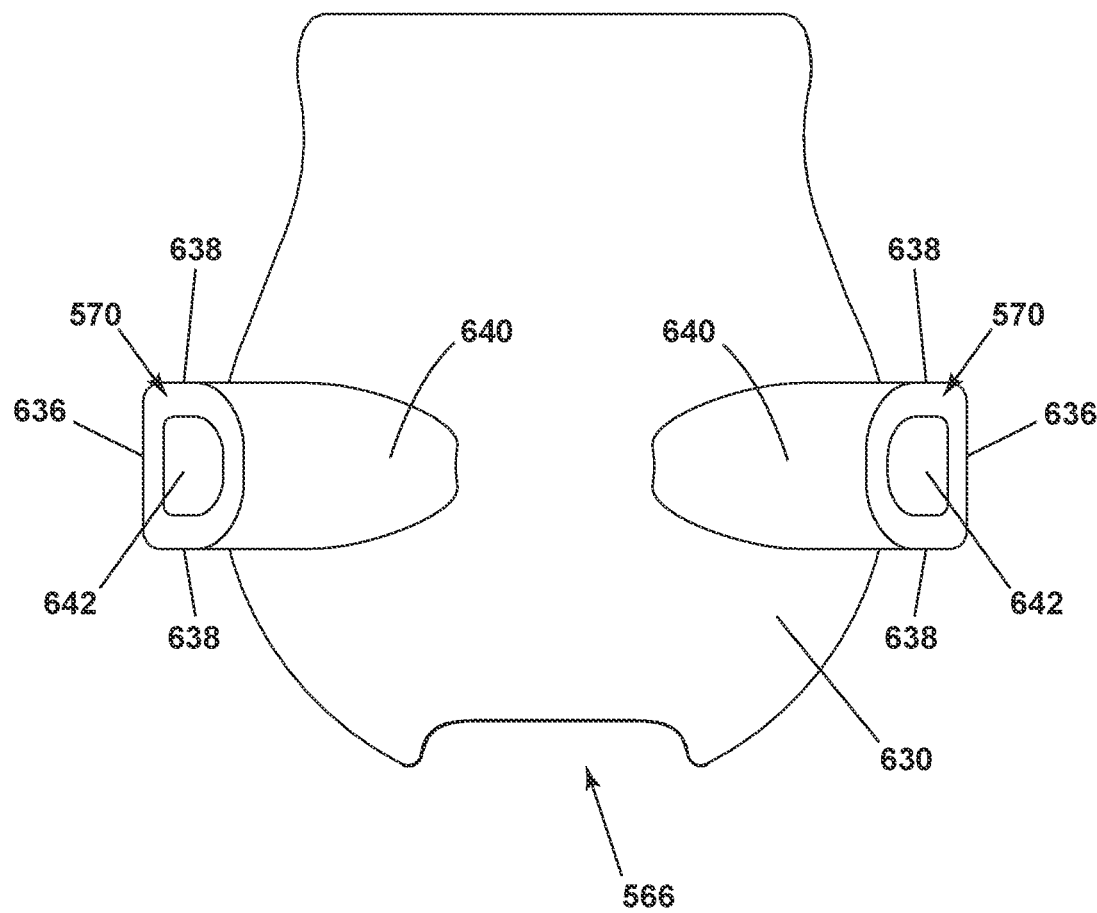
FIG. 19 is a rear view of the interference coupler of FIG. 18 having shoulders.

Referring now to FIG. 19, the shoulders 570 on the interference coupler 532 extend from opposing sides of the peripheral wall 560 at the rounded portion 630. The shoulders 570 include a front wall 636, and opposing sidewalls 638 the curved toward a rear wall 640. Optionally, the shoulders 570 can be hollow, having a shoulder opening 642 defined within the walls 636, 638, 640.

Figure 20:
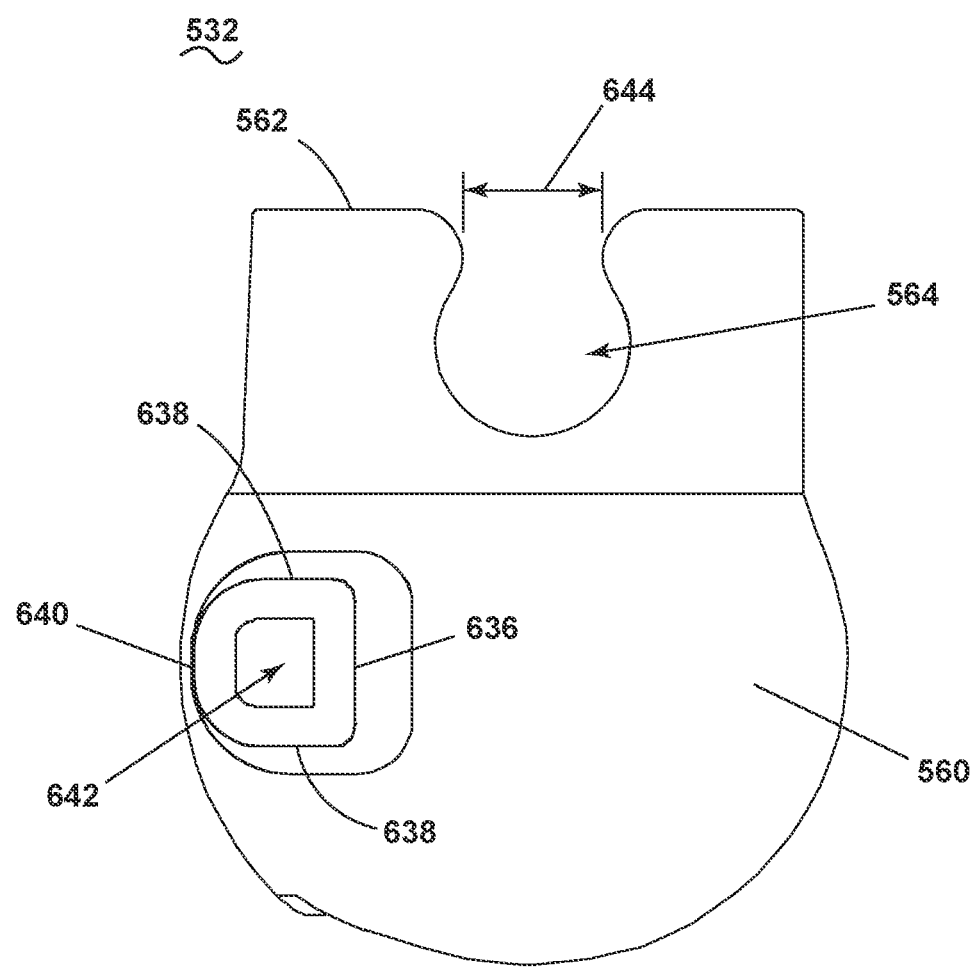
FIG. 20 is a side view of the interference coupler of FIG. 19 having an aperture.

Referring now to FIG. 20, the pin apertures 564 can be formed in the upper edge 562 of the peripheral wall 560. The pin apertures 564 can include a minimum cross-sectional distance 644, which can be sized such that a pin inserted in the pin apertures 564 is prevented from sliding through the pin apertures 564 at the upper edge 562. Optionally, the pin apertures 564 can be enclosed, disconnected from the upper edge 562.

Figure 21:
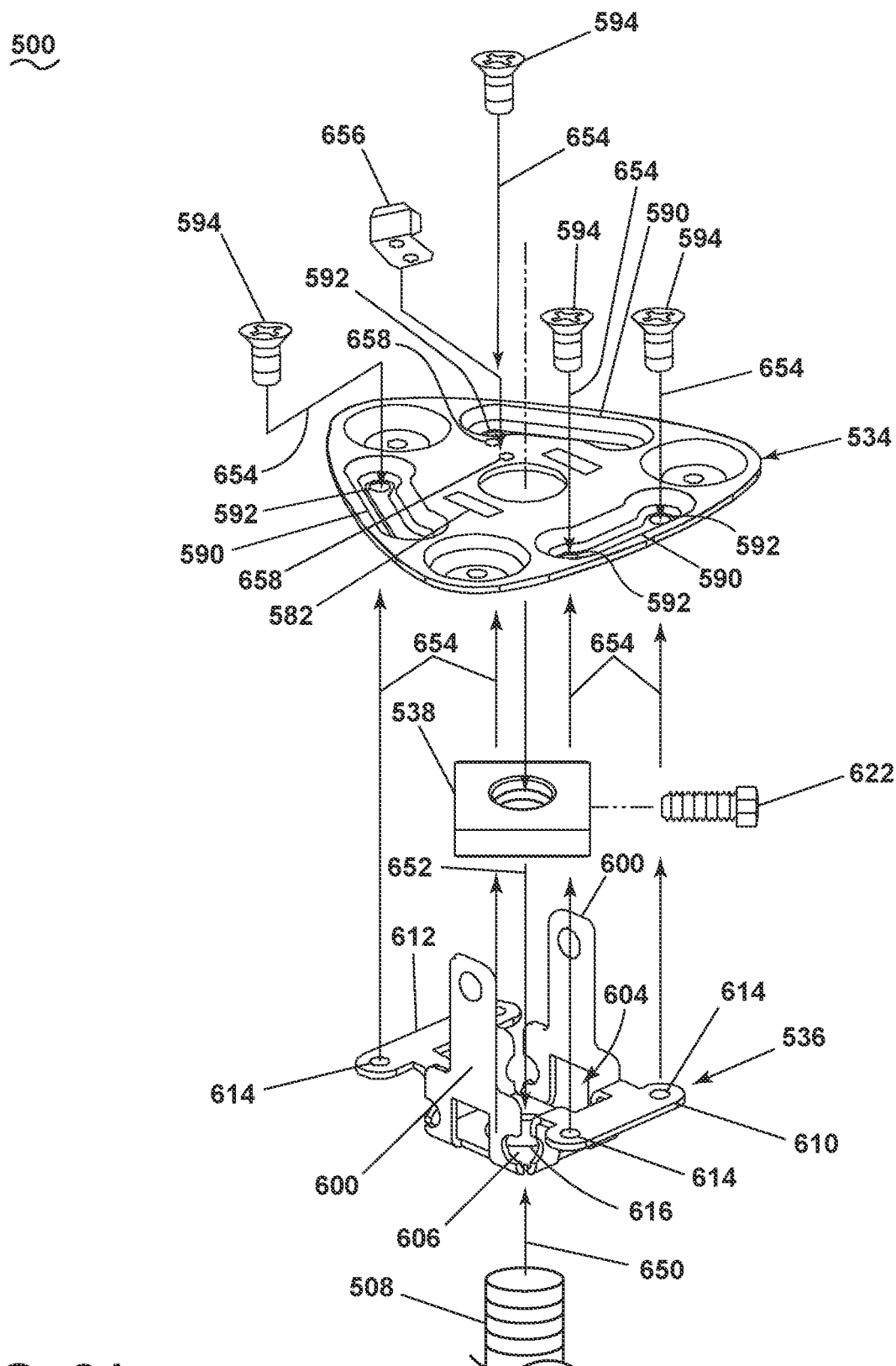
FIG. 21 illustrates an assembly sequence for coupling a bracket to a motor shaft and a mount plate.

FIGS. 21-26 illustrate an assembly sequence for assembling the motor adapter assembly 500 to couple the motor shaft 508 to the downrod 504 and a motor housing 506, such as that shown in FIG. 17. Referring now to FIG. 21 in particular, the shaft fastener 538 can seat in the seat 604 of the bracket 536, as illustrated by arrow 652. In one example, the shaft fastener 538 can be machined within the seat 604, having the sidewalls 608 of the bracket 536 bent around the shaft fastener 538. The combined shaft fastener 538 and the bracket 536 can threadably secure to the motor shaft 508, as illustrated by arrow 650, with the motor shaft 508 can insert through the shaft aperture 616 in the bottom wall 606 of the bracket 536. The set screw 624 can further secure the bracket 536 and the motor shaft 508 to the shaft fastener 538. Optionally, the shaft fastener 538 can be machined or manufactured to be secured in the seat 604 of the bracket 536, and the motor shaft 508 can threadably fasten to the shaft fastener 538.

As illustrated by arrows 654, the fasteners 594 can insert through the bracket apertures 592 in the channels 590 of the mount plate 534 and couple to the apertures 614 in the first and second projections 610, 612 of the bracket 536 to couple the bracket 536 to the mount plate 534. When coupling the bracket 536 to the mount plate 534, the legs 600 insert through the slots 582, extending above the mount plate 534. Additionally, a tab 656 can couple to the mount plate 534 at a set of tab apertures 658. Alternatively, the tab 656 can be manufactured as attached to the mount plate 534.

Figure 22:
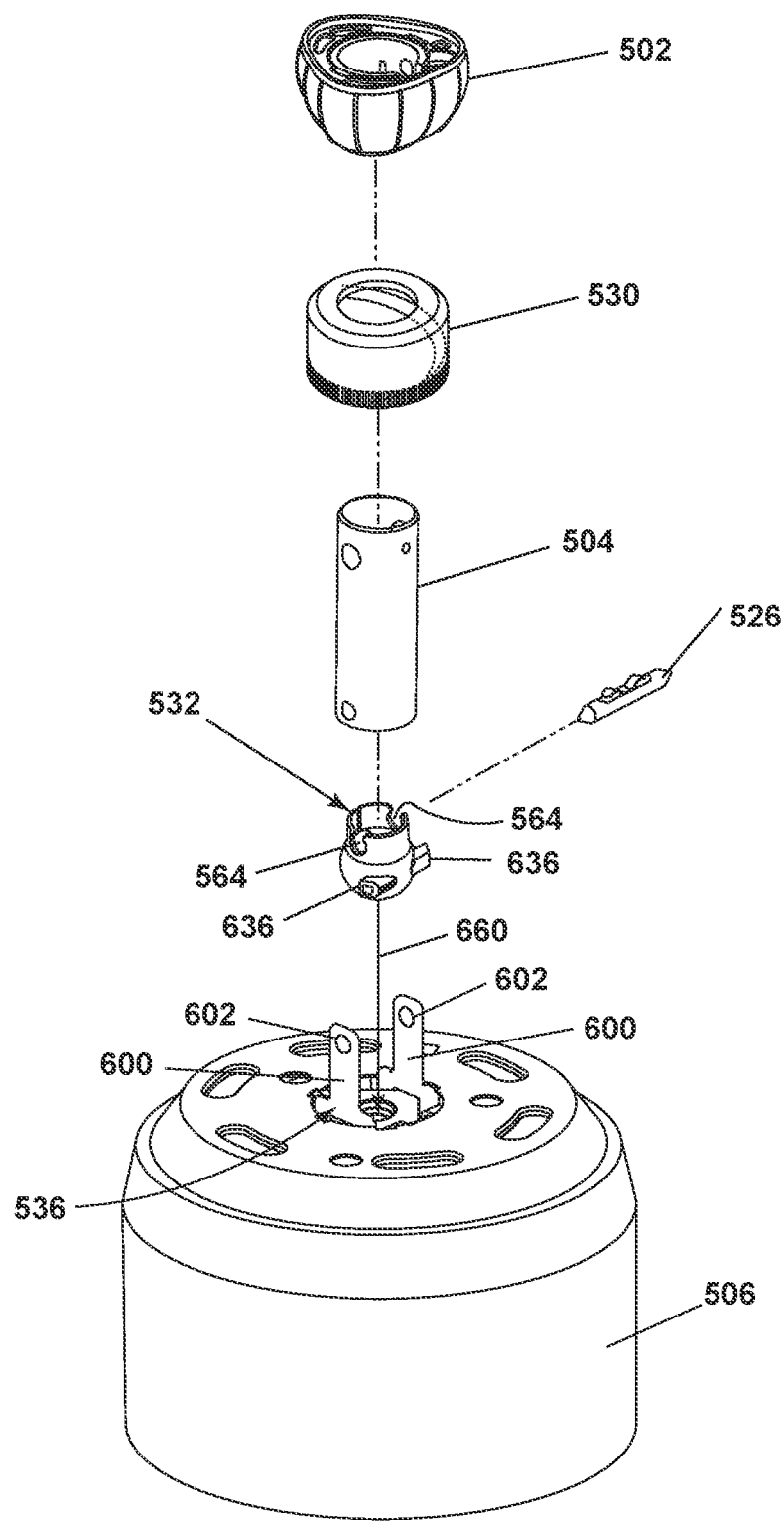
FIG. 22 illustrates the assembly sequence following FIG. 21 for positioning the interference coupler at the bracket extending through a motor housing.

Referring now to FIG. 22, the interference coupler 532 can be positioned between the legs 600 of the bracket 536 extending from the motor housing 506, as illustrated by arrow 660. The pin apertures 564 in the interference coupler 532 can be aligned with the leg apertures 602 in the legs 600. Additionally, the front wall 636 of the interference coupler 532 can abut the legs 600.

Figure 23:
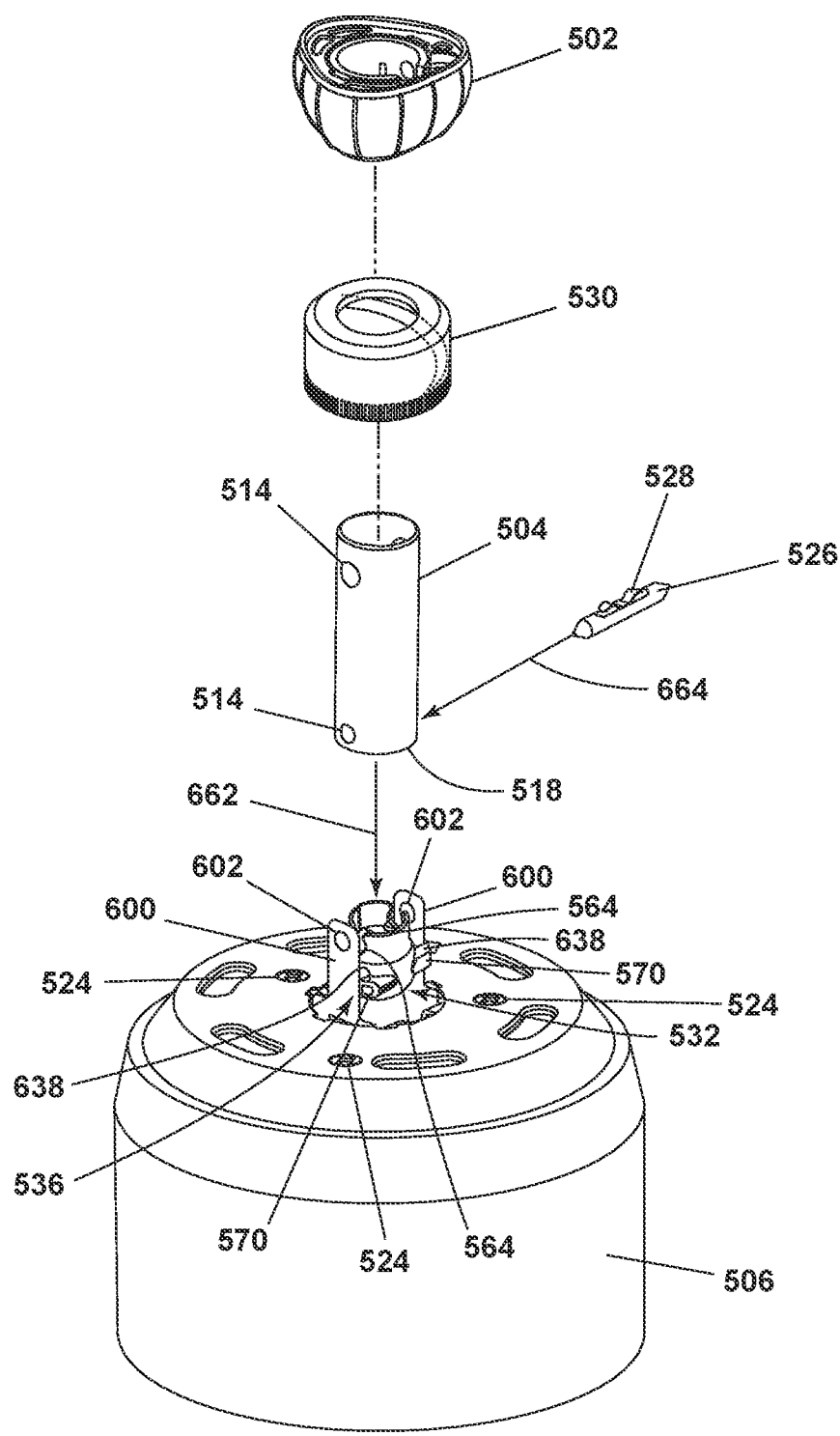
FIG. 23 illustrates the assembly sequence following FIG. 22 for coupling a downrod to the bracket at the interference coupler.

Referring now to FIG. 23, the downrod 504 can be inserted around the interference coupler 532, as illustrated by arrow 662, positioning between the legs 600 and the interference coupler 532. The mount apertures 514 in the downrod 504 adjacent the second end 518 can be aligned with the leg apertures 602 in the legs and the pin apertures 564 in the interference coupler 532. Additionally, the second end 518 of the downrod 504 can be inserted around the interference coupler 532 until the downrod 504 abuts the sidewall 638 of the shoulders 570. The fasteners 524 can secure the mount plate 534 to the motor housing 506

The pin 526 can be inserted through the mount apertures 514, the pin apertures 564, and the leg apertures 602, as illustrated by arrow 664, to fasten the downrod 504 to the interference coupler 532 and the bracket 536. The spring member 528 on the pin 526 can retain the pin 526 within the downrod 504, the interference coupler 532, and the bracket 536.

Figure 24:
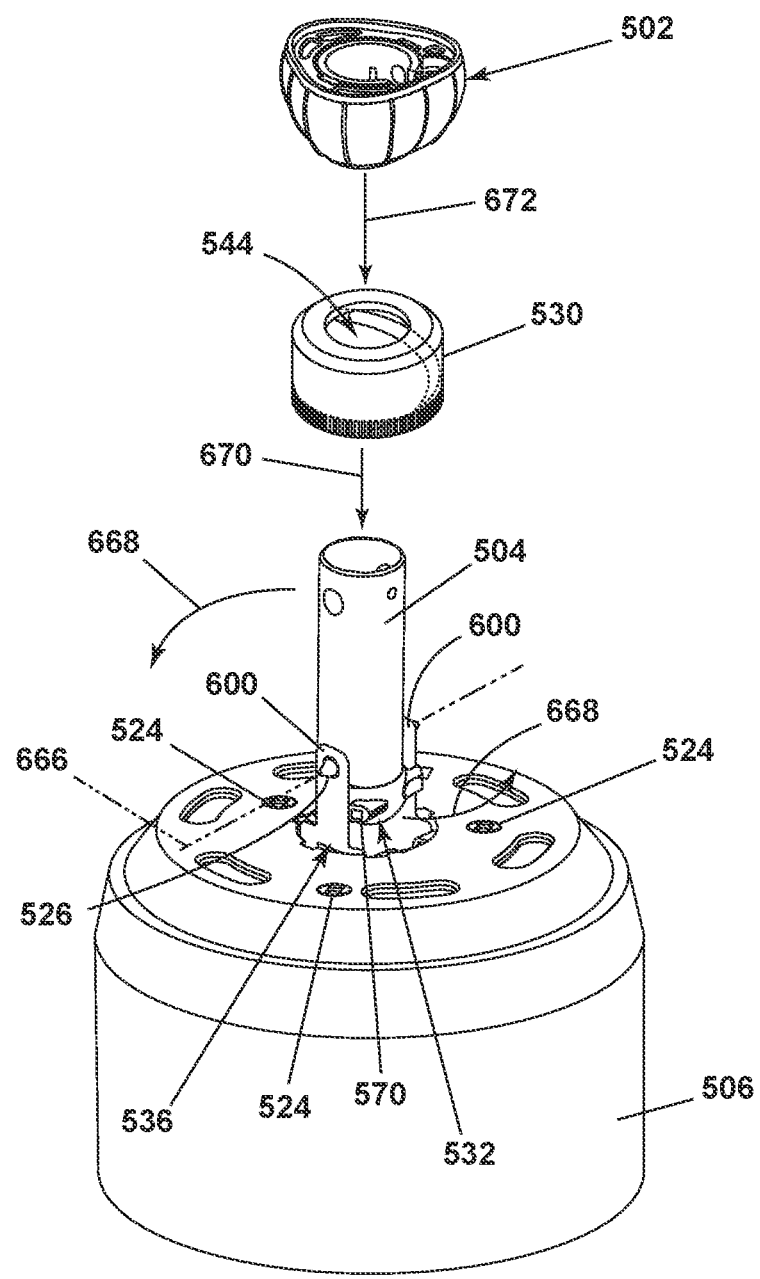
FIG. 24 illustrates the assembly sequence following FIG. 23 for coupling a cap and ball mount assembly to the downrod.

Referring now to FIG. 24, the pin 526 secures the bracket 536 to the downrod 504 and the interference coupler 532. The downrod 504 and the interference coupler 532 can pivot about the pin 526 relative to the bracket 536 at the legs 600 along a pivot axis 666. The downrod 504 and interference coupler 532 are permitted to pivot only one way, as illustrated by arrows 668, as they are prevented from pivoting in the other way by the shoulders 570 abutting the legs 600.

As illustrated by arrow 670, the cap 530 can insert about the downrod 504, with the downrod 504 extending through the downrod aperture 544 in the top wall 540. As illustrated by arrow 672, the ball mount assembly 502 can couple to the first end 516 of the downrod 504 at the mount apertures 514.

Figure 25:
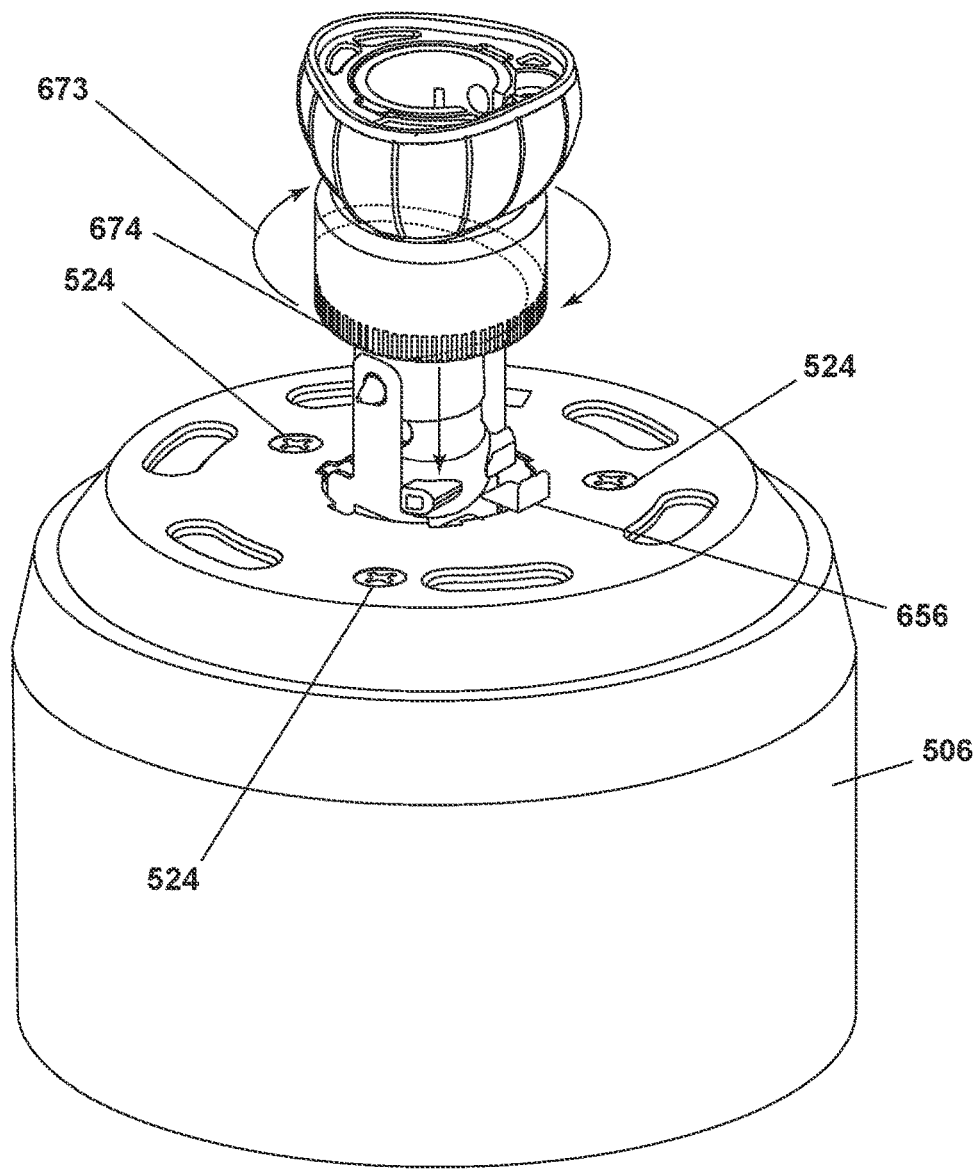
FIG. 25 illustrates the assembly sequence following FIG. 24 for tightening the cap about the bracket.

Referring now to FIG. 25, the cap 530 can be moved downward, as illustrated by arrow 673. When the cap 530 abuts the pin 526, the cap 530 can be rotated, as illustrated by arrows 676, to threadably couple about the pin 526 to secure about the bracket 536 and the interference coupler 532, preventing pivoting of the interference coupler 532 and the downrod 504 about the pin 526. The cap 530 can thread along the pin 526 until it abuts the motor housing 506, where the tab 656 can secure the cap 530 with a set of grooves 674, similar to that as described in FIG. 16.

Figure 26:
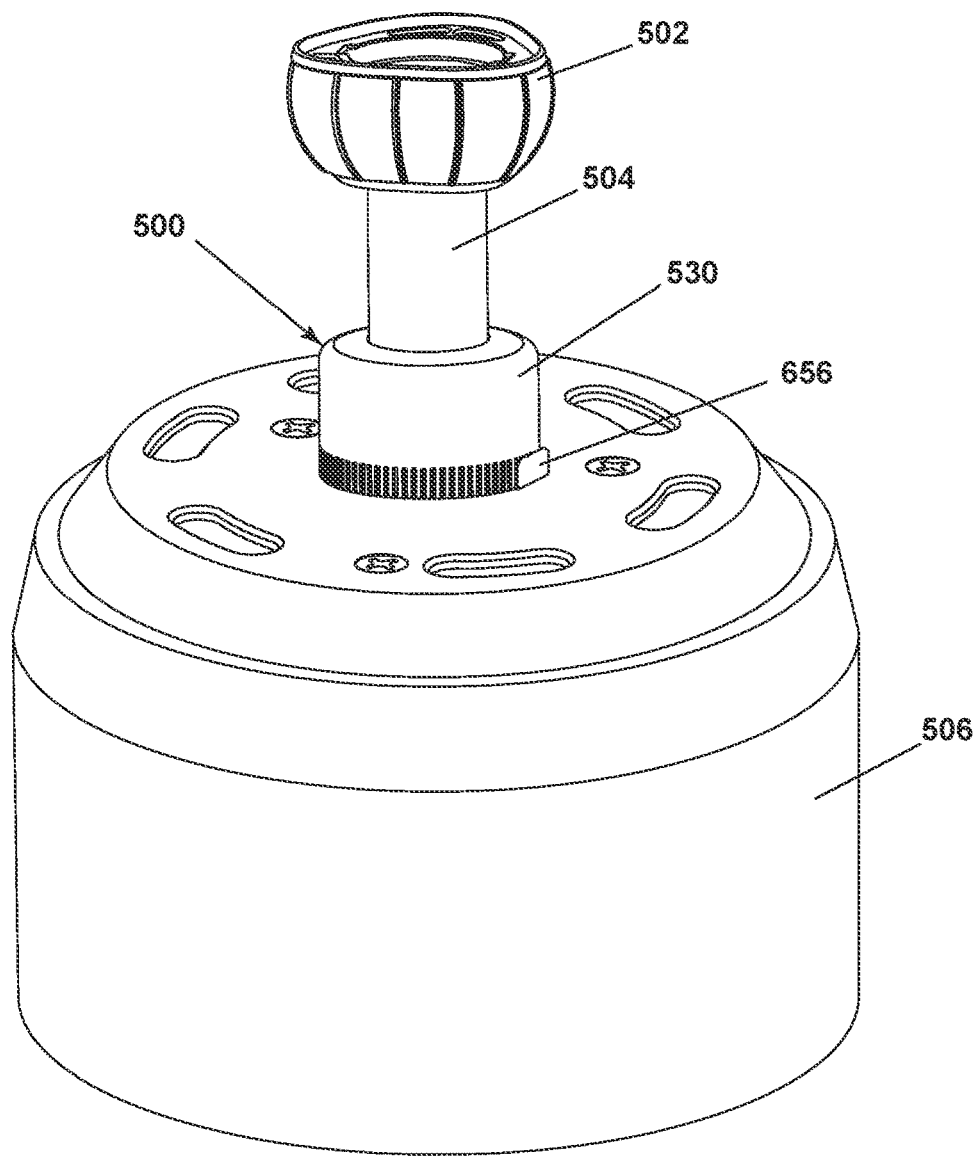
FIG. 26 illustrates the completed assembly for the motor adapter assembly of FIG. 17.

Referring now to FIG. 26, the motor adapter assembly 500 has coupled the downrod 504 to the motor shaft 508 in the final assembled position. As shown, the motor adapter assembly 500 is oriented in the upright position, while it is contemplated that the motor adapter assembly 500 can be arranged in the pivoted position about the pin 526, similar to that as shown in FIG. 15, while utilizing the interference coupler 532 as opposed to the wedge element. The in the position as shown in FIG. 26, the interference coupler 532 and the downrod 504 are prevented from pivoting about the pin 526 by the cap 530.

The motor adapter assembly 500 provides for permitting pivoting of the downrod 504 during storage, shipping, or sale of the motor adapter assembly 500, while providing for securing the downrod 504 in the proper upright position with the interference coupler 532. The shoulders 570 of the interference coupler 532 provide for aligning the downrod 504 relative to the bracket 536, as well as reducing noise and vibration.

Figure 27:
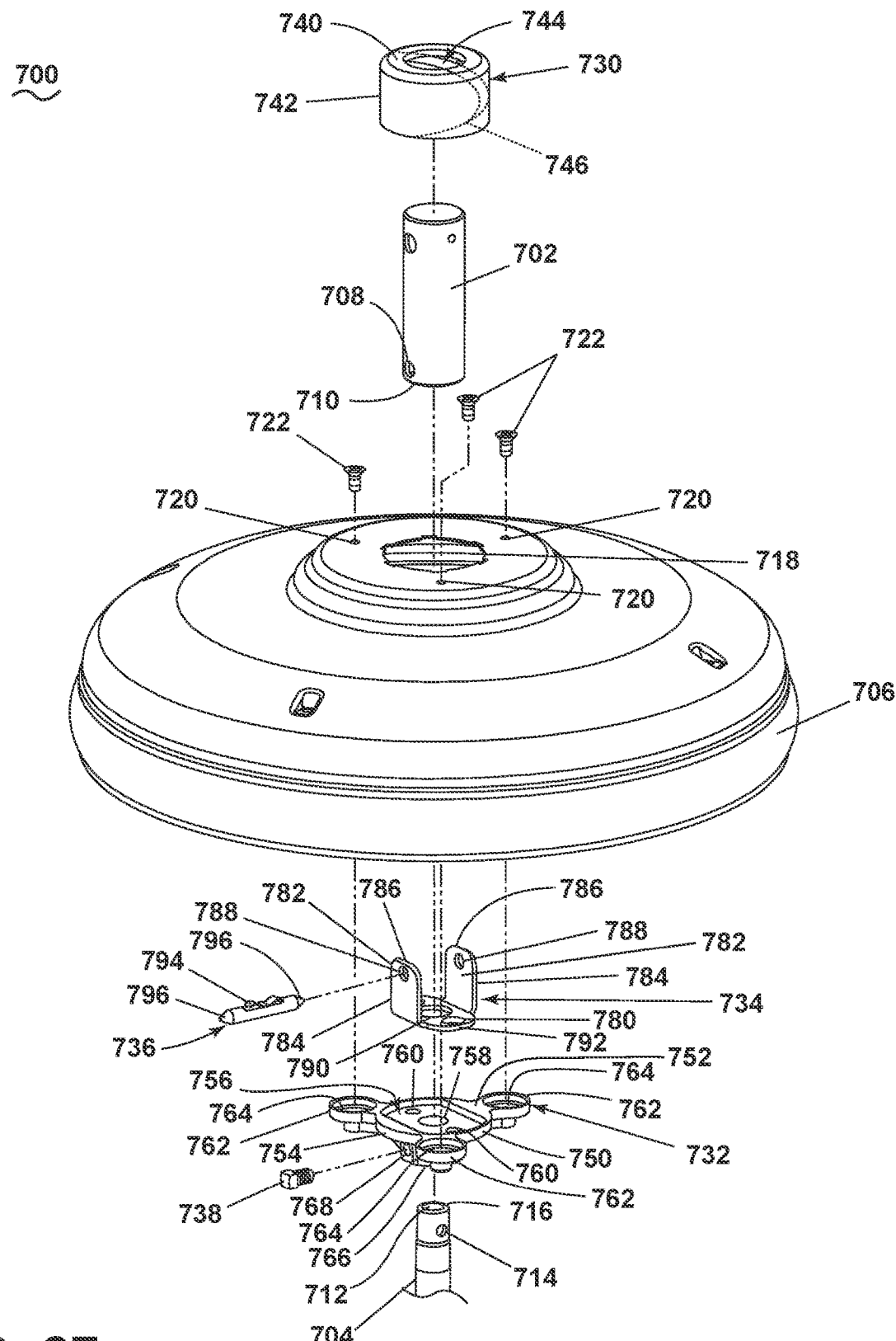
FIG. 27 is an exploded view of another alternative motor adapter assembly having a base bracket exploded from a leg bracket.

Referring now to FIG. 27, another alternative motor adapter assembly 700 can couple a downrod 702 to a motor shaft 704 and a motor housing 706. The downrod 702 can include a set of apertures 708 at a bottom end 710. The motor shaft 704 can be hollow, including a central aperture 712. A mount aperture 714 can be provided at a top end 716 of the motor shaft 704. The motor housing 706 can include a central aperture 718, permitting coupling of the downrod 702 to the motor shaft 704 through the motor housing 706. A set of fastener apertures 720 can be provided in the motor housing 706 about the central aperture 718. A set of fasteners 722 can be provided to extend through the fastener aperture 720 for coupling the motor adapter assembly 700 the motor housing 706.

The motor adapter assembly 700 can include a cap 730, a base bracket 732, a leg bracket 734, a pin 736, and a base fastener 738. The cap 730 can be similar to the caps as described herein, including a top wall 740 extending to a peripheral wall 742. A downrod aperture 744 is provided in the top wall 740. A set of threads 746 are provided in the interior of the peripheral wall 742.

The base bracket 732 can include a plate 750 having a top surface 752 and a bottom surface 754. A bracket seat 756 can be formed in the top surface as a recessed portion of the base bracket 732. A central aperture 758 can extend through the base bracket 732, positioned in the bracket seat 756. A set of bracket apertures 760 can extend at least partially through the base bracket 732, positioned within the bracket seat 756 on opposing sides of the central aperture 758. Three extensions 762 can be formed in the plate 750, extending radially outward from the portion of the plate 750 having the bracket seat 756. The extensions 762 can include mount apertures 764 configured to align with the fastener apertures 720 in the motor housing 706 for mounting the base bracket 732 to the motor housing 706. A motor shaft collar 766 can extend from the bottom surface 754, configured to receive the motor shaft 704. It should be appreciated that the collar 766 can be integral with the base bracket 732. An aperture 768 can be formed in a side of the motor shaft collar 766, adapted to receive the base fastener 738 to secure the motor shaft 704 within the motor shaft collar 766 at the mount aperture 714. The base bracket 732 can be formed as a single element, such as by casting or other suitable manufacture method.

Figure 28:
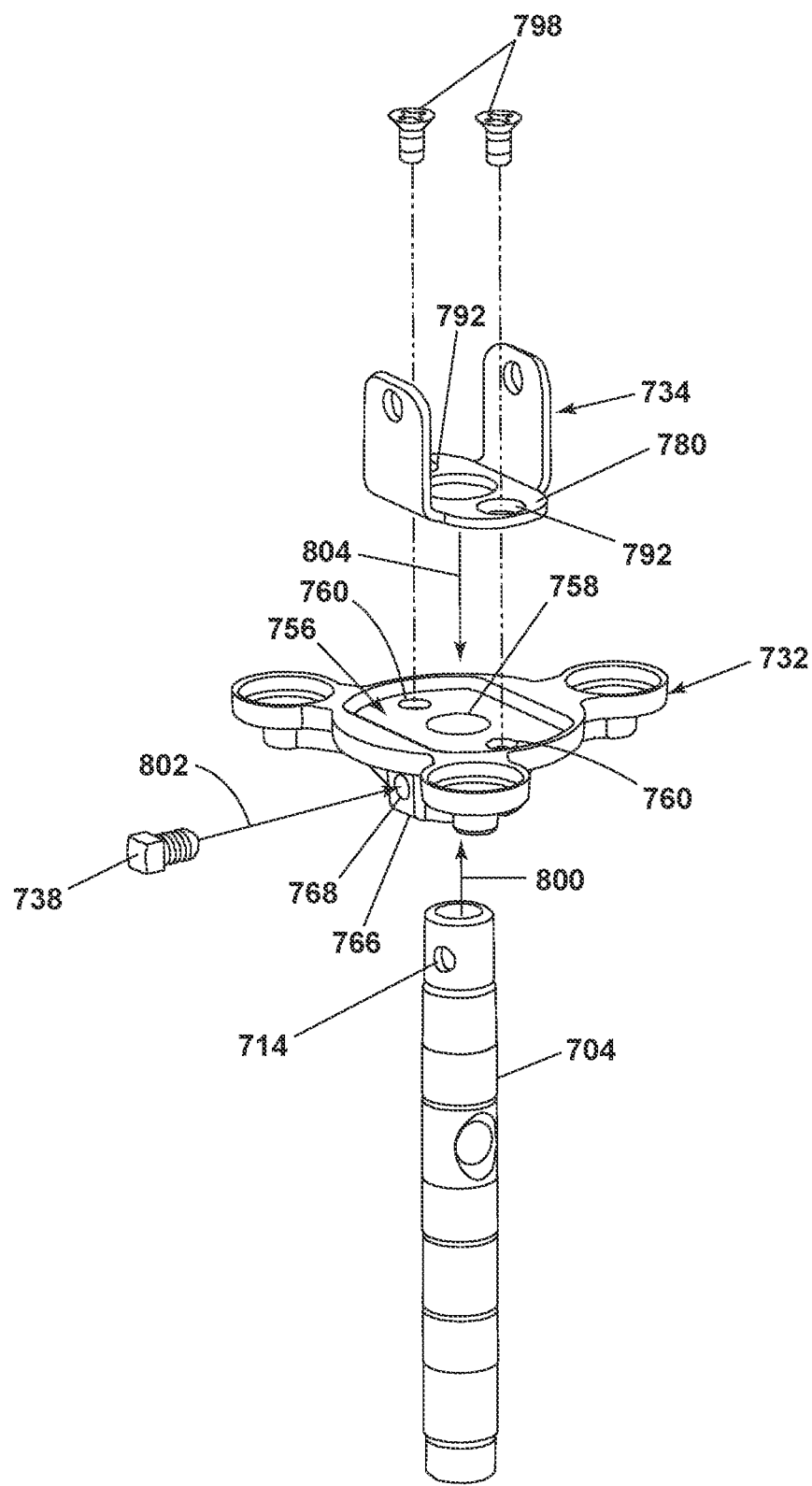
FIG. 28 illustrates the assembly sequence for coupling the base bracket of FIG. 27 to the leg bracket and a motor shaft.

The leg bracket 734 can include a bottom wall 780. The bottom wall 780 can be shaped complementary to the bracket seat 756 of the base bracket 732, such that the leg bracket 734 is configured to insert into the bracket seat 756. Two opposing legs 782 can extend from the bottom wall 780. Each leg can include two opposing side edges 784 extending from the bottom wall 780, terminating at a top edge 786 opposite of the bottom wall 780. The top edge 786 can be elongated, having a linear portion, and can include rounded corners at the junction with the side edges 784. A leg aperture 788 can be provided in each of the legs 782, and can be sized complementary to the apertures 708 in the downrod 702. A central aperture 790 can be provided in the bottom wall 780, sized complementary to the central aperture 758 of the base bracket 732. A set of fastener apertures 792 can be provided in the bottom wall on opposing sides of the central aperture 790, complementary to the bracket apertures 760 of the base bracket 732, configured to couple the leg bracket 734 to the base bracket 732 with a set of fasteners 798 (FIG. 28). During manufacture, the leg bracket 734 can be a single sheet of material, such as a suitable metal or alloy that can be stamped including the various apertures and shapes. After stamping, the legs 782 can be bent or folded upward to form the shape of the leg bracket 734 with the legs positioned substantially orthogonal to the bottom wall 780.

The pin 736 can include a spring member 794 positioned in the middle of the pin 736 between opposing ends 796. The pin 736 can be any suitable pin for coupling the downrod 702 to the leg bracket 734 having the spring member 794 to retain the pin 736 within the downrod 702. As such, the pin 736 can be any pin as described herein.

FIGS. 28-32 illustrate an assembly sequence for assembling the motor adapter assembly 700 to couple the motor shaft 704 to the downrod 702 and the motor housing 706. Referring now to FIG. 28 in particular, the motor shaft 704 can insert into the central aperture 758 of the base bracket 732 at the motor shaft collar 766, as illustrated by arrow 800. As illustrated by arrow 802, the base fastener 738 can insert into the aperture 768 in the mount shaft collar 766 and into the mount aperture 714 in the motor shaft 704 inserted into the mount shaft collar 766. The base fastener 738 secures the motor shaft 704 to the base bracket 732 at the mount shaft collar 766.

As illustrated by arrow 804, the leg bracket 734 insert in the base bracket 732, seating the bottom wall 780 of the leg bracket 734 within the bracket seat 756 of the base bracket 732. Fasteners 798 can insert through the fastener apertures 792 on the leg bracket 734 and into the bracket apertures 760 to secure the leg bracket 734 to the base bracket 732.

Figure 29:
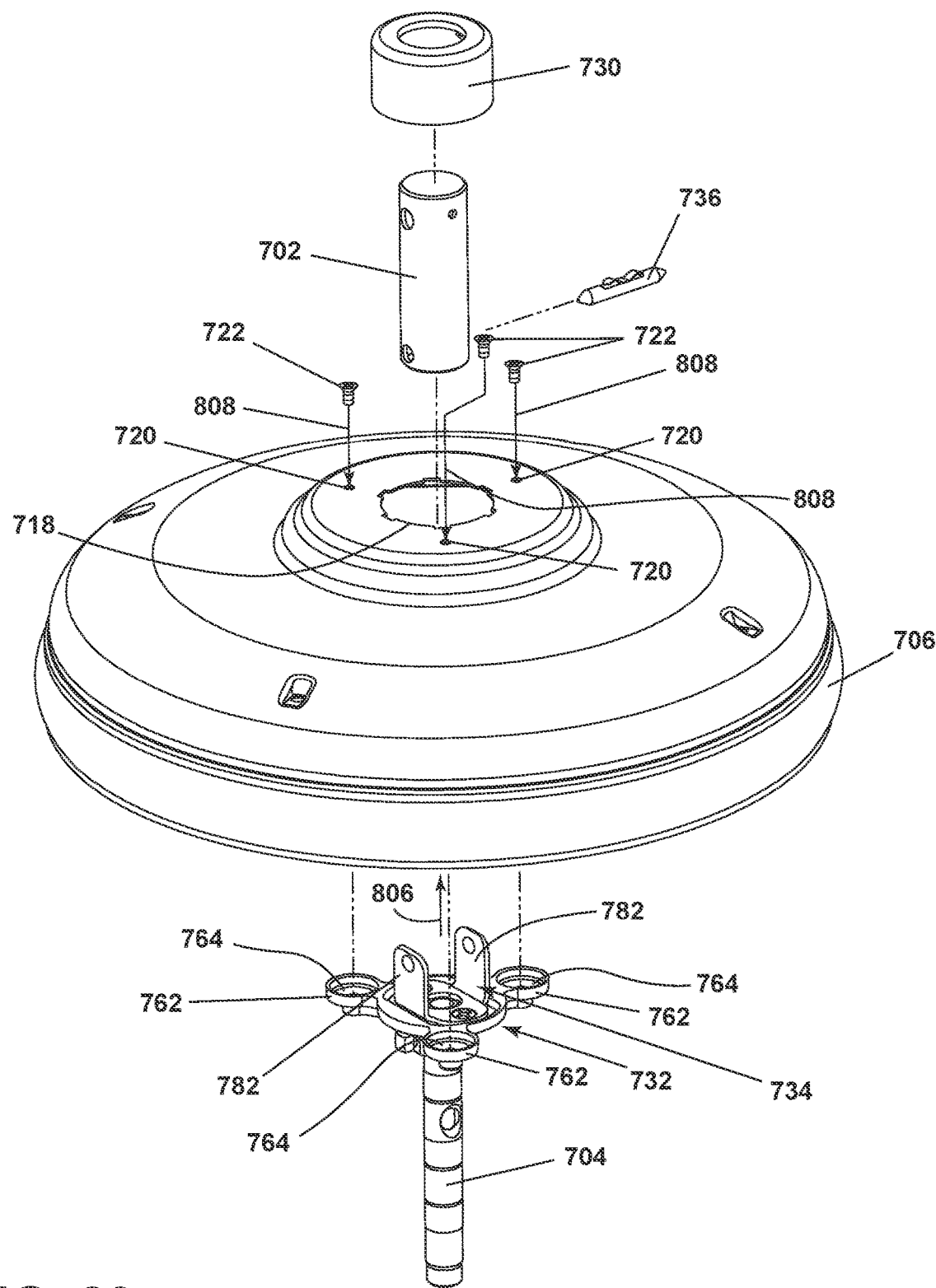
FIG. 29 illustrates the assembly sequence following FIG. 28 for coupling the base bracket to a motor housing.

Referring now to FIG. 29, the legs 782 of the leg bracket 734 can insert through the central aperture 718 of the motor housing 706, as illustrated by arrow 806, until the base bracket 732 abuts the motor housing 706. As illustrated by arrows 808, the fasteners 722 can insert through the fastener apertures 720 in the motor housing 706 and fasten to the mount apertures 764 in the extensions 762 of the base bracket 732 to secure the base bracket 732 to the motor housing 706.

Figure 30:
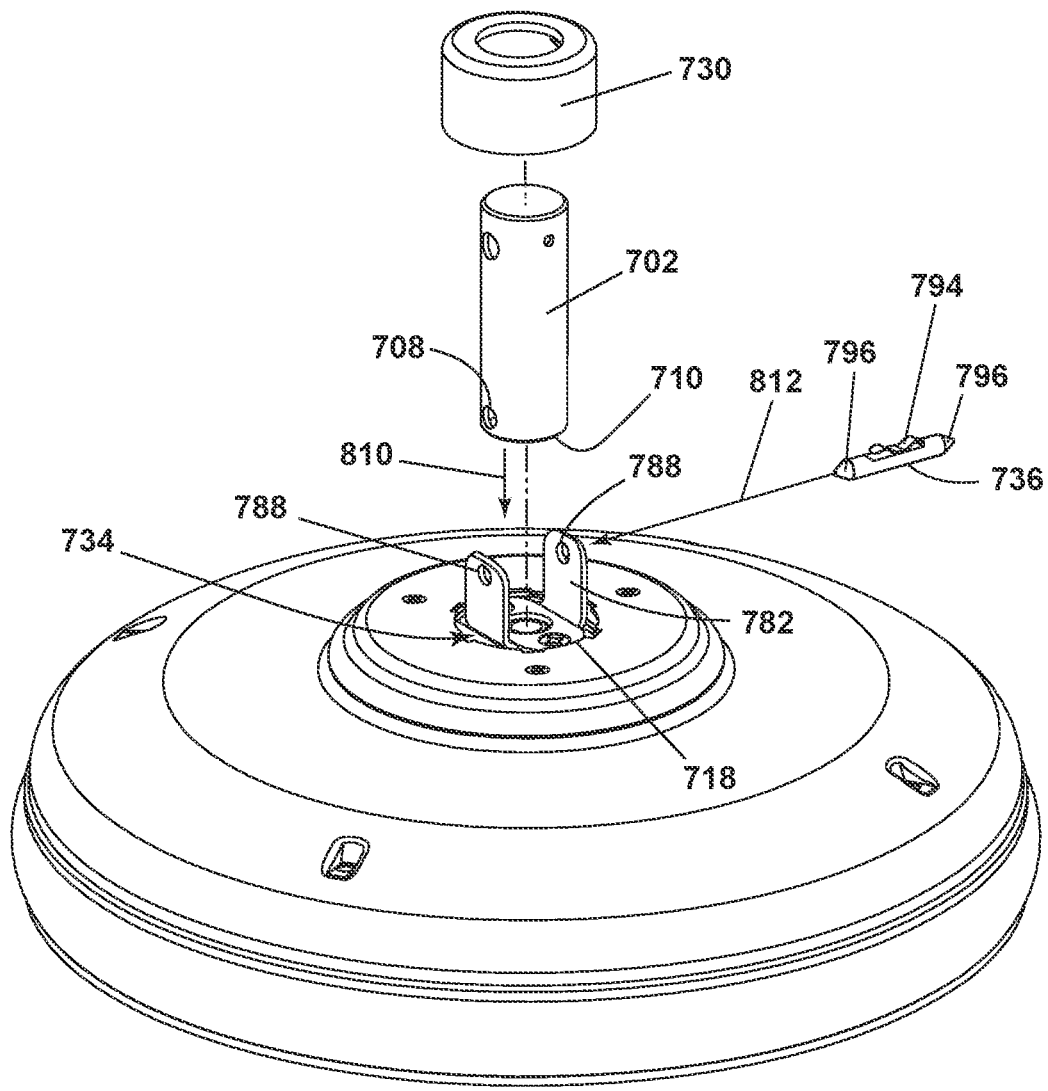
FIG. 30 illustrates the assembly sequence following FIG. 29 for coupling the leg bracket to a downrod with a pin.

Referring now to FIG. 30, the downrod 702 can insert between the legs 782 of the leg bracket 734 extending through the central aperture 718 of the motor housing 706, as illustrated by arrow 810. The leg apertures 788 can align with the apertures 708 in the downrod 702 at the bottom end 710. The pin 736 can insert through the leg apertures 788 and the apertures 708 in the downrod 702, as illustrated by arrow 812, and can secure within the downrod 702 with the spring member 794. The ends 796 of the pin 736 can extend beyond the legs 782 of the leg bracket 734.

Figure 31:
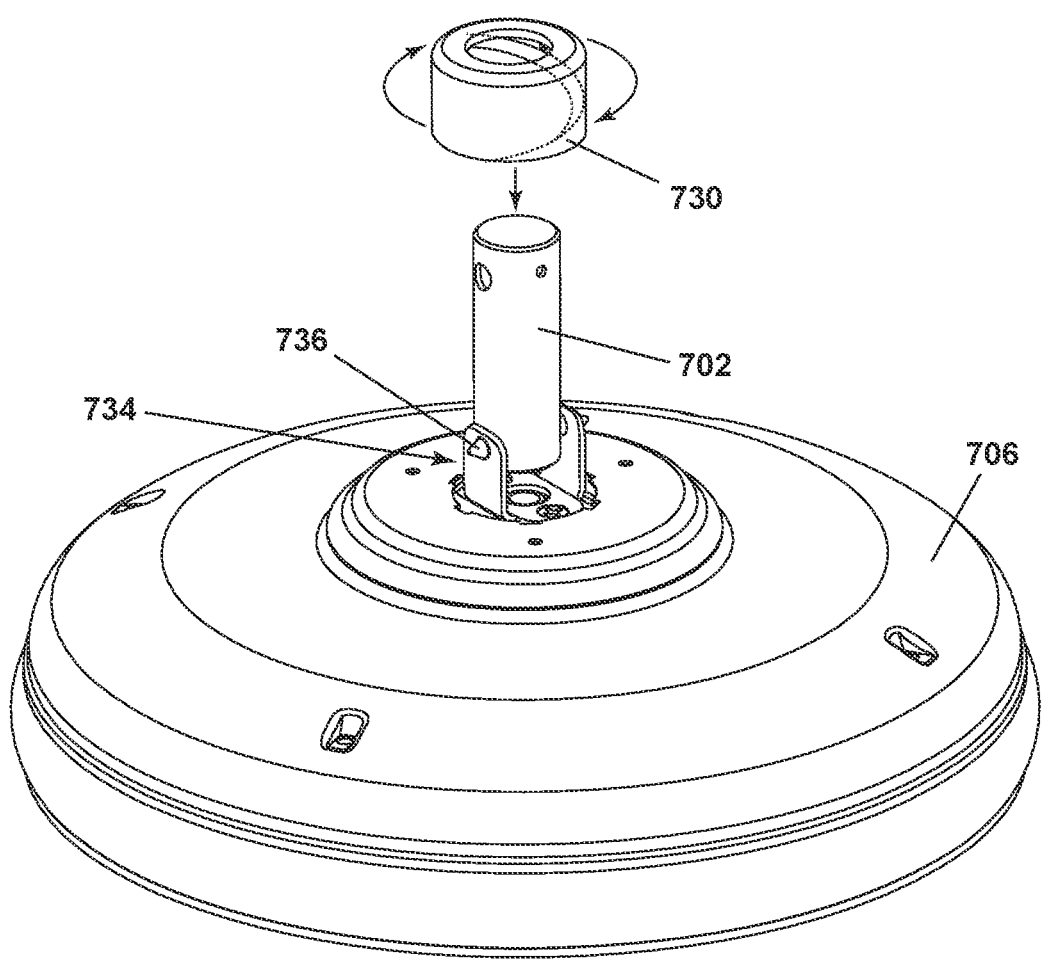
FIG. 31 illustrates the assembly sequence following FIG. 30 for coupling a cap about the leg bracket.
Figure 32:
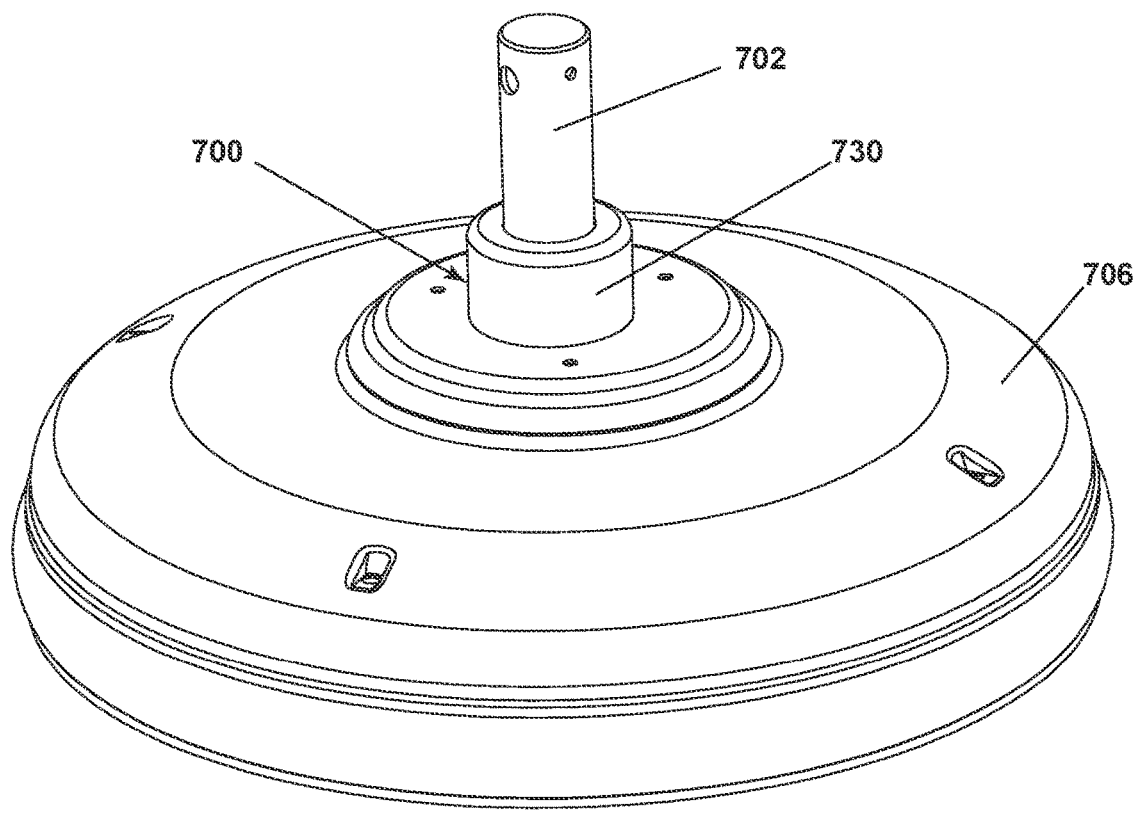
FIG. 32 illustrates the completed assembly for the motor adapter of FIG. 27.

Referring now to FIG. 31, the cap 730 can insert along the downrod 702, as illustrated by arrow 814, with the downrod 702 extending through the downrod aperture 744. When the cap 730 abuts the pin 736, the cap 730 can rotatably thread along the pin 736, as illustrated by arrows 816, to threadably secure about the legs 782 of the leg bracket 734 until the cap 730 abuts the motor housing 706. FIG. 32 illustrates the cap 730 and the motor adapter assembly 700 in the final installed position.

The motor adapter assembly 700 including the base bracket 732 and the leg bracket 734 provide for coupling a motor shaft to a downrod and a motor housing. The leg bracket 734 provides for simplified manufacture of an element extending through a motor housing to couple to a downrod by stamping the leg bracket 734 and bending it into the position as shown.

Figure 33:
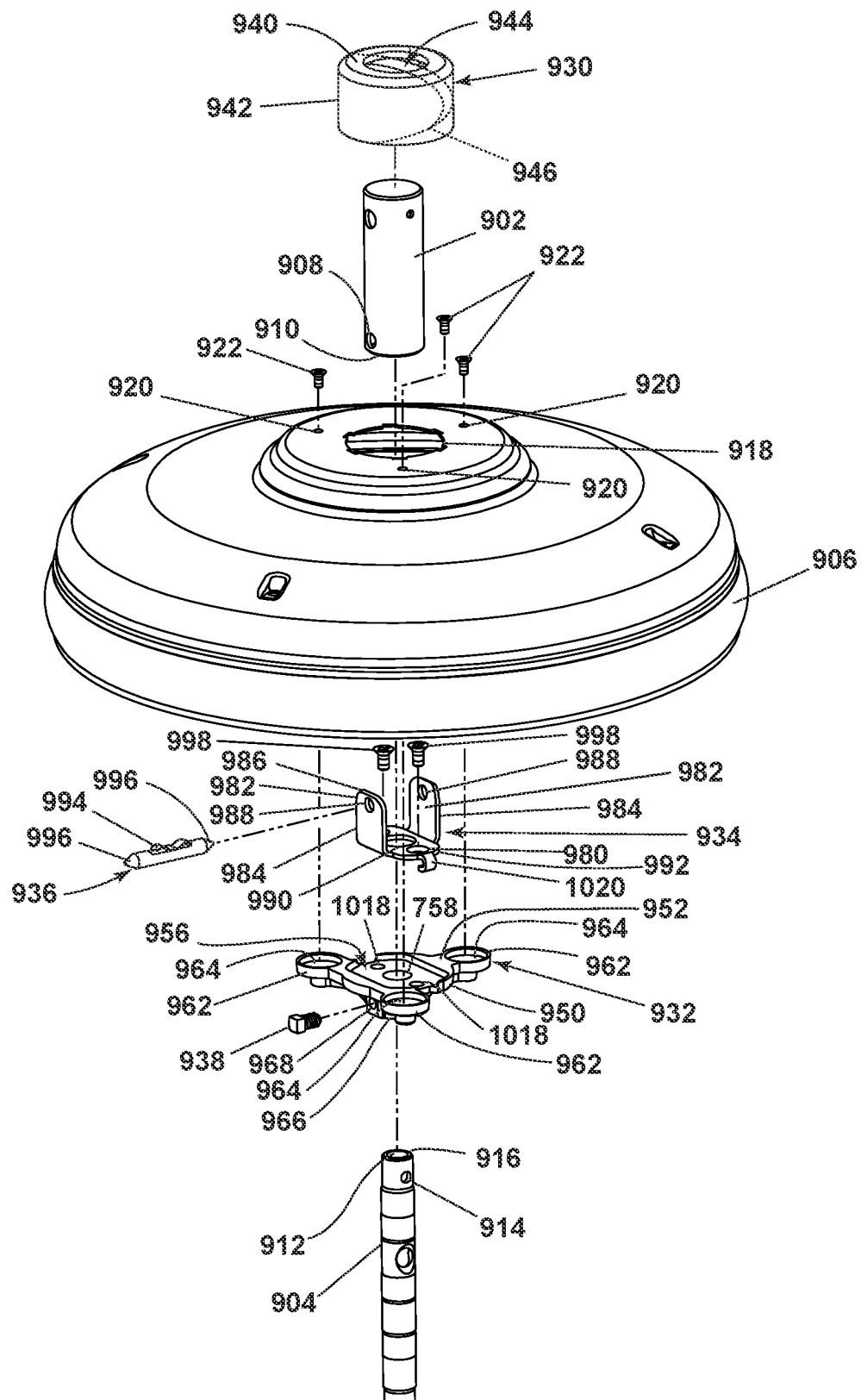
FIG. 33 is an exploded view of yet another alternative motor adapter assembly having a base bracket exploded from a leg bracket including hooks.

Referring now to FIG. 33, another alternative motor adapter assembly 900 is shown. The motor adapter assembly 900 can be substantially similar to the motor adapter assembly 700 as shown and described in FIG. 27. As such, similar numerals will be used to describe similar elements, increased by a value of two-hundred and the discussion will be limited to differences between the two.

A base bracket 932 includes a plate 950 having a top surface 952 with a bracket seat 956. A central aperture 758 and two opposing bracket aperture 960 are provided in the bracket seat 956. A set of opposing open ends 1018 are formed in the bracket seat 956, formed as recessed portions of the plate 950. The open ends 1018 can be recessed to be coplanar with the bracket seat 956.

A leg bracket 934 includes a bottom wall 980 with two legs 982 extending from two sides of the bottom wall 980. On the remaining sides of the bottom wall 980, two hooks 1020 extend from the bottom wall 980 in the opposite direction of the legs 982. The hooks 1020 can be sized to fasten around the plate 950 of the based bracket 932 at the open ends 1018.

Figure 34:
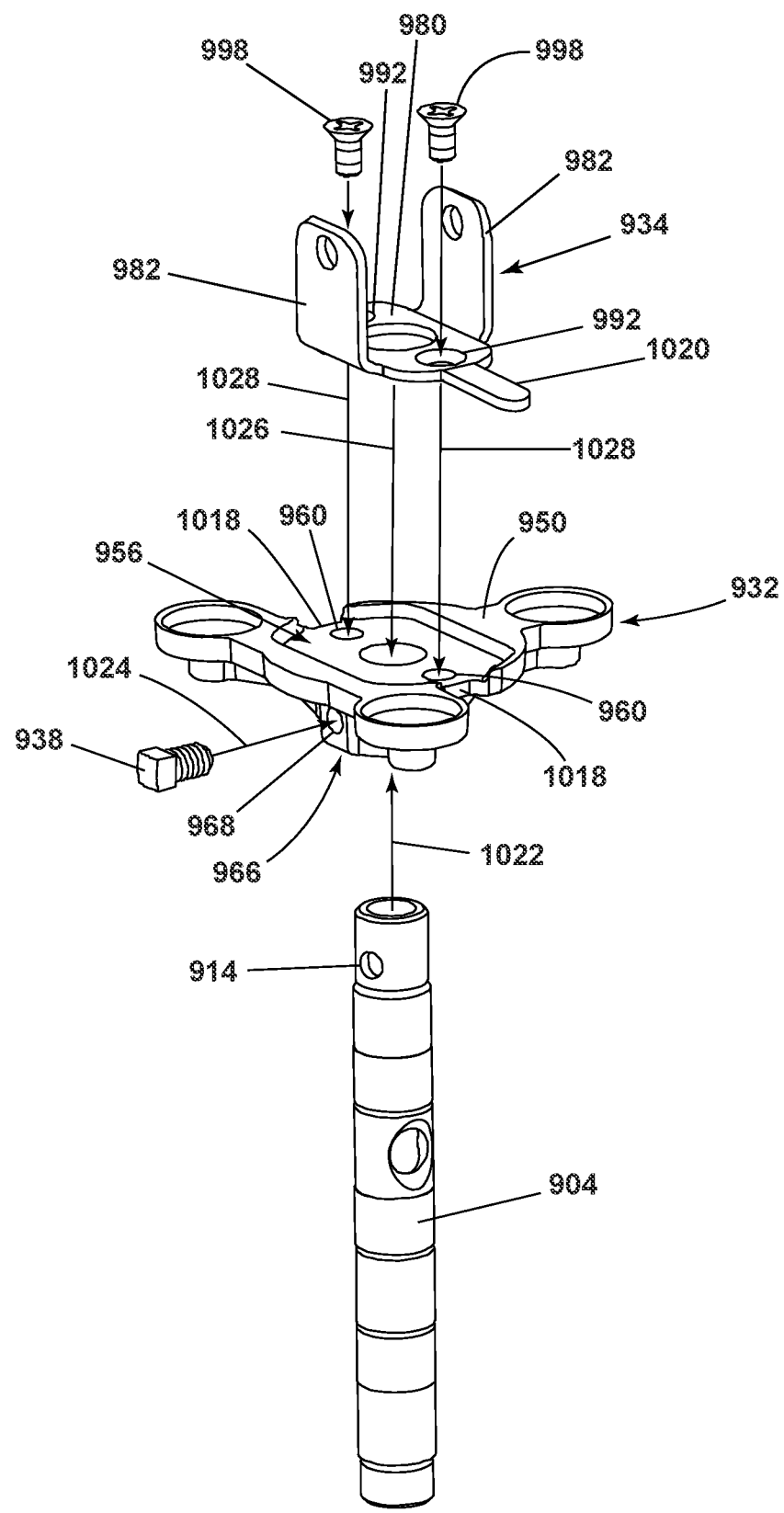
FIG. 34 illustrates the assembly sequence for coupling the base bracket of FIG. 33 to a motor shaft and the leg bracket.

Referring now to FIG. 34, the assembly sequence for coupling the leg bracket 934 and a motor shaft 906 to the base bracket 932. The motor shaft 906 can insert into a motor shaft collar 966, as illustrated by arrow 1022, aligning a mount aperture 914 on the motor shaft 906 with an aperture 968 on the motor shaft collar 966. A fastener 938 can insert into the aligned mount aperture 914 and aperture 968 on the motor shaft collar 966 to fasten the motor shaft 906 to the base bracket 932, as illustrated by arrow 1024.

Figure 35:
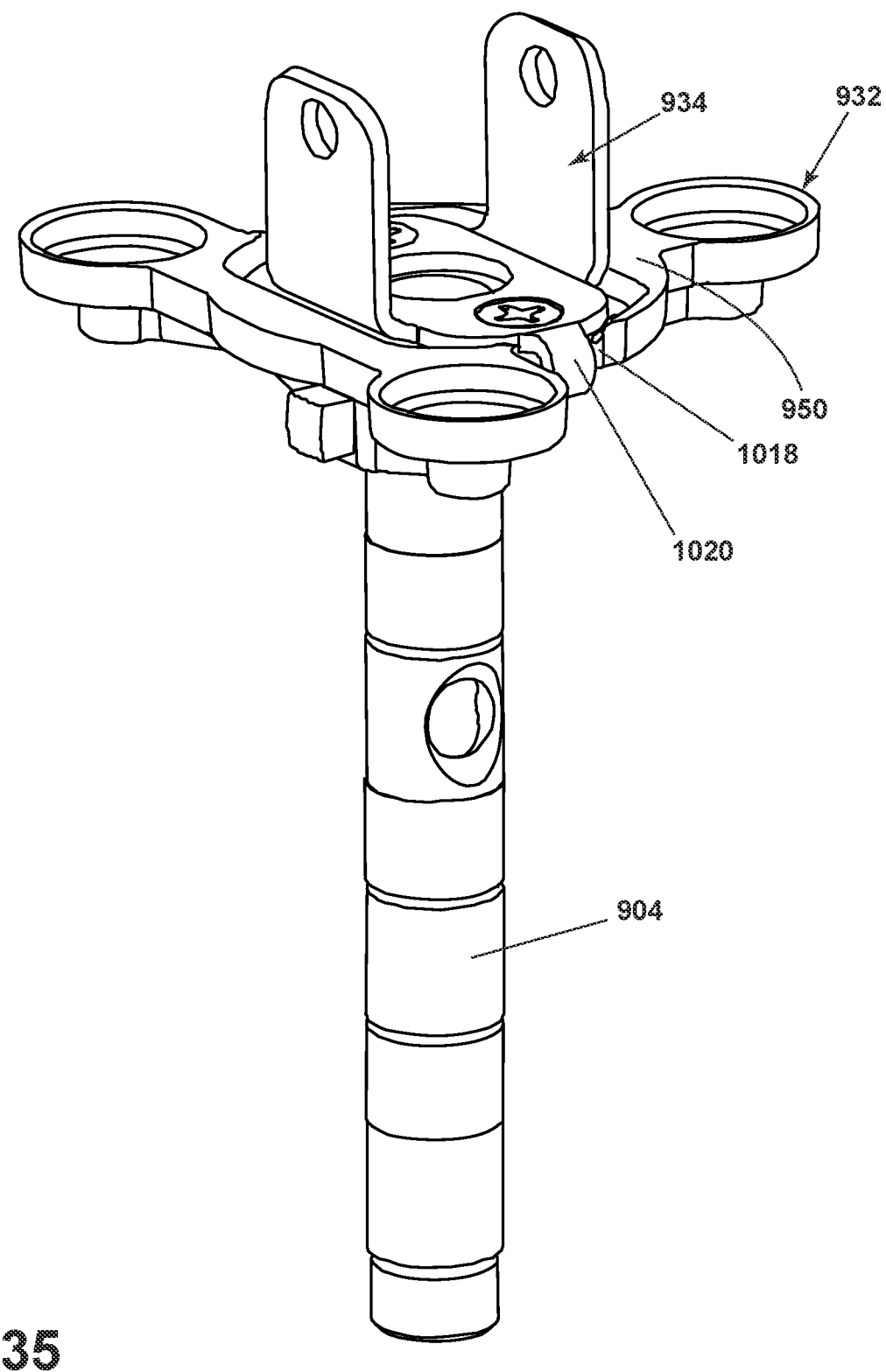
FIG. 35 illustrates the completed assembly of FIG. 34 having the leg bracket coupled to the base bracket.

The hooks 1020 on the leg bracket 934, are shown in a non-bent, straight orientation. Initially, the leg bracket 934 can be stamped as a flat member, with appropriate shape and apertures formed therein. The legs 982 can be bent into position as shown in FIGS. 33 and 35. As illustrated by arrow 1026, the leg bracket 934 can position in the bracket seat 956 of the base bracket 932, with the non-bent hooks 1020 extending through the open ends 1018. After positioning, in the bracket seat 956, the hooks 1020 can be bent around the plate 950 to secure the leg bracket 934 to the base bracket 932.

Additionally, as illustrated by arrows 1028, fasteners 998 can insert through the fastener apertures 992 in the bottom wall 980 of the leg bracket 934 into the bracket apertures 960 of the base bracket 932 to further secure the leg bracket 934 to the base bracket 932.

Referring now to FIG. 35, the final assembled version of FIG. 34 is shown, having the hooks 1020 bent about the plate 950 at the open ends 1018. It should be understood that the assembly of FIG. 35 to the remainder of the motor adapter assembly 900, downrod 902, and motor housing 706 can be substantially similar to the assembly as shown in FIGS. 29-32 and will not be described in detail.

The motor adapter assembly 900 including the base bracket 932 and the leg bracket 934 provide for coupling a motor shaft to a downrod and a motor housing. The leg bracket 934 provides for simplified manufacture of an element extending through a motor housing to couple to a downrod by stamping the leg bracket 934 and bending it into the position as shown. Additionally, vibration and noise can be reduced. The hooks 1020 can provide for improved fastening of the base bracket 932 to the leg bracket 934.

Figure 36:
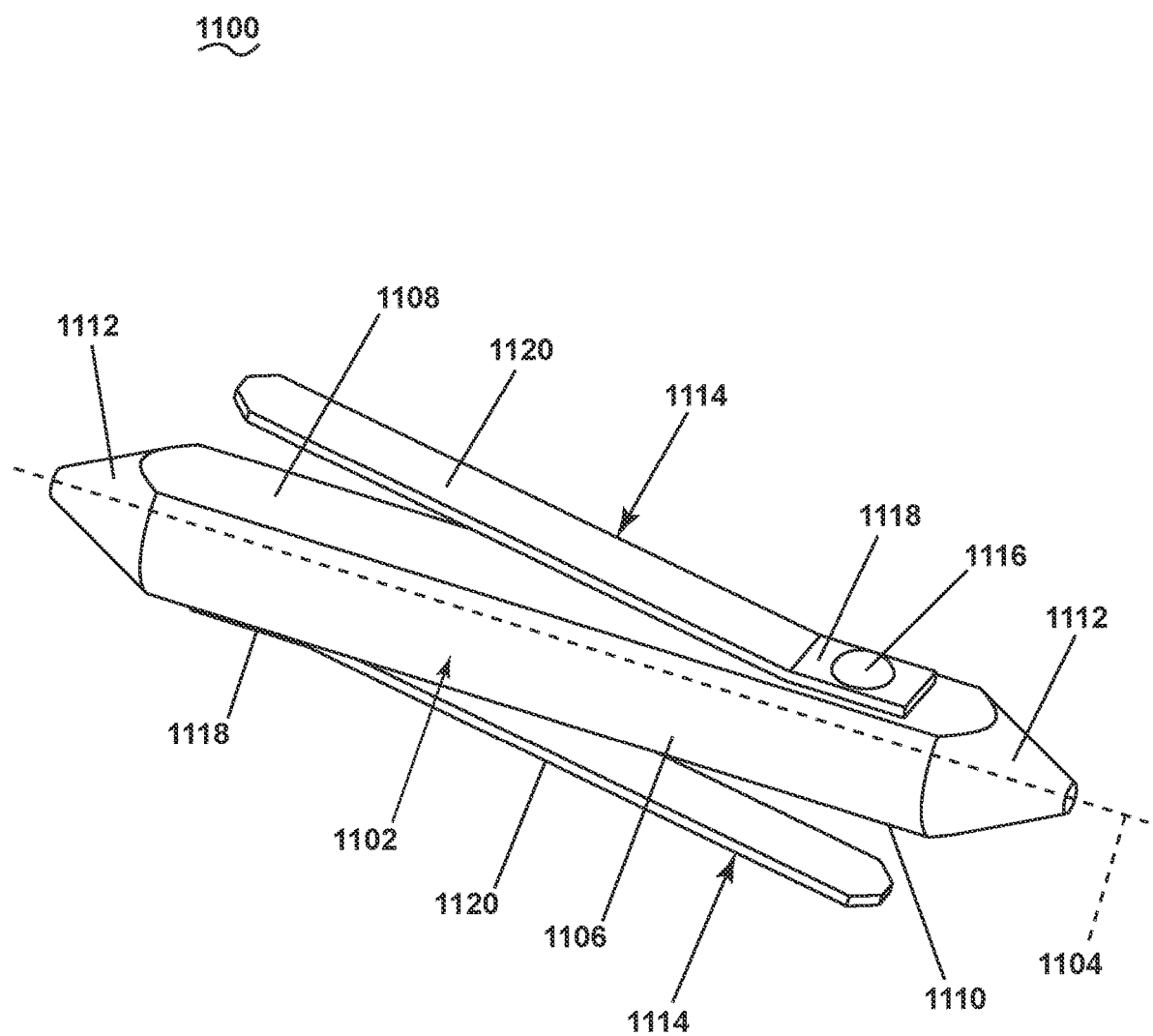
FIG. 36 is a perspective view of an alternative pin that can be used with any of the motor adapter assemblies as described herein.

FIG. 36 illustrates an alternative pin 1100 that can be used for coupling the motor adapter assemblies as described herein, or any suitable motor adapter assembly, to a downrod. The pin 1100 includes an elongated body 1102 having as substantially cylindrical shape, defining a longitudinal axis 1104. The elongated body 1102 includes a peripheral surface 1106. A first flat surface 1108 and a second flat surface 1110 are provided along the peripheral surface 1106. The elongated body 1102 terminates in opposing ends 1112, with the ends including a truncated, conic shape.

A flexure or suitable depressible spring member 1114 mounts to each flat surface 1108, 1110 with a fastener 1116. Each spring member 1114 includes a flat portion 1118 that abuts the flat surface 1108, 1110 when fastened with the fastener 1116, and an inclined portion 1120 extending away from the elongated body 1102. The inclined portion 1120 is flexible relative to the flat portion 1118, permitting depression of the spring member 1114 at the inclined portion 1120 to contact the flat surface 1108, 1110.

Figure 37:
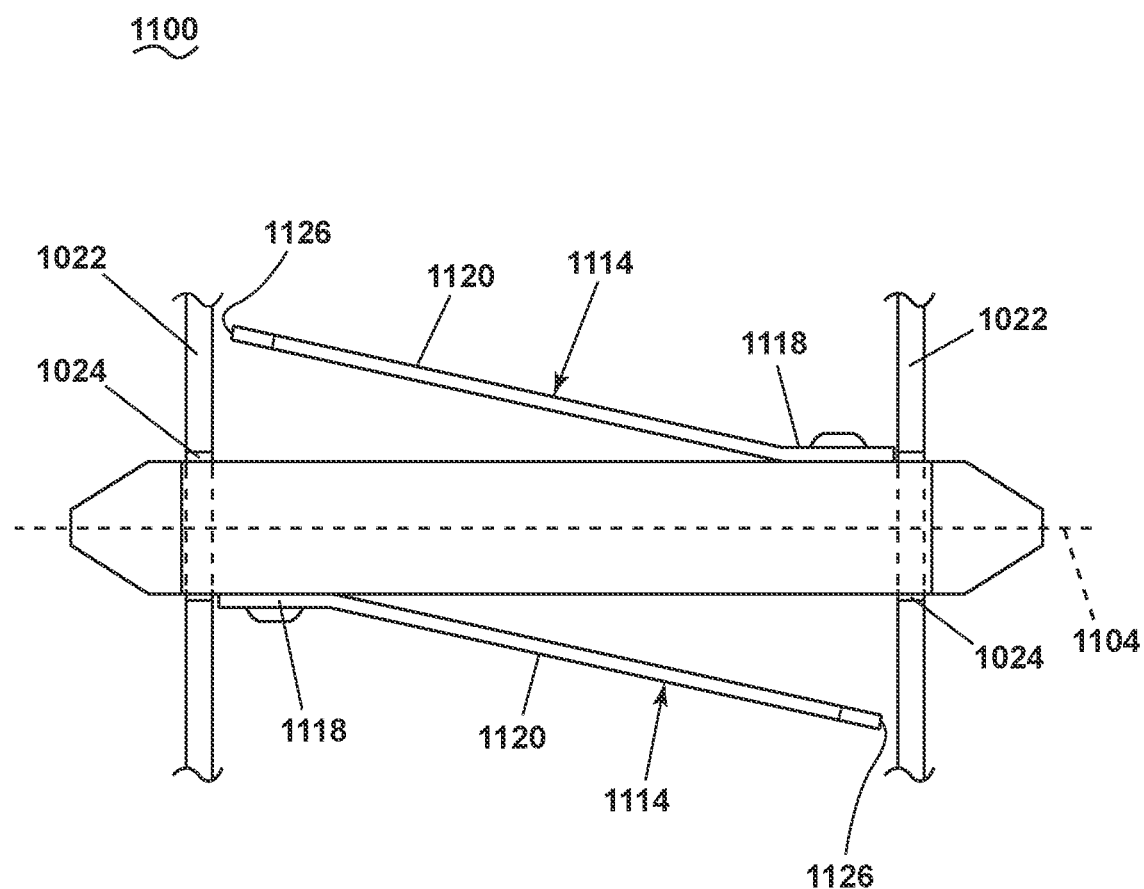
FIG. 37 is a side view of the pin of FIG. 36.

Referring now to FIG. 37, the pin 1100 can be positioned in an exemplary element 1122, such as a downrod, having a set of openings 1124 permitting slidable insertion of the pin 1100. Ends 1126 of the inclined portion 1120 of the spring members 1114 opposite of the flat portion 1118 are raised such that they abut the interior of the element 1122 in either direction along the longitudinal axis 1104, permitting insertion in either direction, but preventing the pin 1100 from being removed from the element 1122 in both directions without depression of at least one of the spring members 1114.

The pin 1100 provides for permitting insertion from either direction, while maintaining itself within an inserted element with the spring member 1114. The pin 1100 is not removed until the spring member 1114 is depressed within the inserted element.

Figure 38:
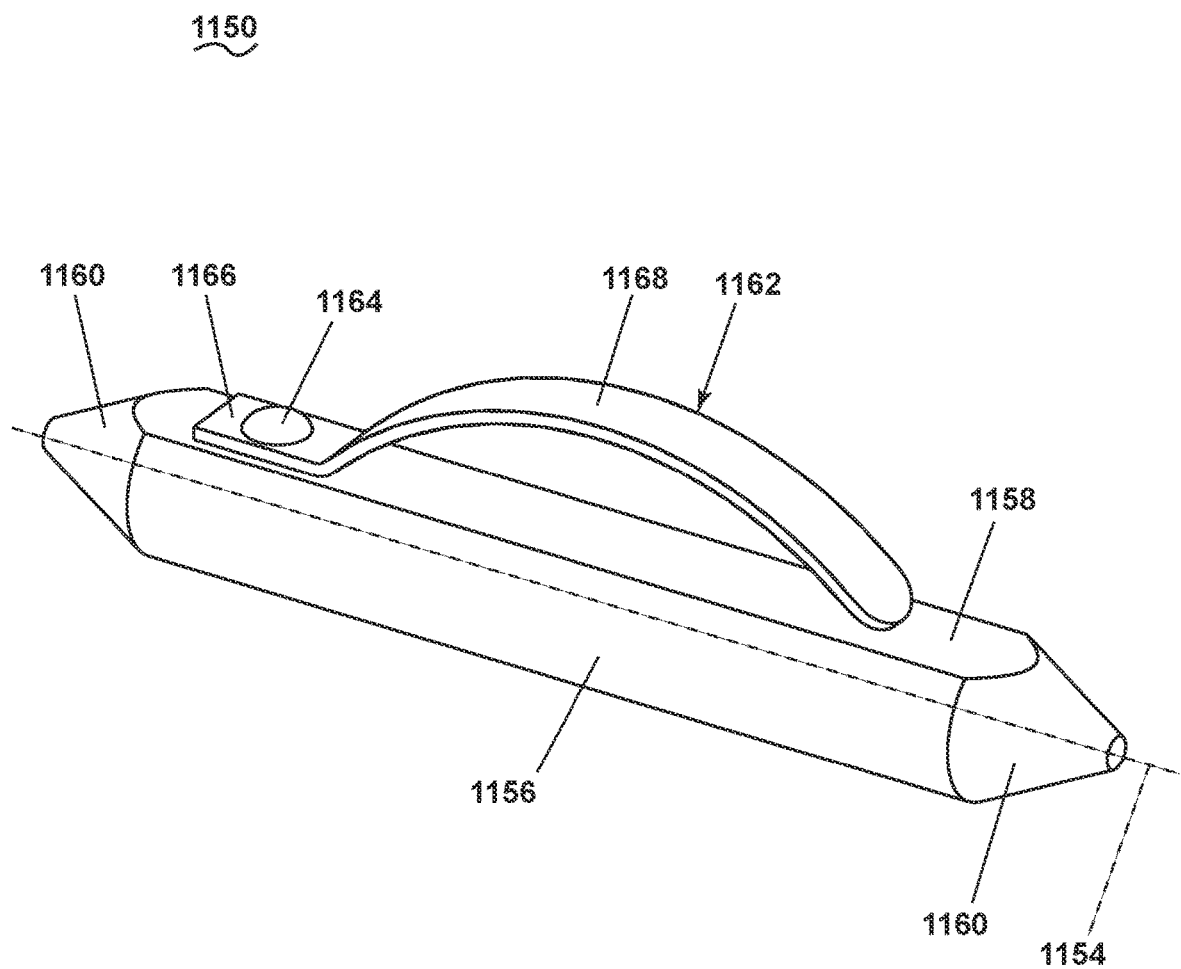
FIG. 38 is a perspective view of another alternative pin that can be used with any of the motor adapter assemblies as described herein.

Referring now to FIG. 38, another alternative pin 1150 includes an elongated body 1152 having a substantially cylindrical shape, defining a longitudinal axis 1154. The elongated body 1152 includes a peripheral surface 1156 having a flat surface 1158. The elongated body 1152 extends between opposing ends 1160, with the ends 1160 having a truncated, conic shape. A flexure or suitable depressible spring member 1162 couples to the elongated body 1152 along the flat surface 1158 with a fastener 1164. The spring member 1162 can include a flat portion 1166 positioned along the flat surface 1158, and an arcuate portion 1168 bending away from the flat surface 1158. The arcuate portion 1168 is flexible, permitting depression of the spring member 1162 to contact the flat surface 1158.

Figure 39:
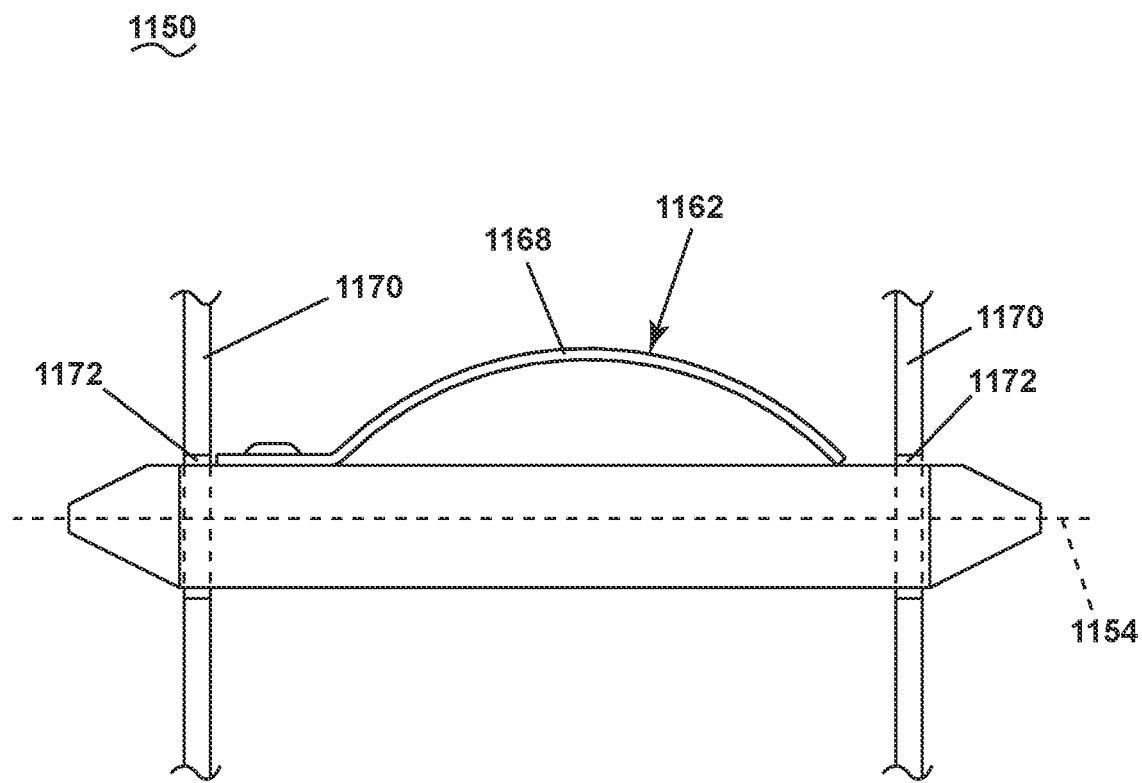
FIG. 39 is a side view of the pin of FIG. 38.

Referring now to FIG. 39, the pin 1150 can be positioned in an exemplary element 1170, such as a downrod, having a set of openings 1172 permitting slidable insertion of the pin 1150. The arcuate portion 1168 is raised to abut the interior of the element 1170 when sliding in either direction along the longitudinal axis 1154. Therefore, the pin 1150 is prevented from being removed from the element 1170 without depression of the spring member 1162.

The pin 1150 provides for permitting insertion from either direction, while maintaining itself within an inserted element with the spring member 1162. The pin 1150 is not removed until the spring member 1162 is depressed within the inserted element.

Figure 40:
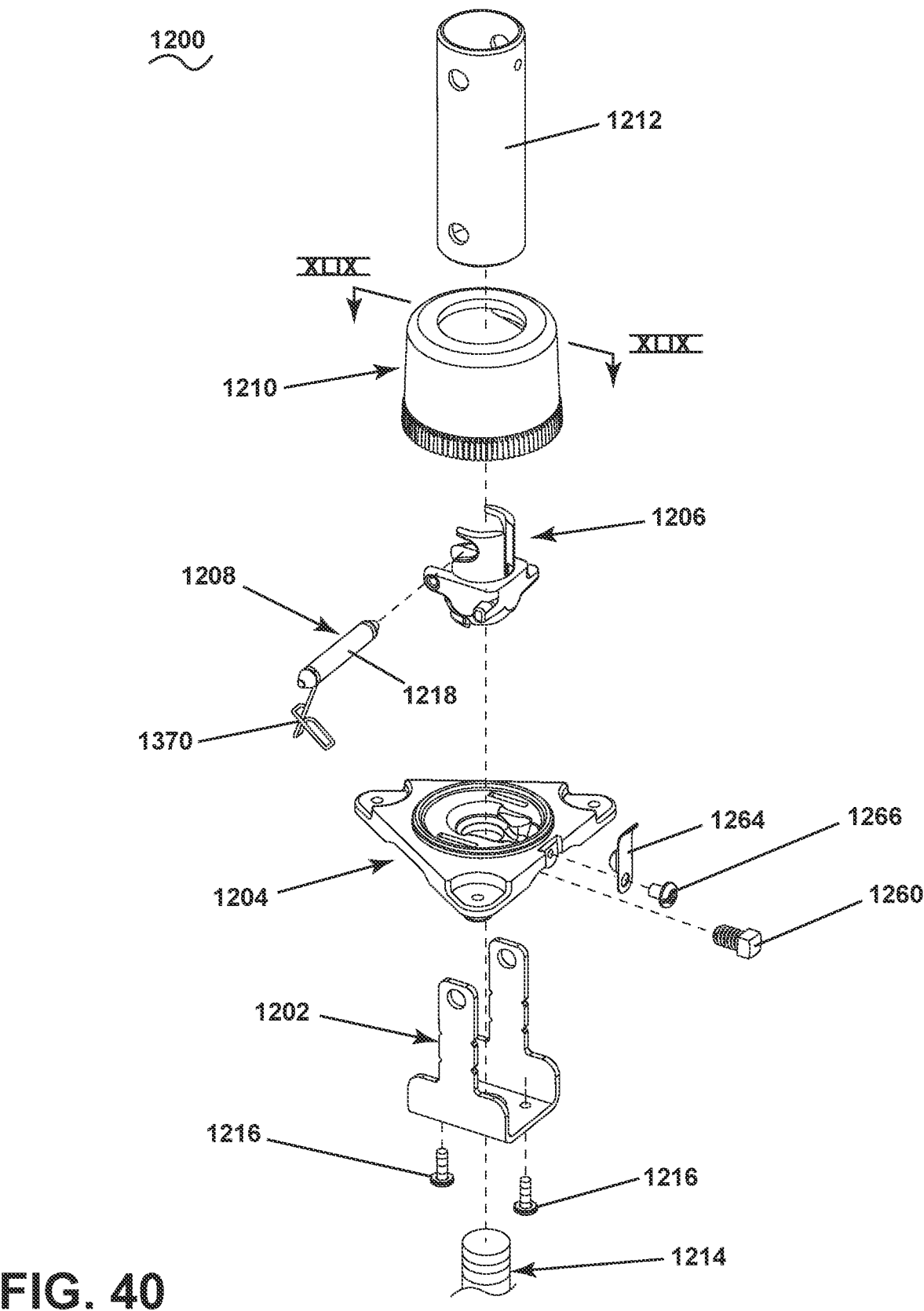
FIG. 40 is an exploded view of a motor adapter assembly having a pivoting joint member adapted to seat in a base plate and couple to a cradle via a pin assembly.

Referring now to FIG. 40, a motor adapter assembly 1200 can include a cradle 1202, a base plate 1204, a pivoting joint member 1206, a pin assembly 1208, and a cap 1210, and can be configured to couple a downrod 1212 to a motor shaft 1214 for a motor (not shown). The pin assembly 1208 can include a pin 1218 and a biasing element illustrated as a spring 1370. Additionally, a motor housing (not shown) can be coupled at the motor adapter assembly 1200 encasing the motor. A set of fasteners 1216 can optionally be included with the motor adapter assembly 1200. A shaft fastener 1260, a tab 1264, and a tab fastener 1266 can also be included with the motor adapter assembly 1200.

Figure 41:
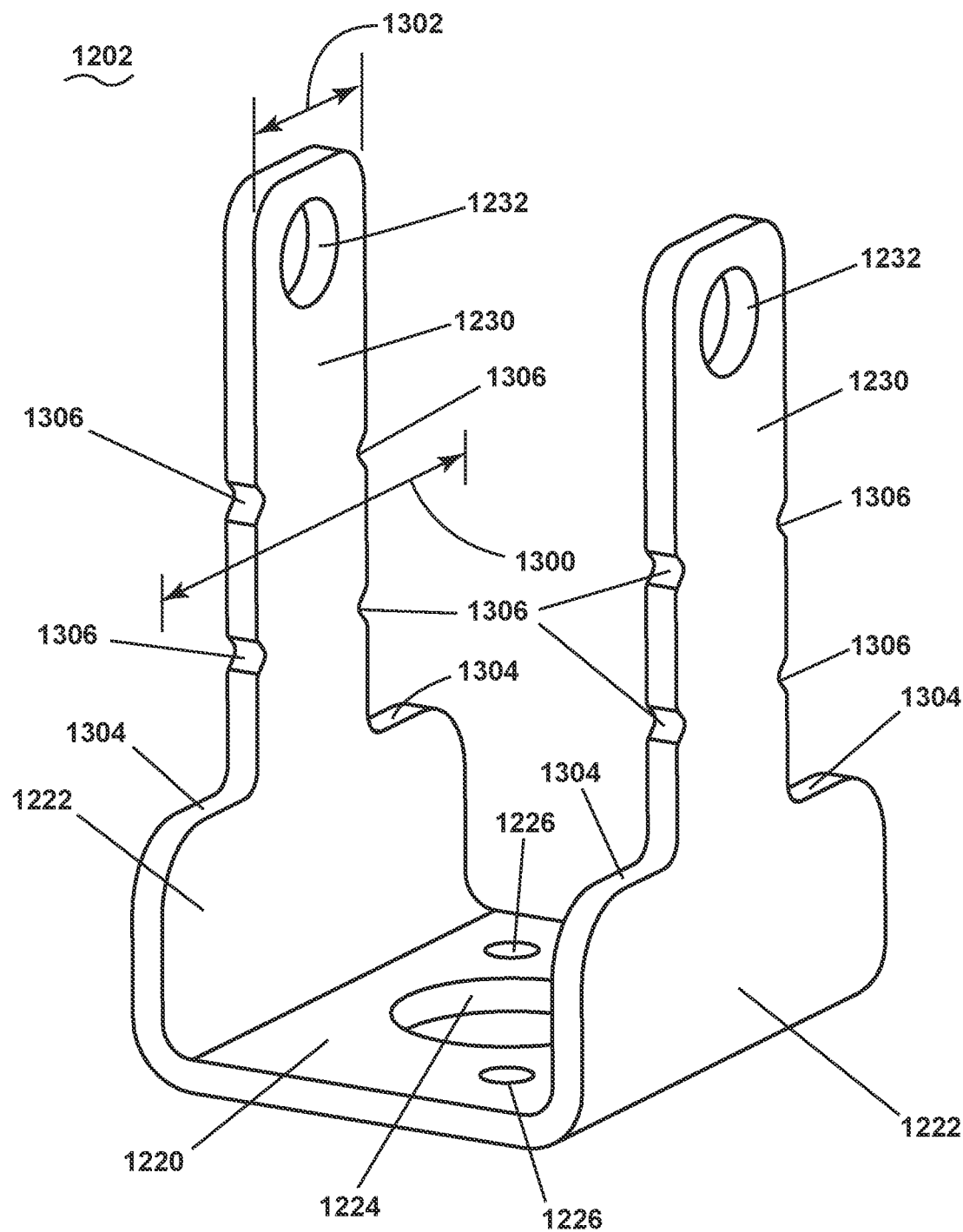
FIG. 41 is a perspective view of the cradle of FIG. 40.

Referring now to FIG. 41, the cradle 1202 can include a base wall 1220 with opposing sidewalls 1222 extending from the base wall 1220. A motor shaft aperture 1224 can be provided centrally in the base wall 1220 and can be sized complementary to a diameter of the motor shaft 1214. A set of fastener apertures 1226 can also be provided in the base wall 1220, configured to receive one or more of the fasteners 1216. An arm 1230 can extend from each sidewall 1222 opposite of the base wall 1220, with an arm aperture 1232 provided in each arm 1230 and arranged across from and complementary to one another. A length 1300 of the sidewalls 1222 can be greater than a length 1302 of the arms 1230, defining a pair of shoulders 1304 for each sidewall 1222. Each arm 1230 can include two sets of notches 1306. The notches 1306 can be positioned along sides of the arms 1230, between the arm aperture 1232 and the shoulders 1304. The sets of notches 1306 can be aligned with one another among the two arms 1230.

In one non-limiting example, the cradle 1202 can be manufactured as a single, stamped piece, including the motor shaft aperture 1224, the fastener apertures 1226, and the arms 1230 including the arm apertures 1232 and the notches 1306. The sidewalls 1222 including the arms 1230 can be folded orthogonal to the base walls 1220 to form the cradle 1202 into the position as shown.

Figure 42:
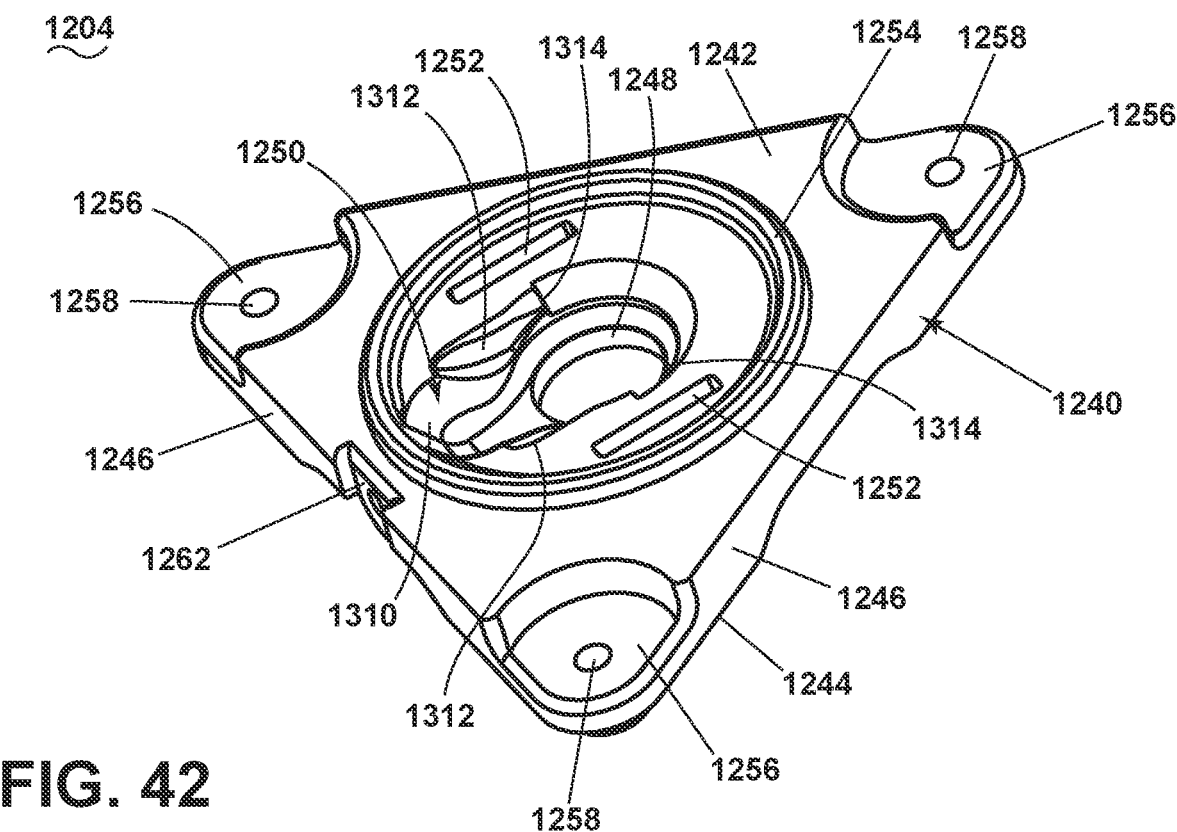
FIG. 42 is a top perspective view of the base plate of FIG. 40 including a relief area.

Referring now to FIG. 42, the base plate 1204 can include a body 1240 having a rounded triangular shape, including a top wall 1242 and a bottom wall 1244, with sidewalls 1246 extending between the top wall 1242 and the bottom wall 1244. A central aperture 1248 is provided in the body 1240, configured to couple to the motor shaft 1214, such as with a threaded connection in one non-limiting example. A pair of slots 1252 can extend through the body 1240 from the top wall 1242 to the bottom wall 1244, and can located opposite of one another relative to and spaced from the central aperture 1248. The slots 1252 can be sized complementary to the arms 1230 of the cradle 1202, for example. A ridge 1254 can be formed on the top wall 1242, extending above the remainder of the top wall 1242 and surrounding the central aperture 1248 and the slots 1252.

A relief portion 1250 can be formed in the body at the central aperture 1248. The relief portion 1250 can include a lead-in relief portion 1310 and a seat 1312 formed in the lead-in relief portion 1310. The seat 1312 can be formed as a peripheral portion of the lead-in relief portion 1310, and can have a depth into the body 1240 that is less than the rest of the lead-in relief portion 1310. The lead-in relief portion 1310 and seat 1312 can terminate at a shoulder 1314, provided radially exterior of the central aperture 1248.

A set of corner recesses 1256 can be provided at corners of the body 1240, having a set of housing apertures 1258 and configured to mount to a motor housing for a ceiling fan, such as the motor housings as described herein. A tab recess 1262 can be formed in the body 1240, recessed into the sidewalls 1246 and extending between the top wall 1242 and the bottom wall 1244. The tab recess 1262 can be sized to seat the tab 1264, secured with the tab fastener 1266 of FIG. 40.

Figure 43:
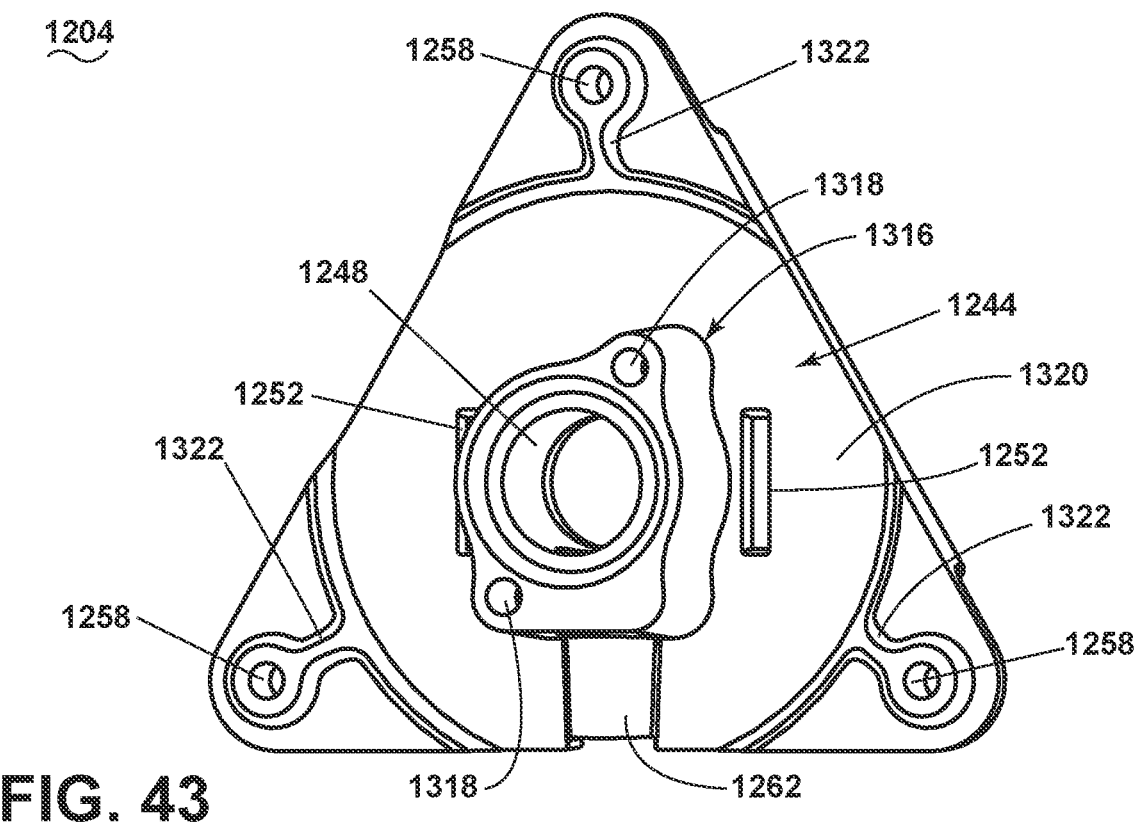
FIG. 43 is a bottom view of the base plate of FIG. 42 having a motor shaft aperture.

Referring now to FIG. 43, a boss 1316 extends from the bottom wall 1244 and at least partially defines the central aperture 1248. A pair of receptacles 1318 can be provided in the boss 1316 complementary to the fastener apertures 1226 of the cradle 1202, for example. A recessed area 1320 can be formed in the bottom wall 1244, with the slots 1252 positioned in the recessed area 1320. A raised portion 1322 can be formed around each of the housing aperture 1258, providing additional rigidity at the housing apertures 1258.

Figure 44:
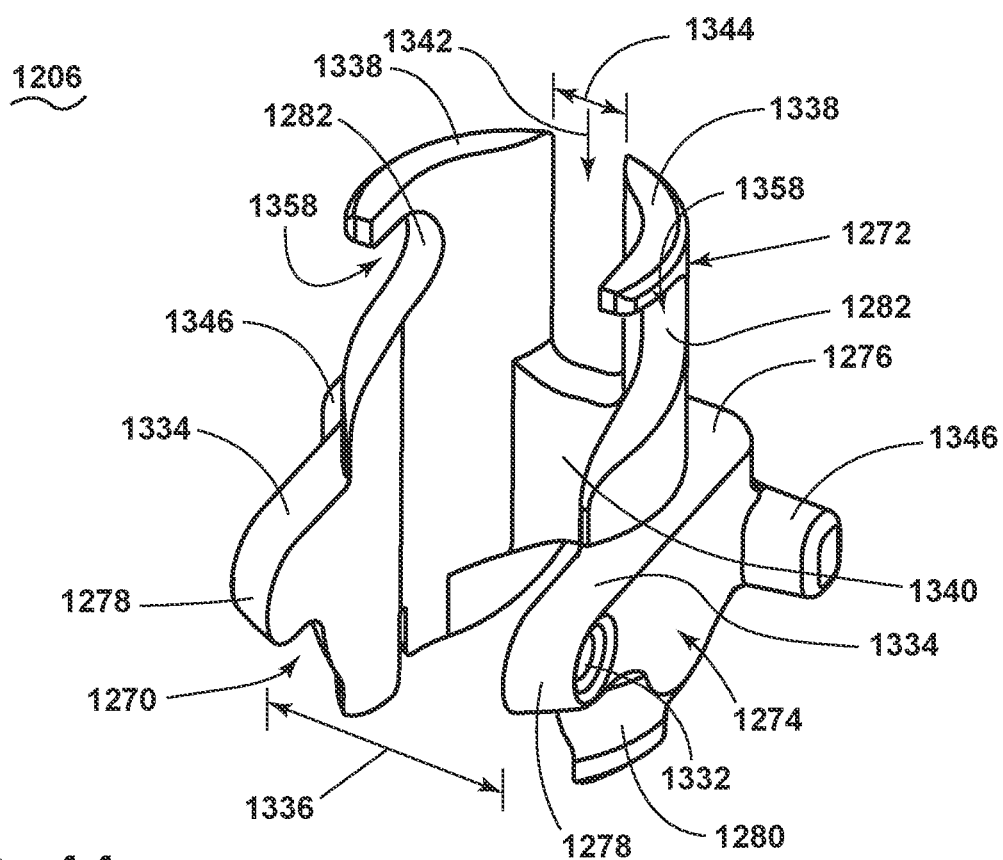
FIG. 44 is a top perspective view of the pivoting joint member of FIG. 40.

Referring now to FIG. 44, the pivoting joint member 1206 can include a body 1270 having an upper portion 1272 configured to couple at the downrod 1212, and a lower portion 1274 having a shoulder 1276 at the junction between the upper portion 1272 and the lower portion 1274. The lower portion 1274 further includes a set of pinch tabs 1278 extending from the remainder of the body 1270 and a ball 1280 sized complementary to the central aperture 1248 of the base plate 1204. The pinch tabs 1278 each include a recess 1332 and can include a first surface 1334 as a top surface, coplanar with the shoulders 1276. The pair of pinch tabs 1278 can be spaced from one another by a gap 1336. A pair of arms 1346 extends from the body 1270 in a direction substantially orthogonal to the longitudinal extension of the pinch tabs 1278.

The upper portion 1272 can extend from the body 1270 as a pair of arcuate walls 1338, interconnected by a bridge 1340. A set of openings 1282 are formed in the arcuate walls 1338. The openings 1282 are open within the arcuate walls 1338, forming a hook 1358 at the arcuate walls 1338. A vertical slot 1342 is formed between the pair of arcuate walls 1338, with the vertical slot 1342 terminating at a bridge 1340 connecting the arcuate walls 1338. The arcuate walls 1338 can be spaced by a gap 1344 defining the vertical slot 1342.

Figure 45:
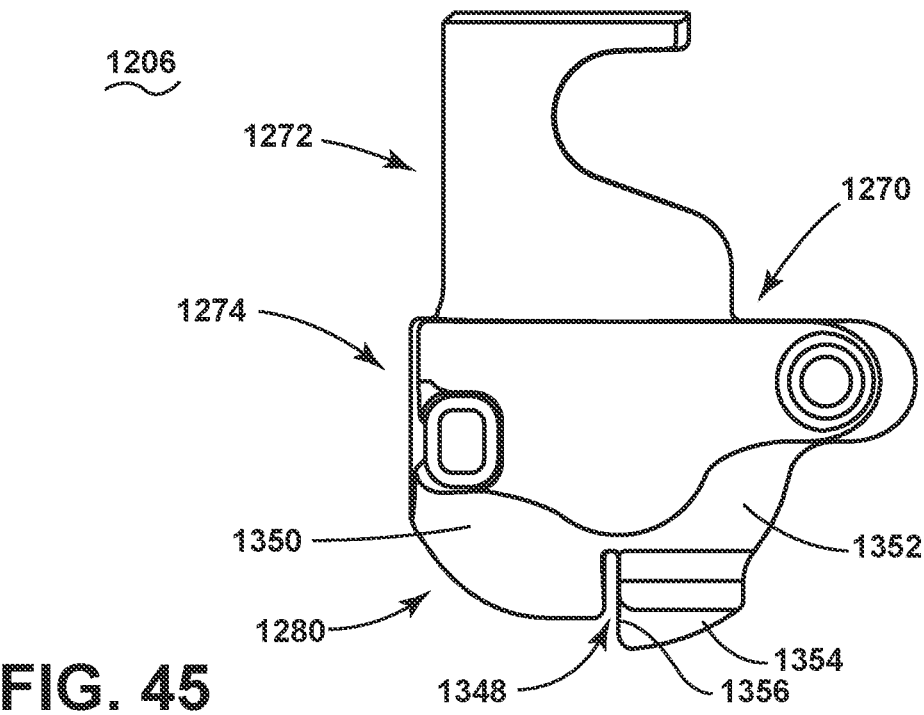
FIG. 45 is a side view of the pivoting joint member of FIG. 44.

Referring now to FIG. 45, the ball 1280 includes a pair of relief slots 1348, effectively separating the ball 1280 into a rear portion 1350 and a front portion 1352. The rear portion 1350 can be substantially shaped as a quarter-sphere, extending around a portion of the body 1270, and terminating at the relief slots 1348, while other shapes are contemplated. The front portion 1352 includes a pair of extensions 1354 extending from the body 1270 and at least partially forming the ball 1280. The extensions 1354 extend further from the body 1270 than the rear portion 1350, forming an abutment 1356 for each extension 1354 at the relief slots 1348.

Figure 46:
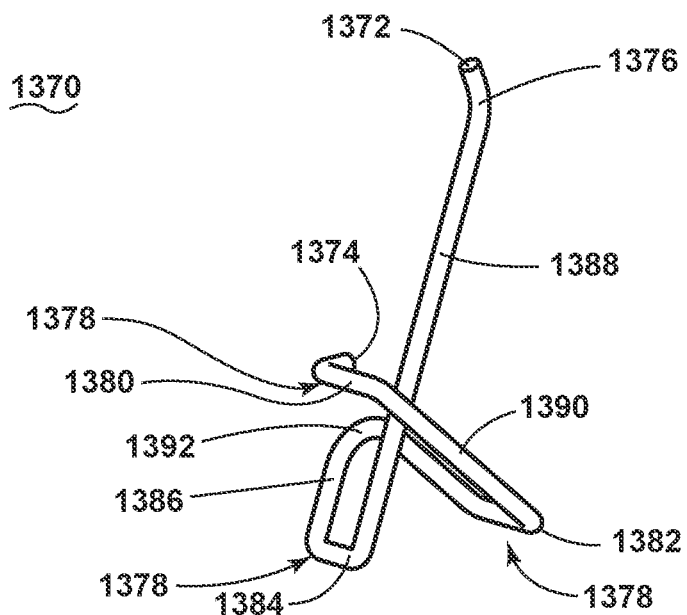
FIG. 46 is a perspective view of a pin spring configured to couple to the cradle of FIG. 41.

Referring now to FIG. 46, the spring 1370 of the pin assembly 1208 can include a first end 1372 and a second end 1374. A hook 1376 can be formed at the first end 1372. Three squared portions 1378 can be formed in the spring 1370. A first squared portion 1380 can be formed adjacent the second end 1374, at a height higher than the remaining squared portions 1378. A second squared portion 1382 and a third squared portion 1384 can be provided at a similar height, and can be interconnected by an intermediate portion 1386. The intermediate portion 1386 can be include a bend 1392, while it is contemplated that it is linear extending between the second and third squared portions 1382, 1384. A first longitudinal portion 1388 extends between the first end 1372 and the second squared portion 1382, and a second longitudinal portion 1390 extends between the first squared portion 1380 and the third squared portion 1384.

The spring 1370 is preferably made of metal. Such a suitable metal can be any metal capable of flexion, such as aluminium, while retaining rigidity to return to an initial orientation after flexion. Such flexion can be about the bend 1392 of the intermediate portion 1386.

Figure 47:
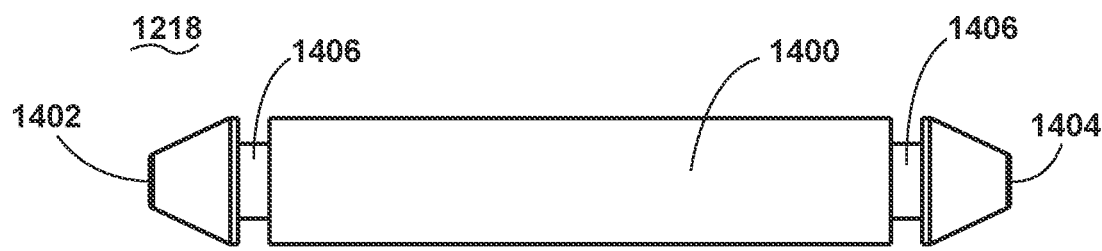
FIG. 47 is a side view of a pin of the pin assembly FIG. 40.

Referring now to FIG. 47, the pin 1218 can include a body 1400 extending between a first end 1402 and a second end 1404. The body 1400 can be substantially cylindrical. The first and second ends 1402, 1404 can be tapered and shaped as a truncated cone, while other suitable shapes are contemplated. A pair of grooves 1406 are formed in the body 1400, provided adjacent to the first end 1402 and the second end 1404. The grooves 1406 can be sized complementary to a thickness of the spring 1370 of FIG. 46.

Figure 48:
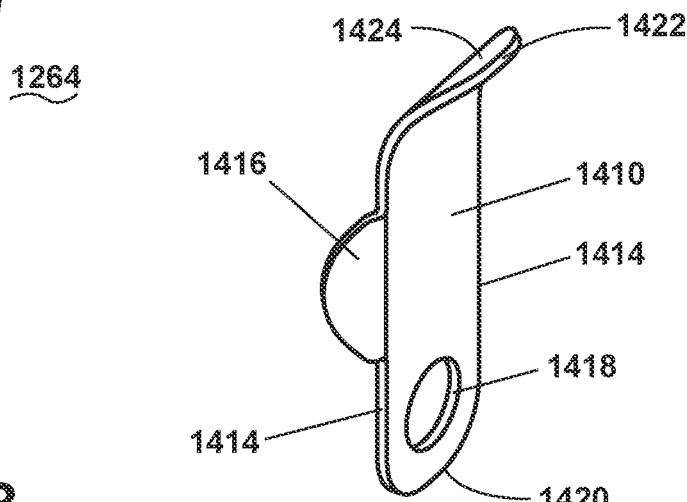
FIG. 48 is a perspective view of a tab configured to retain a cap over the pivoting joint member of FIG. 40.

Referring now to FIG. 48, the tab 1264 can include a body 1410 with a pair of sidewalls 1414. A lock tab 1416 extends from one sidewall 1414, and can be bent or angled relative to the body 1412. An aperture 1418 is provided in the body 1412 at a first end 1420 of the body 1412. A depressible release tab 1422 is provided at a second end 1424 of the body 1412. The depressible release tab 1422 can be bent or angled away from the body 1412.

Figure 49:
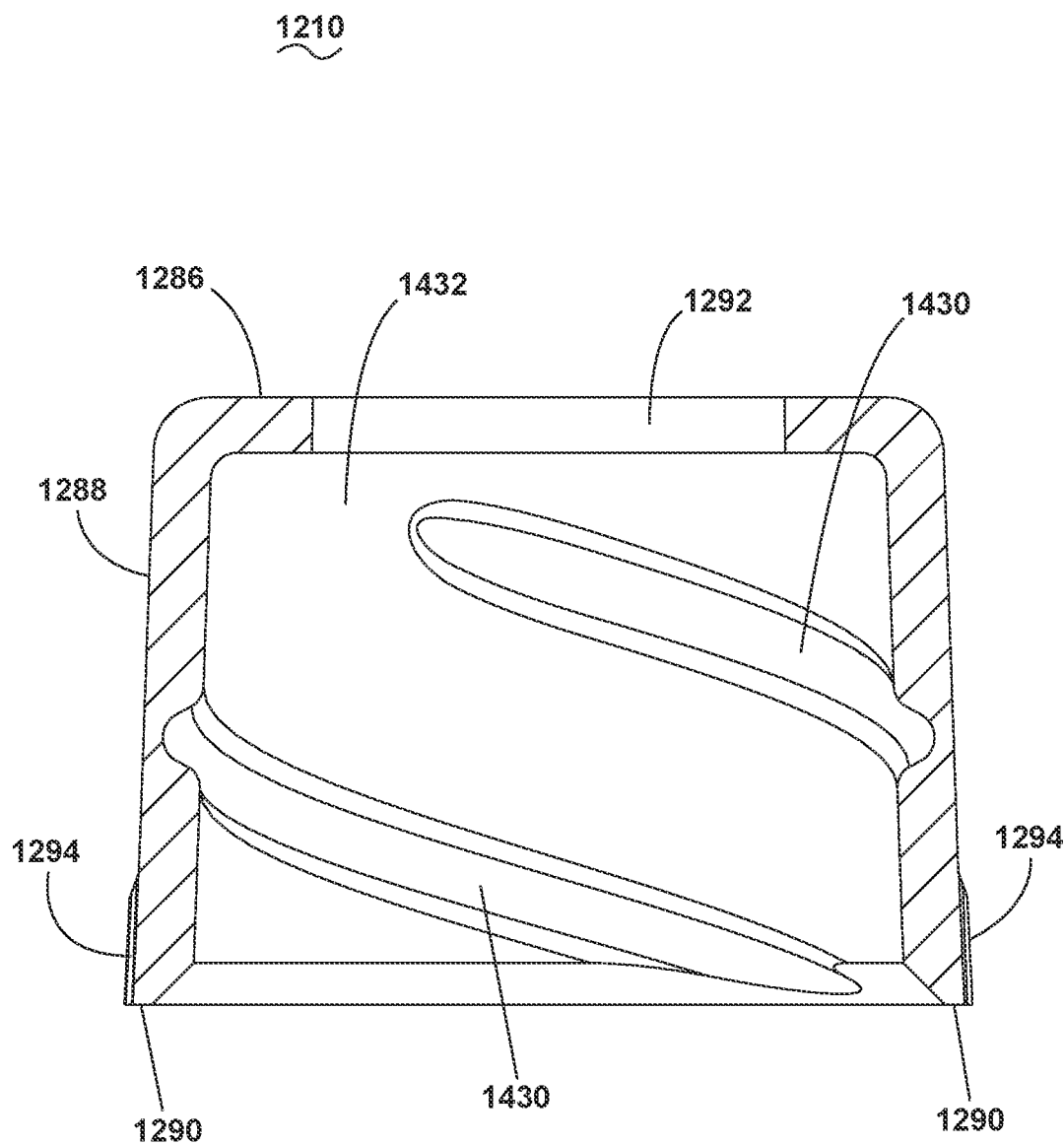
FIG. 49 is a sectional view of the cover taken across section XLIX-XLIX of FIG. 40.

Referring now to FIG. 49, a section of the cap 1210 about section XLIX-XLIX of FIG. 40 better illustrates an upper wall 1286 extending to a sidewall 1288. The sidewall 1288 terminates at a terminal edge 1290 opposite of the upper wall 1286. The cap 1210 can be slightly tapered, such that a diameter at the terminal edge 1290 is greater than a diameter for the upper wall 1286. A downrod aperture 1292 is provided in the upper wall 1286. A set of teeth 1294 are provided on the sidewall 1288, adjacent the terminal edge 1290. The teeth 1294 can have a saw-tooth shape, with a flat back portion and an angled portion to permit rotation in a single direction about the tab 1264, and securing at the teeth 1294 after rotation. A set of threads 1430 formed on an interior wall 1432 of the cap 1210.

Figure 50:
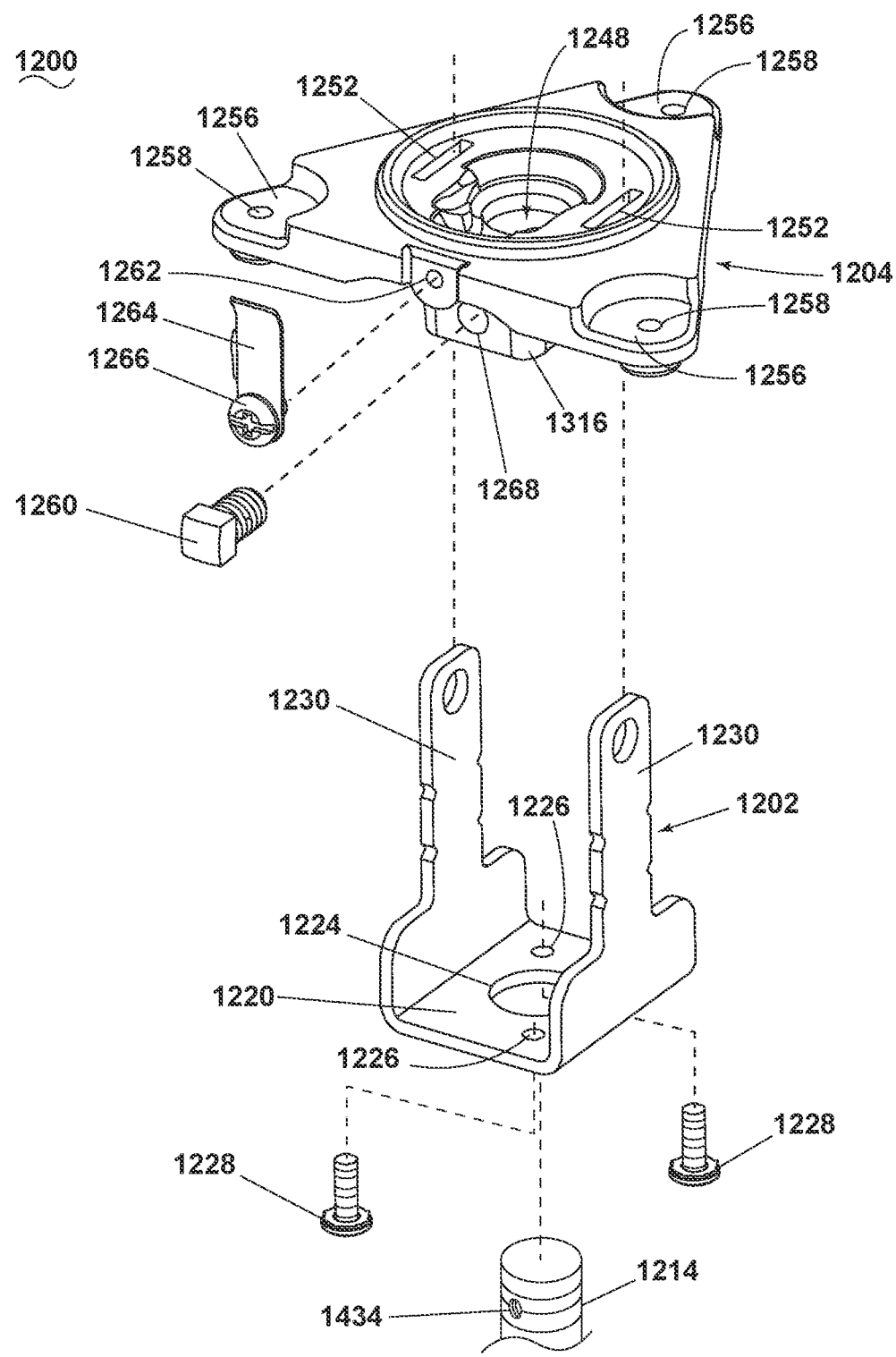
FIG. 50 illustrates an assembly sequence for the motor adapter assembly of FIG. 40, illustrating coupling the cradle and a motor shaft to the base plate.

FIGS. 50-58 illustrate an assembly sequence for assembling the motor adapter assembly 1200 to couple the motor shaft 1214 to the downrod 1212. Referring now to FIG. 50, the cradle 1202 can couple to the base plate 1204. The arms 1230 of the cradle 1202 can insert into the slots 1252 of the base plate 1204 until the boss 1316 abuts the base wall 1220 of the cradle 1202. The cradle 1202 can fasten to the base plate 1204 with the set of fasteners 1228 extending through the fastener apertures 1226 and securing within the receptacles 1318 of the boss 1316.

The motor shaft 1214 can extend through the motor shaft aperture 1224 in the cradle 1202 and threadably fasten within the central aperture 1248 of the base plate 1204, while it is contemplated that the motor shaft 1214 need not thread to the base plate 1204. The shaft fastener 1260 can thread into a shaft fastener aperture 1268 to secure the motor shaft 1214 to the base plate 1204 at the boss 1316. It is contemplated that the shaft fastener 1260 can use compression to prevent rotation of the motor shaft 1214 relative to the base plate 1204, or can thread into the motor shaft 1214, such as into a motor shaft aperture 1434

The tab 1264 can fasten to the tab recess 1262 in the base plate 1204 with a tab fastener 1266. Optionally, a motor housing (not shown) can mount to the base plate 1204 at the corner recesses 1256 and the housing apertures 1258.

Figure 51:
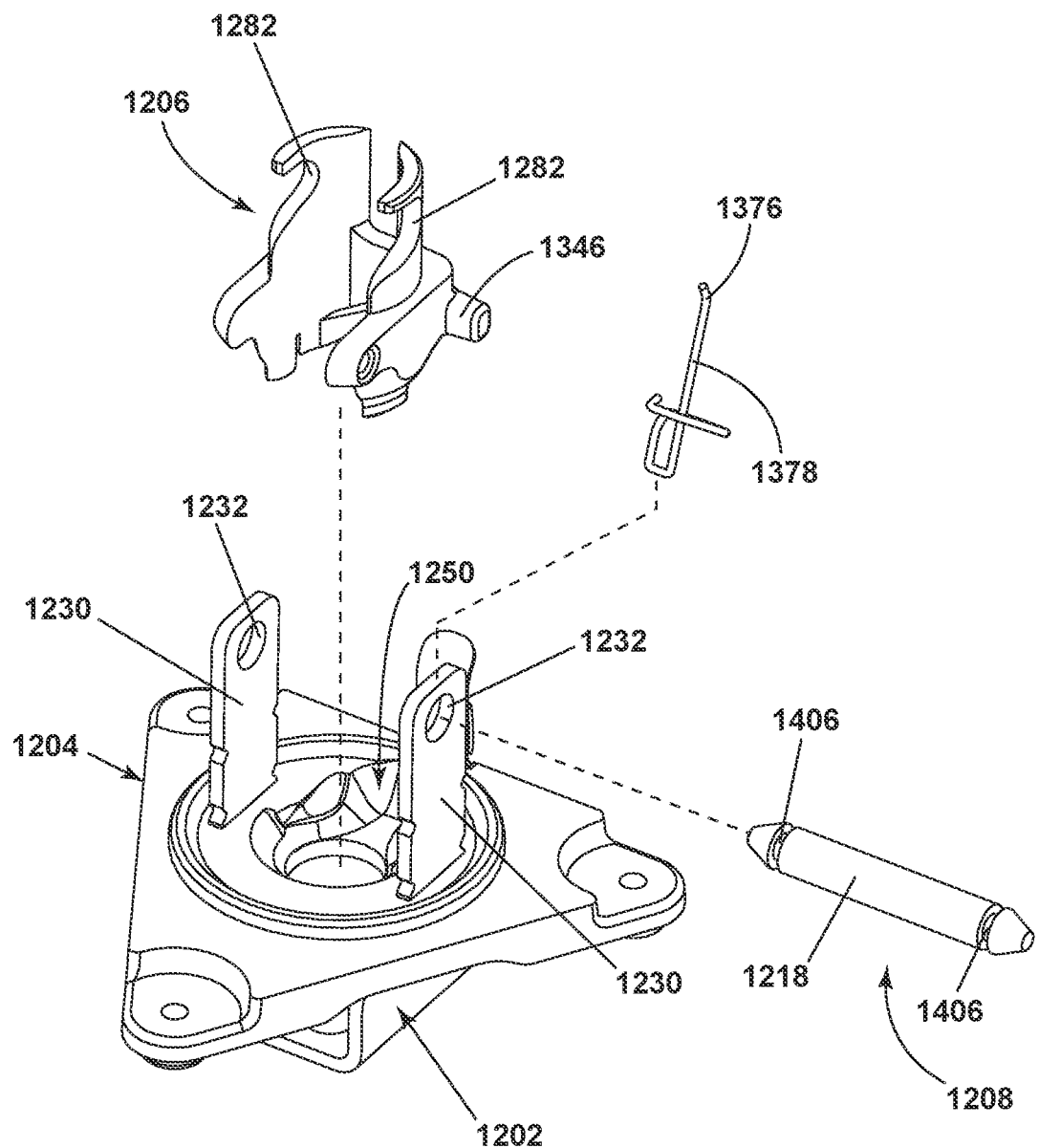
FIG. 51 illustrates the assembly sequence following FIG. 50 for coupling the pin spring to the cradle and the pivoting joint member to the base plate.

Referring now to FIG. 51, continuing the assembly sequence from FIG. 50, the pivoting joint member 1206 can position in the relief portion 1250 of the base plate 1204. The pivoting joint member 1206 positions between the arms 1230 of the cradle 1202 extending beyond the base plate 1204, aligning the openings 1282 in the pivoting joint member 1206 with the arm apertures 1232 in the cradle 1202. The arms 1346 of the pivoting joint member 1206 can abut the arms 1230 of the cradle 1202, when the pivoting joint member 1206 is in the upright position, as shown.

The pin assembly 1208 can at least partially couple to the arms 1230 of the cradle 1202, coupling the spring 1370 to one arm 1230. The spring 1370 can insert over one of the arms 1230 of the cradle 1202, securing the position of the pin 1208 with the hook 1376 adjacent the arm aperture 1232.

Figure 52:
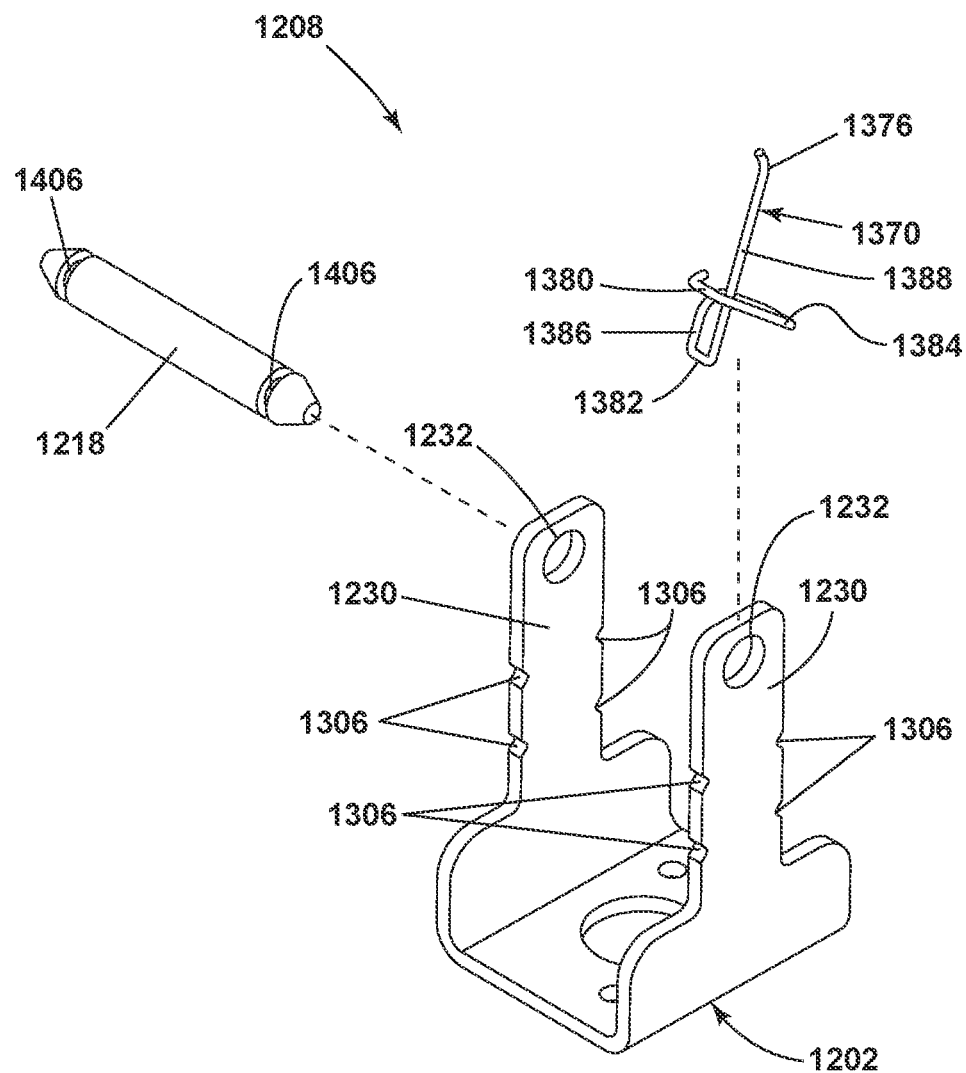
FIG. 52 illustrates the assembly of the pin assembly and the cradle.

Referring now to FIG. 52, specifically describing the assembly of the pin assembly 1208, the spring 1370 can couple to the arm 1230 of the cradle 1202, with the first, second, and third squared portions 1380, 1382, 1384 inserting into the notches 1306 on one arm 1230 of the cradle 1202. The intermediate portion 1386 of the spring 1370 permits flexion of the spring 1370 to insert onto the arm 1230, and flexibly secure at the notches 1306. The pin 1218 can insert through the arm apertures 1232 in the arms 1230.

Figure 53:
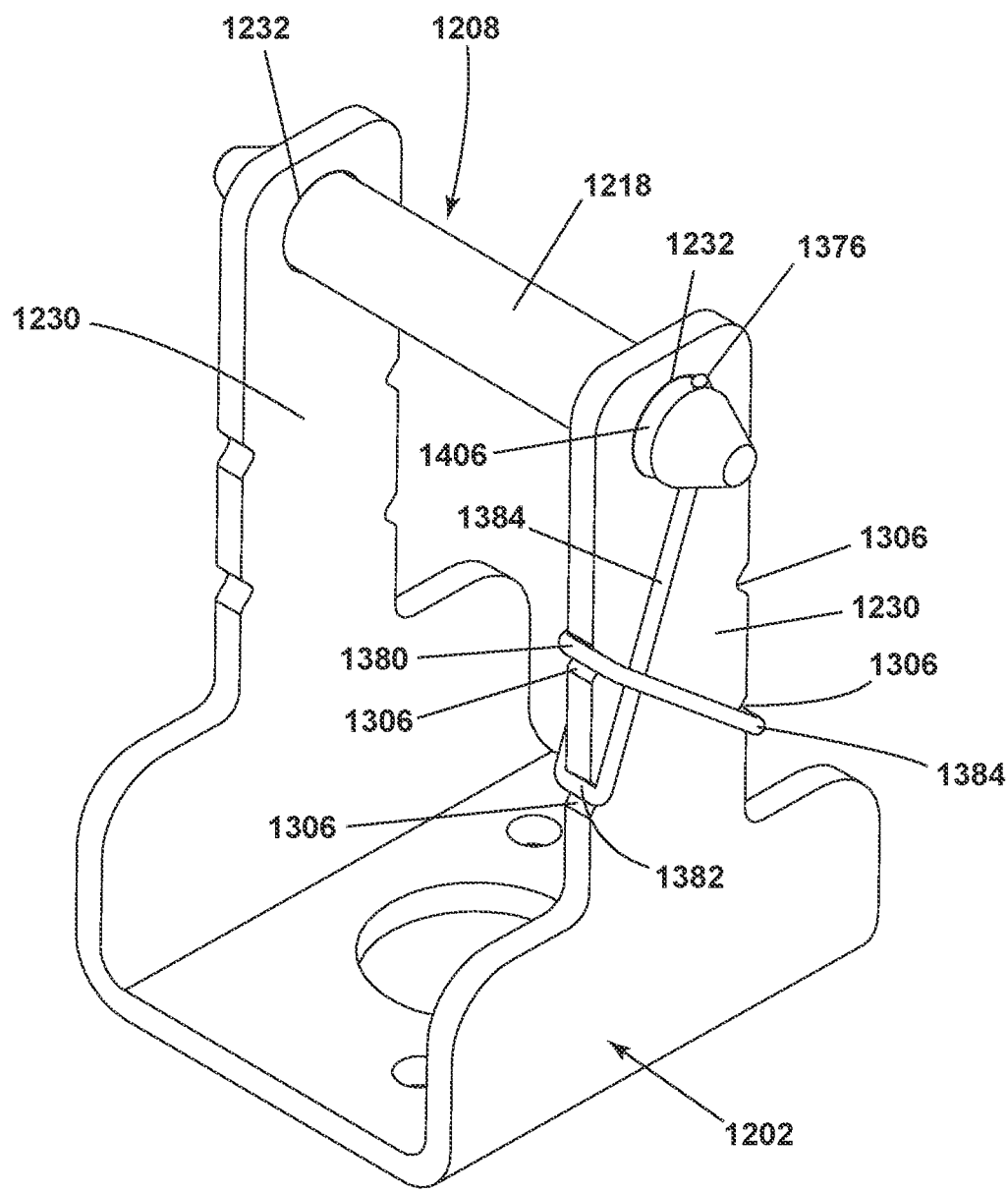
FIG. 53 illustrates the final assembled version of FIG. 52.

FIG. 53 shows the pin assembly 1208 in the assembled position mounted to an arm 1230 of the cradle 1202. In the assembled position, the squared portions 1378 of the spring 1370 secure in the notches 1306 of the arms 1230 of the cradle 1202, and fastens to the arm 1230. The pin 1218 extends through the arm apertures 1232. The hook 1376 inserts into the grooves 1406 on the pin 1218, and secures the position of the pin 1218, preventing movement of the pin 1218 relative to the cradle 1202 through the arm apertures 1232. Additionally, the first longitudinal portion 1388 can be bent to remove the hook 1376 from the groove 1406 on the pin 1218, permitting the pin 1218 to be removed from the cradle 1202. While only a single spring 1370 is shown, two springs 1370 can be used, or the spring 1370 can be positioned on the other arm 1230 of the cradle 1202.

Figure 54:
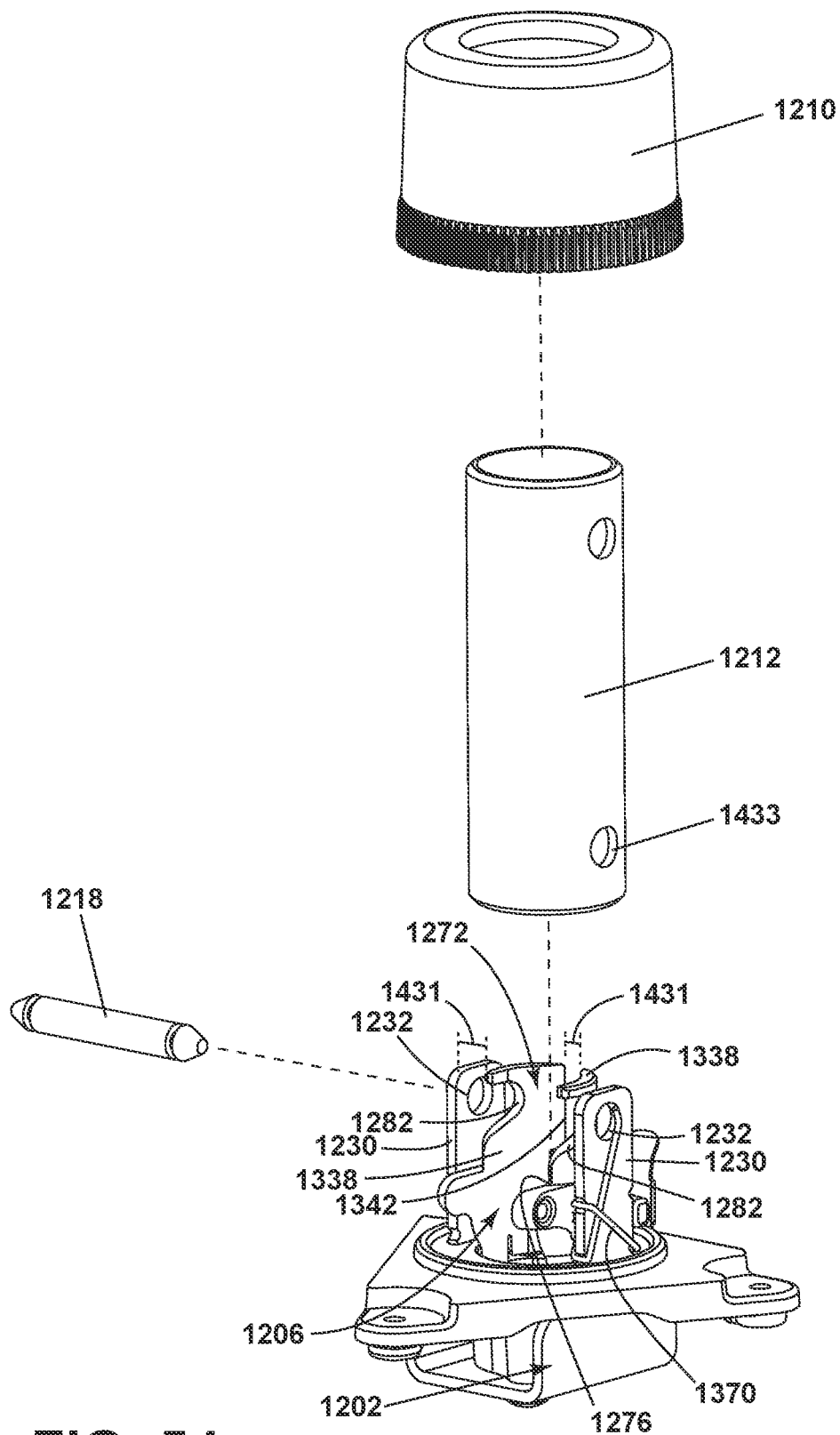
FIG. 54 illustrates the assembly sequence following FIG. 51, for coupling a downrod to the pivoting joint member and the cradle via the pin.

Referring now to FIG. 54, continuing the assembly sequence from FIG. 51, a gap 1431 is formed between each of the arcuate walls 1338 of the pivoting joint member 1206 and the arms 1230 of the cradle 1202. The gap 1431 can be sized complementary to a thickness of the walls of the downrod 1212. The downrod 1212 can insert around the pivoting joint member 1206, aligning mount apertures 1433 in the downrod 1212 with the openings 1282 in the pivoting joint member 1206 and the arm apertures 1232 in the cradle 1202. The downrod 1212 can insert around the pivoting joint member 1206 until the downrod 1212 abuts the shoulder 1276 of the pivoting joint member 1206. The diameter of the downrod 1212 can be sized such that inserting the downrod 1212 around the pivoting joint member 1206 compresses or squeezes the upper portion 1272 of the pivoting joint member 1206. Compression of the upper portion 1272 is permitted by moving the arcuate walls 1338 inward, into the vertical slot 1342. Such compression can be used to retain the pivoting joint member 1206 within the downrod 1212.

The pin 1218 can insert through the arm apertures 1232, the openings 1282, and the mount apertures 1433 to secure the cradle 1202, the pivoting joint member 1206, and the downrod 1212 together. The spring 1370 can secure the pin 1218 in position and prevent the pin 1218 from sliding out of position.

Figure 55:
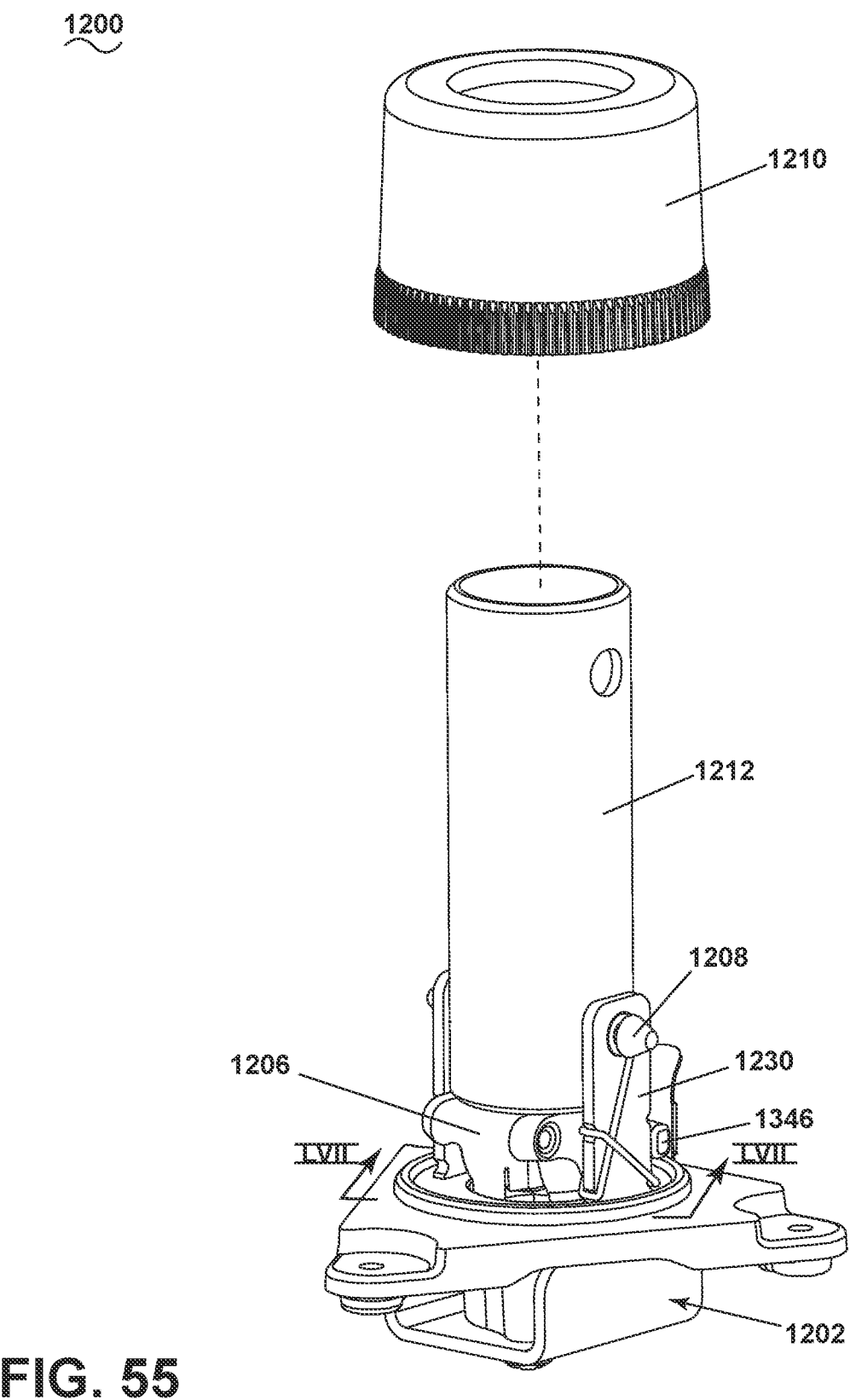
FIG. 55 illustrates the assembled version of FIG. 54, with the motor adapter assembly in an upright position, with the cap exploded from the rest of the motor adapter assembly.

Referring now to FIG. 55, continuing the sequence assembly from FIG. 54, the motor adapter assembly 1200 is assembled in the upright position, with only the cap 1210 exploded from the downrod 1212. In the upright position, the downrod 1212 and the pivoting joint member 1206 can pivot about the pin assembly 1208, with the arms 1346 of the pivoting joint member 1206 pivoting away from the arms 1230 of the cradle 1202.

Figure 56:
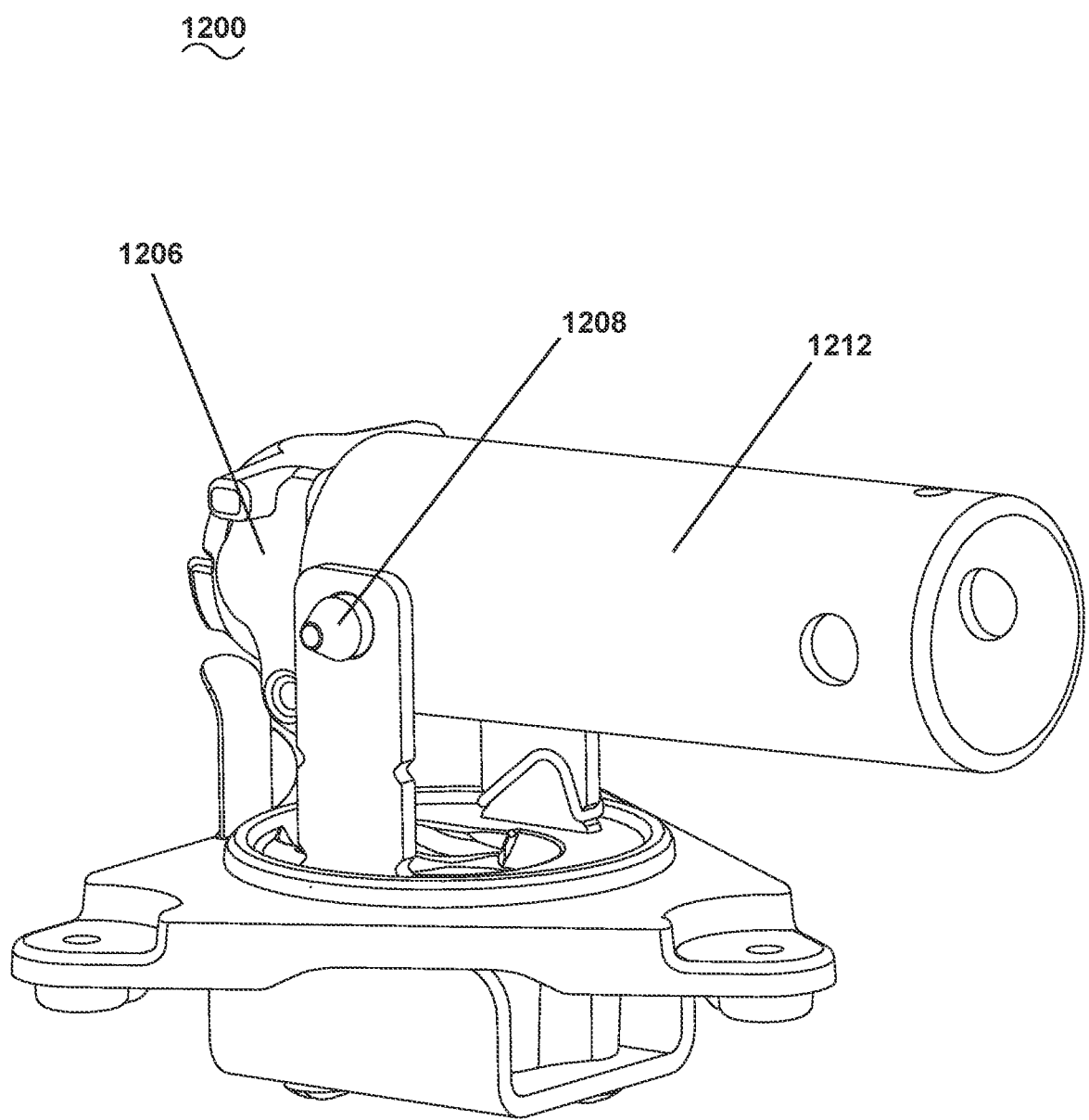
FIG. 56 illustrates the assembled version of FIG. 55, with the motor adapter assembly in the rotated position.

Referring now to FIG. 56, the motor adapter assembly 1200 of FIG. 55 has moved into the pivoted position, having the downrod 1212 and the pivoting joint member 1206 pivoted about the pin assembly 1208. The pivoting joint member 1206 is retained within the downrod 1212 by compression of the upper portion 1272 (hidden interior of the downrod 1212 as shown) of the pivoting joint member 1206. The pivoted position can provide for decreased space occupied by the motor adapter assembly 1200, which can decrease space required for packaging, shipping, or display, as well as an overall reduction in packaging materials.

Figure 57:
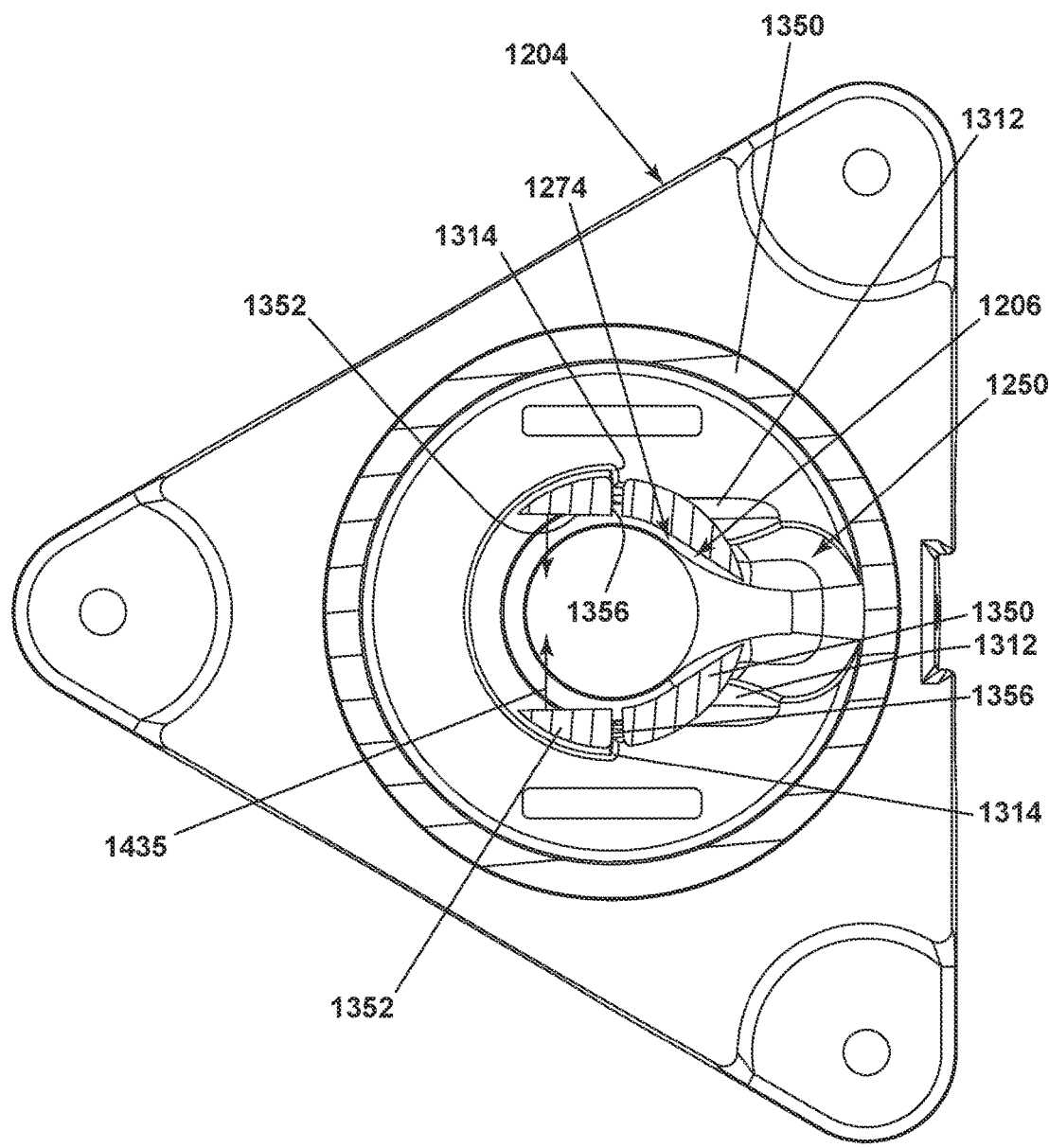
FIG. 57 is a section view of FIG. 55 taken across section LVII-LVII, isolating the pivoting joint member seated in the relief area of the base plate.

The motor adapter assembly 1200 can be rotated back into the upright position (see FIG. 54) for installation. Referring now to FIG. 57, showing a section taken along section LVII-LVII of FIG. 55, with the motor adapter assembly 1200 in the upright position and isolating the base plate 1204 and the pivoting joint member 1206 for clarity. The lower portion 1274 of the pivoting joint member 1206 can seat in the relief portion 1250 of the base plate 1204. Rotation of the pivoting joint member 1206 can continue until the abutment 1356 of the front portion 1352 seat against in the shoulder 1314 of the relief portion 1250. The front portion 1352 can be sized complementary to the shoulder 1314 of the relief portion 1250, while the rear portion 1350 of the pivoting joint member 1206 can position in the remainder of the relief portion 1250 at the seat 1312. The upright position can be maintained with the abutments 1356 against the shoulders 1314, in addition to the arms 1346 of the pivoting joint member 1206 positioned against the arms 1230 of the cradle 1202 (see FIG. 54).

Compression of the pinch tabs 1278 of the pivoting joint member 1206 can release the abutments 1356 from the shoulders 1314 of the relief portion 1250, by squeezing the abutments 1356 inward, shown by arrow 1435, removing the abutments 1356 from the shoulders 1314. Such removal permits pivoting movement of the downrod 1212 and the pivoting joint member 1206 about the pin 1218 (see FIG. 56). After pivoting, downrod 1212 and the pivoting joint member 1206 can be pivoted back into the upright position, locking the abutments 1356 into the shoulders 1314.

Figure 58:
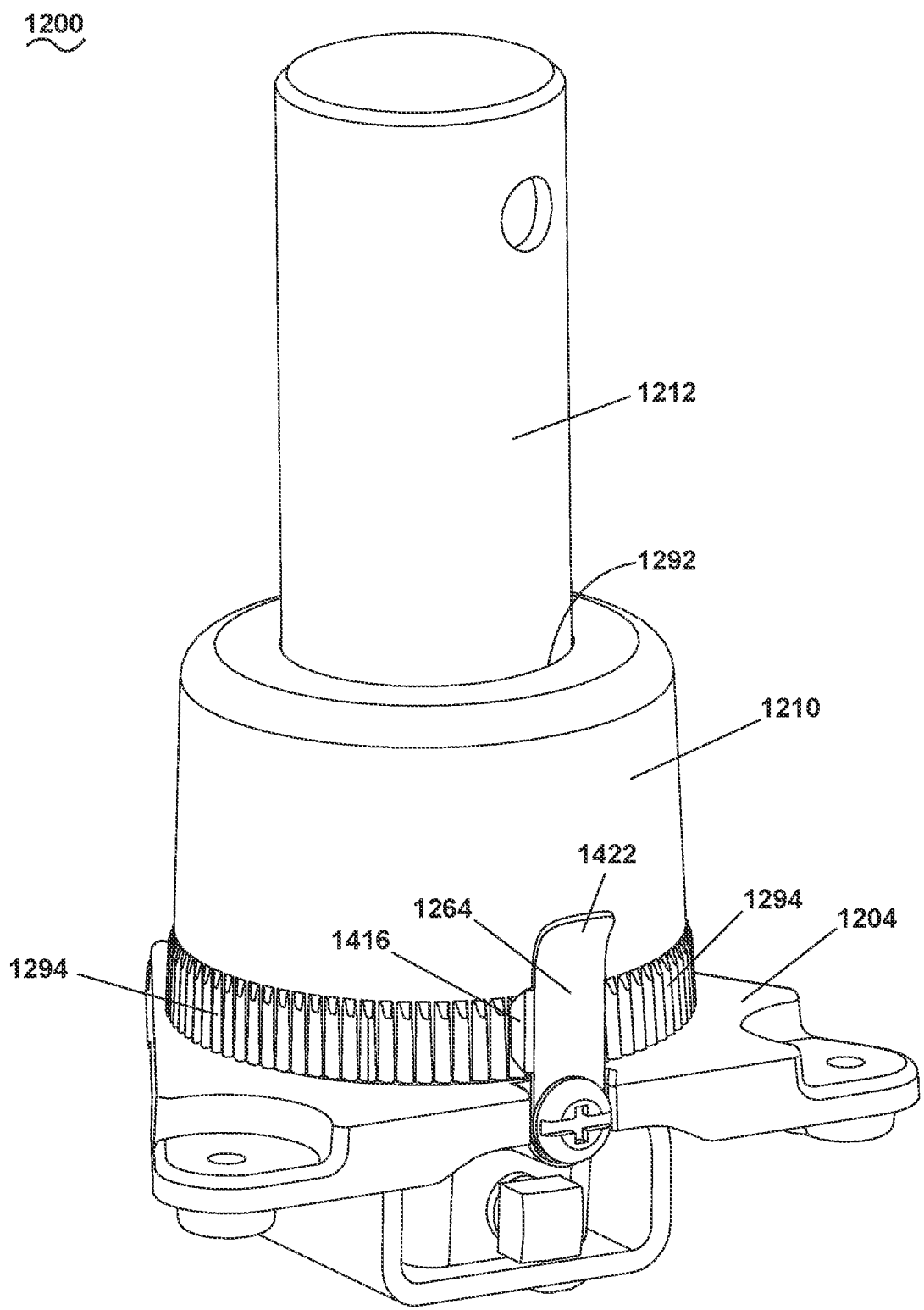
FIG. 58 illustrates the assembly sequence following FIG. 55, showing the final assembled version of the motor adapter assembly of FIG. 40.

Referring now to FIG. 58, the motor adapter assembly 1200 is in the final installed, upright position, with the cap 1210 has been inserted around the downrod 1212, with the downrod 1212 extending through the downrod aperture 1292 in the cap 1210. The cap 1210 can be rotated to insert about the remainder of the motor adapter assembly 1200, threading the first and second ends 1402, 1404 of the pin 1208 (hidden interior of the cap 1210, as shown) along the threads 1430 on the interior of the cap 1210. The cap 1210 can fasten to the base plate 1204 with the lock tab 1416 of the tab 1264 locking into the teeth 1294 of the cap 1210. The cap 1210 can be released by depressing the release tab 1422, removing the lock tab 1416 from the teeth 1294.

The motor adapter assembly 1200 as described in FIGS. 40-58 provides for a pivoting motor adapter assembly which permits pivoting movement of the downrod into a pivoted position (FIG. 56) and an upright position (FIG. 58). The pivoted position reduces required space for storage and permits ease of installation. A user can remove the motor adapter assembly 1200 from a package, for example, and easily rotate the downrod 1212 about the pin 1218 into the upright position, where it can lock into position with the abutments 1356 against the shoulders 1314, and with the arms 1346 of the pivoting joint member 1206 positioned against the arms 1230 of the cradle 1202. Such a position is maintained upright, permitting ease of installation, such as fastening the downrod 1212 to the motor shaft 1214. Additionally, the pin assembly 1208 among the downrod 1212, the pivoting joint member 1206, and the cradle 1202 secures the assembly 1200 together, while permitting rotation of the downrod into the pivoted position. The pin assembly 1208 provides for retaining the pin 1218 within the assembly 1200, which can be secured by the cap 1210 at final installation.

Figure 59:
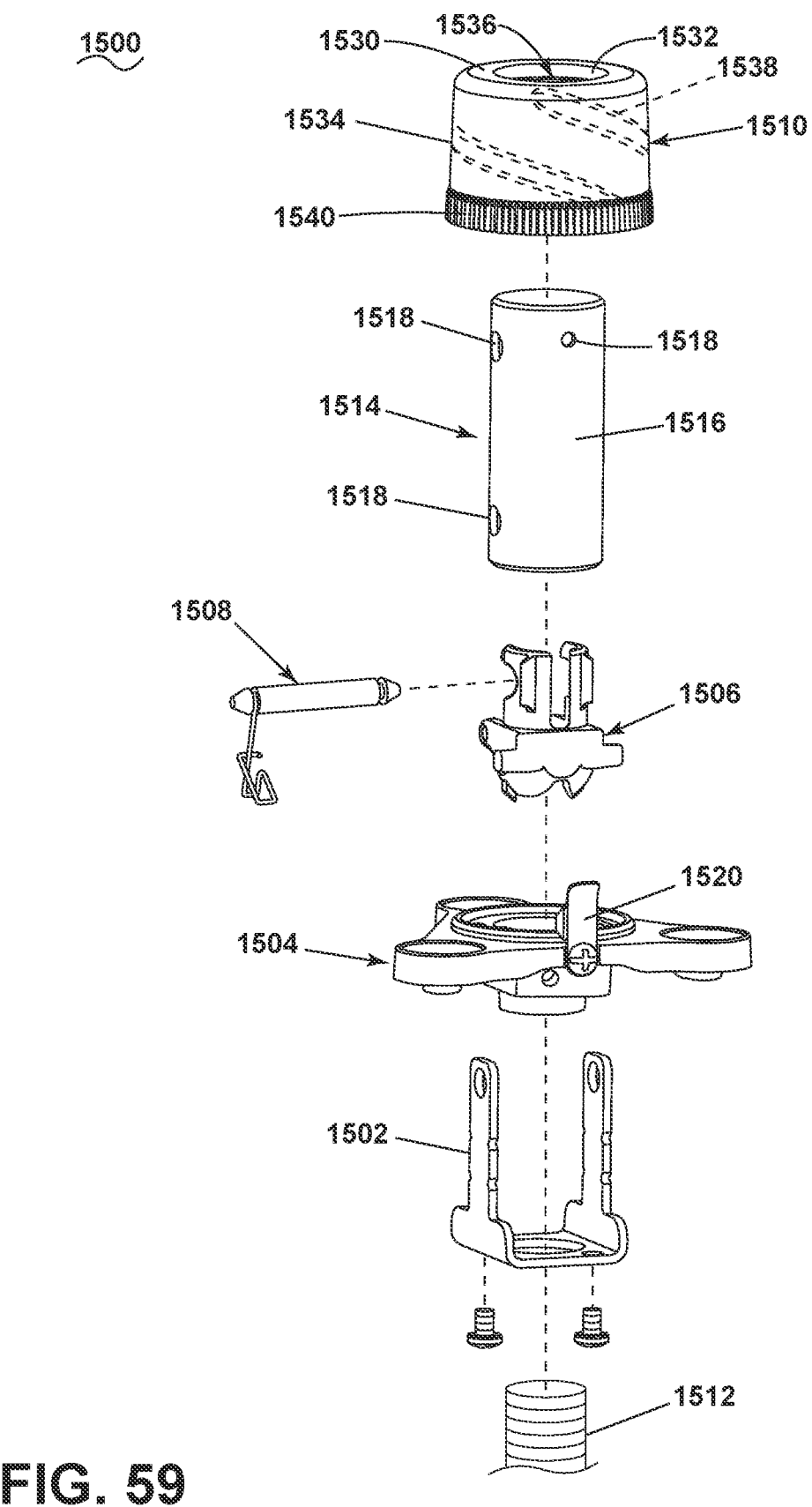
FIG. 59 shows an exploded view of a motor adapter assembly including a cradle, a base plate, and a pivoting joint member.

Referring now to FIG. 59, another exemplary motor adapter assembly 1500 can include a cradle 1502, a base plate 1504, a pivoting joint member 1506, a pin assembly 1508, and a cap 1510 for coupling a motor shaft 1512 to a downrod 1514. The motor shaft 1512 can be a threaded motor shaft in one example. The downrod 1514 can include an outer wall 1516, with mounting apertures 1518 provided in the outer wall 1516. The pin assembly 1508 can be substantially similar to the pin assembly 1208 of FIGS. 40, 46 and 47, and can have the same distinctive features permitting fastening of the pin assembly 1508 to the cradle 1502. A tab 1520 can be coupled to the base plate 1504, and can be substantially similar to the tab 1264 of FIG. 48.

The cap 1510 can include a top wall 1530 with a downrod aperture 1532 formed in the top wall 1530. A sidewall 1534 extends from the top wall 1530, defining an interior 1536 for the cap 1510. A set of threads 1538 can be formed in the sidewall 1534 in the interior 1536 of the cap 1510. A set of teeth 1540 can be provided on the sidewall 1534 on the exterior of the cap 1510. The teeth 1540 can be saw-tooth shaped, for example, while any suitable shape is contemplated.

Figure 60:
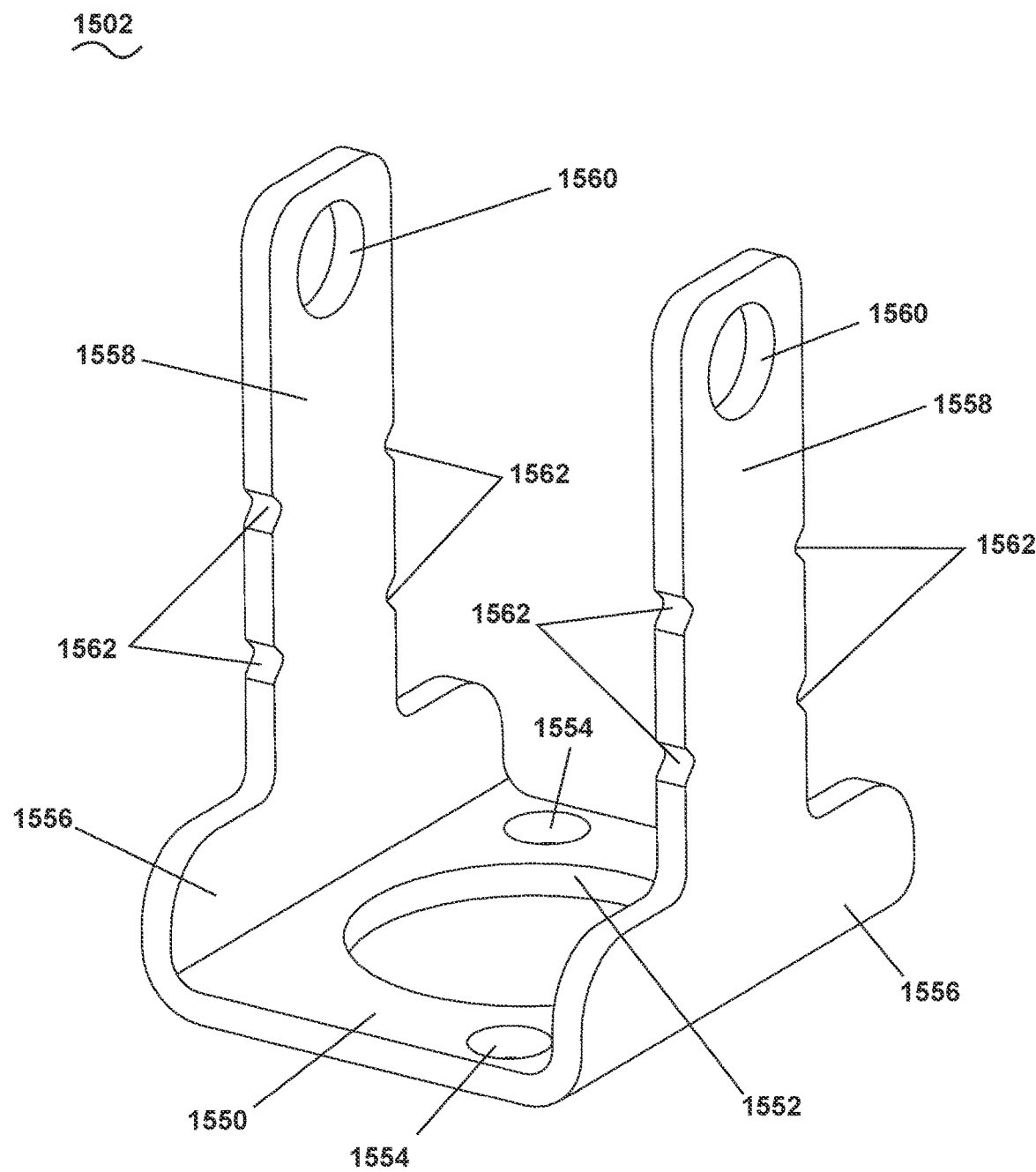
FIG. 60 is a perspective view of the cradle of FIG. 59.

Referring now to FIG. 60, the cradle 1502 can include a bottom wall 1550 having a motor shaft aperture 1552 and a set of mount holes 1554. A set of opposing sidewalls 1556 can extend from the bottom wall 1550. A set of cradle arms 1558 extends from the sidewalls 1556 opposite from the bottom wall 1550. An arm aperture 1560 can be provided in each arm 1558. A set of notches 1562 can be provided in the sides or the arms 1558, shown as two sets of notches 1562 in each arm.

The cradle 1502 can be substantially similar to the cradle 1202 of FIG. 41, with one difference being that the sidewalls 1556 of the cradle 1502 of FIG. 60 can be shorter than that of the cradle 1202 of FIG. 41, as extending a shorter distance between the bottom wall 1550 and the arms 1558. Furthermore, the motor shaft aperture 1552 can be larger than that of the cradle 1202 of FIG. 41, and can be sized to permit a portion of the base plate 1504 to extend into the motor shaft aperture 1552, described in further detail below.

Figure 61:
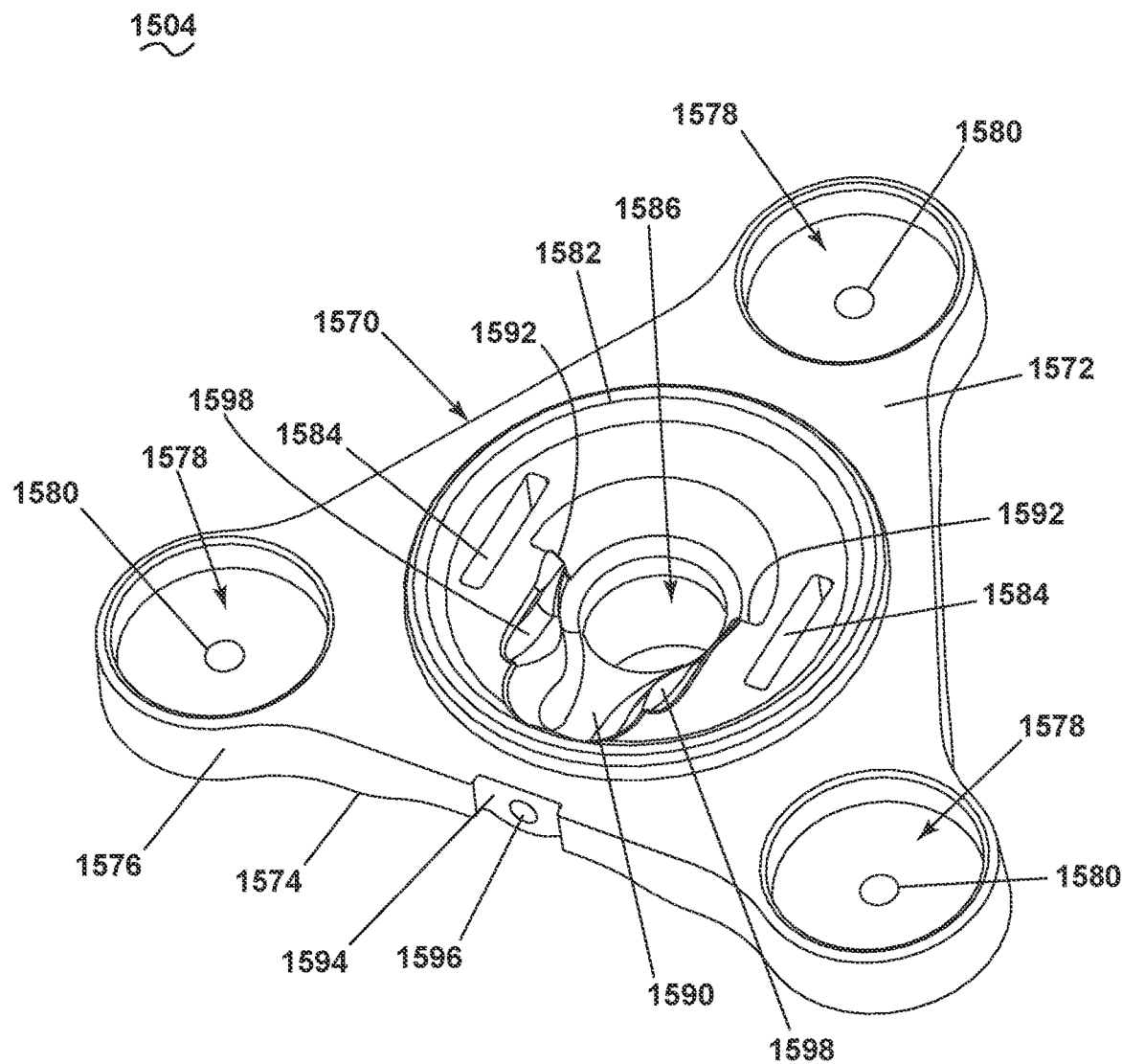
FIG. 61 is a perspective view of the base plate of FIG. 59.

Referring now to FIG. 61, the base plate 1504 can include a body 1570 including a top wall 1572 and a bottom wall 1574, with a sidewall 1576 extending between the top wall 1572 and the bottom wall 1574. A set of housing recesses 1578 are formed in the top wall 1572 and can include a set of housing apertures 1580 adapted to mount a motor housing to the base plate 1504. A circular ridge 1582 can be formed extending above the top wall 1572. A set of slots 1584 can be provided in the body 1570 radially interior of the ridge 1582.

A central aperture 1586 is provided in the body 1570 in the center of the base plate 1504 extending between the top wall 1572 and the bottom wall 1574. A relief portion 1590 is provided at the central aperture 1586, and can be substantially similar to the relief portion 1310 of FIG. 42, including a pair of abutments 1592 and a seat 1598.

A tab recess 1594 is provided in the side wall 1576. A tab aperture 1596 is provided in the tab recess 1594 for mounting the tab 1520 to the base plate 1504.

Figure 62:
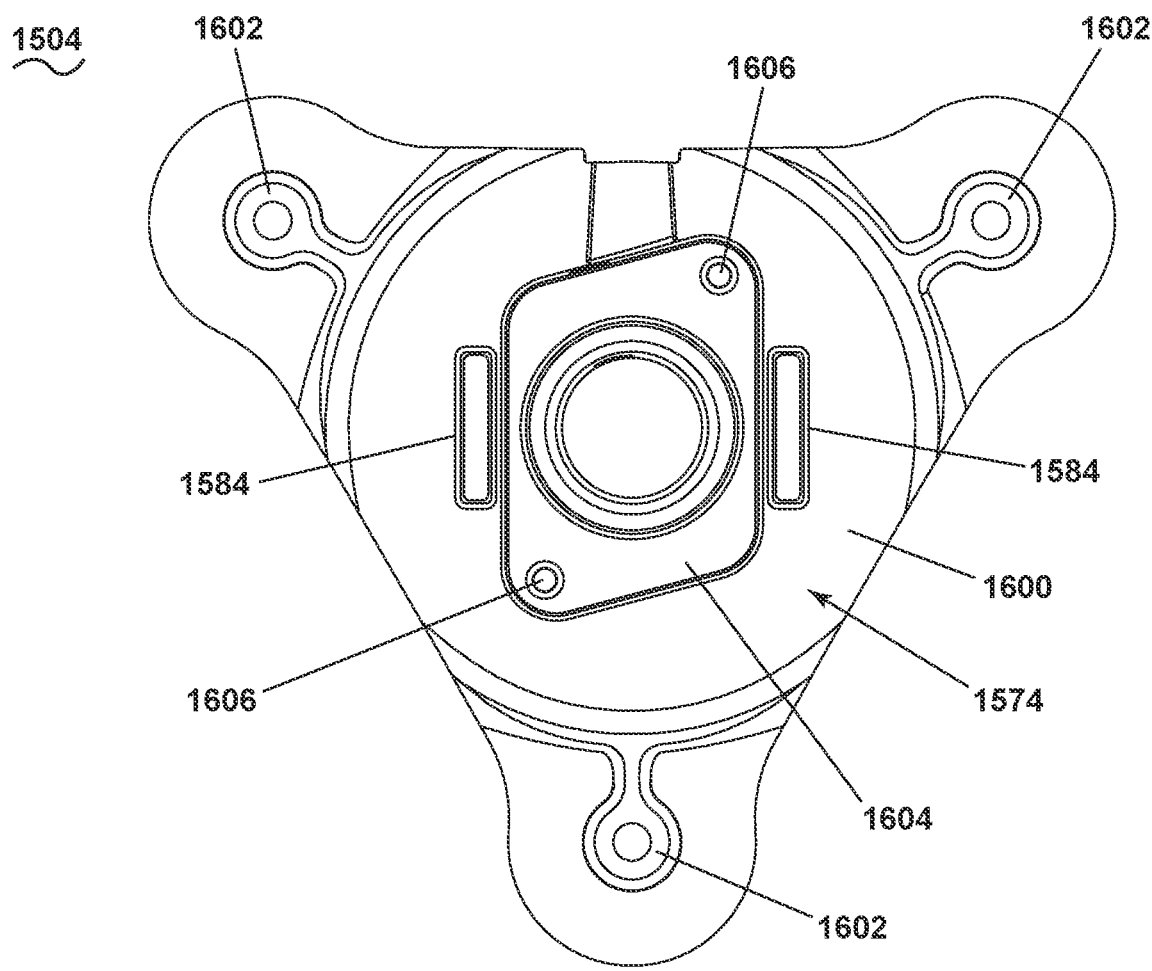
FIG. 62 is a bottom view of the base plate of FIG. 61.

Referring now to FIG. 62, the bottom wall 1574 of the base plate 1504 can include a recessed area 1600, with a set of raised portions 1602 surrounding the housing apertures 1580, providing rigidity at the housing mount. A cradle attachment portion 1604 can extend from the bottom wall 1574, having a rounded parallelogram shape, sized complementary to the cradle 1502. A pair of mount apertures 1606 can be provided in the cradle attachment portion 1604.

Figure 63:
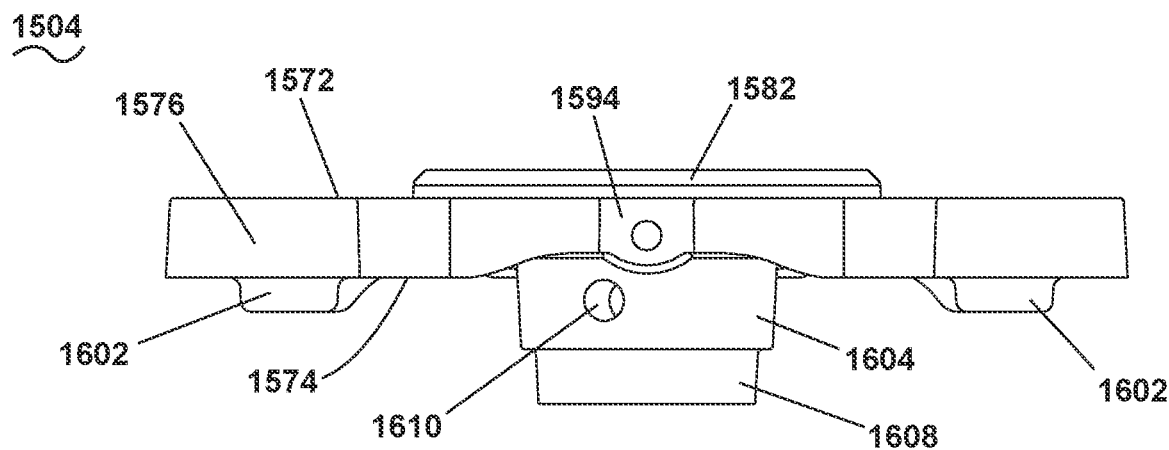
FIG. 63 is a side view of the base plate of FIG. 61.

Referring now to FIG. 63, a motor shaft attachment portion 1608 can extend from the cradle attachment portion 1604. The motor shaft attachment portion 1608 can be sized complementary to the motor shaft aperture 1552 in the cradle 1502, for example. A set screw hole 1610 can be provided in the cradle attachment portion 1604, sized to receive a set screw or other similar fastener.

Figure 64:
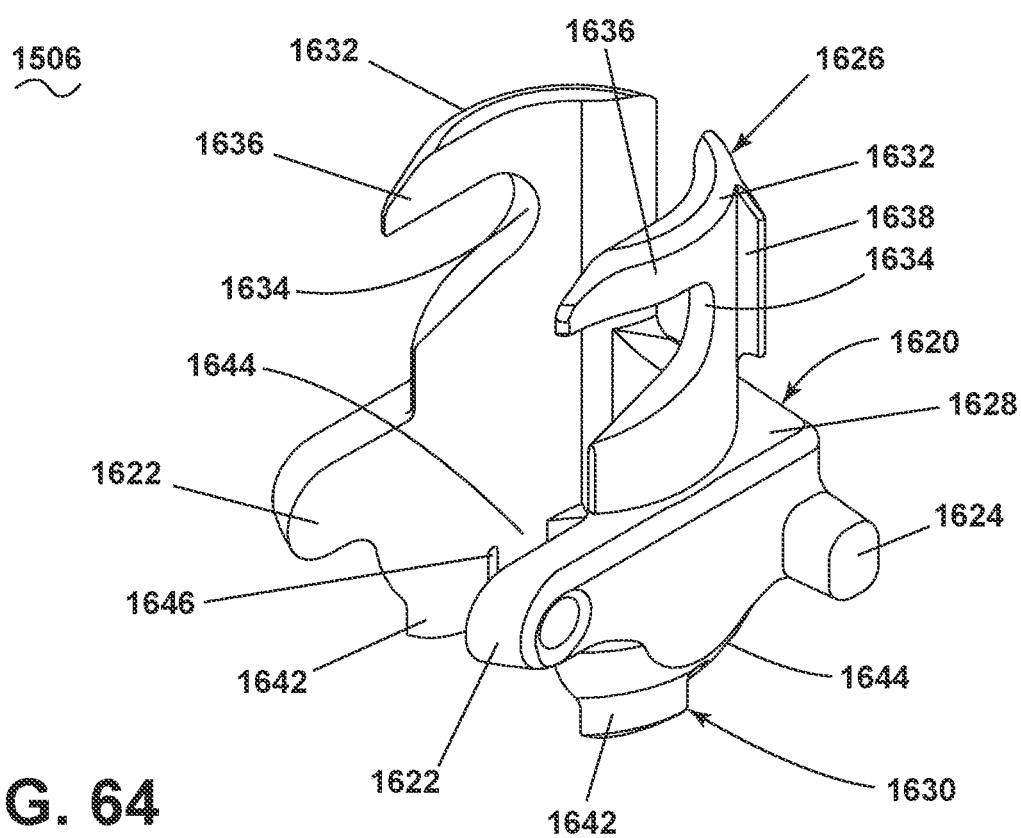
FIG. 64 is a perspective view of the pivoting joint member of FIG. 59.

Referring now to FIG. 64, the pivoting joint member 1506 can include a body 1620 including a pair of pinch tabs 1622 and a pair of arms 1624. A first portion 1626 can extend from a shoulder 1628 of the body 1620, and a second portion 1630 can extend from the body 1620 opposite of the first portion 1626. The first portion 1626 can include a pair of arcuate walls 1632. An opening 1634 can be formed in each arcuate wall 1632, forming a hook 1636. A fin 1638 can extend from each of the arcuate walls 1632.

The second portion 1630 can include a front portion 1642 and a rear portion 1644, with a slot 1646 separating the front portion 1642 and the rear portion 1644. The rear portion 1644 can be rounded, having a substantially quarter-spherical shape and sized complementary to the relief portion 1590 of the base plate 1504.

Figure 65:
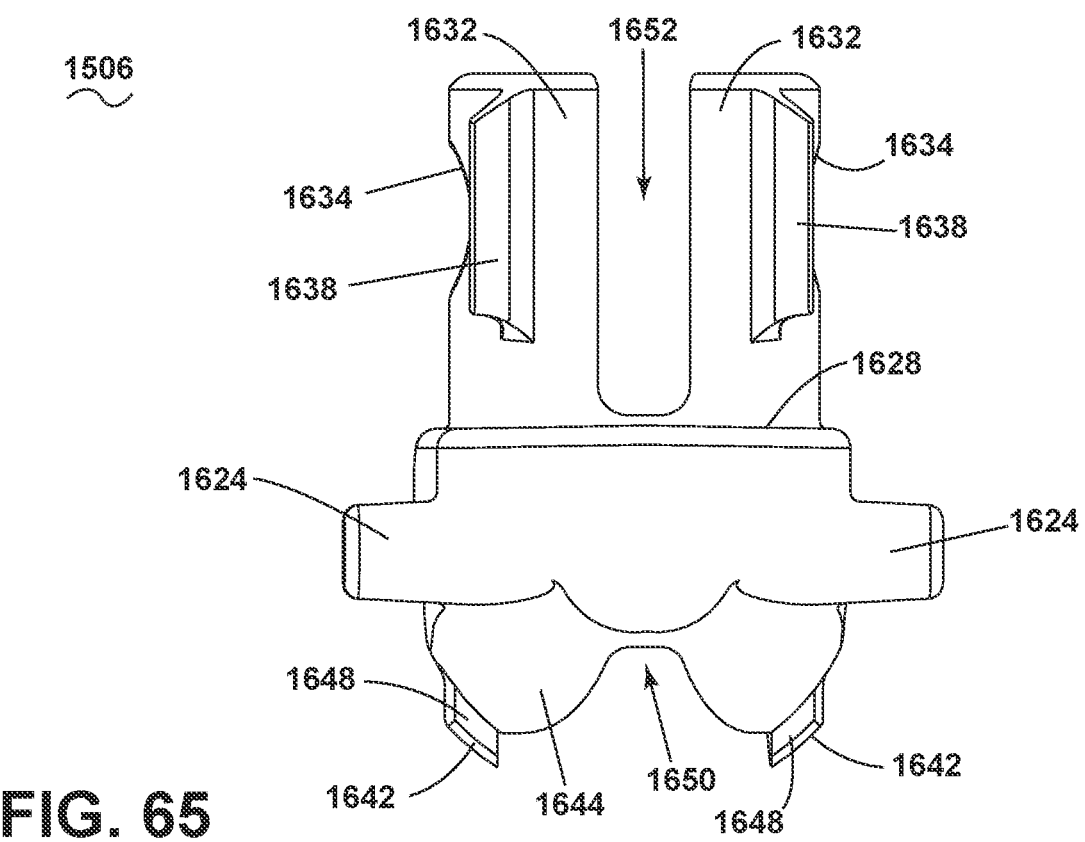
FIG. 65 is a rear view of the pivoting joint member of FIG. 64.

Referring now to FIG. 65, the front portion 1642 of the pivoting joint member 1506 can extend below the rear portion 1644, forming an abutment surface 1648. A recess 1650 is formed in the rear portion 1644. A gap 1652 is formed between the arcuate walls 1632, aligned with the recess 1650, with one fin 1638 provided on each of the arcuate walls 1632. The fins 1638 can be flexible members, suitable to compressibly secure to downrods 1514 having different diameters or sizes, while utilizing a pivoting joint member 1506 of a single size.

Figure 66:
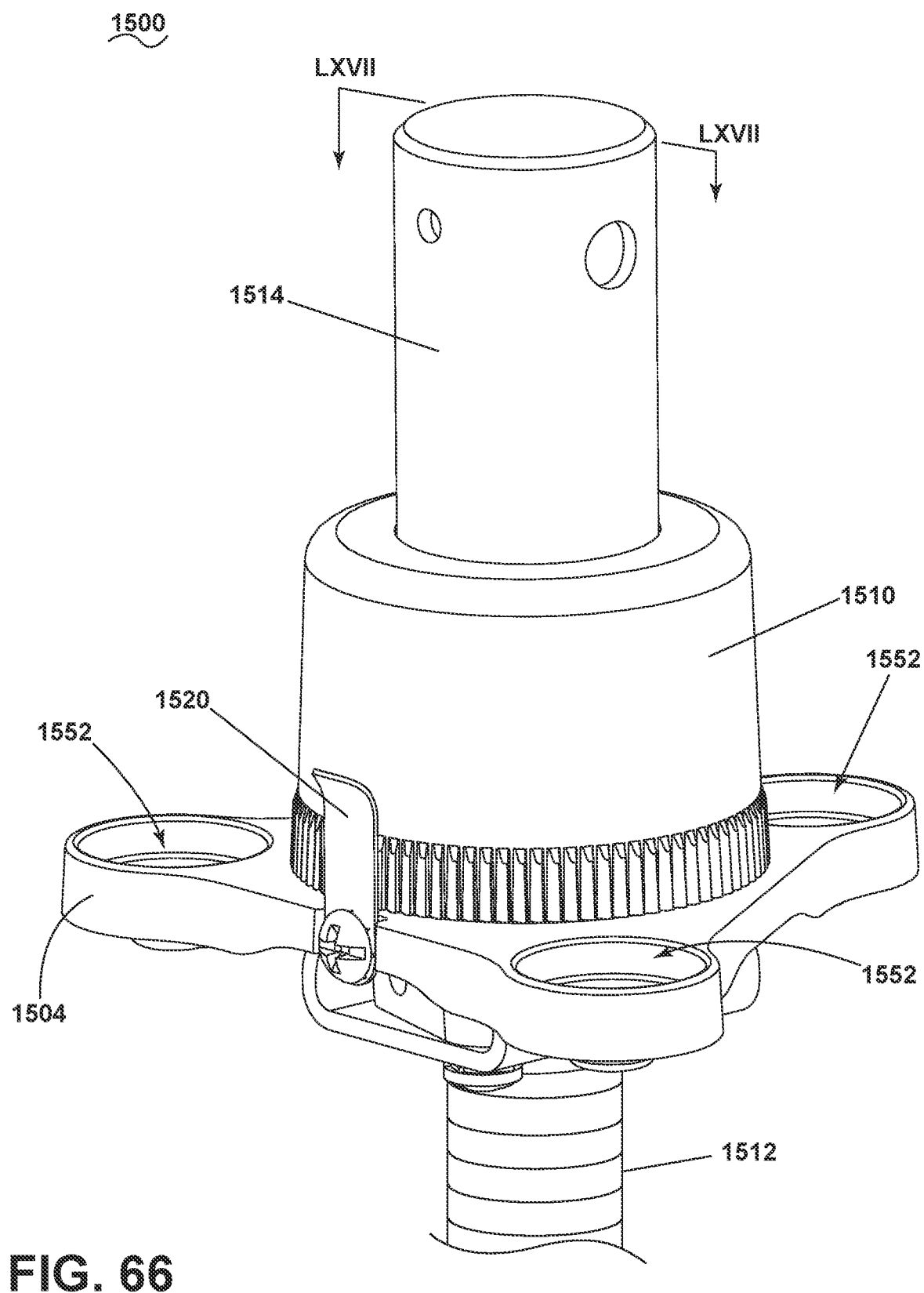
FIG. 66 is a perspective view of the completed motor adapter assembly of FIG. 59.

Referring now to FIG. 66, the motor adapter assembly 1500 is assembled in the upright position, connecting the motor shaft 1512 to the downrod 1514. The cap 1510 secures at the base plate 1504 with the tab 1520. A motor housing (not shown) can be secured to the base plate 1504 at the motor shaft apertures 1552.

Figure 67:
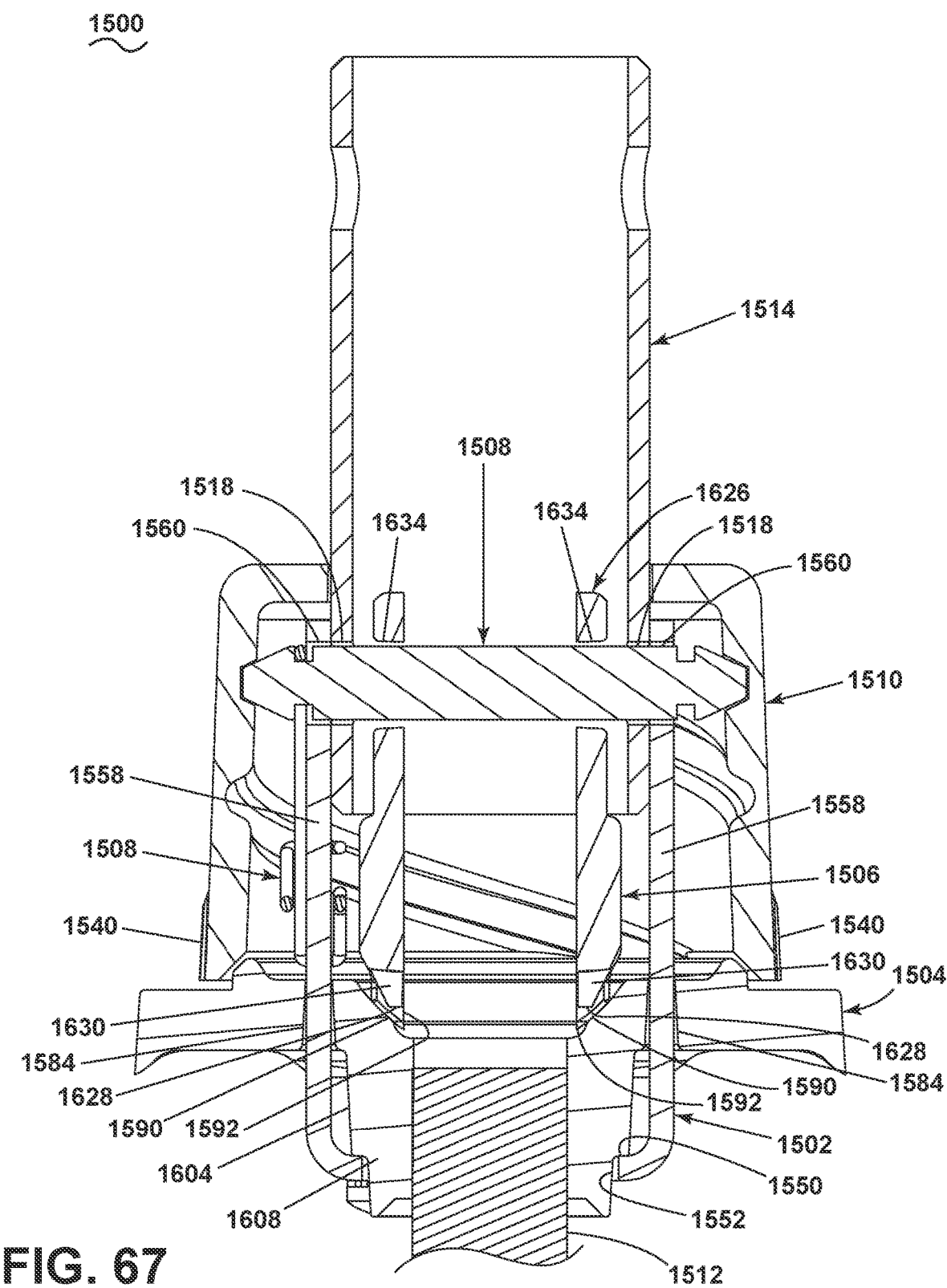
FIG. 67 is a section view of the motor adapter assembly taken across section LXVII-LXVII of FIG. 66.

Referring now to FIG. 67, taken across section LXVII-LXVII of FIG. 66, the motor shaft 1512 can extend through the motor shaft aperture 1552 in the cradle 1502 and threadably couple to the base plate 1504 at the motor shaft attachment portion 1608. The cradle 1502 can couple to the base plate 1504, having the bottom wall 1550 abutting the cradle attachment portion 1604 and the arms 1558 extending through slots 1584 in the base plate 1504. One or more fasteners can be used to secure the cradle 1502 to the base plate 1504 extending through the mount holes 1554 (see FIG. 60) in the cradle 1502 and securing in the mount apertures 1606 (see FIG. 62) in the cradle attachment portion 1604 of the base plate 1504.

The pivoting joint member 1506 can position between the arms 1558 of the cradle 1502, with the second portion 1630 of the pivoting joint member 1506 positioned in the relief portion 1590 of the base plate 1504. The downrod 1514 can position between the first portion 1626 of the pivoting joint member 1506 and the arms 1558 of the cradle 1502, aligning the mounting apertures 1518 in the downrod 1514, the arm apertures 1560 in the cradle 1502, and the openings 1634 in the pivoting joint member 1506. The pin assembly 1508 can extend through the mounting apertures 1518, the arm apertures 1560, and the openings 1634 to secure the cradle 1502, the pivoting joint member 1506, and the downrod 1514 together. The cap 1510 can thread about the pin assembly 1508, moving downward until the cap 1510 abuts the base plate 1504. The tab 1520 (see FIG. 59) can secure the cap 1510 against the base plate 1504 at the teeth 1540. With the cap 1510 secured against the base plate 1504, the motor adapter assembly 1500 is secured in the upright position, as shown. In this position, the shoulder 1628 of the second portion 1630 of the pivoting joint member 1506 abut the abutments 1592 of the relief portion 1590, similar to that as shown in FIG. 57.

Figure 68:
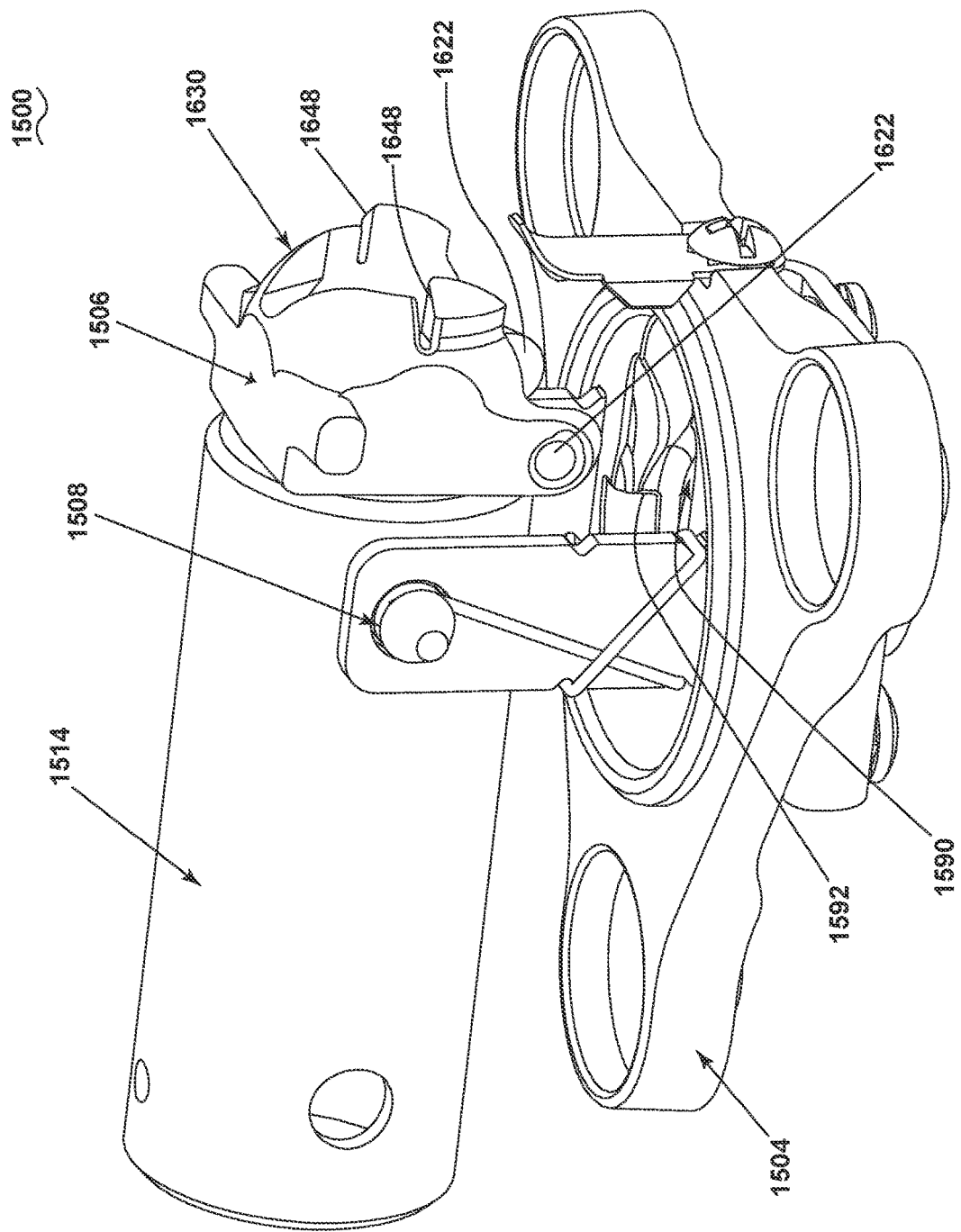
FIG. 68 is a perspective view of the motor adapter assembly of FIG. 59 in a pivoted position.

Referring now to FIG. 68, with the cap 1510 removed from the remainder of the motor adapter assembly 1500, the downrod 1514 and the pivoting joint member 1506 are permitted to rotate about the pin assembly 1508 into a pivoted position. The pinch tabs 1622 can be depressed inward on the pivoting joint member 1506 to release the abutments surface 1648 of the second portion 1630 from the abutments 1592 of the relief portion 1590 of the base plate 1504. In the pivoted position, the motor adapter assembly 1500 occupies less space, and is more compact for packaging, shipping, display, or storage.

The motor adapter assembly 1500 as described in FIGS. 59-68 provides for a pivoting motor adapter assembly 1500 which permits pivoting movement of the downrod 1514 into a pivoted position. The pivoted position reduces required space for storage, but permits ease of installation. A user can remove the motor adapter assembly 1500 from a package, and easily rotate the downrod 1514 about the pin assembly 1508 into the upright position, where it can releasably lock into position with the abutments 1592 against the abutment surface 1648, and with the arms 1624 of the pivoting joint member 1506 positioned against the arms 1558 of the cradle 1502. Such a position is maintained upright, permitting ease of installation. Additionally, the pin assembly 1508 among the downrod 1514, the pivoting joint member 1506, and the cradle 1502 secures the assembly 1500 together, while permitting rotation of the downrod into the pivoted position.

Figure 69:
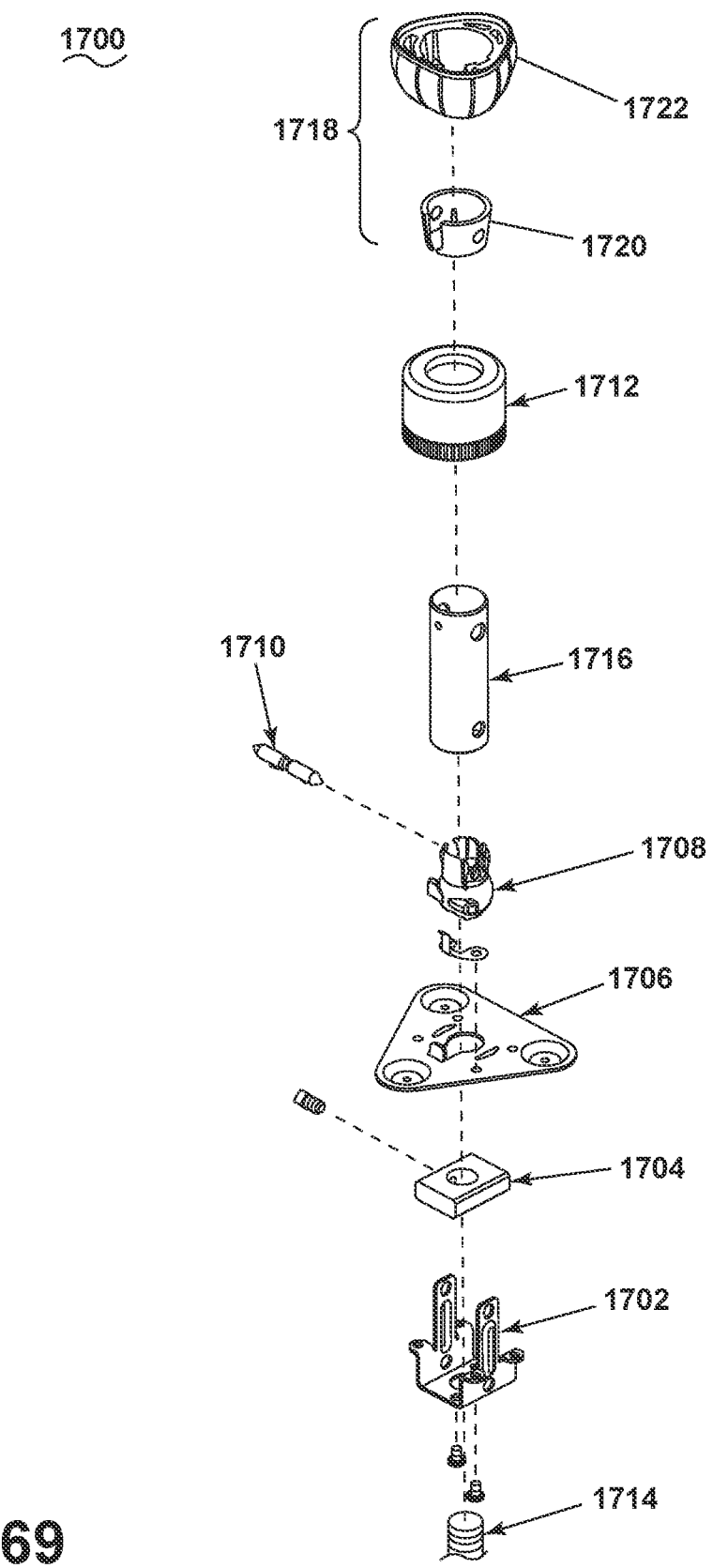
FIG. 69 is an exploded view of a motor adapter assembly.

Referring now to FIG. 69, another exemplary motor adapter assembly 1700 can include a cradle 1702, a threaded nut 1704, a base plate 1706, a pivoting joint member 1708, a pin assembly 1710, and a cap 1712. The motor adapter assembly 1700 can provide for coupling a motor shaft 1714 to a downrod 1716. A mount assembly 1718 can include a downrod mount 1720 and a trilobe ball 1722 for suspending the downrod 1716 from a structure, such as with a hanger bracket (not shown).

Figure 70:
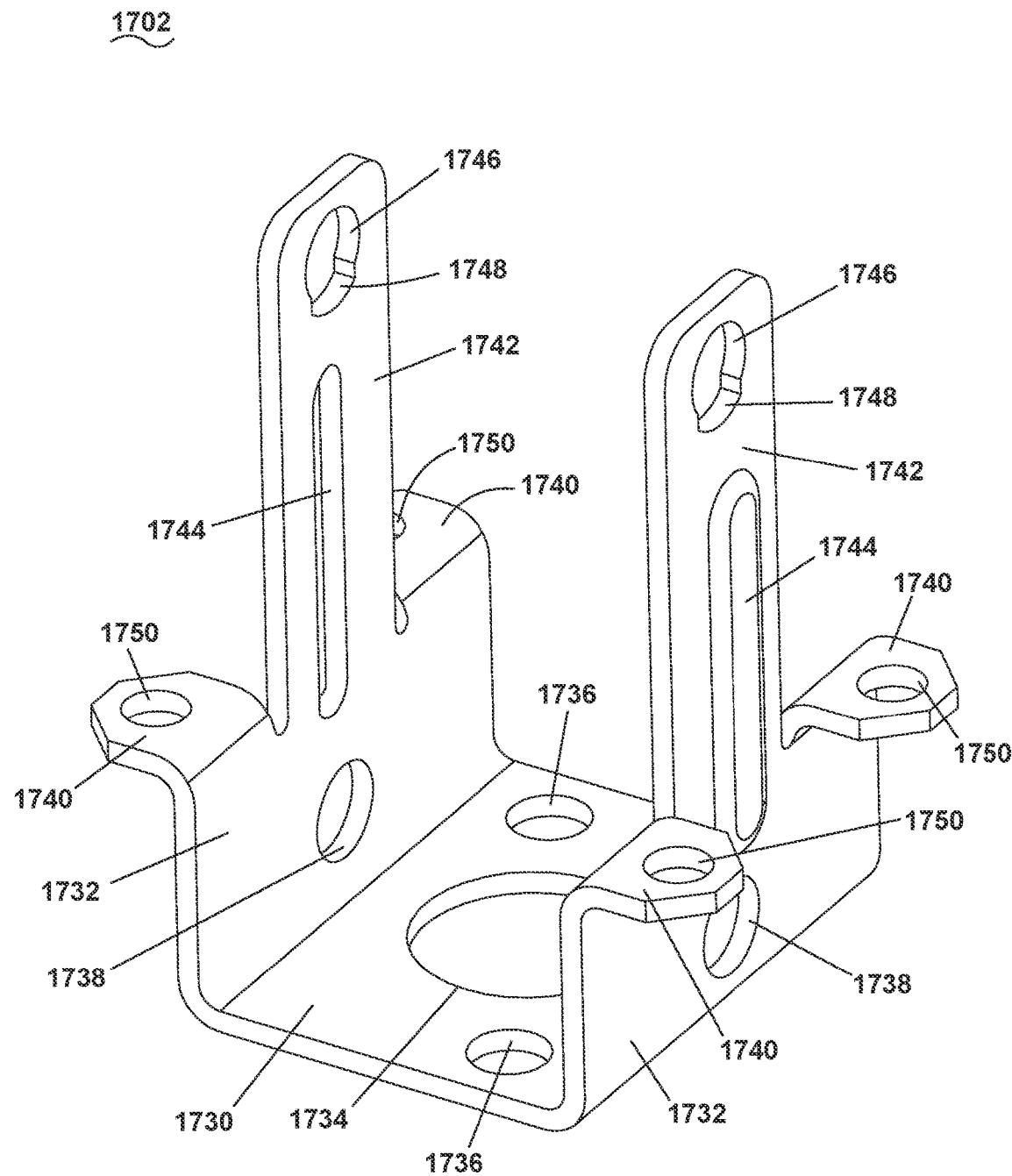
FIG. 70 is a perspective view of a cradle of the motor adapter assembly of FIG. 69.

Referring now to FIG. 70, the cradle 1702 can include a bottom wall 1730, with two opposing sidewalls 1732 extending orthogonal from the bottom wall 1730. A motor shaft aperture 1734 is provided in the bottom wall 1730, with two fastener apertures 1736. A motor shaft fastener aperture 1738 is provided in each sidewall 1732. A pair of mount tabs 1740 extend orthogonal from each sidewall 1732, positioned on either side of a cradle arm 1742 extending coplanar with the sidewalls 1732. A tab aperture 1750 is provided in each tab 1740. A rib 1744 is formed in each cradle arm 1742, with the rib 1744 formed as a portion of the cradle arm 1742 extending outwardly from the cradle arm 1742 in the same direction as the mount tabs 1740. An arm aperture 1746 is formed in each cradle arm 1742, including a recessed portion 1748. The arm apertures 1746 can be substantially circular, with the recessed portion 1748 having an increased diameter as compared to the remainder of the arm apertures 1746. The arm apertures 1746 can be a keyed aperture, or form keyway, permitting insertion in a particular orientation based upon the recessed portion 1748.

Figure 71:
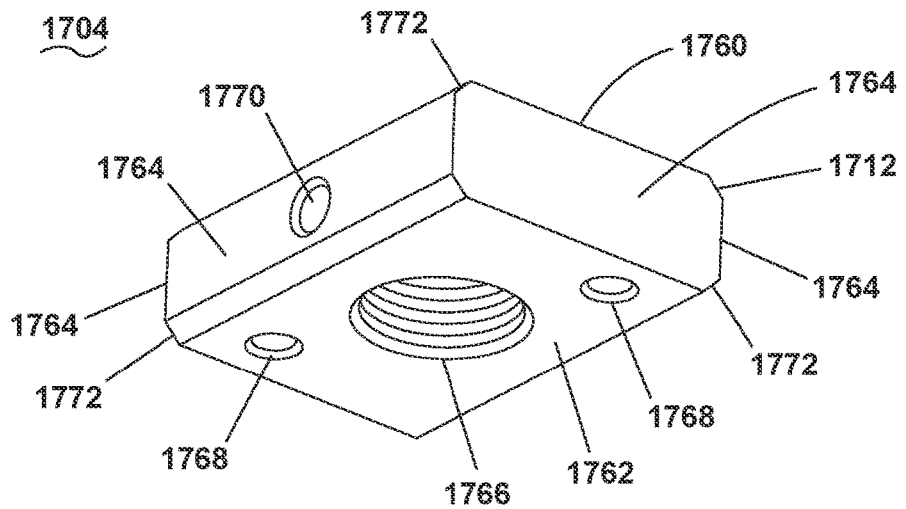
FIG. 71 is a bottom perspective view of a retainer nut of the motor adapter assembly of FIG. 69.

Referring now to FIG. 71, the threaded nut 1704 can be substantially cubic, having a top wall 1760, a bottom wall 1762, and four sidewalls 1764. A threaded shaft aperture 1766 can be provided in the threaded nut 1704, extending between the top wall 1760 and the bottom wall 1762. A set of fastener apertures 1768 can be provided in the bottom wall 1762, terminating prior to the top wall 1760. A shaft fastener aperture 1770 can be provided in one sidewall 1764 extending into the shaft aperture 1766. A set of bevelled edges 1772 can be formed at the junction between two of the sidewalls 1764 and the top and bottom walls 1760, 1762.

Figure 72:
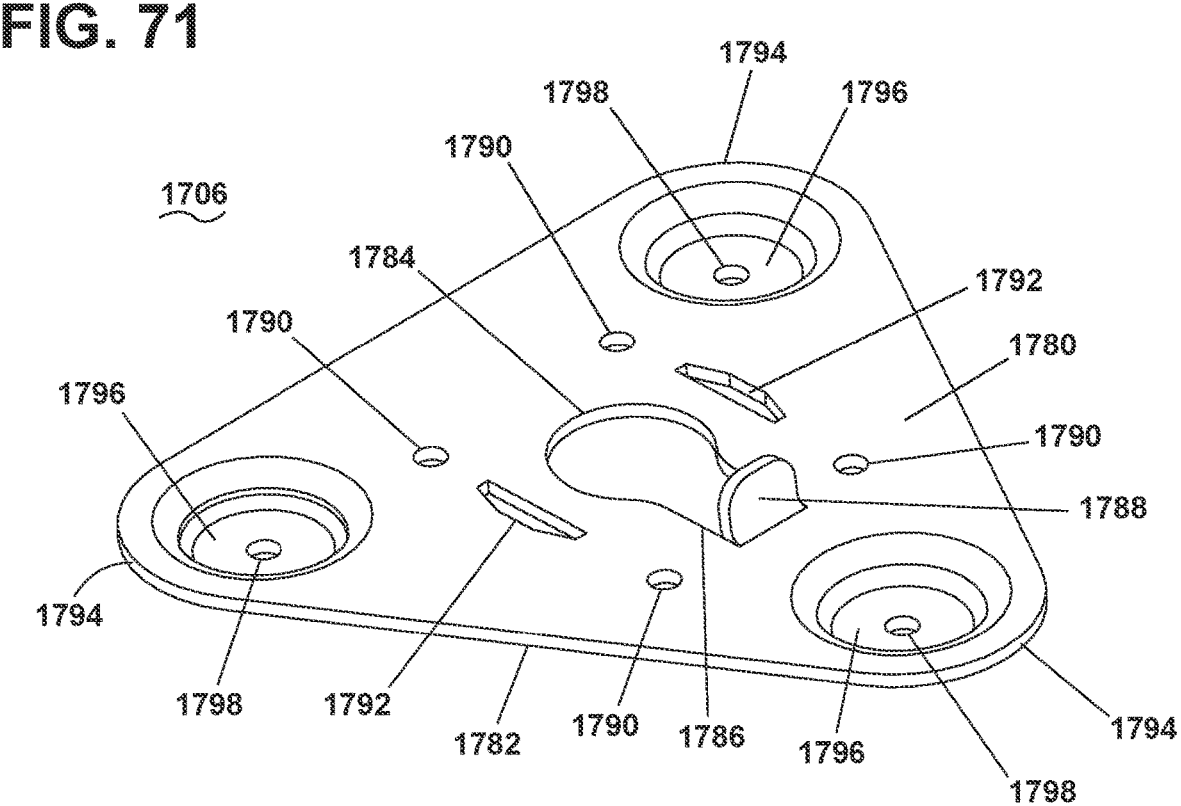
FIG. 72 is a perspective view of a base plate of the motor adapter assembly of FIG. 69.

Referring now to FIG. 72, the base plate 1706 includes a top wall 1780 and a bottom wall 1782. A central aperture 1784 is formed in the base plate 1706 and includes a lead-in portion 1786. A support tab 1788 is formed at the end of the lead-in portion 1786, extending above the top wall 1780. Four mount holes 1790 are provided in the base plate 1706 extending between the top wall 1780 and the bottom wall 1782. A pair of slots 1792 are provided in the base plate 1706 on opposing sides of the central aperture 1784. The slots 1792 can have a trapezoidal shape, while any suitable shape is contemplated.

The base plate 1706 can be a rounded-triangular shape, having three rounded corners 1794. A recessed portion 1796 can be provided near each corner 1794, including a mount aperture 1798 configured to mount to a motor housing for a ceiling fan.

Figure 73:
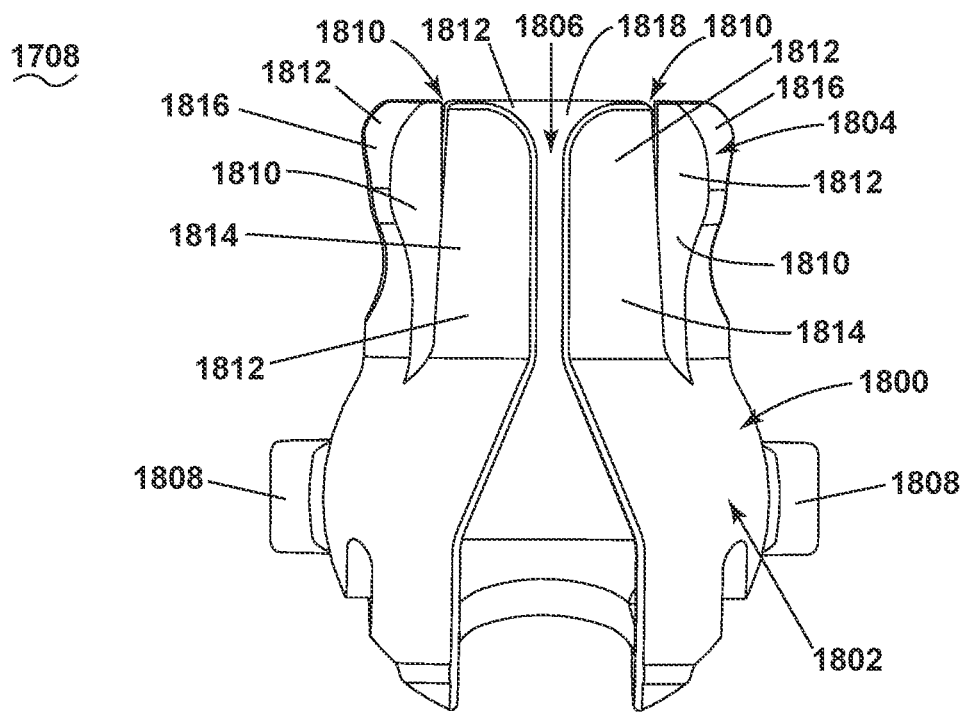
FIG. 73 is a rear view of a pivoting joint member for the motor adapter assembly of FIG. 69.

Referring now to FIG. 73, the pivoting joint member 1708 includes a body 1800 having a ball portion 1802 and an upper portion 1804. A gap 1806 extends along the body 1800 through both the ball portion 1802 and the upper portion 1804 and can widen at the ball portion 1802. A pair of ears 1808 extends from the ball portion 1802. A set of four upper slots 1810, in addition to the gap 1806, separates the upper portion 1804 into five sections 1812, with the sections 1812 separated by the slots 1810 or the gap 1806. The five sections 1812 can include two gap sections 1814, two pin sections 1816, and a rear section 1818. The gap sections 1814 are provided adjacent the gap 1806. The two pin sections 1816 are provided on opposing sides of the pivoting joint member 1708. The rear section 1818 is provided between the pin sections 1816, above the ears 1808.

Figure 74:
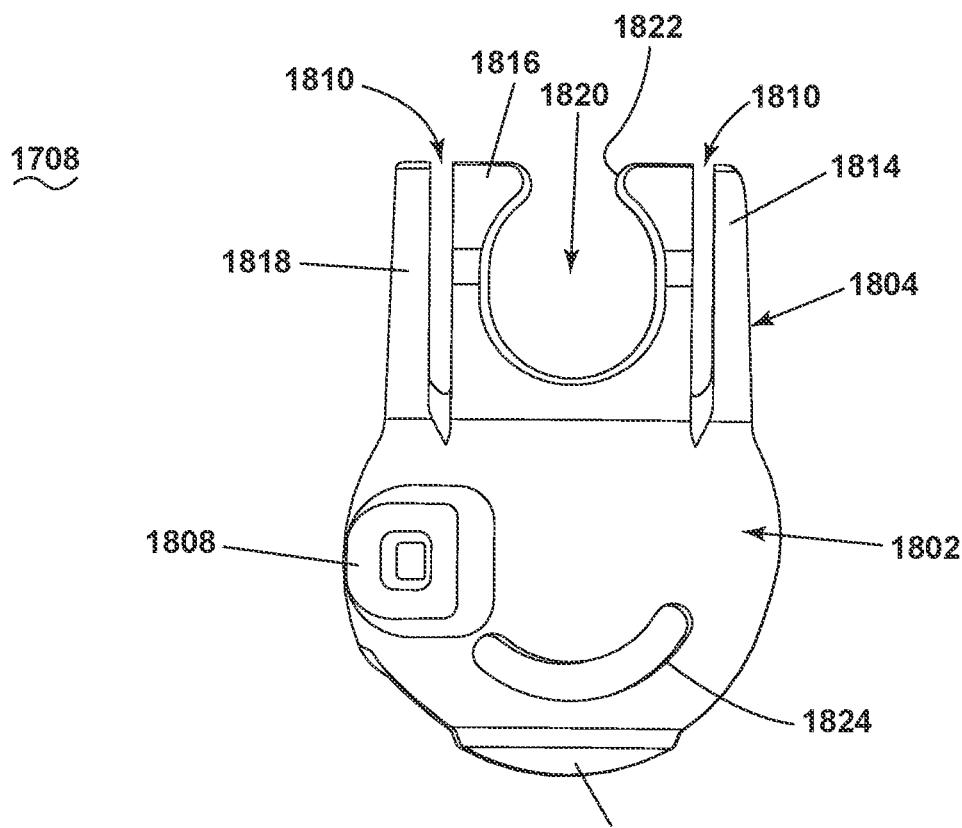
FIG. 74 is a side view of the pivoting joint member of FIG. 73.

Referring now to FIG. 74, a pair of pin apertures 1820 are provided in each of the pin sections 1816. The pin apertures 1820 include a top opening 1822, and are not wholly enclosed within the pin sections 1816. A pair of crescent slots 1824 are provided in the ball portion 1802. A raised area 1826 is also provided in the ball portion 1802, extending from the rest of the surface of the ball portion 1802 in a direction opposite of the upper portion 1804.

Figure 75:
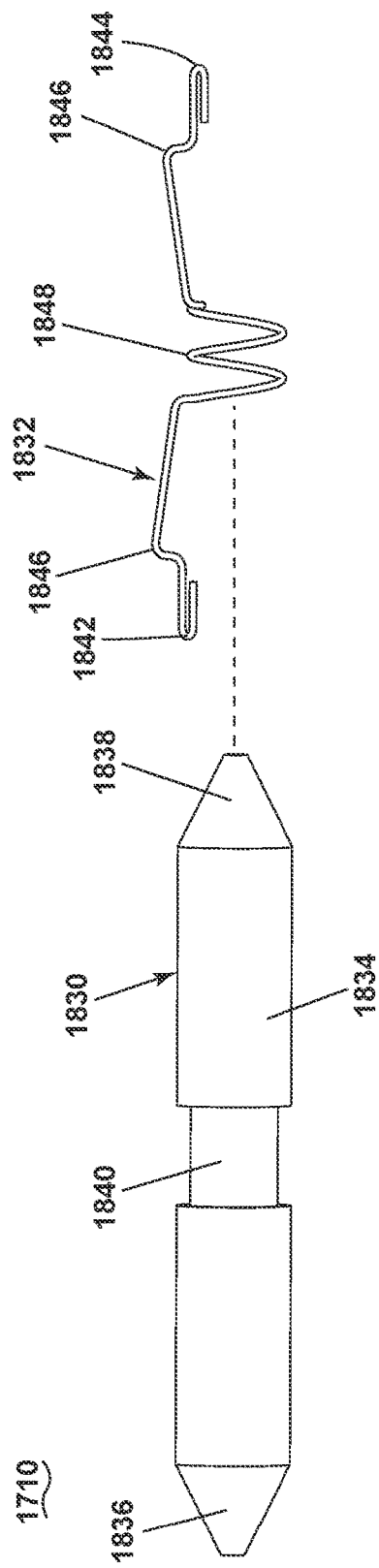
FIG. 75 is an exploded view of a pin assembly of FIG. 69.

Referring now to FIG. 75, the pin assembly 1710 includes a pin 1830 and a biasing element shown as a spring 1832. The pin 1830 includes a substantially cylindrical body 1834 extending between a first end 1836 and a second end 1838. The first and second ends 1836, 1838 can have a conic shape or a truncated conic shape. A recessed portion 1840 is formed in the body 1834 centrally between the first and second ends 1836, 1838. The recessed portion 1840 can have a diameter that is lesser than the remainder of the body 1834.

The spring 1832 can include a first end 1842 and a second end 1844. A raised portion 1846 is formed near each end 1842, 1844. A coil 1848 is formed at center of the spring 1832. The coil 1848 can have a diameter complementary to the diameter of the recessed portion 1840 of the pin 1830.

Figure 76:
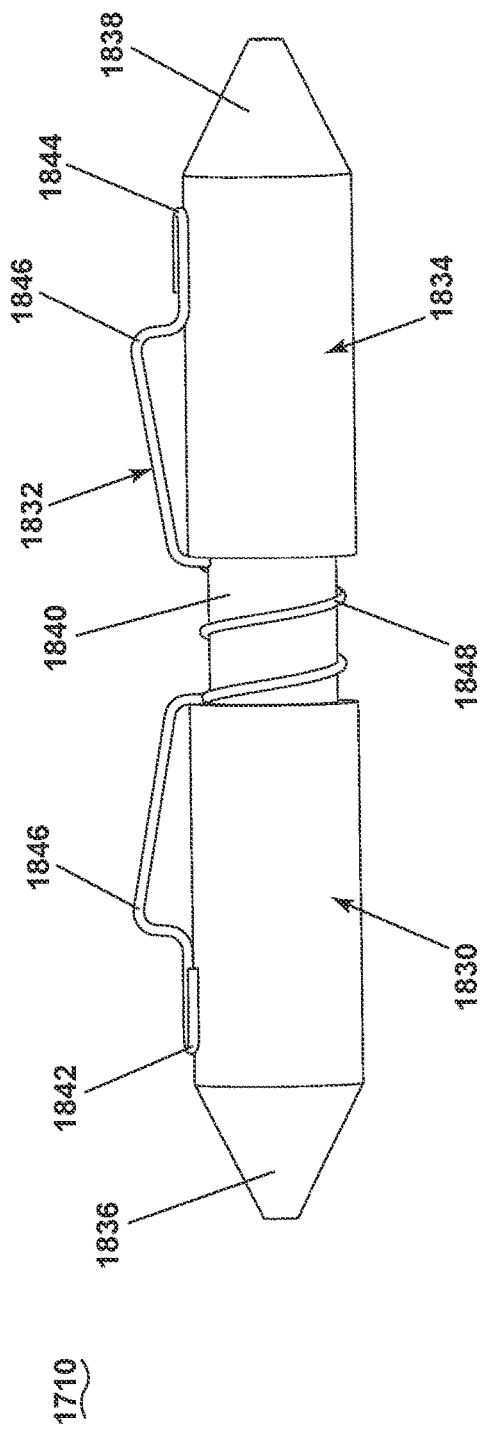
FIG. 76 is a completed view of the exploded view of the pin assembly of FIG. 75.

Referring now to FIG. 76, the pin assembly 1710 is completed, having the spring 1832 arranged on the pin 1830. The coil 1848 can position at the recessed portion 1840 of the body 1834, with the first and second ends 1842, 1844 of the spring 1832 abutting the body 1834 of the pin 1830. The raised portions 1846 of the spring 1832 extend away from the body 1834 of the pin 1830, and can be depressible toward the body 1834 to actuate the first and second ends 1842, 1844 slidably along the body 1834 toward the first and second ends 1836, 1838.

Figure 77:
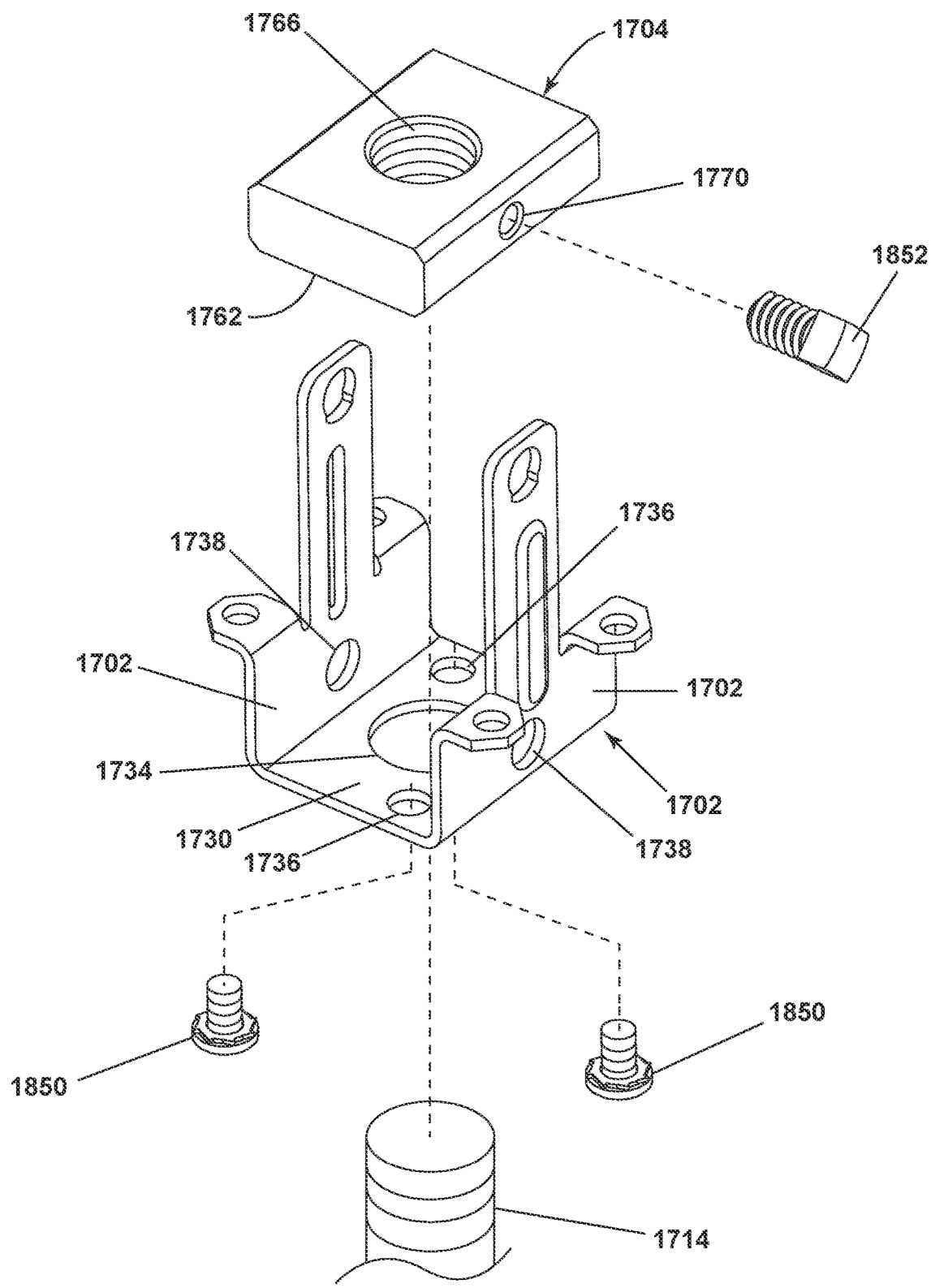
FIG. 77 is an exploded view of a portion of the motor adapter assembly of FIG. 69 illustration one step on an assembly sequence.

FIGS. 77-84 show an assembly sequence for the motor adapter assembly 1700. Referring now to FIG. 77, the motor shaft 1714 can extend through the motor shaft aperture 1734 in the bottom wall 1730 of the cradle 1702. The motor shaft 1714 can thread into the shaft aperture 1766 in the threaded nut 1704. The threaded nut 1704 can seat within the cradle 1702, with the bottom wall 1762 of the threaded nut 1704 abutting the bottom wall 1730 of the cradle 1702. One or more fasteners 1850 can secure the threaded nut 1704 to the cradle 1702, passing through the fastener apertures 1736 in the cradle 1702 and threading into the fastener apertures 1768 in the threaded nut 1704. A fastener, such as a set screw 1852 can pass through the motor shaft fastener aperture 1738 in the cradle 1702 and the shaft fastener aperture 1770 in the threaded nut 1704 to secure the motor shaft 1714 within the threaded nut 1704, while preventing rotation of the motor shaft 1714 relative to the threaded nut 1704. Additionally, rotation of the threaded nut 1704 relative to the cradle 1702 is prevented by the sidewalls 1732 of the cradle 1702.

Figure 78:
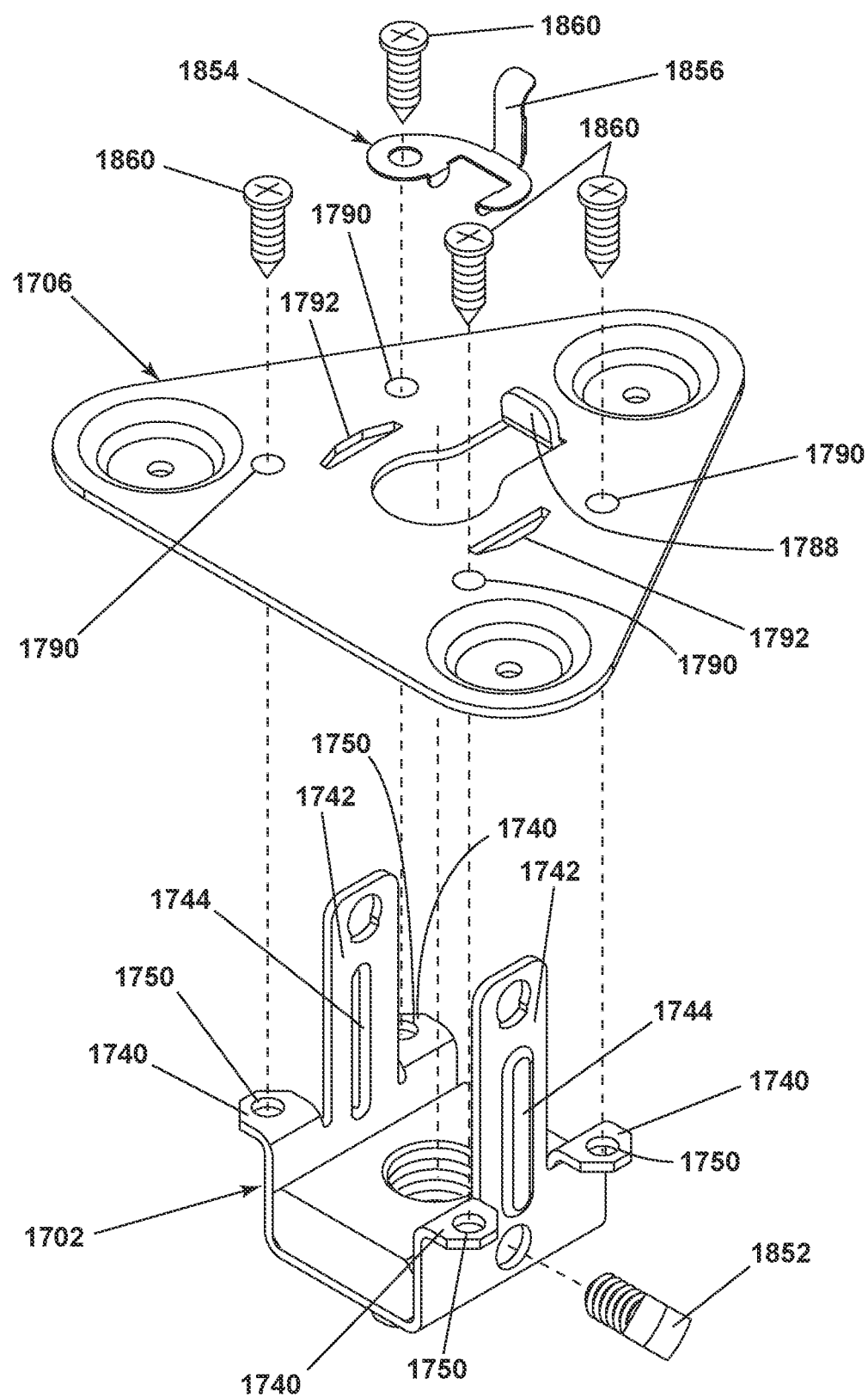
FIG. 78 is an exploded view for the assembly sequence of the motor adapter assembly following FIG. 77.

Referring to FIG. 78, continuing the assembly sequence from FIG. 77, the base plate 1706 can couple to the cradle 1702, inserting the arms 1742 of the cradle 1702 through the slots 1792 of the base plate 1706. The trapezoidal shape of the slots 1792 is sized to receive the ribs 1744 on the arms 1742. One or more fasteners 1860 can insert through the mount holes 1790 in the base plate 1706 and into the tab apertures 1750 on the tabs 1740 to fasten the base plate 1706 to the cradle 1702. A tab member 1854 can fasten to the base plate 1706 at one of the mount holes 1790, with a tab 1856 extending upwardly from the base plate 1706 and spaced from the support tab 1788.

Figure 79:
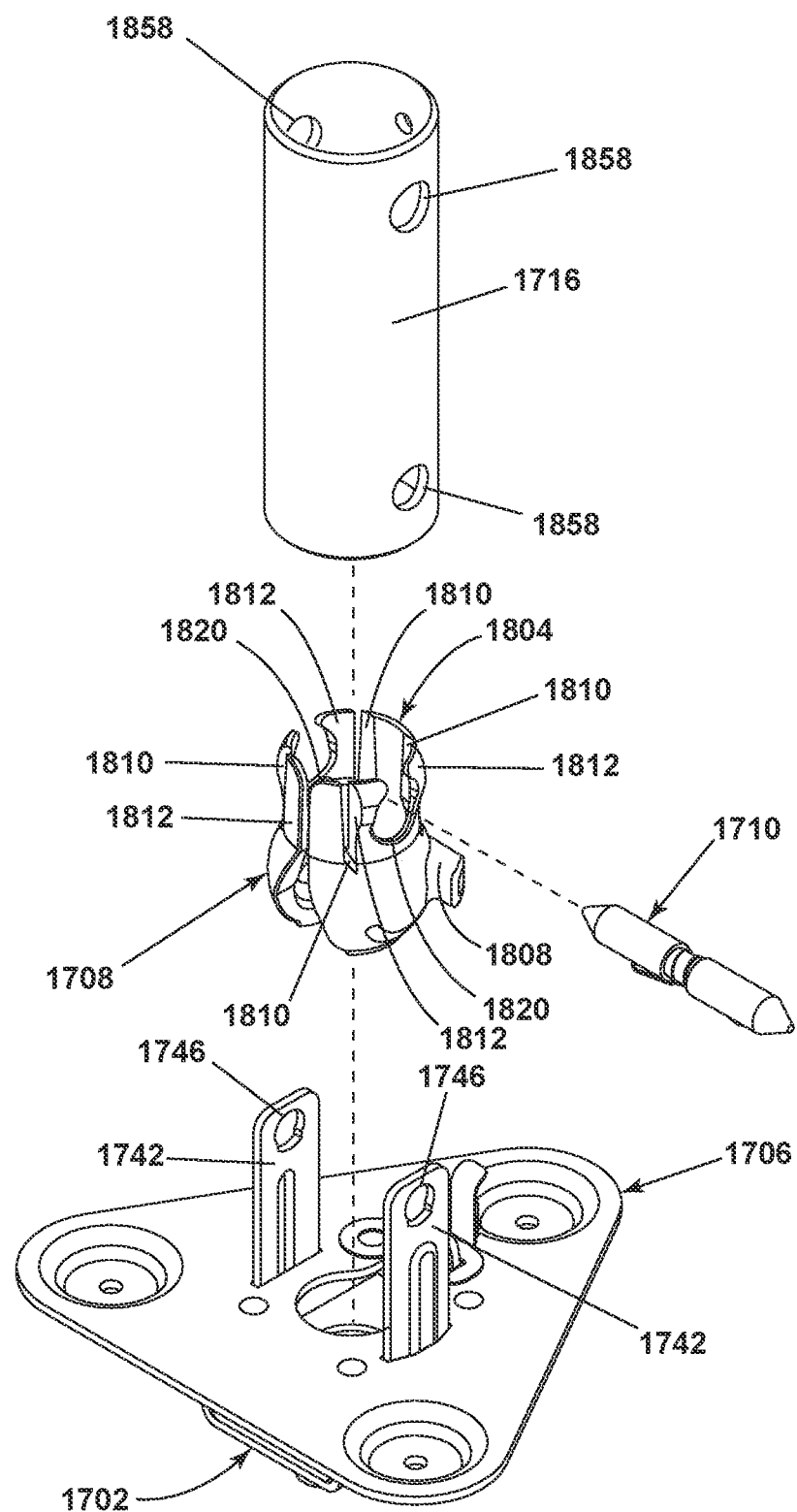
FIG. 79 an exploded view for the assembly sequence of the motor adapter assembly following FIG. 78.

Referring now to FIG. 79, continuing the assembly sequence from FIG. 78, the pivoting joint member 1708 and the downrod 1716 can position within the arms 1742 of the cradle 1702, aligning the arm apertures 1746 of the cradle 1702, the pin apertures 1820 in the pivoting joint member 1708, and apertures 1858 in the downrod 1716. The ears 1808 of the pivoting joint member 1708 can abut the arms 1742 of the cradle 1702. The slots 1810 defining the sections 1812 for the upper portion 1804 of the pivoting joint member 1708 can be compressed, accommodating downrods 1716 having different diameters. The pin assembly 1710 can insert through the arm apertures 1746, the pin apertures 1820, and the apertures 1858 to secure the cradle 1702, the pivoting joint member 1708, and the downrod 1716 together.

Figure 80:
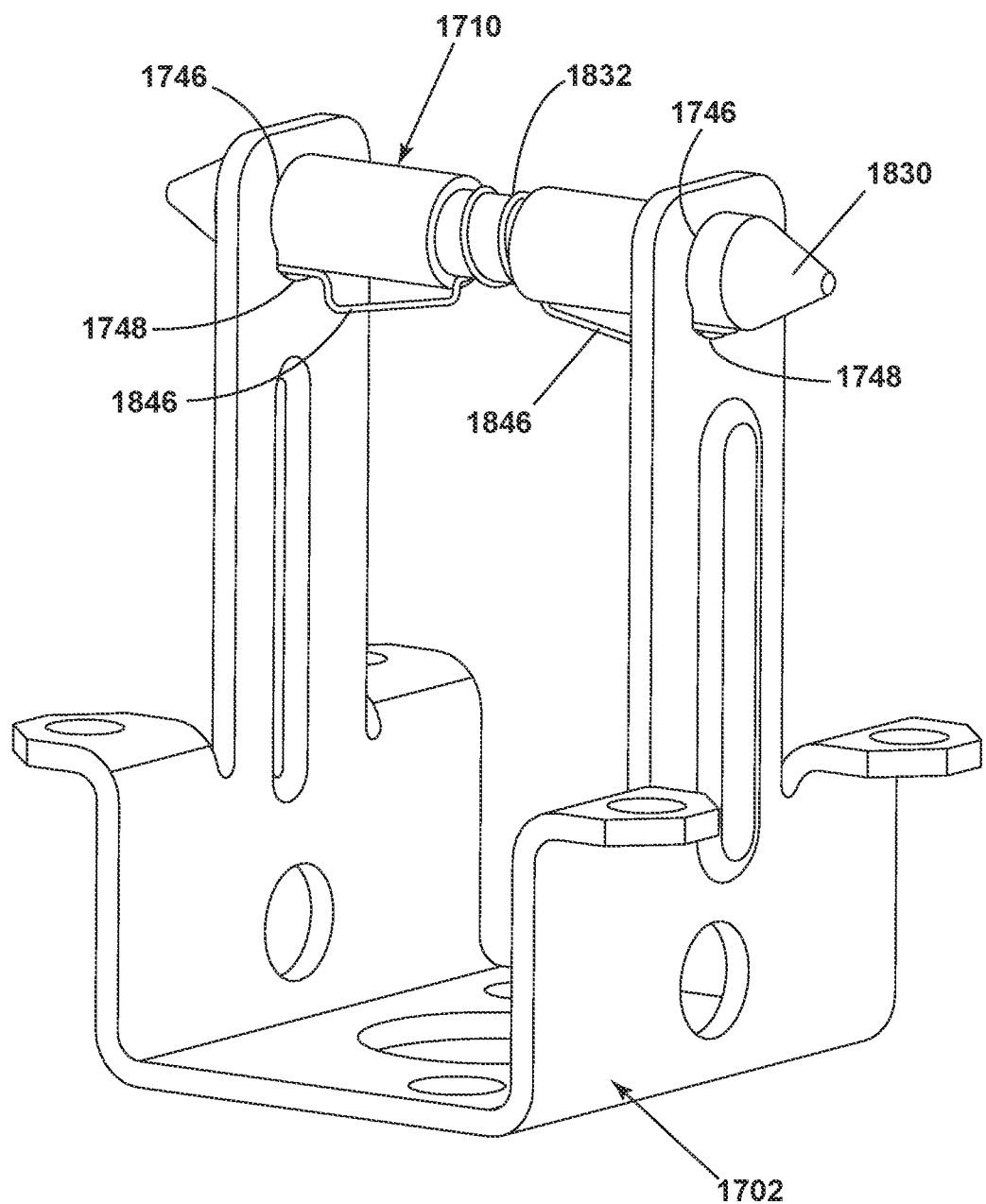
FIG. 80 is a perspective view of the pin assembly of FIG. 75 coupled to the cradle of FIG. 70.

Referring now to FIG. 80, better illustrating the pin assembly 1710 of FIG. 79, the raised portion 1846 of the spring 1832 can be depressible during insertion of the pin assembly 1710 into the arm apertures 1746 of the cradle 1702, keyed to the recessed portion 1748 of the arm apertures 1746. In such a manner, the spring 1832 prevents the pin 1830 from sliding out of the cradle 1702 without a user depressing the raised portions 1846 to permit the spring 1832 to slide through the arm apertures 1746.

Figure 81:
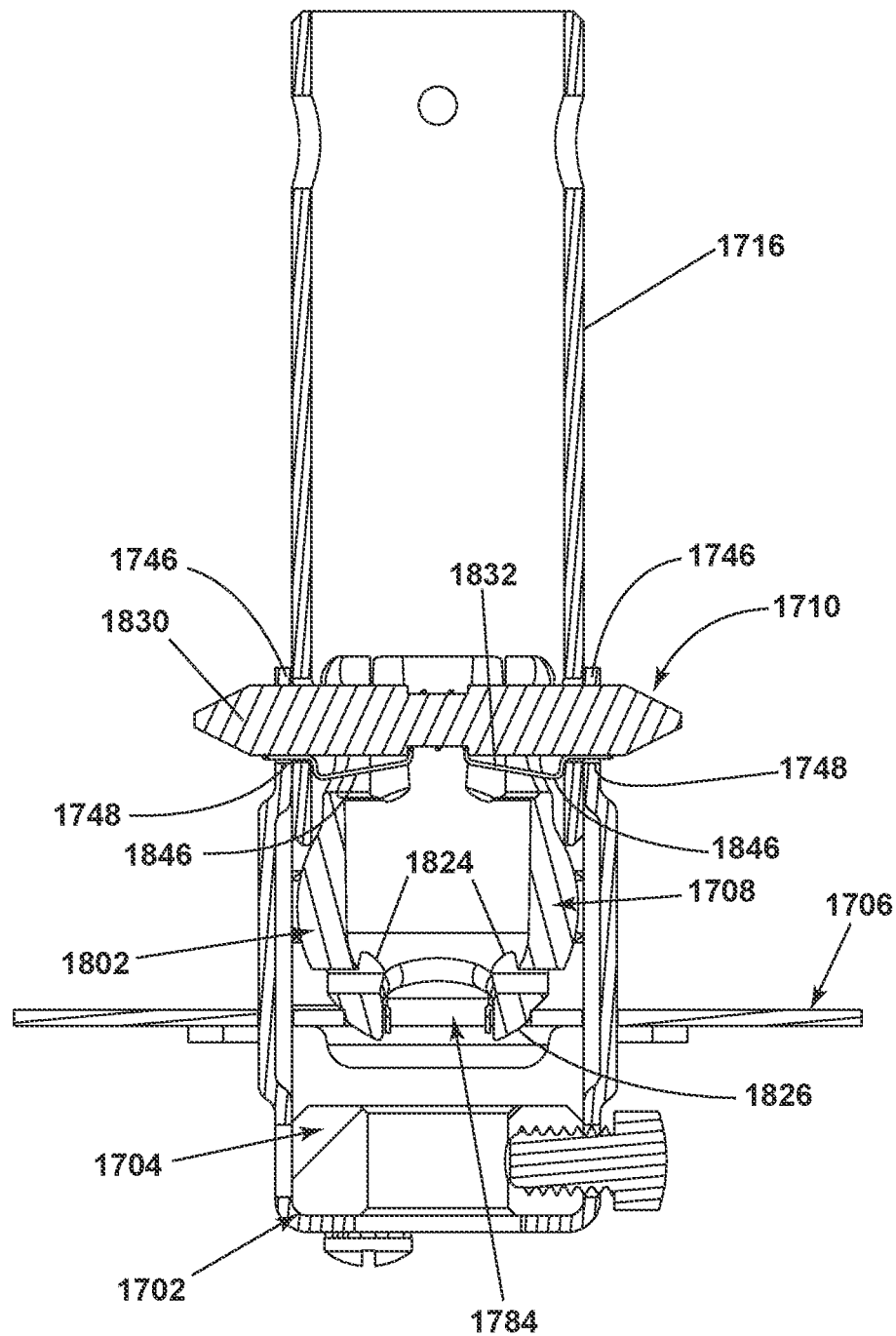
FIG. 81 is a section view of the motor adapter assembly of the completed motor adapter assembly of FIG. 79, showing a portion of the pivoting joint member seated in the base plate.

Referring now to FIG. 81, a cross sectional view of the completed assembly of FIG. 79 better shows the raised area 1826 of the ball portion 1802 of the pivoting joint member 1708 seated in the central aperture 1784 of the base plate 1706. The crescent slots 1824 can provide for compression of the pivoting joint member 1708 toward the base plate 1706, with the raised area 1826 resisting rotation of the pivoting joint member 1708 about the pin assembly 1710 within the central aperture 1784.

Figure 82:
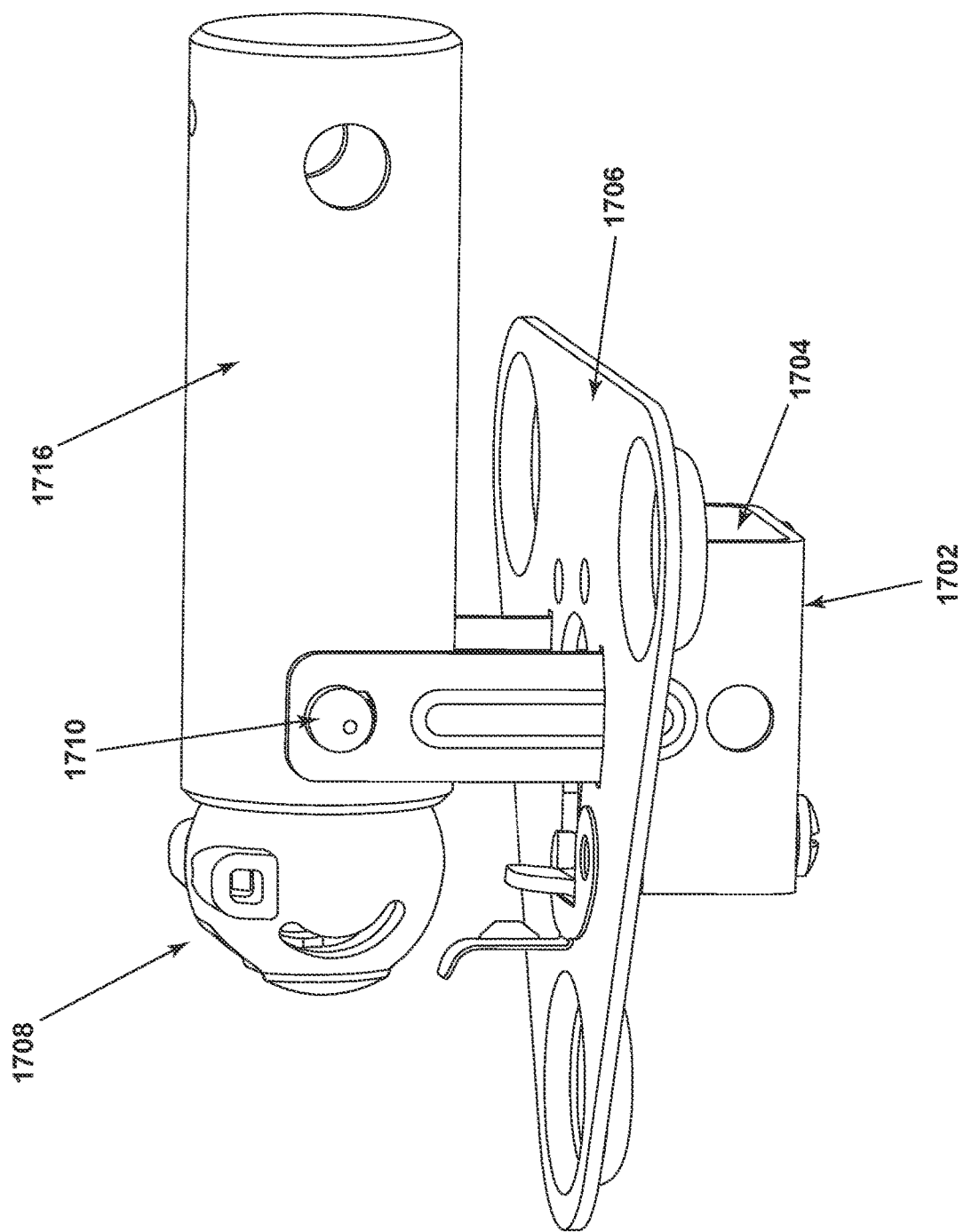
FIG. 82 is a view of the completed motor adapter assembly of FIG. 69 with a downrod and the pivoting joint member in the pivoted position.
Figure 83:
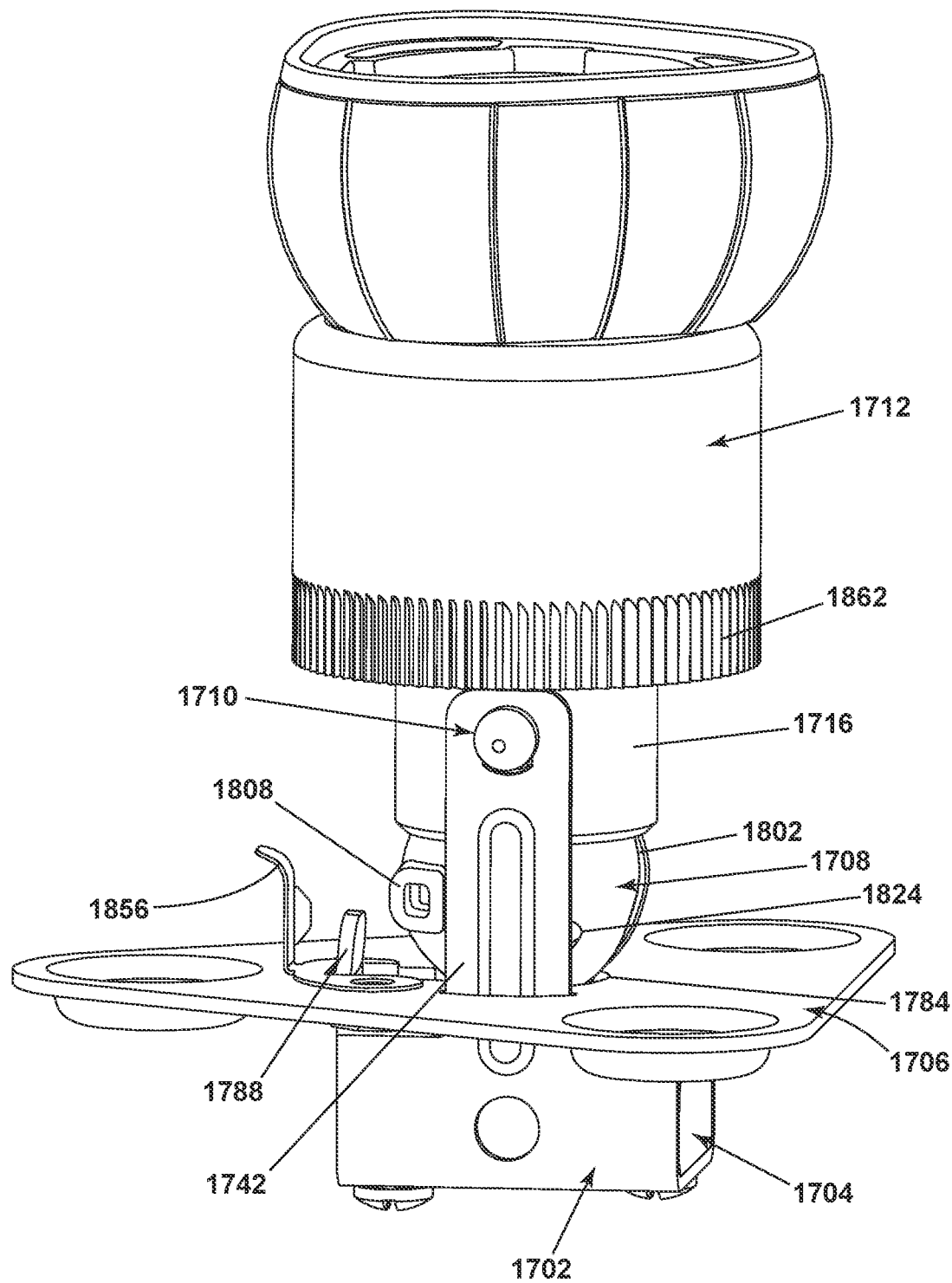
FIG. 83 is a view of the pivoting joint member assembly following the sequence assembly of FIG. 79 in the upright position with the cap positioned above the rest of the motor adapter assembly.

Referring now to FIG. 82, continuing the assembly sequence from FIG. 79, the downrod 1716 and the pivoting joint member 1708 can pivot about the pin assembly 1710 into the pivoted position, as shown. Referring now to FIG. 83, continuing the assembly sequence from FIG. 82, the downrod 1716 is positioned in the upright position, with the ears 1808 of the pivoting joint member 1708 abutting the arms 1742 of the cradle 1702. The cap 1712 can slide over the downrod 1716. The cap 1712 can thread about the pin assembly 1710, positioning the cap 1712 between the support tab 1788 and the tab 1856. This position secures the raised area 1826 of the pivoting joint member 1708 within the central aperture 1784 of the base plate 1706. The tab member 1856 can secure the cap 1712 to abut the base plate 1706 at a set of teeth 1862. As the cap 1712 threads about the pin assembly 1710, the cap 1712 can pull the cradle 1702 upward at the arms 1742, pulling the base plate 1706 upward as well, to compress the ball portion 1802 of the pivoting joint member 1708 at the crescent slots 1824.

Figure 84:
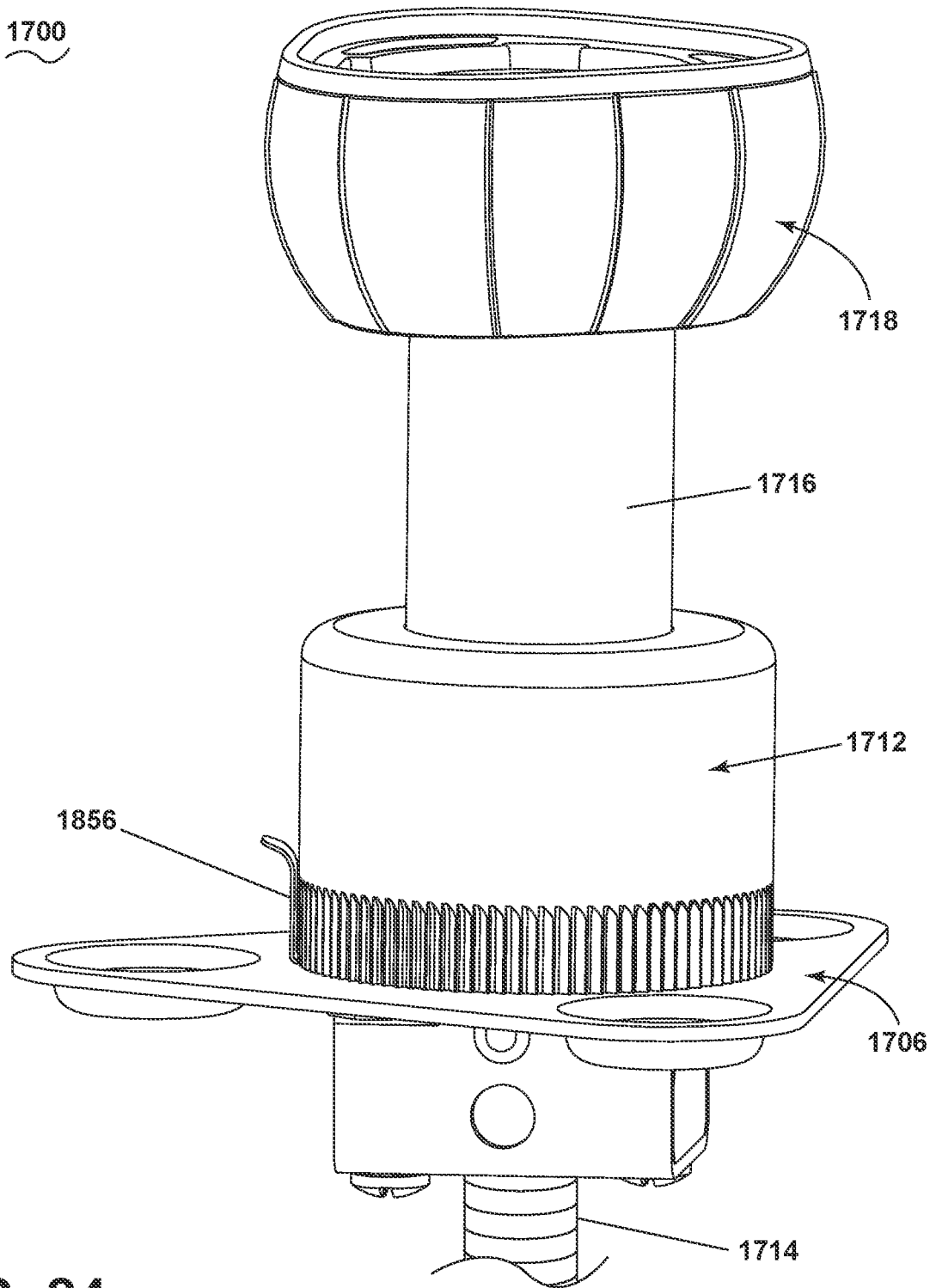
FIG. 84 is a perspective view of the completed motor adapter assembly in the upright position.

Referring now to FIG. 84, continuing the assembly sequence from FIG. 83, the cap 1712 secures in place against the base plate 1706, secured with the tab 1856. Thus, the motor adapter assembly 1700 is secured in the upright position, mounting the motor shaft 1714 to the downrod 1716. The mount assembly 1718 can mount or suspend the motor adapter assembly 1700, and thus a ceiling fan, to a structure such as a ceiling.

The motor adapter assembly 1700 provides for securing the downrod 1716 to the motor shaft 1714, while permitting pivoting movement of the downrod 1716 about the pin assembly 1710 during shipping, packaging, and display. Additionally, the raised area 1826 seats in the base plate 1706 to resist pivoting movement of the motor adapter assembly 1700 in the upright, installed position. As such, the pivoting joint member 1708 can further dampen vibrations at the motor adapter assembly 1700. Further yet, the sections 1812 of the upper portion 1804 of the pivoting joint member 1708 are compressible into the slots 1810, permitting the pivoting joint member 1708 to fit with downrods having a variety of diameters.

Figure 85:
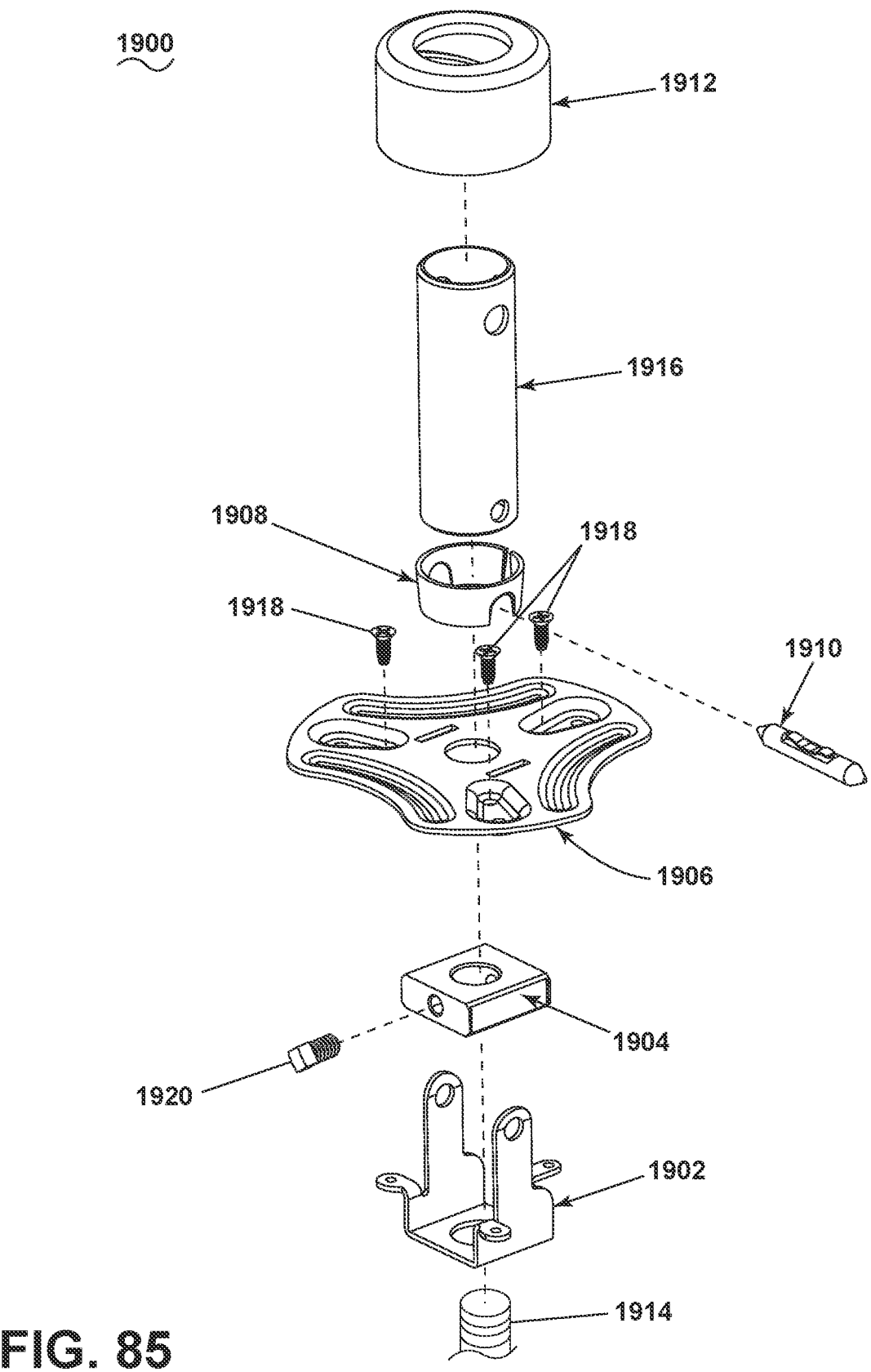
FIG. 85 is an exploded view of a motor adapter assembly.

Referring now to FIG. 85, another exemplary motor adapter assembly 1900 can include a cradle 1902, a threaded nut 1904, a base plate 1906, a wedge 1908, a pin assembly 1910, and a cap 1912. The motor adapter assembly 1900 can be configured to couple a motor shaft 1914 to a downrod 1916. A set of fasteners 1918 can be included with the base plate 1906, and a shaft fastener 1920 can be included with the retainer nut 1904.

Figure 86:
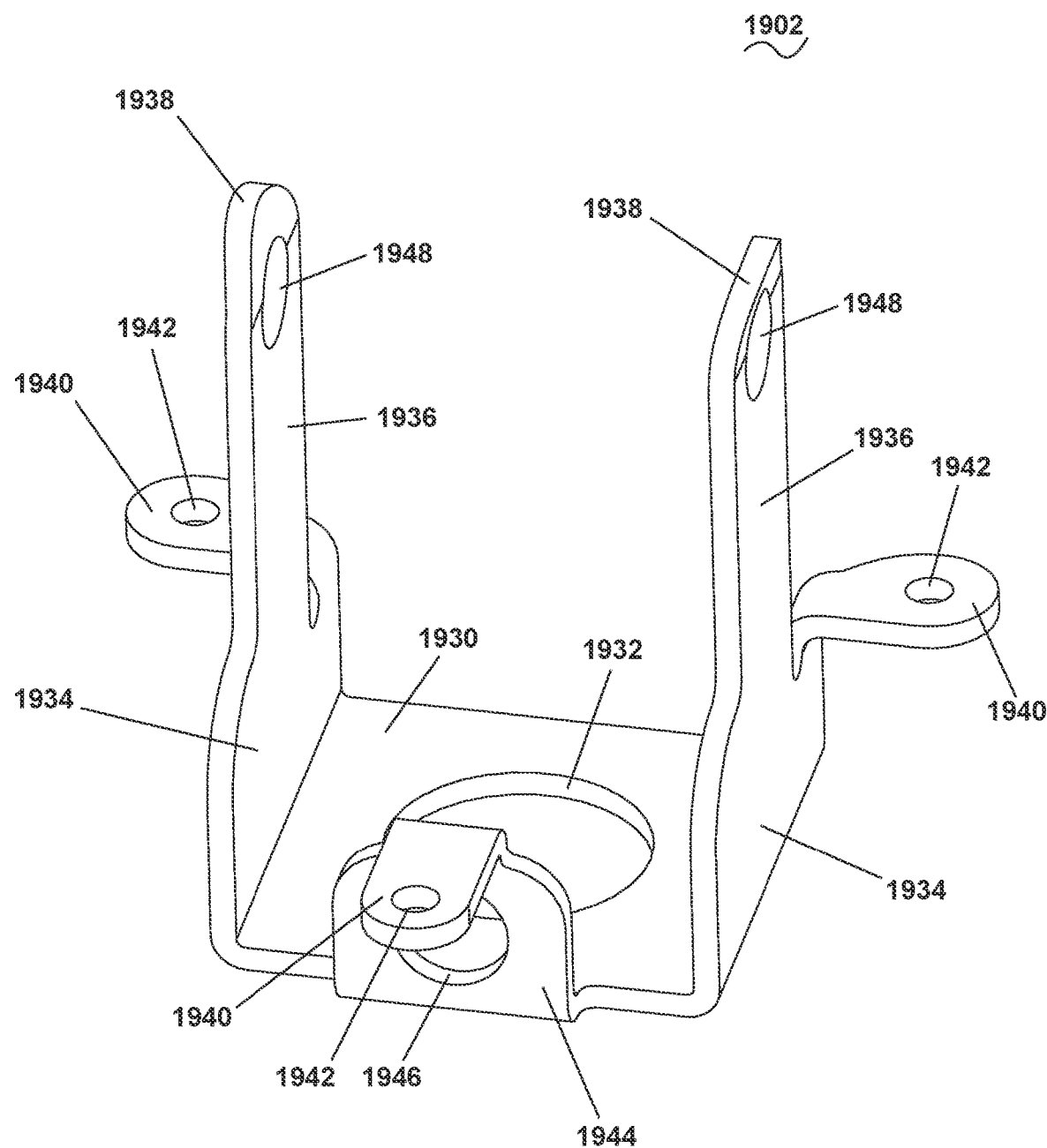
FIG. 86 is a perspective view of a cradle of the motor adapter assembly of FIG. 85.

Referring now to FIG. 86, the cradle 1902 can include a bottom wall 1930. A motor shaft opening 1932 can be provided in the bottom wall 1930. A set of two opposing sidewalls 1934 can extend from the bottom wall 1930. An arm 1936 can extend from center of each sidewall 1934 substantially coplanar with the sidewall 1934. An arm aperture 1948 can be provided in each arm 1936. The arms 1936 can have rounded ends 1938. The rounded ends 1938 can taper outwardly, away from the center of the cradle 1902.

A tab 1940, adjacent to the arm 1936, can extend from and orthogonal to each sidewall 1934, and can include a tab aperture 1942. A shaft fastener tab 1944 can also extend from the bottom wall 1930 and can include a shaft fastener aperture 1946. Another tab 1940 can extend orthogonal to the shaft fastener tab 1944, and can include the tab aperture 1942.

In one example, the cradle 1902 can be stamped at manufacture. The sidewalls 1934, arms 1936, shaft fastener tab 1944, and tabs 1940 can be bent and shaped after stamping. Additionally, the apertures and openings can be quickly and easily stamped into the cradle 1902 prior to shaping.

Figure 87:
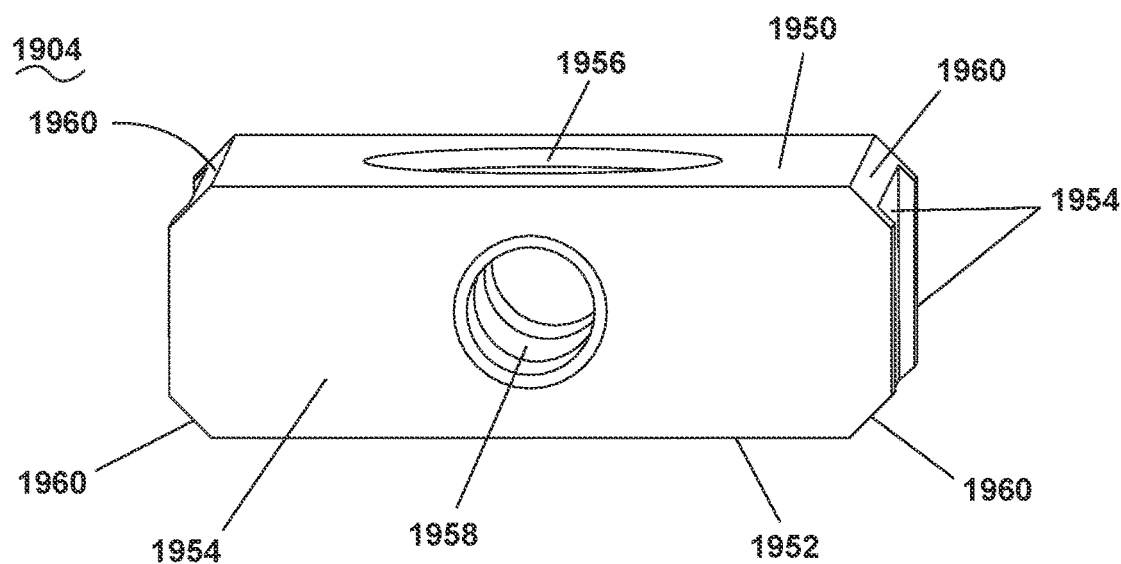
FIG. 87 is a perspective view of a retainer nut for the motor adapter assembly of FIG. 85.

Referring now to FIG. 87, the threaded nut 1904 includes a top wall 1950, a bottom wall 1952, and a set of sidewalls 1954 extending between the top wall 1950 and the bottom wall 1952. A shaft aperture 1956 extends between the top wall 1950 and the bottom wall 1952 in the center of the threaded nut 1904. A fastener aperture 1958 extends through one sidewall 1954 to the shaft aperture 1956. A set of bevels 1960 can be formed between two of the sidewalls 1954 and the top and bottom walls 1950, 1952.

Figure 88:
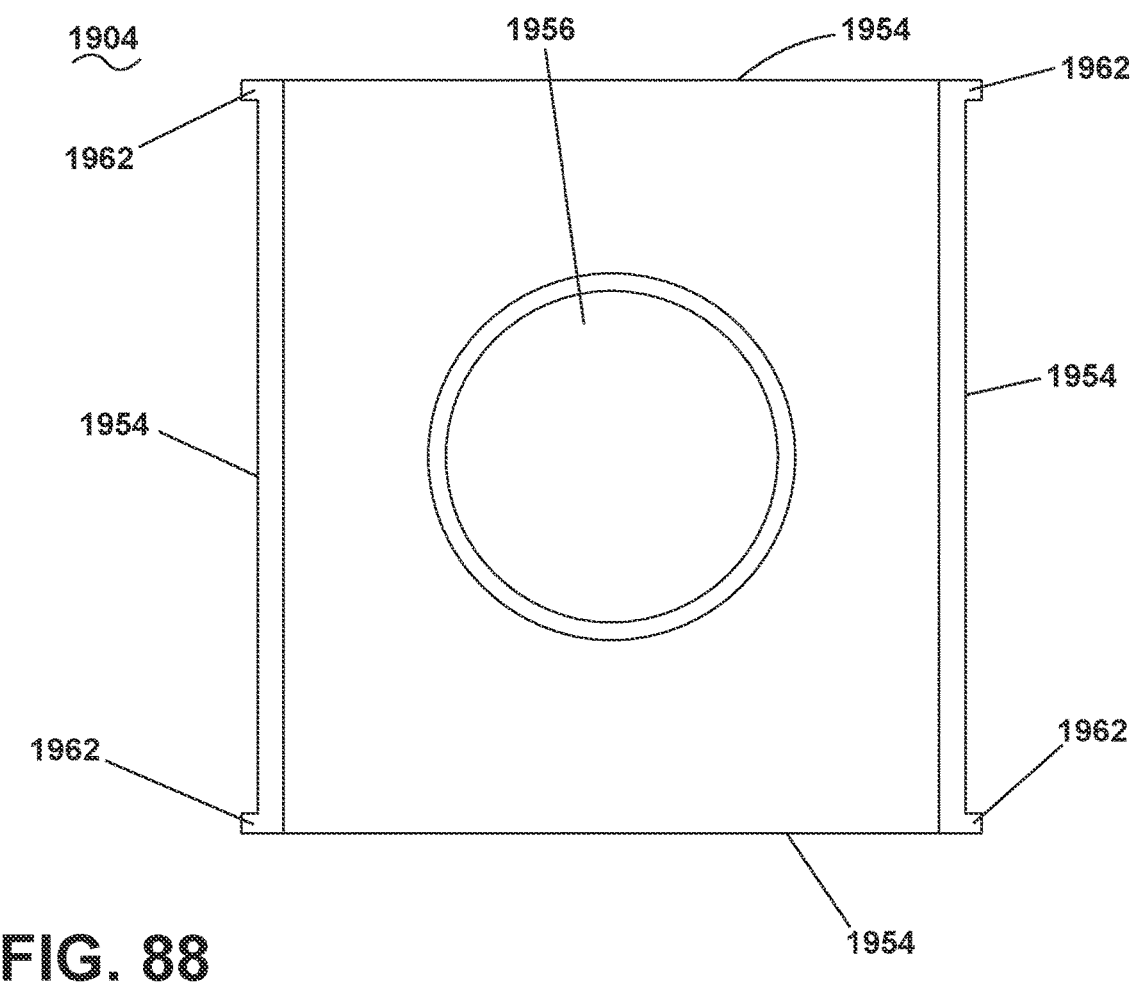
FIG. 88 is a top view of the retainer nut of FIG. 87.

Referring now to FIG. 88, the threaded nut 1904 can further include a set of tabs 1962. The set of tabs 1962 extend from opposing sidewalls 1954, at the ends adjacent the remaining sidewalls 1954. The tabs 1962 can be spaced from one another complementary to a length of a sidewall 1934 for the cradle 1902.

Figure 89:
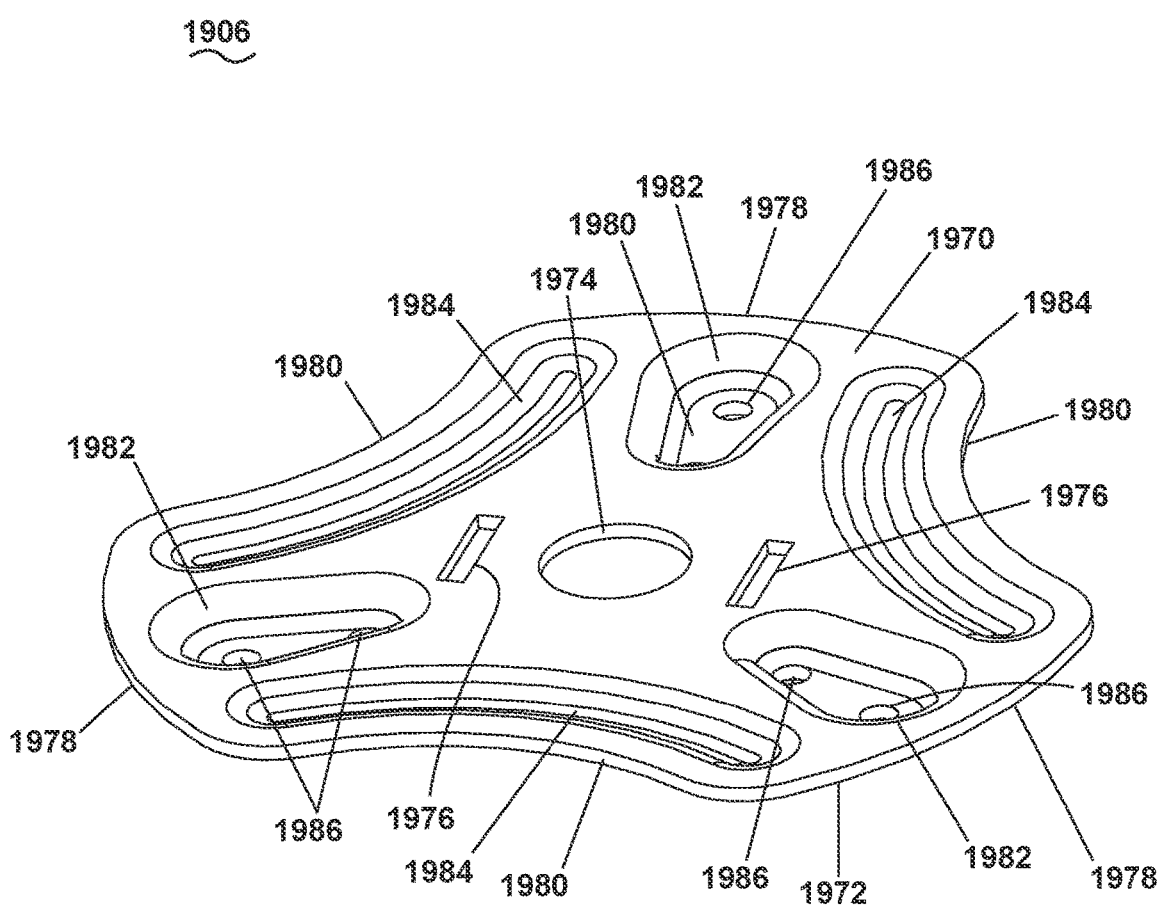
FIG. 89 is a perspective view of a base plate for the motor adapter assembly of FIG. 85.

Referring now to FIG. 89, the base plate 1906 can include a top surface 1970 and a bottom surface 1972. A central aperture 1974 can be provided in the center of the base plate 1906. A pair of slots 1976 can be provided on either side of the central aperture 1974. The base plate 1906 can include three ends 1978, with a curved side 1980 extending between each end 1978. A screw recess 1982 can be provided at each end 1978, with two fastener aperture 1986 in each screw recess 1982. One end of the screw recess 1982 can be wider than the other, forming a teardrop shape. A set of three ribs 1984 can be provided in the base plate 1906, extending along each of the curved sides 1980.

It should be appreciated that the base plate 1906 can be stamped at manufacture. Each slot, aperture, or opening can be stamped through the base plate 1906, while the recesses and ribs can be formed or shaped into the base plate 1906 to extend from the top or bottom surface 1970, 1972.

Figure 90:
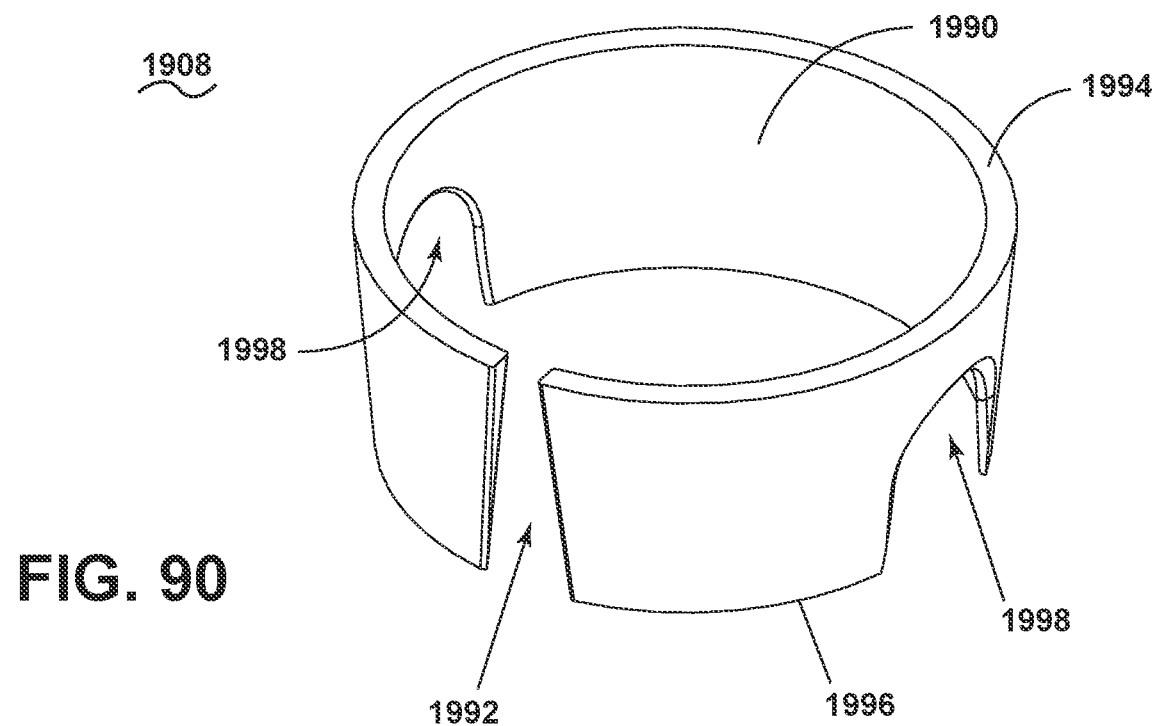
FIG. 90 is a perspective view of a wedge for the motor adapter assembly of FIG. 85.
Figure 91:
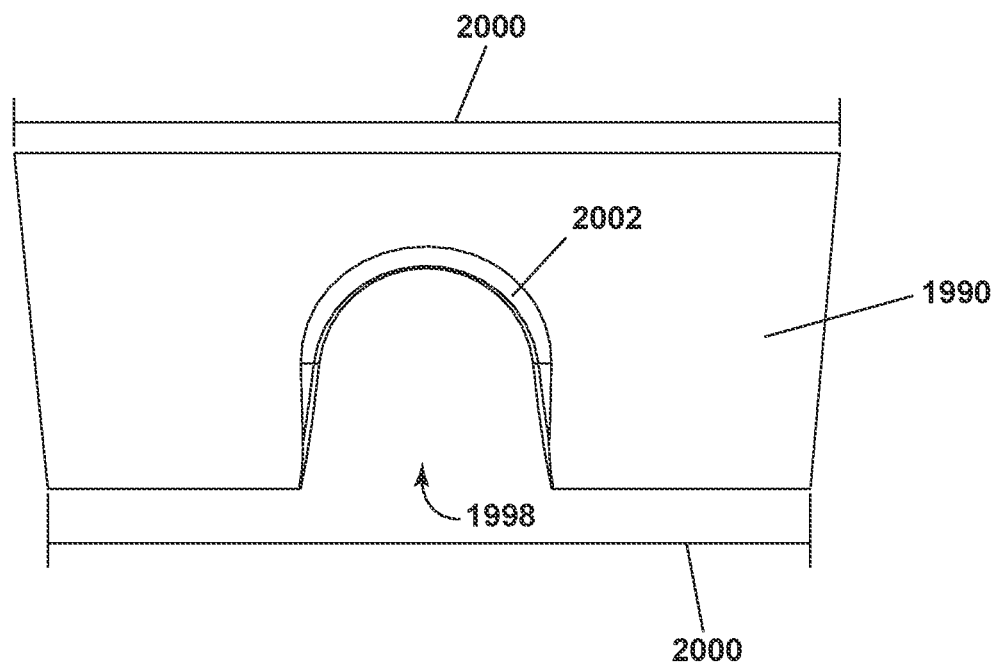
FIG. 91 is a side view of the motor adapter assembly of FIG. 90.

Referring now to FIG. 90, the wedge 1908 can include a sidewall 1990 with a gap 1992. The sidewall 1990 can include a top edge 1994 and a bottom edge 1996, with the gap 1992 increasing in width extending from the top edge 1994 to the bottom edge 1996. A set of openings 1998 can be formed on opposite sides of the sidewall 1990, open at the bottom edge 1996. Referring to FIG. 91, the wedge 1908 is tapered, having a diameter 2000 for the top edge 1994 that is greater than that of the bottom edge 1996. A bevel 2002 is provided at each opening 1998.

Figure 92:
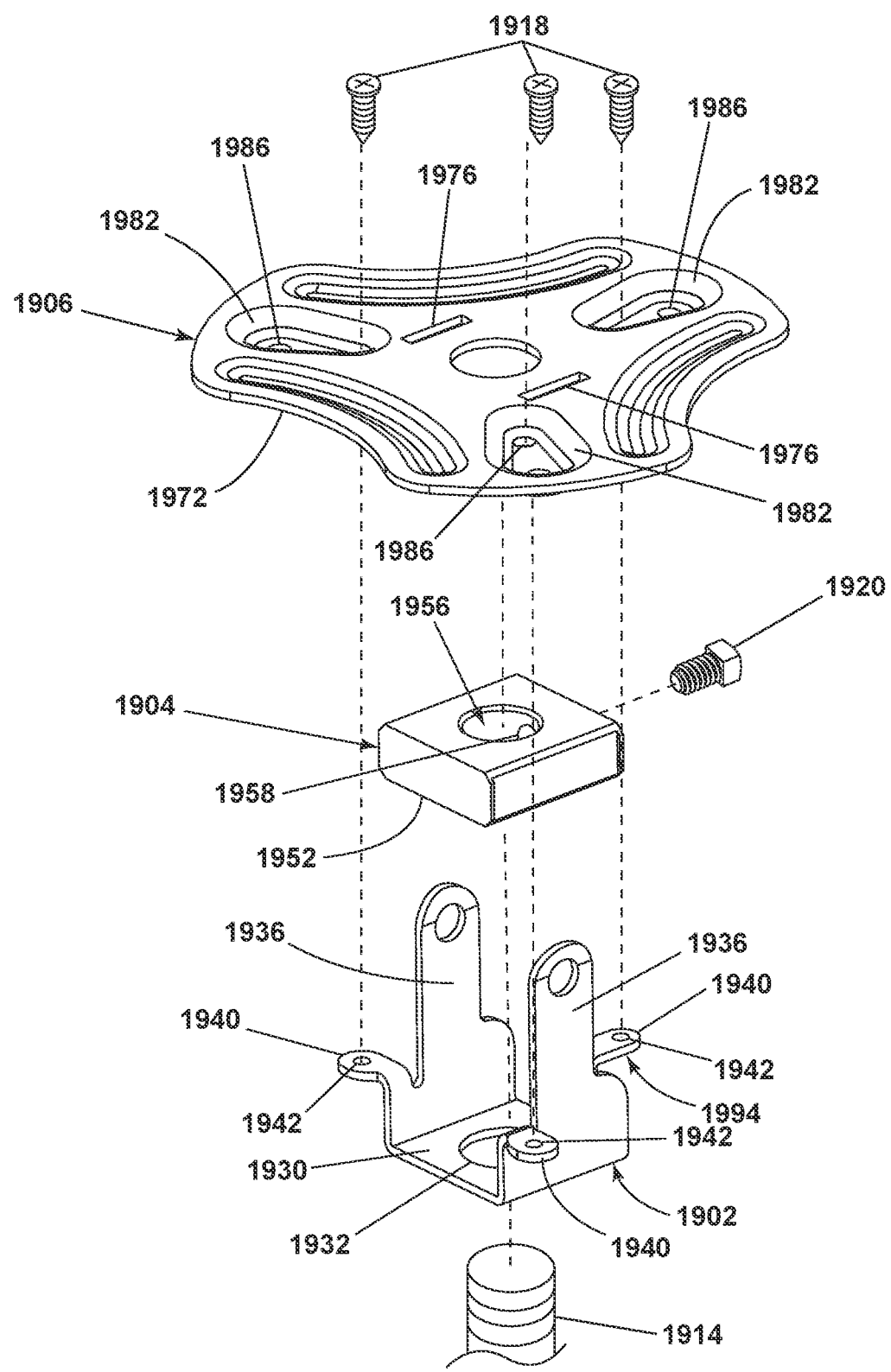
FIG. 92 is an exploded view of a portion of the motor adapter assembly of FIG. 85 showing an assembly sequence of the motor adapter assembly.

FIGS. 92-96 show an assembly sequence for the motor adapter assembly 1900. Referring now to FIG. 92, the threaded nut 1904 can seat in the cradle 1902, with the bottom wall 1952 of the threaded nut 1904 abutting the bottom wall 1930 of the cradle 1902. The motor shaft 1914 can threadably couple to the threaded nut 1904 at the shaft aperture 1956 through the motor shaft opening 1932 in the cradle 1902. The shaft fastener 1920 can extend through the shaft fastener aperture 1946 in the shaft fastener tab 1944 of the cradle 1902, and into the fastener aperture 1958 of the threaded nut 1904 to secure the motor shaft 1914 within the threaded nut 1904.

The arms 1936 of the cradle 1902 can insert through the slots 1976 of the base plate 1906 until the bottom surface 1972 of the base plate 1906 abuts the tabs 1940 of the cradle 1902. The set of fasteners 1918 can insert through the fastener apertures 1986 in the screw recesses 1982 and into the tab aperture 1942 in the tabs 1940 of the cradle 1902 to secure the base plate 1906 to the cradle 1902.

Figure 93:
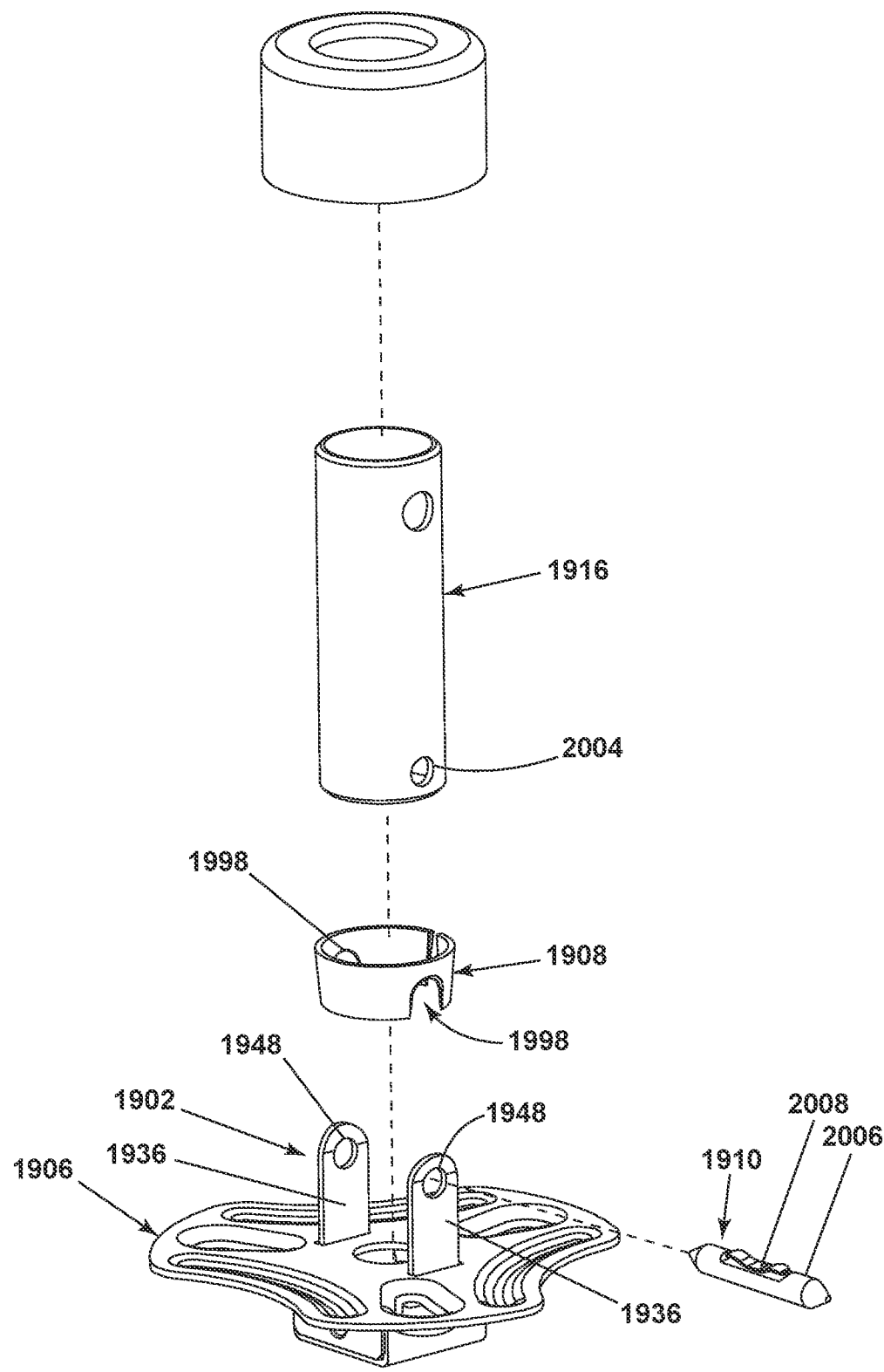
FIG. 93 is an exploded view of the assembly sequence of the motor adapter assembly following FIG. 92.

Referring now to FIG. 93, continuing the assembly sequence from FIG. 92, the downrod 1916 can insert into the wedge 1908, with the openings 1998 of the wedge 1908 aligned with openings 2004 in the downrod 1916. The downrod 1916 and wedge 1908 can insert between the arms 1936 of the cradle 1902, aligning the arm apertures 1948 with the openings 1998, 2004 in the wedge 1908 and the downrod 1916.

The pin assembly 1910 can insert through the arm apertures 1948, the openings 1998 in the wedge 1908, and the openings 2004 in the downrod 1916, and the arm apertures 1948, coupling the downrod 1916, the wedge 1908, and the cradle 1902. The pin assembly 1910 can include a pin 2006 and a biasing element or spring 2008, and can be substantially similar to that as described in FIG. 5.

Figure 94:
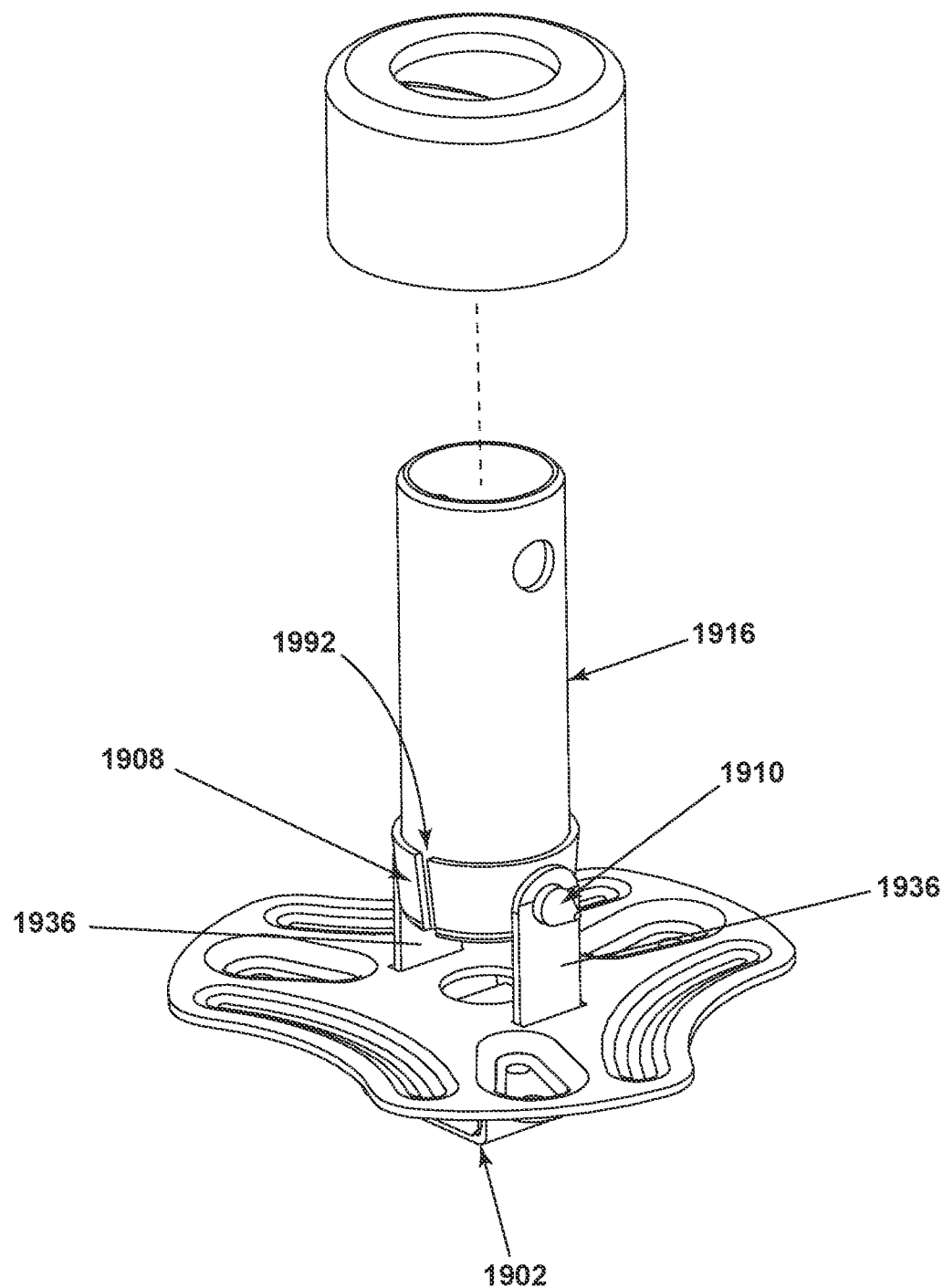
FIG. 94 is an exploded view of the assembly sequence of the motor adapter assembly following FIG. 93.

Referring now to FIG. 94, continuing the assembly sequence from FIG. 93, the wedge 1908, being tapered, can be compressed about the downrod 1916 between the arms 1936 of the cradle 1902. The gap 1992 in the wedge 1908 permits compression of the wedge 1908. Additionally, the bevels 2002 at the openings 1998 permit the arms 1936 to secure at the openings 1998 of the wedge 1908, and to orient the wedge 1908 in the upright position.

Figure 95:
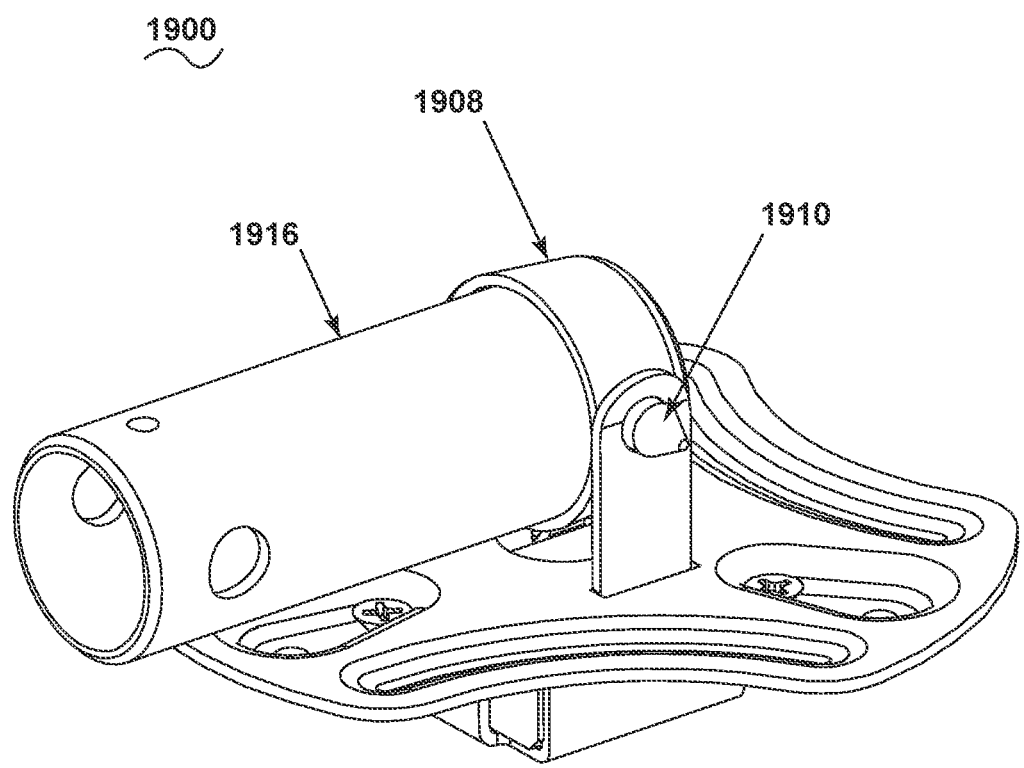
FIG. 95 is a view of the motor adapter assembly of FIG. 85 with a downrod and the wedge pivoted into the pivoted position.
Figure 96:
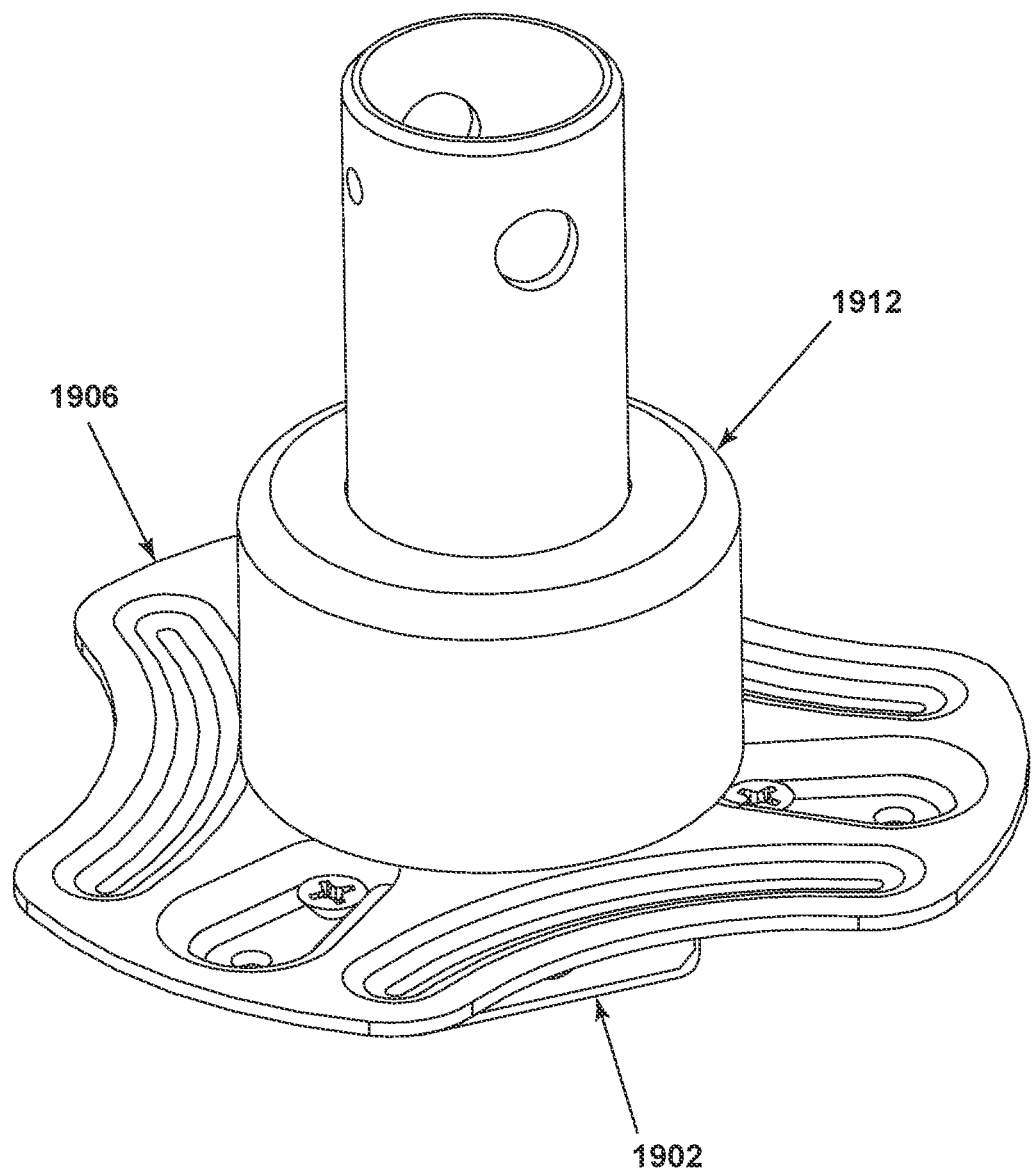
FIG. 96 is a view of the completed motor adapter assembly of FIG. 85.

Referring now to FIG. 95, the downrod 1916 and the wedge 1908 can pivot about the pin assembly 1910 into the pivoted position. In the pivoted position, the motor adapter assembly 1900 can be more compact for shipping, packaging, or display. During installation, the user can easily pivot the wedge 1908 and downrod 1916 about the pin assembly 1910 into the upright position. Referring again to FIG. 94, the cap 1912 can be positioned over the wedge 1908 and the arms 1936 of the cradle 1902. The cap 1912 can thread onto the pin assembly 1910 until the cap 1912 abuts the base plate 1906. At the same time, the cap 1912 presses the wedge 1908 downward, securing the downrod 1916 in the upright position, as shown in FIG. 96.

The motor adapter assembly 1900 provides for securing the downrod 1916 to the motor shaft 1914, while permitting pivoting movement of the downrod 1916 about the pin assembly 1910 during shipping, packaging, and display. Additionally, the wedge 1908 resists pivoting movement of the motor adapter assembly 1900 in the upright, installed position. Furthermore, the motor adapter assembly 1900 can be a wholly stamped assembly, manufactured only from stamped and shaped pieces.

Figure 97:
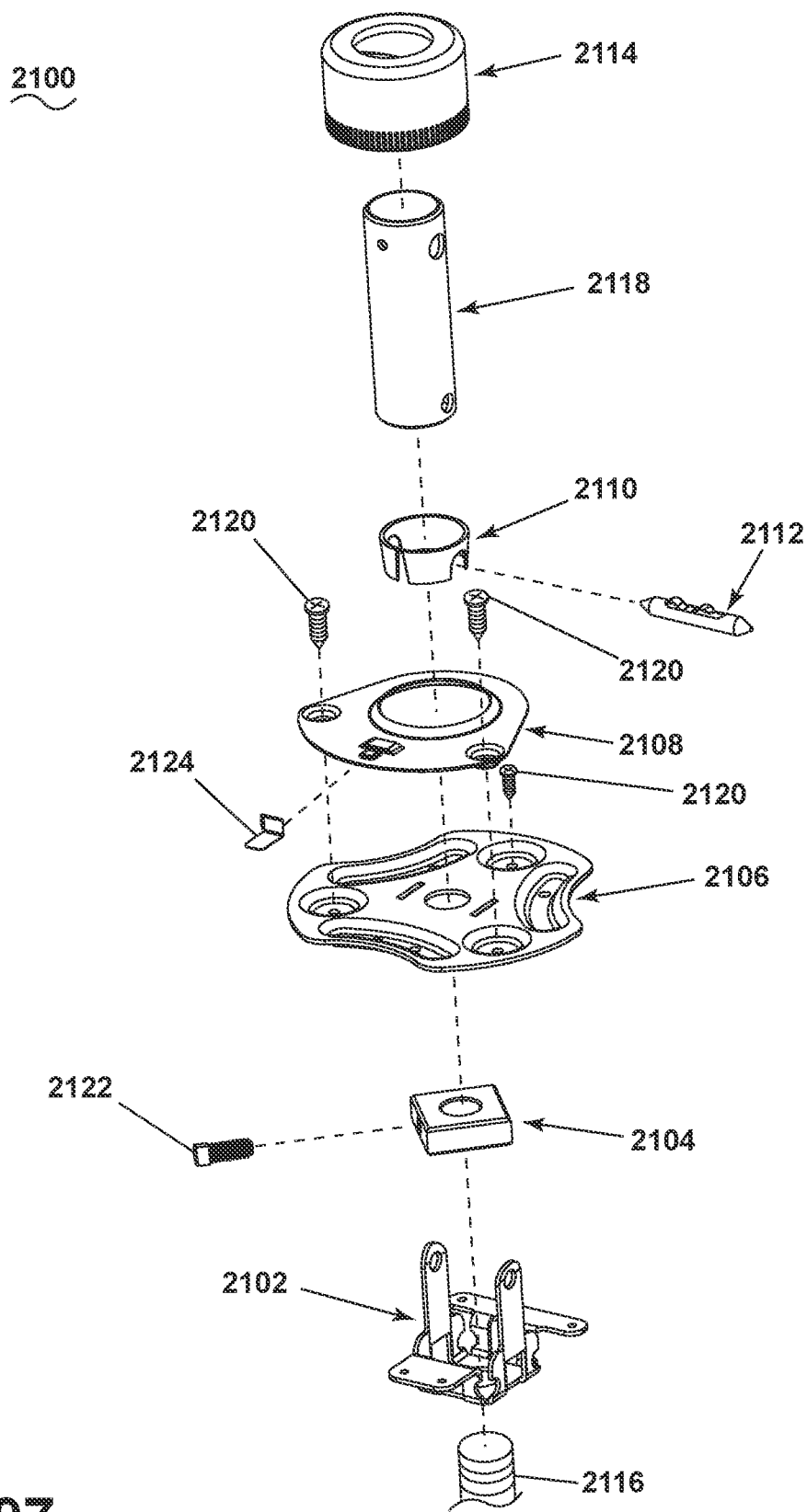
FIG. 97 is an exploded view of a motor adapter assembly.

Referring now to FIG. 97, another exemplary motor adapter assembly 2100 can include a cradle 2102, a retainer nut 2104, a first base plate 2106, a second base plate 2108, a wedge 2110, a pin assembly 2112, and a cap 2114. The pin assembly 2112 can be substantially similar to the pin of FIG. 5, or any other pin or pin assembly as described herein. The motor adapter assembly 2100 can provide for coupling a motor shaft 2116 to a downrod 2118 for suspending a ceiling fan from a structure or ceiling. A set of fasteners 2120 can be included with the first base plate 2106. A motor shaft fastener 2122 can be included with the retainer nut 2104. A tab 2124 can be included with the second base plate 2108.

Figure 98:
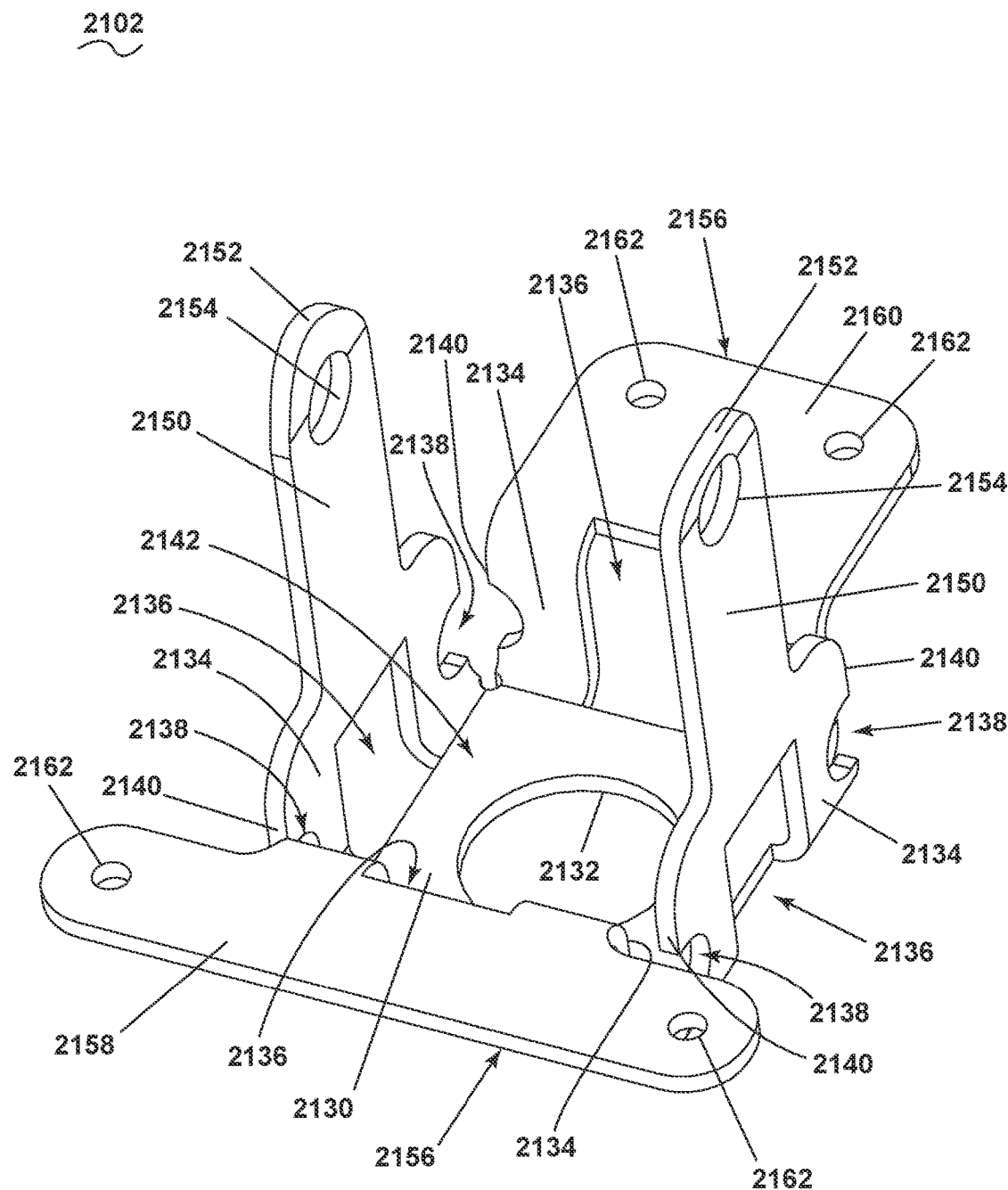
FIG. 98 is a perspective view of a cradle of the motor adapter assembly of FIG. 97.

Referring now to FIG. 98, the cradle 2102 includes a bottom wall 2130 including a motor shaft aperture 2132. A set of four sidewalls 2134 extend from the bottom wall 2130. The sidewalls 2134 can include a cutout portion 2136 within the sidewalls 2134, and can include fastener recesses 2138 at edges 2140 of the sidewalls 2134. Adjacent fastener recesses 2138 at adjacent sidewalls edges 2140 can form a substantially circular shape that can be sized and shaped complementary to a fastener insertable through the fastener recesses 2138. The sidewalls 2134 with the bottom wall 2130 can form a seat 2142 within the cradle 2102.

Arms 2150 extend from two opposing sidewalls 2134 in a direction away from the bottom wall 2130. The arms 2150 terminate in a rounded end 2152, which can be flared outwardly from one another. Each arm 2150 can include an arm aperture 2154. The remaining sidewalls 2134 include an extension 2156, extending from the sidewalls 2134 opposite of the bottom wall 2130, and in a direction substantially orthogonal to the sidewalls 2134 and parallel to the bottom wall 2130. A first extension 2158 can be elongated, having width greater than the bottom wall 2130. A second extension 2160, opposite the first extension 2158, can have a width similar to that of the remainder of the sidewall 2134 from which it extends. A set of fastener apertures 2162 can be formed in the extensions 2156, having two aperture 2162 in each of the first and second extensions 2158, 2160.

Figure 99:
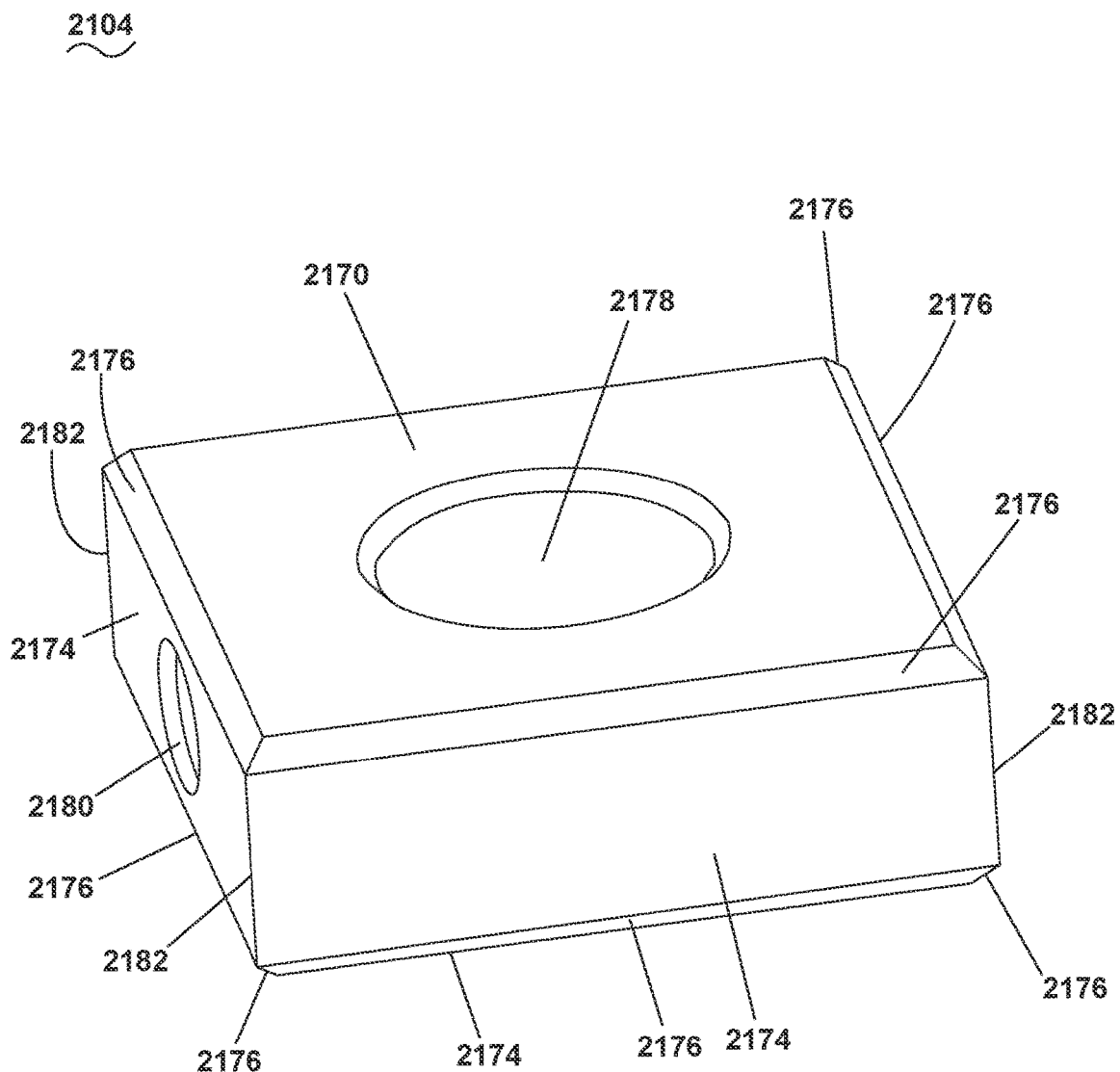
FIG. 99 is a perspective view of a retainer nut for the motor adapter assembly of FIG. 97.

Referring now to FIG. 99, the retainer nut 2104 includes a top wall 2170 and a bottom wall 2172, with four sidewalls 2174 extending between the top wall 2170 and the bottom wall 2172. The sidewalls 2174 can abut one another at corners 2182 of the retainer nut 2104. The sidewalls 2174 can be equally sized, forming a square-shape for the top wall 2170 and the bottom wall 2172. Bevelled edges 2176 can be formed at the junction between each of the sidewalls 2174 and the top and bottom walls 2170, 2172.

A threaded motor shaft aperture 2178 can be provided in the retainer nut 2104 extending between the top wall 2170 and the bottom wall 2172. A motor shaft fastener aperture 2180 can be provided in one sidewall 2174, extending to the motor shaft aperture 2178.

Figure 100:
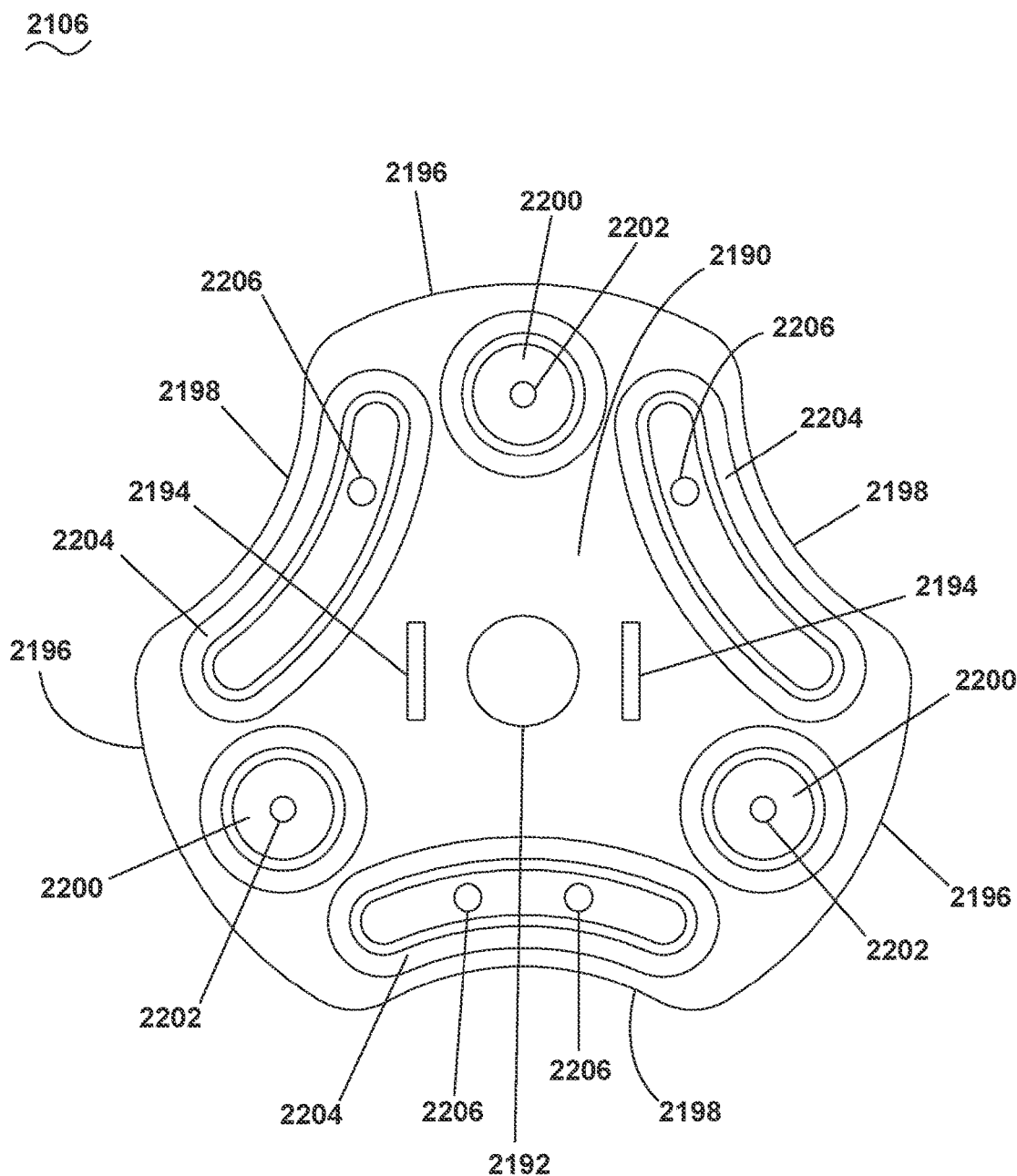
FIG. 100 is a top view of a base plate for the motor adapter assembly of FIG. 97.

Referring now to FIG. 100, the first base plate 2106 can include a body 2190 including a central aperture 2192. A pair of slots 2194 can be provided on opposite sides of the central aperture 2192, sized complementary to the arms 2150 of the cradle 2102. The body 2190 can include three ends 2196, with arcuate sides 2198 extending between the ends 2196. A motor housing recess 2200 can be provided at each end 2196, with a housing aperture 2202 in each motor housing recess 2200. A set of ribs 2204 can be formed in the body 2190 extending along and spaced from the arcuate sides 2198. One or more cradle fastener apertures 2206 can be provided the ribs 2204, and can be formed complementary to the fastener apertures 2162 in the extensions 2156 of the cradle 2102.

Figure 101:
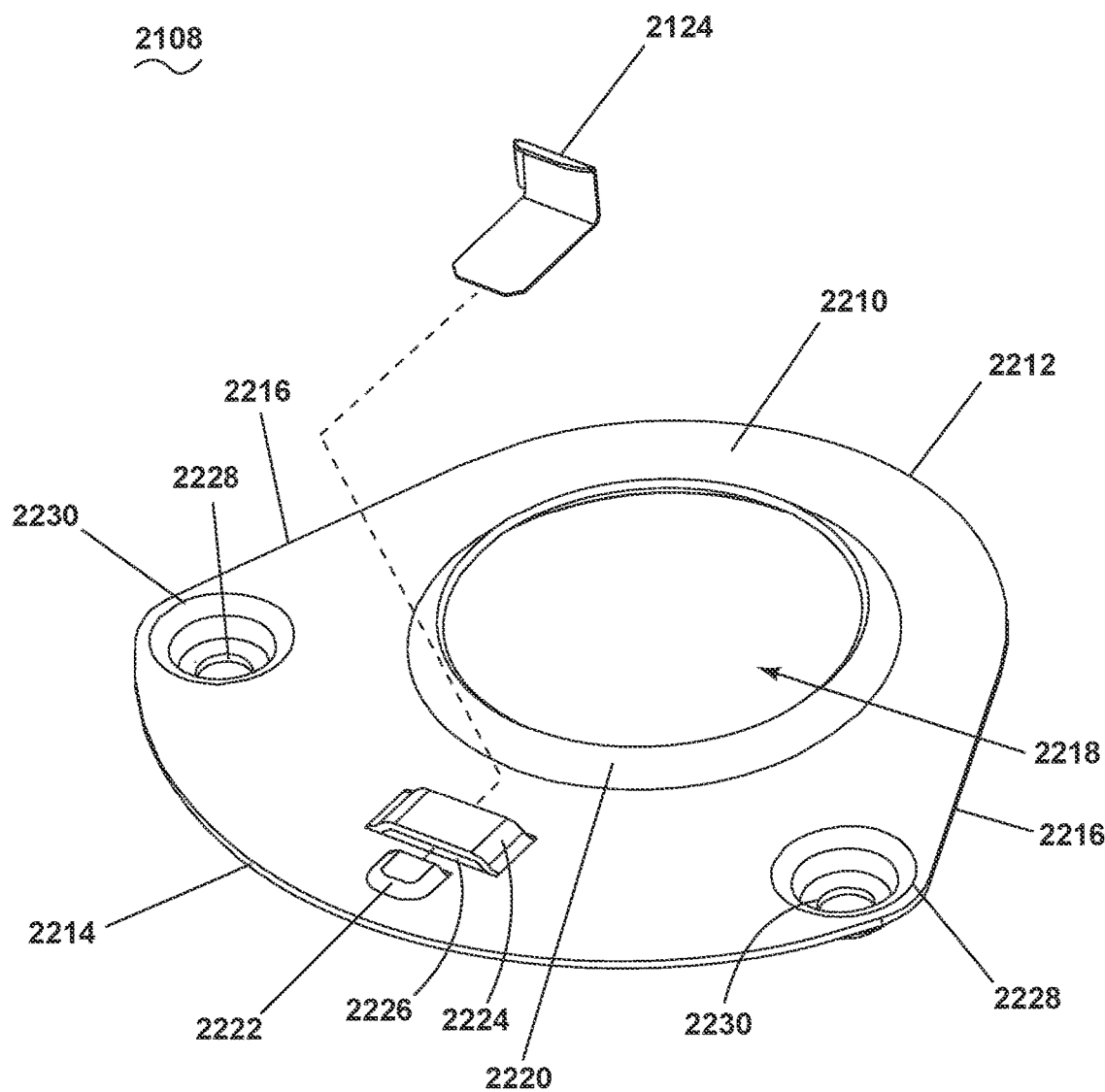
FIG. 101 is a perspective view of a second base plate for the motor adapter assembly of FIG. 97.

Referring now to FIG. 101, the second base plate 2108 can include a body 2210, having a first rounded edge 2212 and a second rounded edge 2214, with two linear portions 2216 extending between the first and second rounded edges 2212, 2214. A central aperture 2218 is provided in the body 2210. A flange 2220 is provided about the central aperture 2218.

A lip 2222 is formed in the body 2210, and a bridge 2224 extends from the body 2210, forming gaps 2226 in the body 2210. The gaps 2226 can be sized to receive the tab 2124, which can abut the lip 2222 to remain in position at the bridge 2224. A set of recesses 2228 can be formed in the body 2210 at the junction between the second rounded edge 2214 and the linear portions 2216, with fastener apertures 2230 provided in the recesses 2228.

Figure 102:
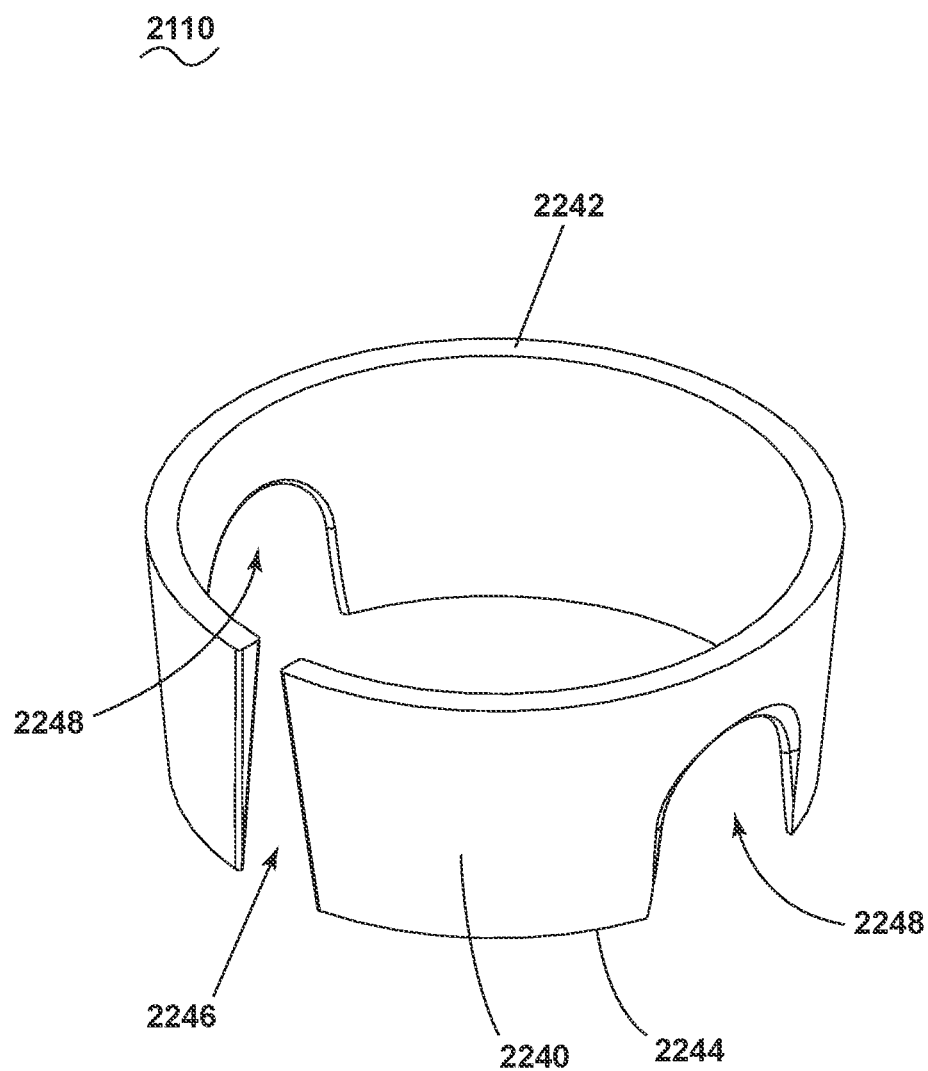
FIG. 102 is wedge for the motor adapter assembly of FIG. 97.

Referring now to FIG. 102 the wedge 2110 can be substantially similar to the wedge 1908 of FIG. 89, for example, and can include a sidewall 2240 terminating at an upper edge 2242 and a lower edge 2244, with the upper edge 2242 having a greater diameter than the lower edge 2244. A slot 2246 is provided in the sidewalls 2240 extending between the upper edge 2242 and the lower edge 2244. A set of openings 2248 are formed in the sidewall 2240, extending from the lower edge 2244. The openings 2248 can be provided on opposing sides of the sidewall 2240.

Figure 103:
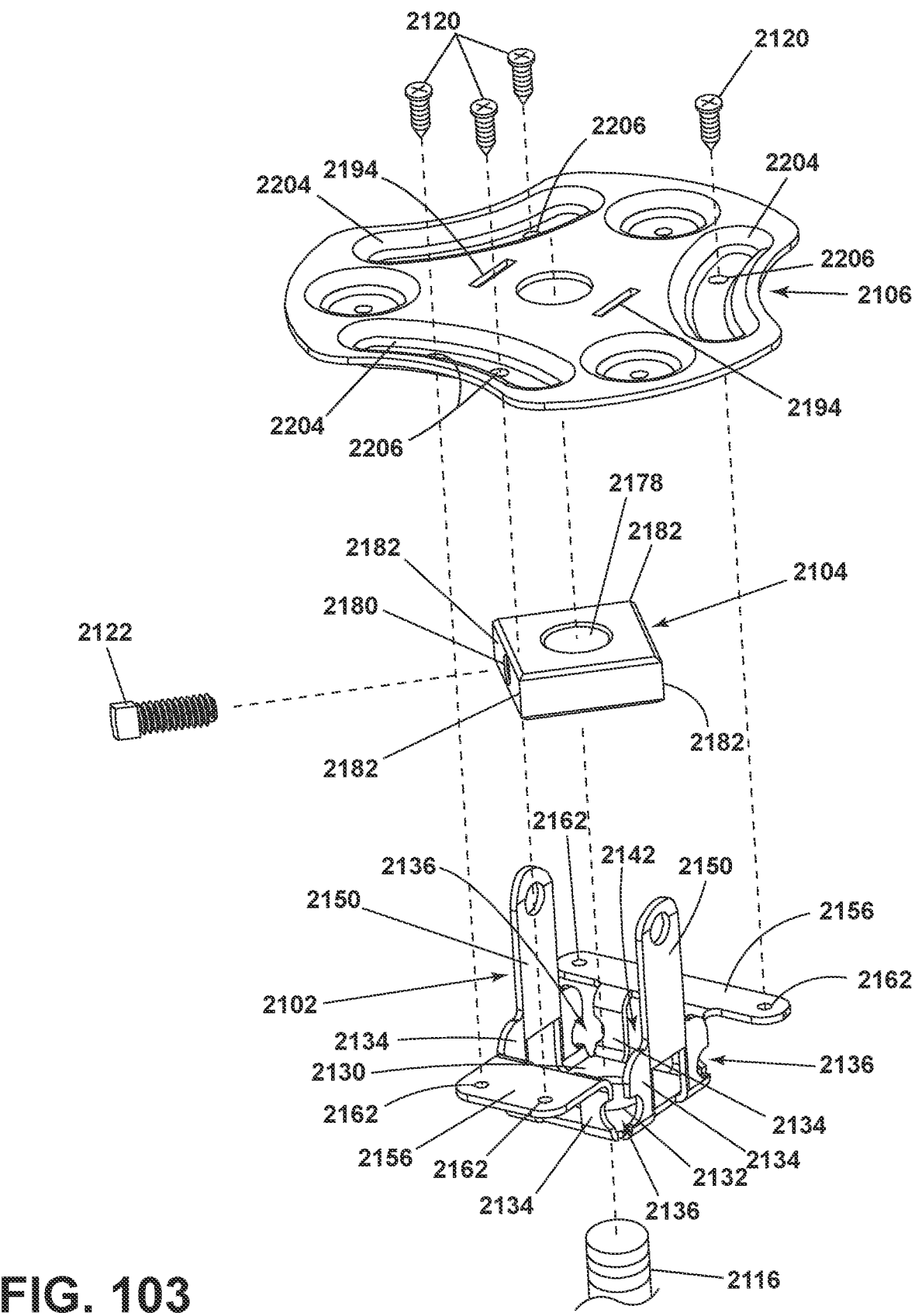
FIG. 103 is an exploded view illustrating an assembly sequence for the motor adapter assembly of FIG. 97.

FIGS. 103-107 illustrate an assembly sequence for the motor adapter assembly 2100, for coupling the motor shaft 2116 to the downrod 2118. Referring now to FIG. 103, the retainer nut 2104 can position within the seat 2142 of the cradle 2102, with the corners 2182 positioned in the cutout portions 2136 of the sidewalls 2134 of the cradle 2102. In one example, the cradle 2102 can be stamped, and the sidewalls 2134 can be bent about the retainer nut 2104.

The motor shaft 2116 can extend through the motor shaft aperture 2132 in the bottom wall 2130 of the cradle 2102, and thread into the motor shaft aperture 2178 of the retainer nut 2104. The motor shaft fastener 2122 can thread into the motor shaft fastener aperture 2180 of the retainer nut 2104 to secure the motor shaft 2116 within the retainer nut 2104.

The arms 2150 of the cradle 2102 can insert though the slots 2194 of the first base plate 2106 until the ribs 2204 abut the extensions 2156 of the cradle 2102. The set of fasteners 2120 can extend through the cradle fastener apertures 2206 in the ribs 2204 and into the fastener apertures 2162 in the extensions 2156 to secure the first base plate 2106 to the cradle 2102.

Figure 104:
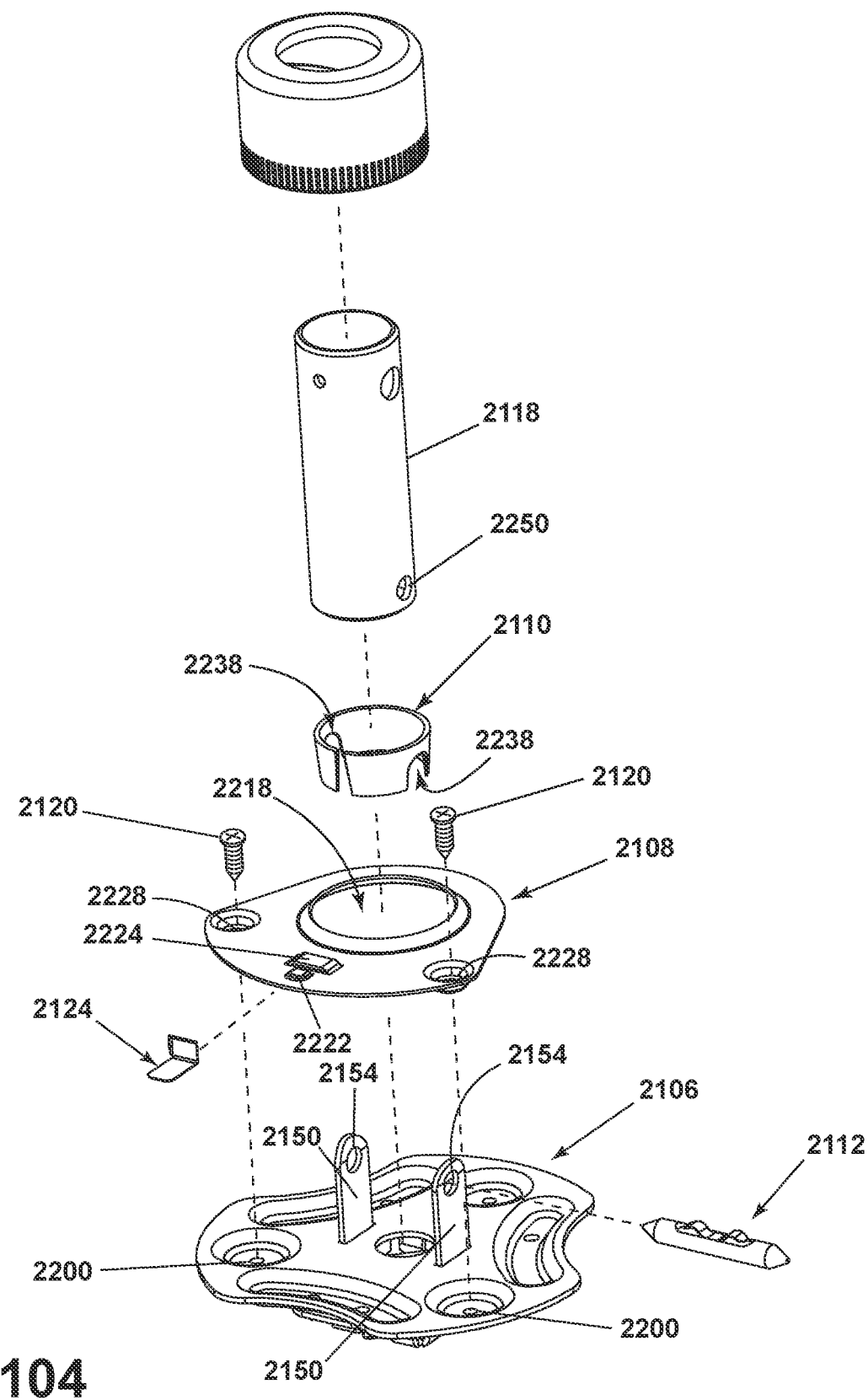
FIG. 104 is an exploded view of the motor adapter assembly continuation the assembly sequence of FIG. 103.

Referring now to FIG. 104, continuing the assembly sequence of FIG. 103, the second base plate 2108 can position on the first plate 2106, with the arms 2150 extending through the central aperture 2218. The recesses 2228 on the second base plate 2108 can align with the motor housing recesses 2200 on the first base plate 2106. The set of fasteners 2120 can secure the second base plate 2108 to the first base plate 2106.

The wedge 2110 can position around the downrod 2118, aligning the openings 2238 in the wedge 2110 with openings 2250 in the downrod 2118. The combined downrod 2118 and the wedge 2110 can insert between the arms 2150 of the cradle 2102, aligning the arm apertures 2154 with the openings 2238, 2250 in the wedge 2110 and the downrod 2118. The pin assembly 2112 can insert through the arm apertures 2154, the openings 2238 in the wedge 2110, and the openings 2250 in the downrod 2118 to secure the arms 2150, the downrod 2118, and the wedge 2110 to one another. The tab 2124 can insert under the bridge 2224 on the second base plate 2108, abutting the lip 2222.

Figure 105:
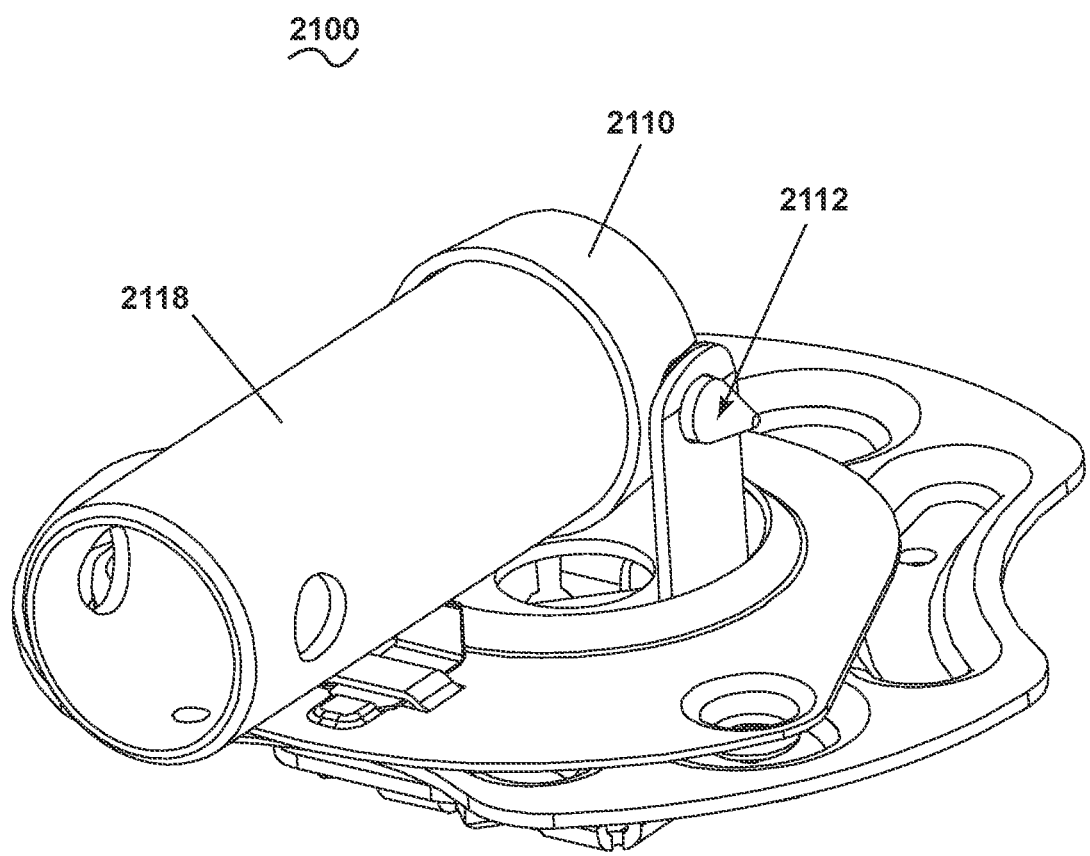
FIG. 105 is a perspective view of the motor adapter assembly with a downrod and the wedge in a pivoted position.

Referring now to FIG. 105, continuing the assembly sequence from FIG. 104, the downrod 2118 and the wedge 2110 can pivot about the pin assembly 2112 into the pivoted position. In this position, space is saved for storage, packaging, or shipping of the motor adapter assembly 2100, while remaining at least partially assembled prior to installation.

Figure 106:
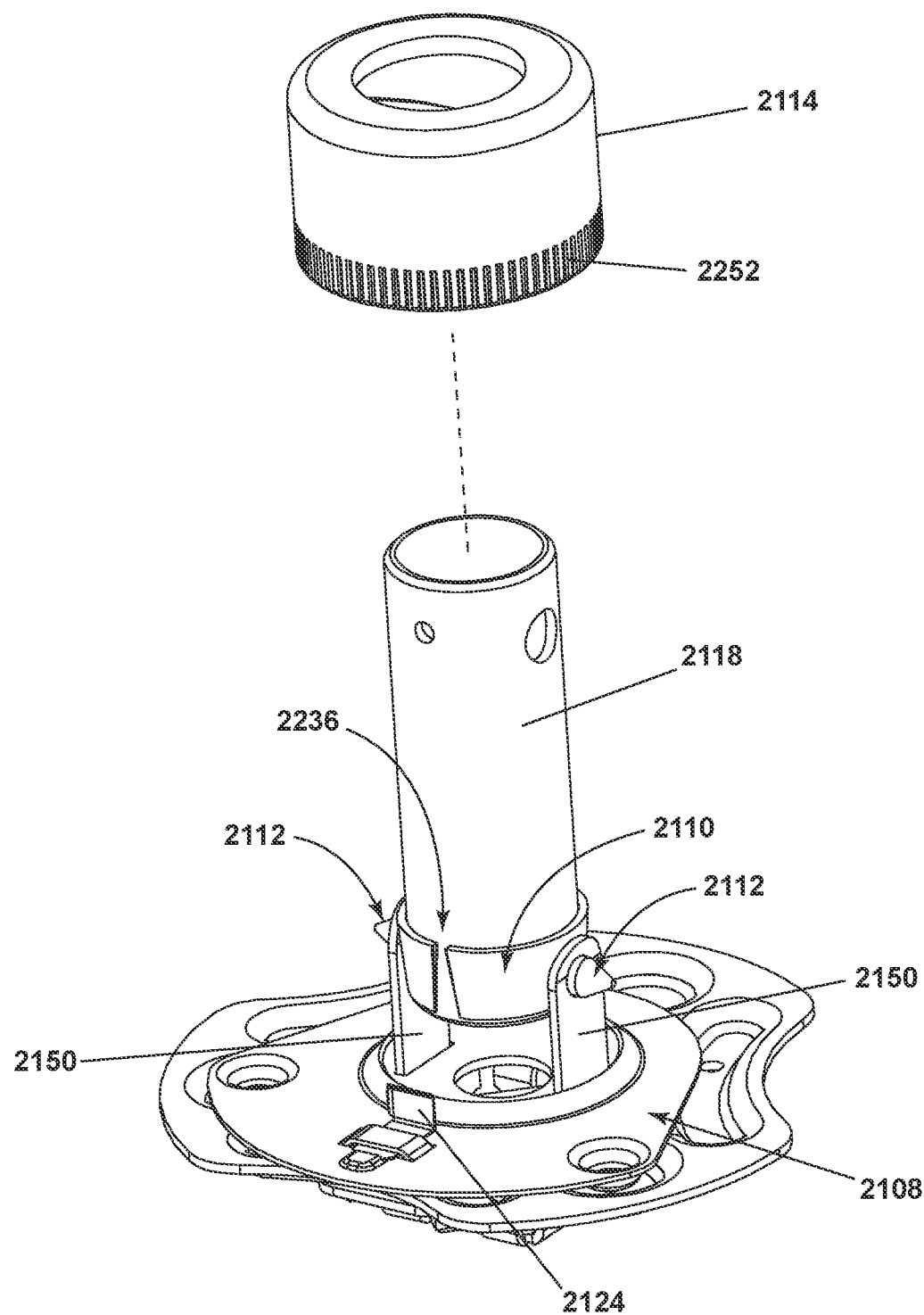
FIG. 106 is a perspective view of the motor adapter assembly continuing the assembly sequence of FIG. 105.

Referring now to FIG. 106, continuing the assembly sequence of FIG. 105, the downrod 2118 and the wedge 2110 have been rotated about the pin assembly 2112 back into the upright position. The wedge 2110 can be flexible due to the slot 2236, and can conform to downrods 2118 having varying widths.

The cap 2114 can insert over the downrod 2118, and can thread about the pin assembly 2112 to secure around the wedge 2110 and the arms 2150. The tab 2124 can secure the cap 2114 in place, abutting the second base plate 2108, and securing at grooves 2252 on the cap 2114.

Figure 107:
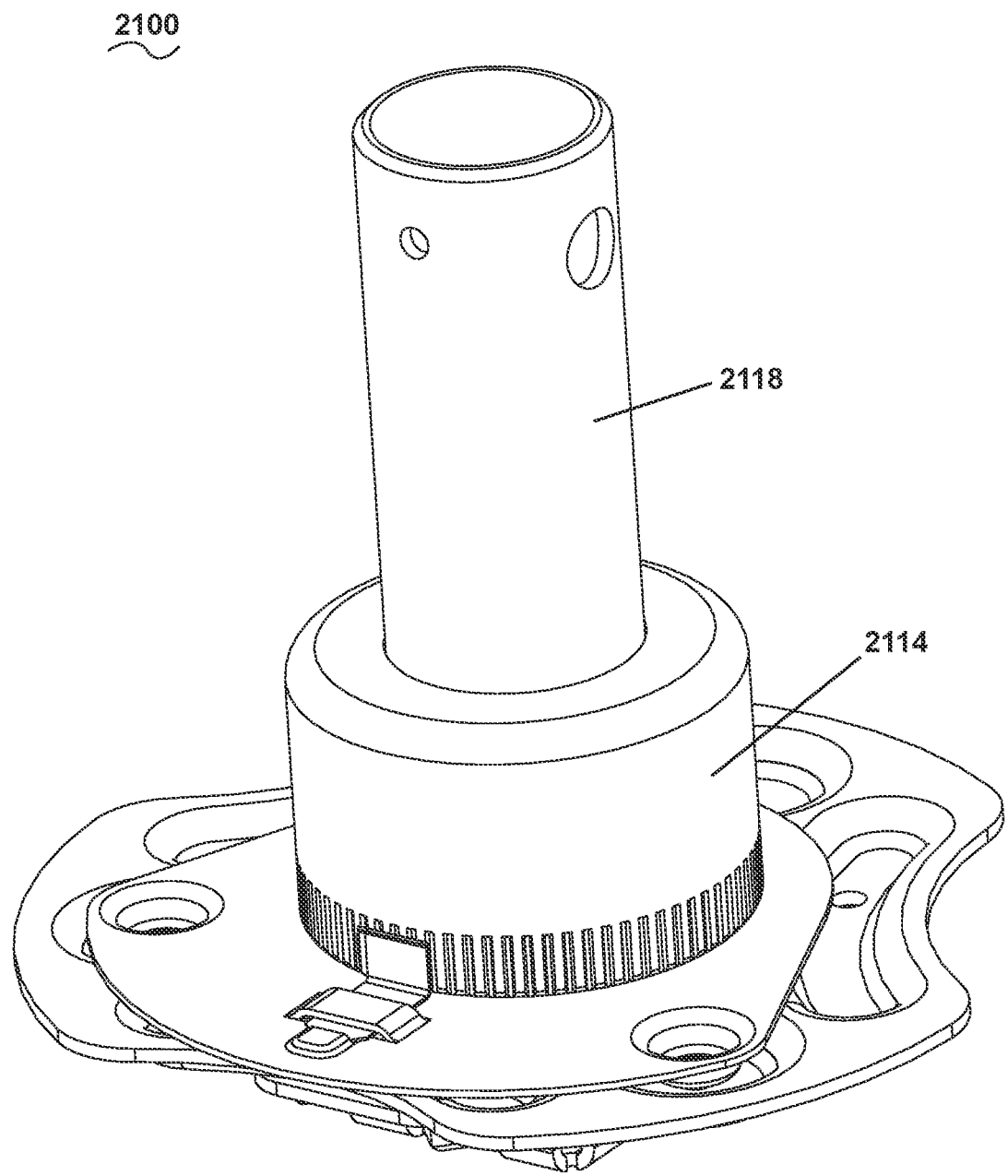
FIG. 107 is a completed view of the motor adapter assembly of FIG. 97.

Referring now to FIG. 107, continuing the assembly sequence of FIG. 106, the cap 2114 is moved to the final upright position, securing the downrod 2118 and the wedge 2110 in the upright position.

The motor adapter assembly 2100 provides for securing the downrod 2118 to the motor shaft 2116, while permitting pivoting movement of the downrod 2118 about the pin assembly 2112 during shipping, packaging, and display. Additionally, the wedge 2110 resists pivoting movement of the motor adapter assembly 2100 in the upright, installed position. Furthermore, the motor adapter assembly 2100 can be a wholly stamped assembly, manufactured only from stamped and shaped pieces.

Figure 108:
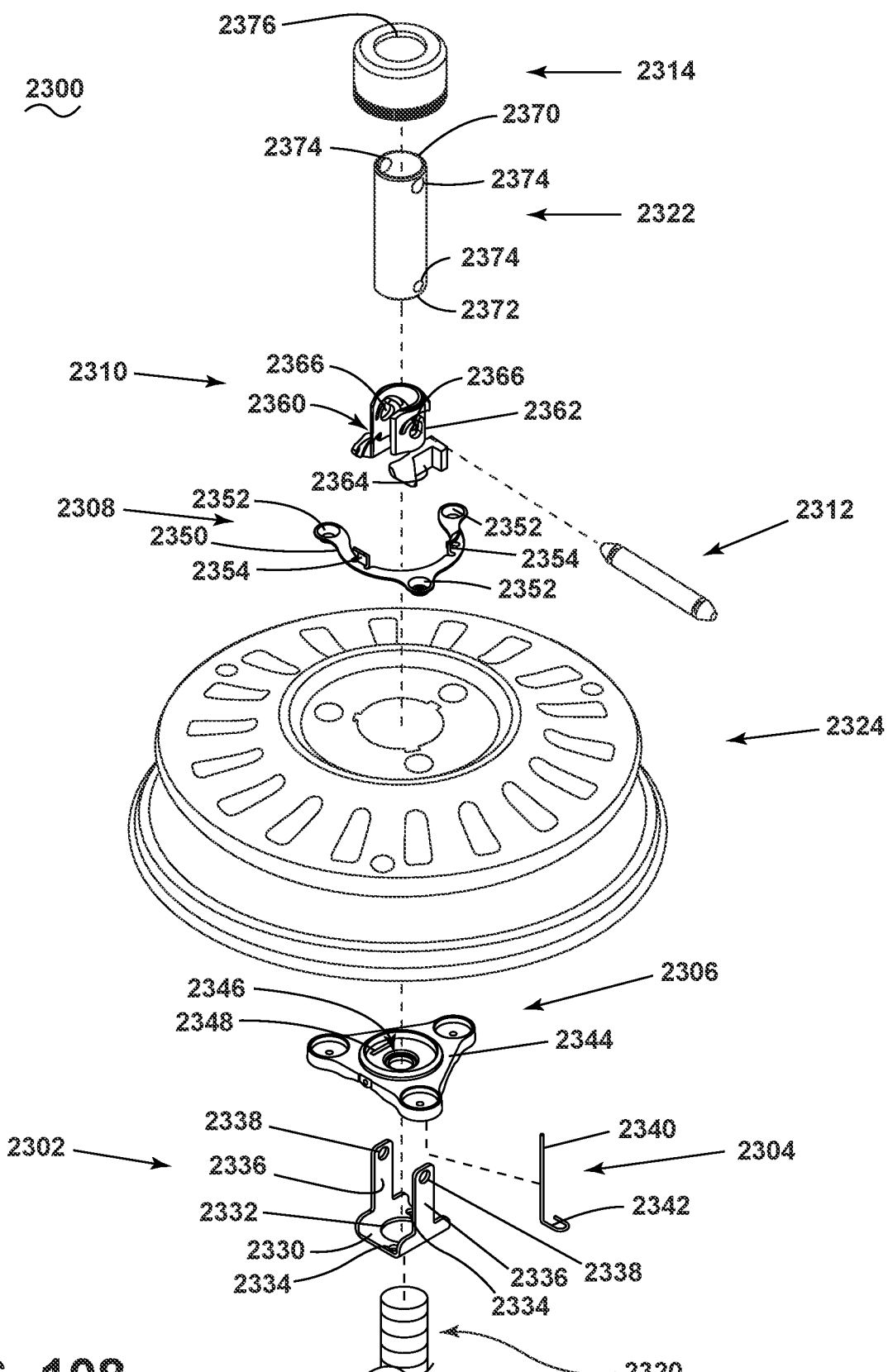
FIG. 108 is an exploded view of another motor adapter assembly.

Referring now to FIG. 108, a motor adapter assembly 2300 for a ceiling fan can include a cradle 2302, a spring member 2304, a base plate 2306, a securing plate 2308, a pivoting joint member 2310, a pin 2312, and a cap 2314, which can be used to secure a motor shaft 2320 to a downrod 2322 through a motor housing 2324. The cradle 2302 can include a bottom wall 2330 having a motor shaft aperture 2332 configured to receive the motor shaft 2320 and a pair of plate mount apertures 2334. A pair of arms 2336 extend from the bottom wall 2330 with a pair of pin apertures 2338. The cradle 2302 can be substantially similar to other cradles as described herein, such as the cradle 1502 of FIG. 60, for example, except that the cradle 2302 does not includes the notches 1562.

The spring member 2304 can include a rod portion 2340 and a hook portion 2342, and can be a bendable or partially deformable member, such as made of a soft metal, for example. The base plate 2306 can include a triangular body 2344 having a central shaft aperture 2346 with a pair of arm slots 2348 on either side of the central shaft aperture 2346. The base plate 2306 can be substantially similar to that of the base plate 1504 of FIG. 61, except that the relief portion 1590 is not included in the present base plate 2306. In this way, the central shaft aperture 2346 is substantially cylindrical.

The securing plate 2308 can include a body 2350 including a set of plate openings 2352 and a pair of cap tabs 2354. The pivoting joint member 2310 can include a body 2360 having an upper portion 2362 and a lower portion 2364, with a pair of pin openings 2366 provided in the upper portion 2362. The pin 2312 can be sized to insert through the pin openings 2366 in the upper portion 2362 of the pivoting joint member 2310.

The downrod 2322 can include an upper end 2370 and a lower end 2372, and can include a set of openings 2374. The cap 2314 can include a downrod opening 2376 sized to receive the downrod 2322. The cap 2314 can be substantially similar to other caps described herein, such as the cap 70 of FIGS. 2 and 3, for example.

Figure 109:
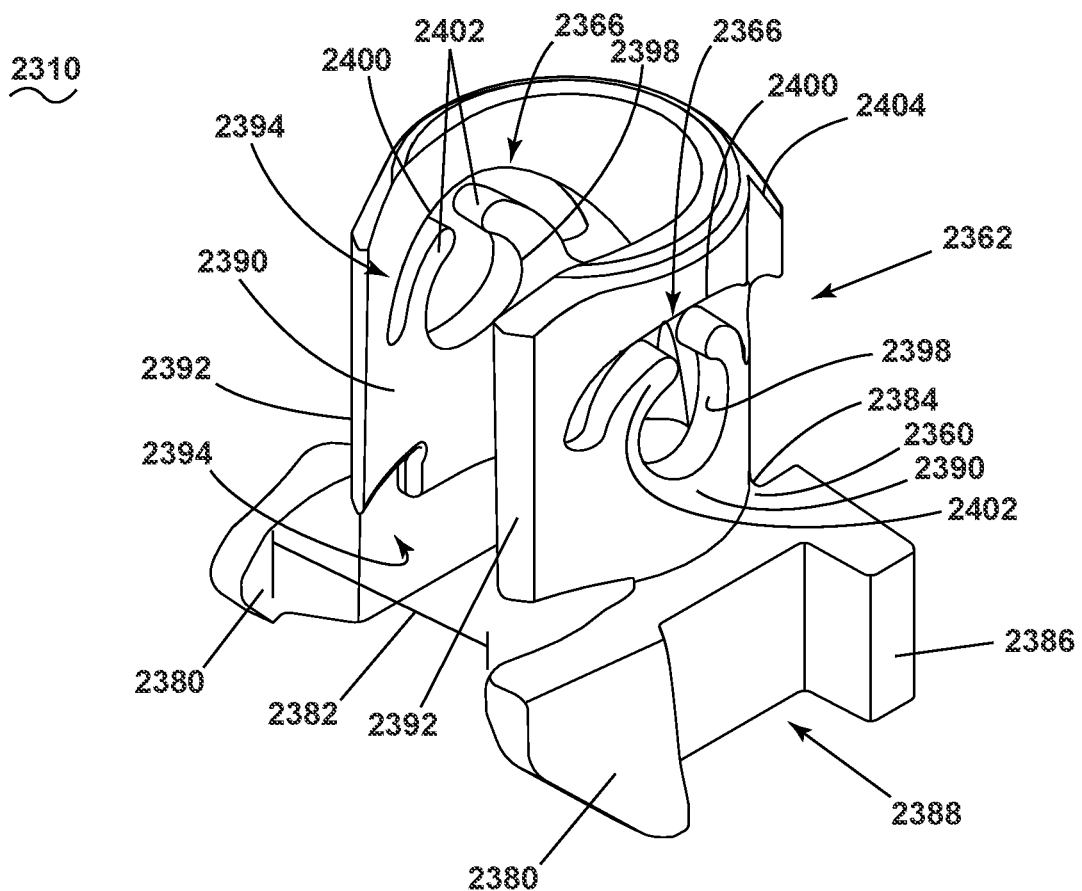
FIG. 109 is a perspective view of a pivoting joint member of the motor adapter assembly of FIG. 108.

Referring now to FIG. 109, the lower portion 2364 of the pivoting joint member 2310 includes a pair of pinch tabs 2380 spaced from one another by a gap 2382. A rear wall 2384 includes a pair of flanges 2386 extending from the rear wall 2384. One flange 2386 can be arranged complementary and spaced from one of the pinch tabs 2380, to define a channel 2388 between each pair of pinch tabs 2380 and flanges 2386, arranged on either side of the pivoting joint member 2310. The channel 2388 can be sized complementary to one of the arms 2336 of the cradle 2302 of FIG. 108.

The upper portion 2362 can include a peripheral wall 2390 having a substantially cylindrical shape, terminating at two ends 2392 defining a space 2394 between the ends 2392. The pin openings 2366 can be formed on opposing sides of the peripheral wall 2390, and can be vertically aligned with the channels 2388 of the lower portion 2364. Each pin opening 2366 can be two-part, including a pin portion 2398 having a substantially circular shape, and a flexion portion 2400, having an arcuate shape. The pin portion 2398 is partially connected to the flexion portion 2400, such that a pair of extensions 2402 are defined between areas of the pin portion 2398 and the flexion portion 2400 where they are unconnected. Additionally, a pair of upper flanges 2404 extend from the peripheral wall 2390, opposite of the ends 2392 relative to the apertures 2396.

Figure 110:
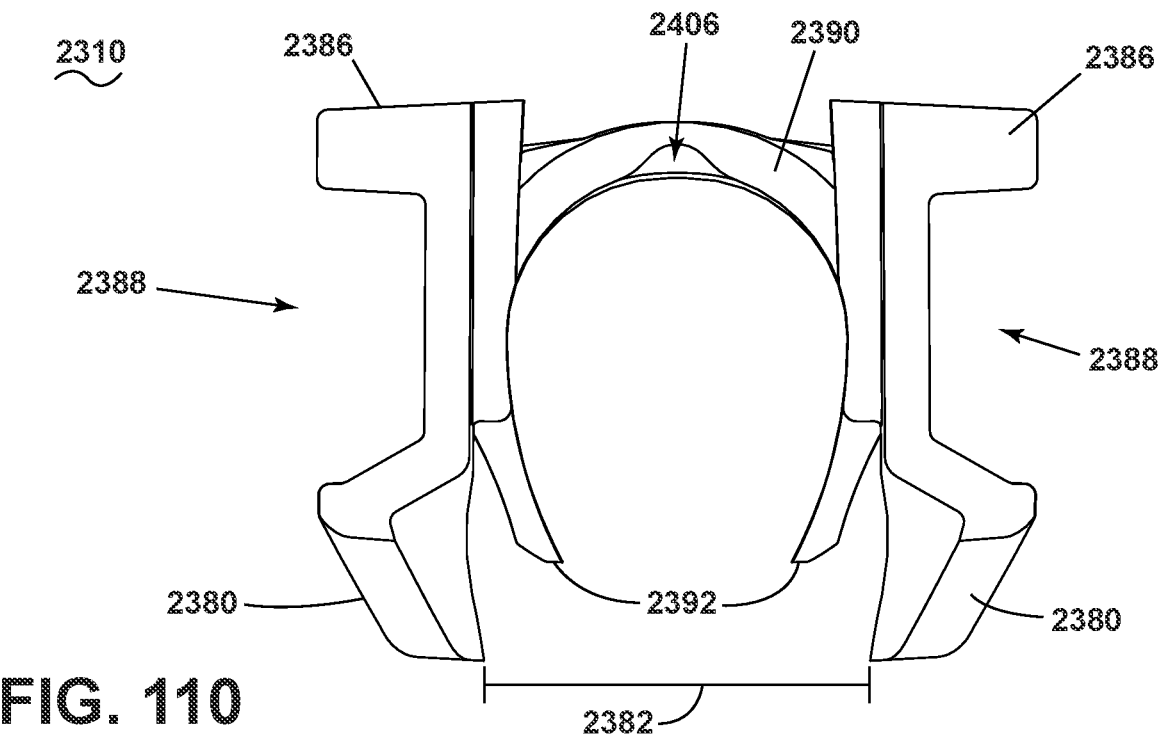
FIG. 110 is a bottom view of the pivoting joint member of FIG. 109 showing a concavity.

Referring now to FIG. 110, a bottom view of the pivoting joint member 2310 shows a concavity 2406 formed in the peripheral wall 2390. The concavity 2406 provides for reduced structural rigidity of the pivoting joint member 2310 to permit the peripheral wall 2390 to flex inwardly with reduced stress to the peripheral wall 2390 upon such flexion.

Figure 111:
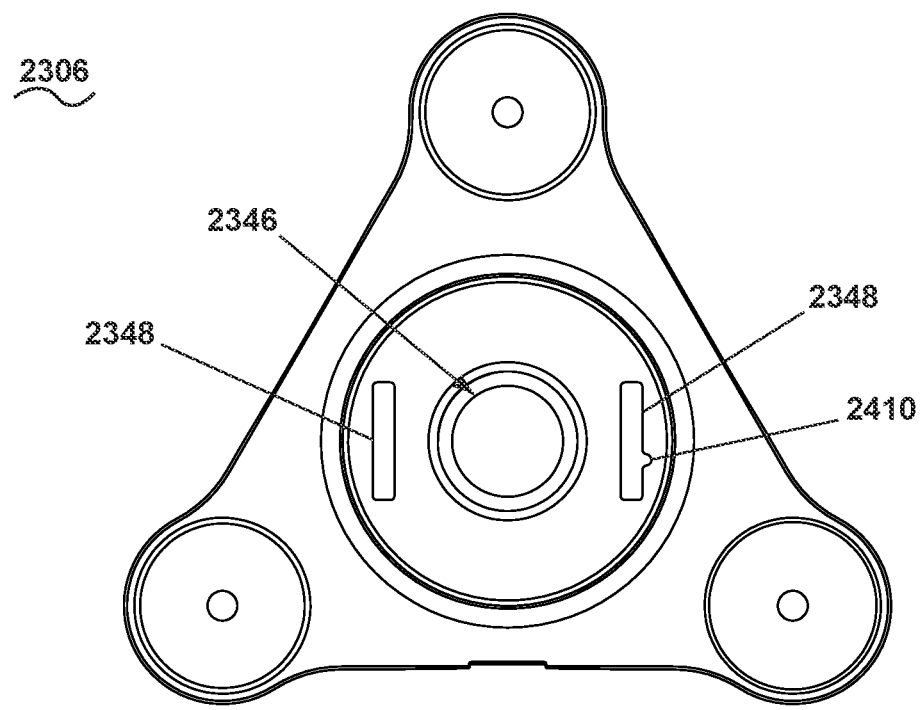
FIG. 111 is a top view of a base plate of the motor adapter assembly of FIG. 108.
Figure 112:
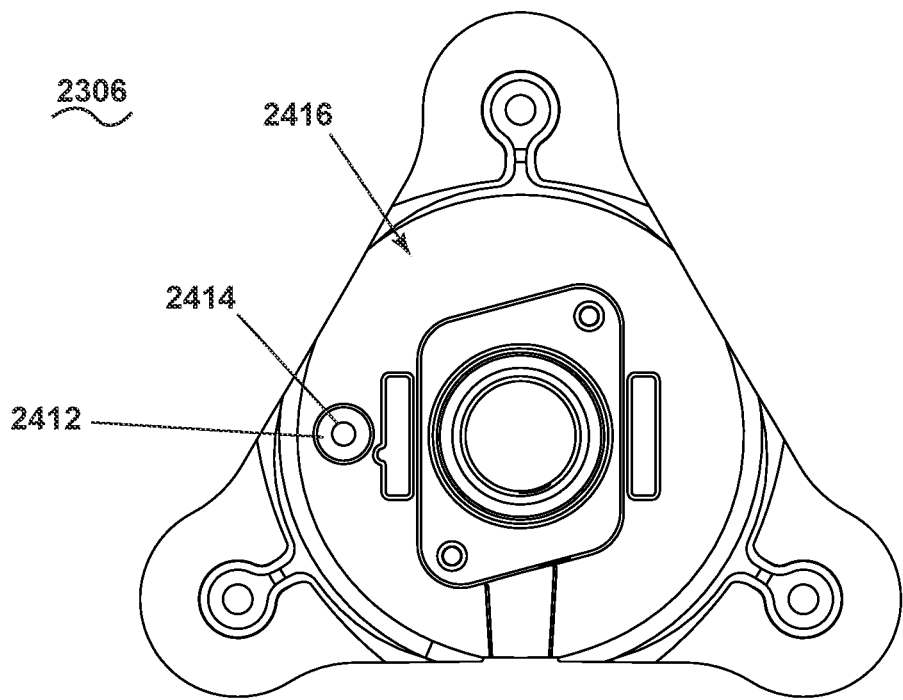
FIG. 112 is a bottom view of the base plate of FIG. 111.

Referring now to FIG. 111, the base plate 2306 can be substantially similar to the base plate 1504 of FIG. 61, except that the base plate 2306 does not include the relief portion 1590 and includes a substantially cylindrical central aperture 2346. Additionally, one slot 2348 includes a spring recess 2410, which can be sized to receive the rod portion 2340 of the spring member 2304. Referring to FIG. 112, showing a bottom view of the base plate 2306, a fastener protuberance 2412 with a fastener opening 2414 is formed in a bottom surface 2416, which can receive a fastener to secure to the hook portion 2342 of the spring member 2304.

Figure 113:
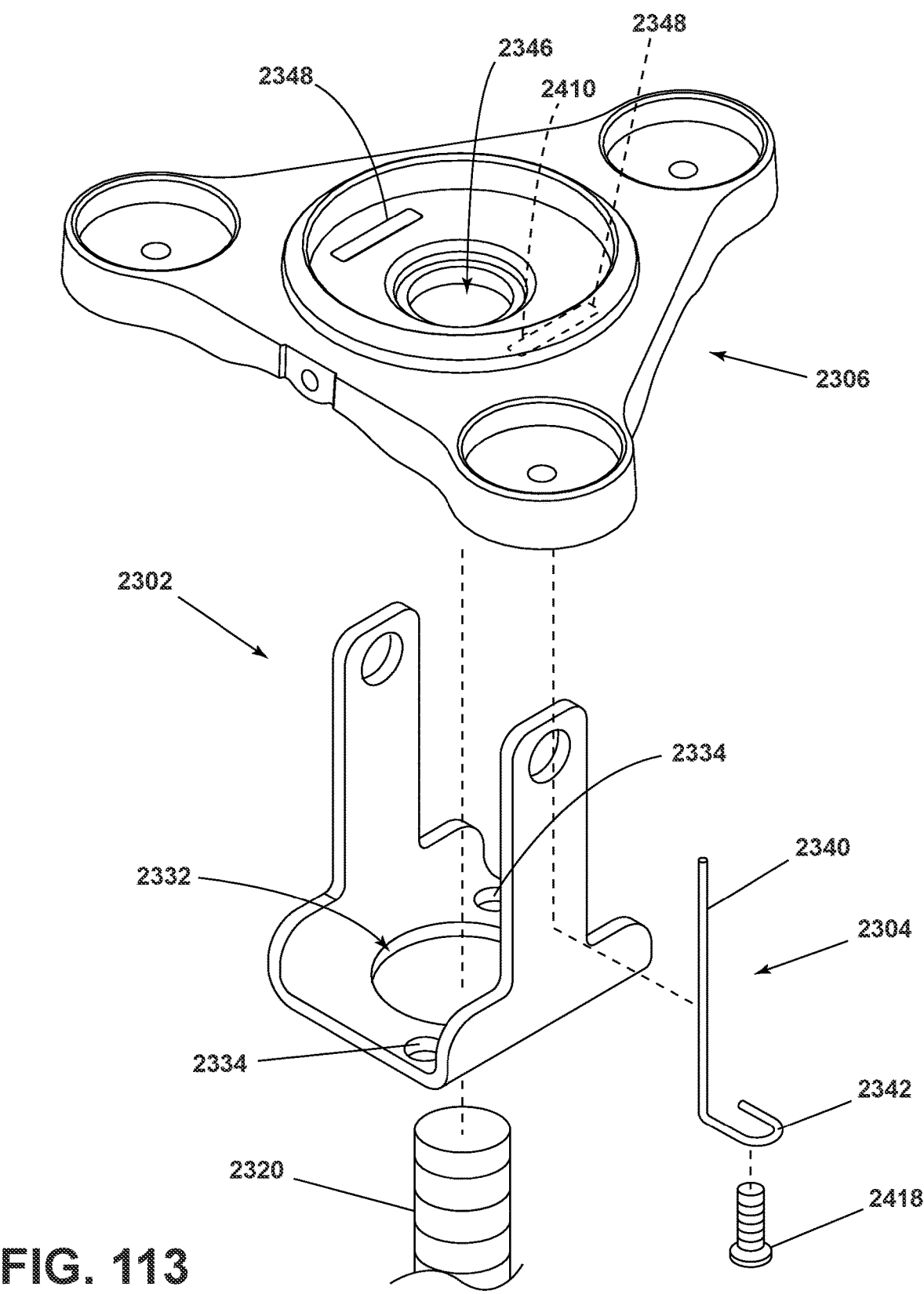
FIG. 113 is an exploded view illustrating an assembly sequence for the motor adapter assembly of FIG. 108.

FIGS. 113-116 illustrate an assembly sequence for the motor adapter assembly 2300, for coupling the motor shaft 2320 to the downrod 2322. Referring now to FIG. 113, the motor shaft 2320 can thread onto the base plate 2306 within the central shaft aperture 2346, or optionally, can be threaded to a nut secured in the cradle 2302, similar to that described in FIG. 77. The motor shaft 2320 can pass through the motor shaft aperture 2332 in the cradle 2302. The cradle 2302 can secure to the base plate 2306 with one or more fasteners (not shown) securing the plate mount apertures 2334 to the base plate 2306. The spring member 2304 can insert through the spring recess 2410 in one of the slots 2348 in the base plate 2306, where a fastener 2418 can secure the hook portion 2342 to the protuberance 2412 on the base plate 2306.

Figure 114:
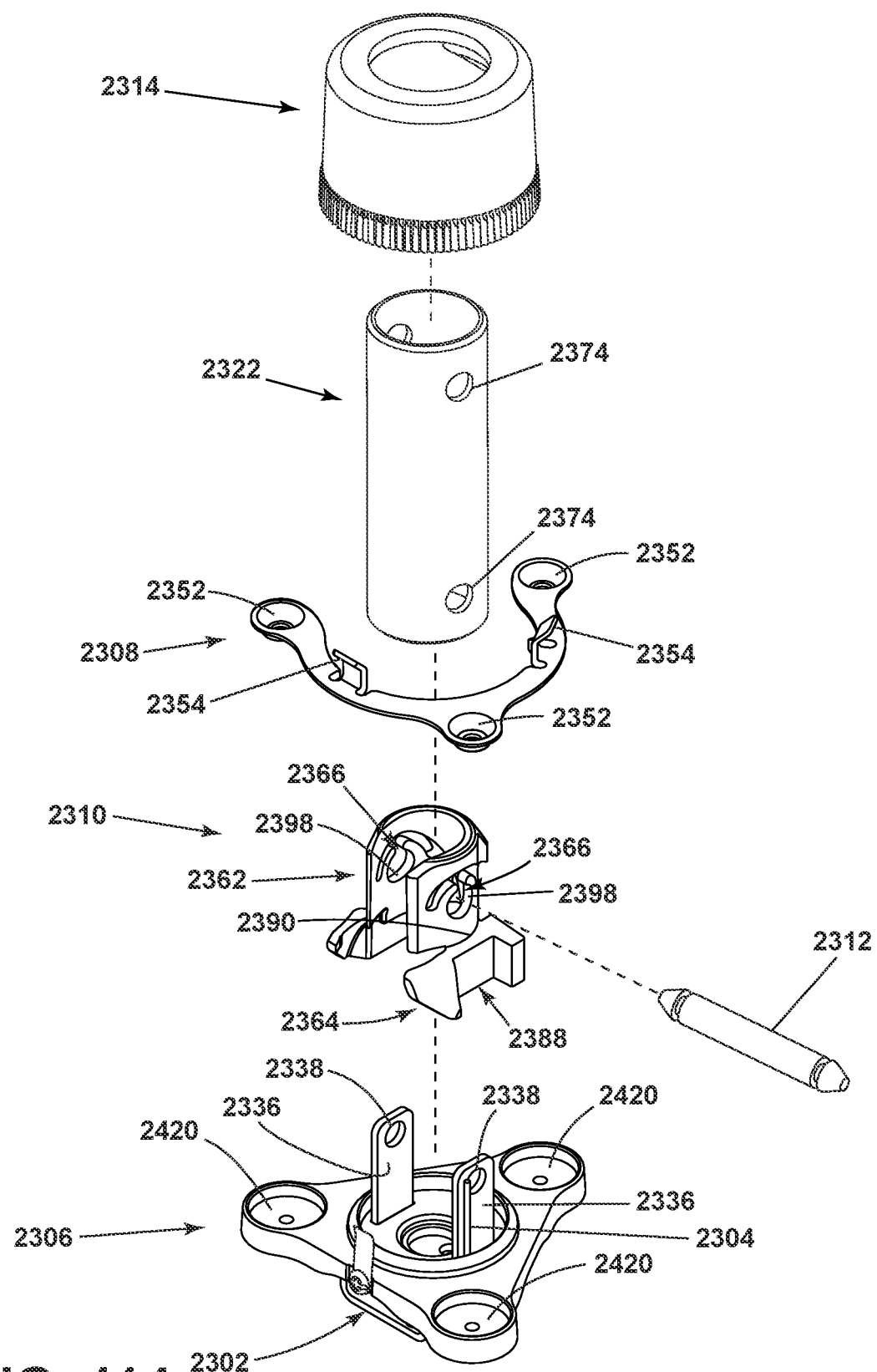
FIG. 114 is an exploded view of the motor adapter assembly continuing the assembly sequence of FIG. 113.

Referring now to FIG. 114, continuing the assembly sequence of FIG. 113, the pivoting joint member 2310 can slide between the arms 2336 of the cradle 2302 extending from the base plate 2306. The arms 2336 position within the channels 2388 on either side of the lower portion 2364 and aligning the pin apertures 2338 of the arms 2336 with the pin portion 2398 of the pin openings 2366 on the pivoting joint member 2310.

The downrod 2322 can insert around the peripheral wall 2390 of the upper portion 2362 of the pivoting joint member 2310, between the pivoting joint member 2310 and the arms 2336, aligning the openings 2374 in the downrod 2322 with the pin portion 2398 of the pin openings 2366. The pin 2312 can insert through the pin apertures 2338 on the arms 2336, the pin portion 2398 of the pin openings 2366 in the pivoting joint member 2310, and the downrod openings 2374 in the downrod 2322 to fasten the downrod 2322 to the pivoting joint member 2310 and the cradle 2302. In this way, the pivoting joint member 2310 and the downrod 2322 can pivot about the pin 2312 relative to the cradle 2302 and the base plate 2306.

The securing plate 2308 can couple to the base plate 2306, securing the plate openings 2352 on the securing plate 2308 to motor housing apertures 2420 on the base plate 2306. The motor housing 2324 has been omitted from FIG. 114 for clarity, but can be secured between the securing plate 2308 and the base plate 2306. Additionally, the cap 2314 can secure around the downrod 2322 and thread about the pin 2312, and can secure to the securing plate 2308 at the tabs 2354 in a ratcheting manner. Actuation of the tabs 2354 can be used to release the cap 2314.

Figure 115:
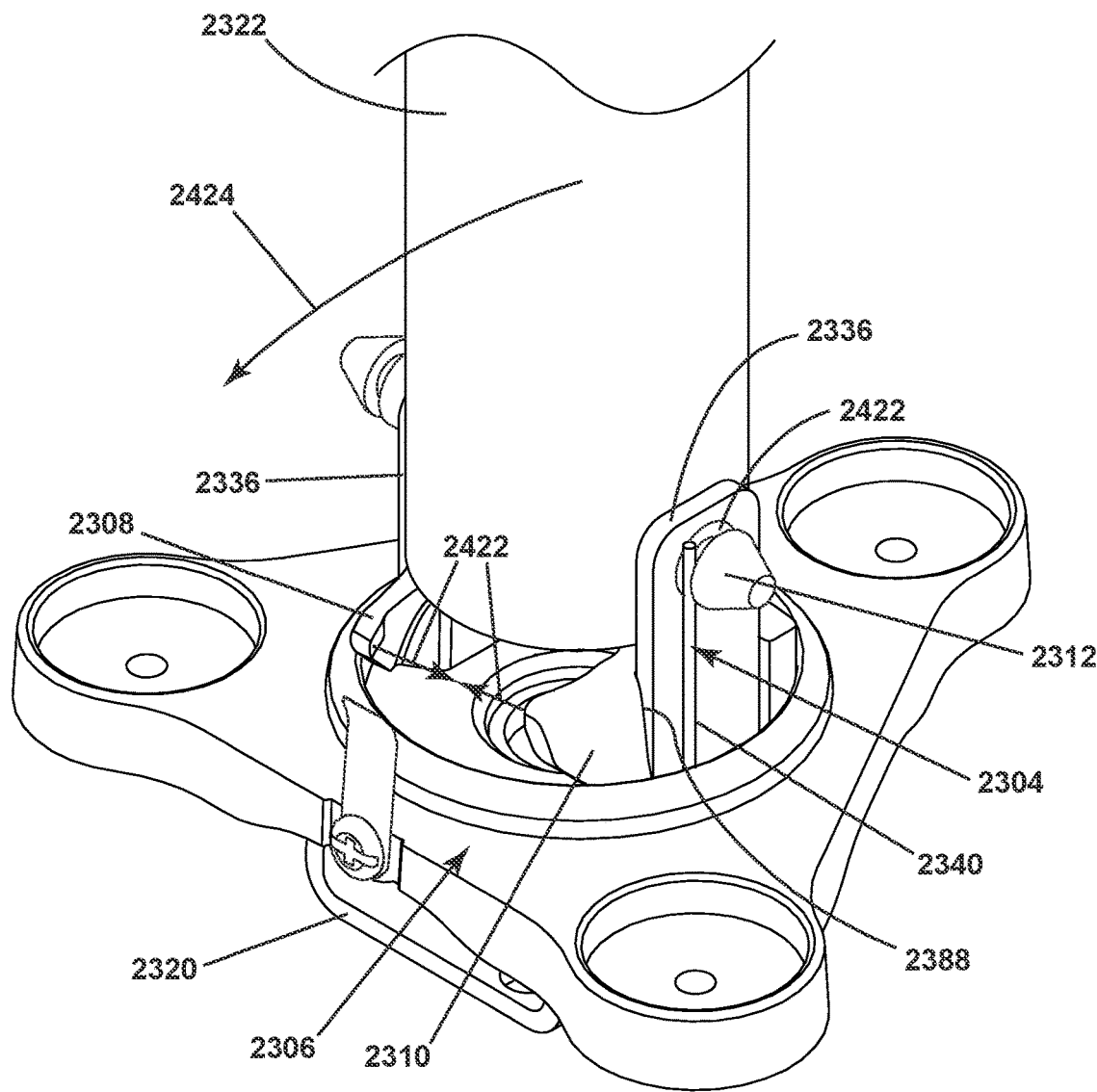
FIG. 115 is an enlarged view of the motor adapter assembly continuing the assembly sequence of FIG. 114 and having a cap, motor housing, and securing plate removed for clarity.

Referring now to FIG. 115, the downrod 2322 is pivotably fastened to the cradle 2302 via the pin 2312. The pin 2312 is secured within the downrod 2322, the pivoting joint member 2310, and the cradle 2302 with the rod portion 2340 of the spring member 2304 positioned within a channel 2423 of the pin 2312, preventing movement of the pin 2312 into or out of the cradle 2302, the pivoting joint member 2310, and the downrod 2322.

The arms 2336 are positioned within the channel 2388 of the pivoting joint member 2310, locking the upright position of the downrod 2322 via the pivoting joint member 2310. More specifically, the peripheral wall 2390 of the pivoting joint member 2310 secures the downrod 2322 relative to the position of the pivoting joint member 2310. In this way, the arms 2336 maintain the upright position of the pivoting joint member 2310 and therefore, the downrod 2322. To permit pivoting movement of the downrod 2322 and the pivoting joint member 2310, a user can pinch and squeeze the pinch tabs 2380 towards one another, as indicated by arrows 2422, moving the channels 2388 away from the arms 2336, permitting the downrod 2322 to pivot about the pin 2312, as indicated by arrow 2424. The pinch tabs 2380 can include an angled surface, permitting them to slide along the arms 2336 and move or pinch inwardly when arranging the downrod 2322 in the upright position from a pivoted position. In this way, the user need not pinch the pinch tabs 2380 when changing from a pivoted position to an upright position, and can provide for a click-lock style of orienting the downrod 2322 in the upright position, with the arms 2336 locking into the channels 2388.

Figure 116:
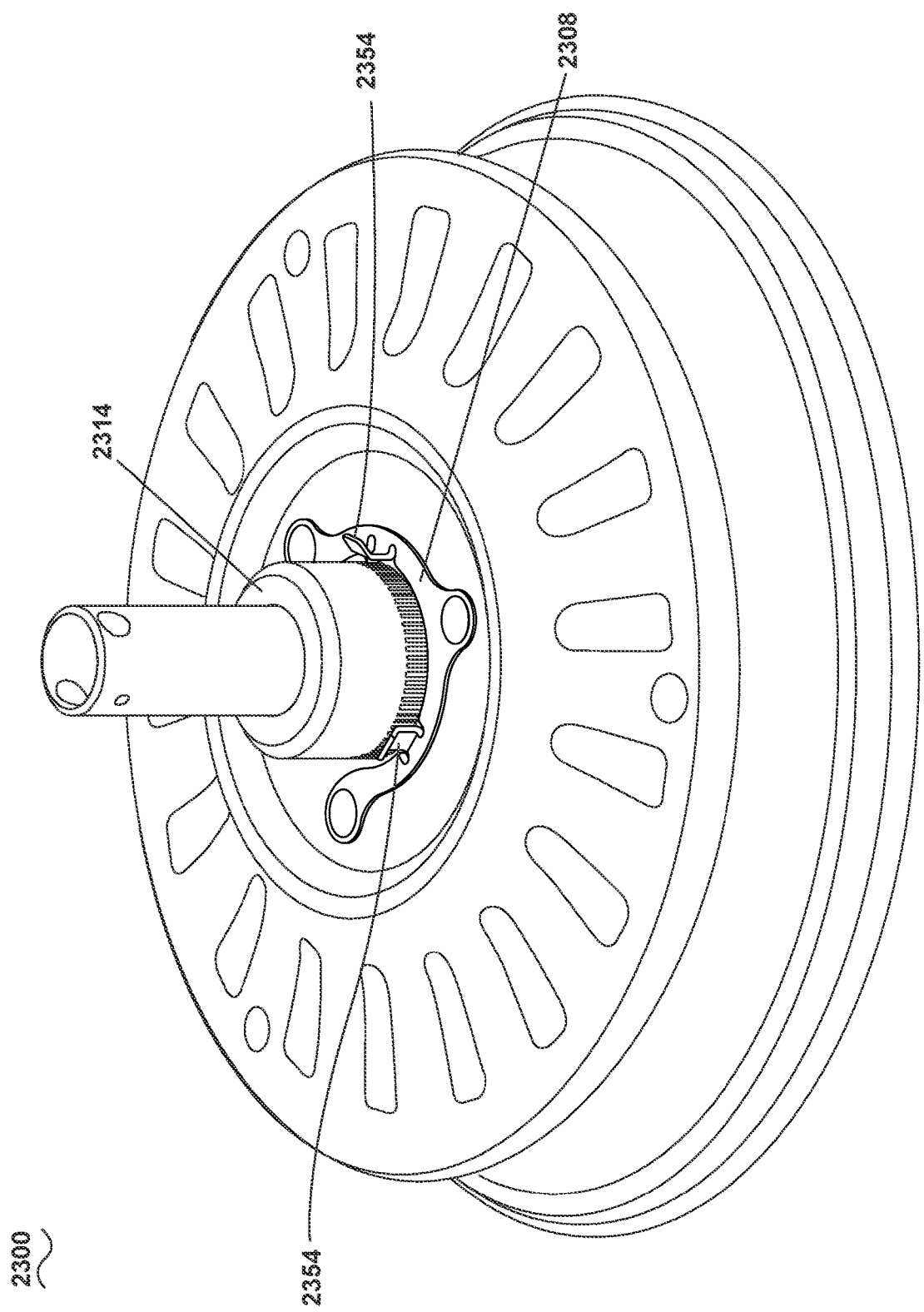
FIG. 116 is a view of the completed motor adapter assembly of FIG. 108 including the cap, motor housing, and securing plate.

Referring now to FIG. 116, the motor adapter assembly 2300 is shown in the final installed position, with the cap 2314 locked to the securing plate 2308 at the tabs 2354. The securing plate 2308 is visible on the top of the motor housing 2324, which can be secured to the base plate 2306 hidden interior of the motor housing 2324 as shown. In this way, the motor adapter assembly 2300 provides for facilitating of coupling a motor shaft to a downrod, while providing the potential for pivoting movement and pivoted storage of the motor adapter assembly 2300 during packaging, shipping, or sale. In this way, space can be conserved, while providing for an assembly that is ready to install and user friendly.

Figure 117:
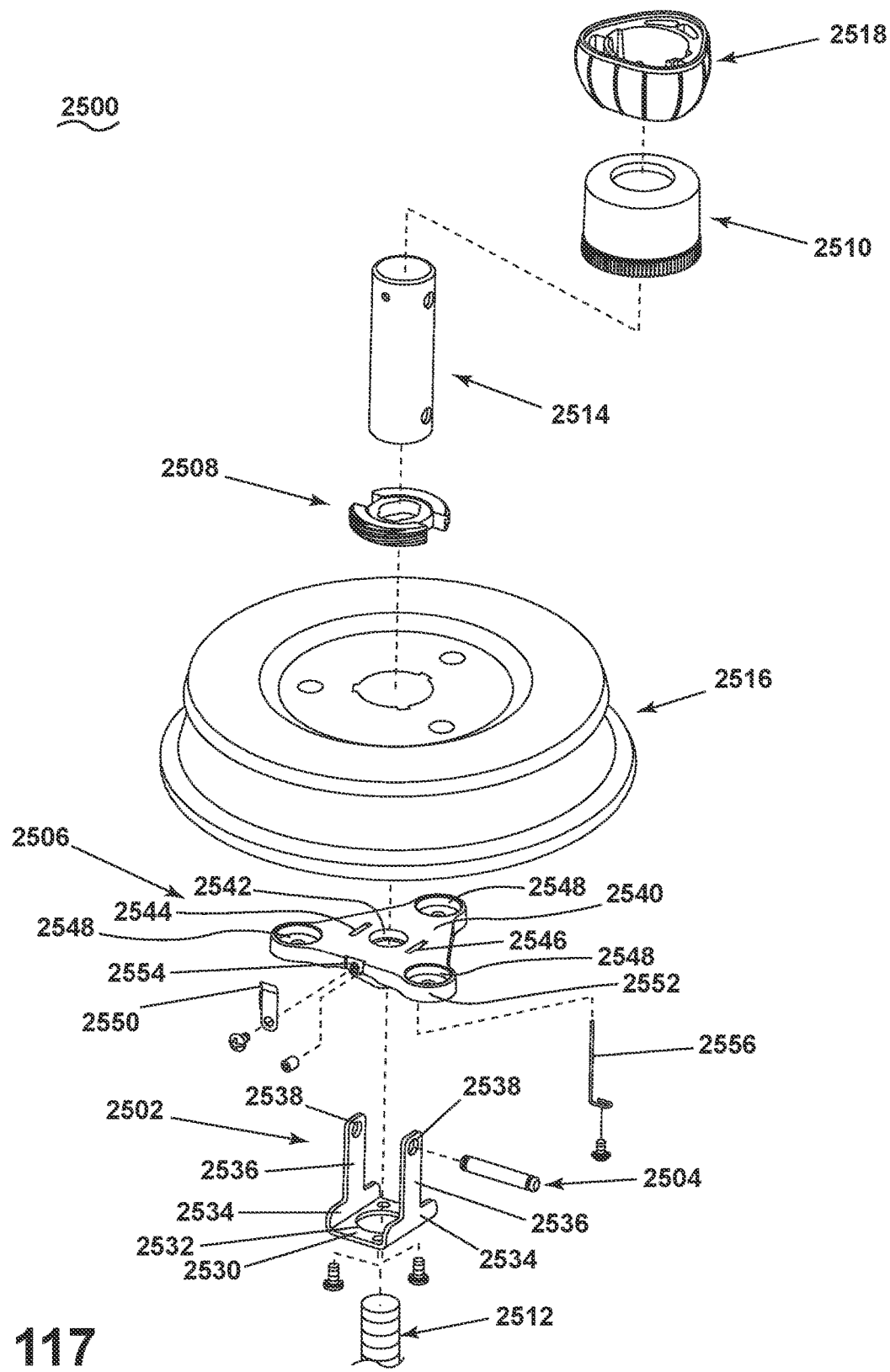
FIG. 117 is an exploded view of another motor adapter assembly.

Referring now to FIG. 117, a motor adapter assembly 2500 can include a cradle 2502, a pin 2504, a base plate 2506, a bushing 2508, and a cap 2510. The motor adapter assembly 2500 can be used to couple a motor shaft 2512 of a ceiling fan motor assembly (not shown) to a downrod 2514. A motor housing 2516 for housing the ceiling fan motor assembly can also be coupled to the motor adapter assembly 2500. A ball mount 2518 can couple to the downrod 2514 opposite of the motor adapter assembly 2500 for suspending the downrod 2514, and therefore the ceiling fan, from a ceiling or structure.

The cradle 2502 can be substantially similar to the cradle of FIG. 108, for example, or can be similar to other cradles as described herein. The cradle 2502 can include a bottom wall 2530, including a motor shaft aperture 2532, with two opposing side walls 2534 extending from the bottom wall 2530. A pair of arms 2536 extend from the side walls 2534 with an arm aperture 2538 in each arm 2536.

The base plate 2506 can be substantially similar to the base plate of FIG. 108, except that a top wall 2540 is flat. The base plate 2506 includes a central shaft aperture 2542, a pair of slots 2544 with one slot including a channel 2546, and a set of housing mounts 2548. A tab 2550 can secure to a side 2552 of the base plate 2506 at a tab recess 2554. A spring pin 2556 can insert through the channel 2546 in the slot 2544 and secure to the bottom of the base plate 2506 with a fastener. The spring pin 2556 can be substantially similar to the spring member 2304 of FIG. 108, for example.

Figure 118:
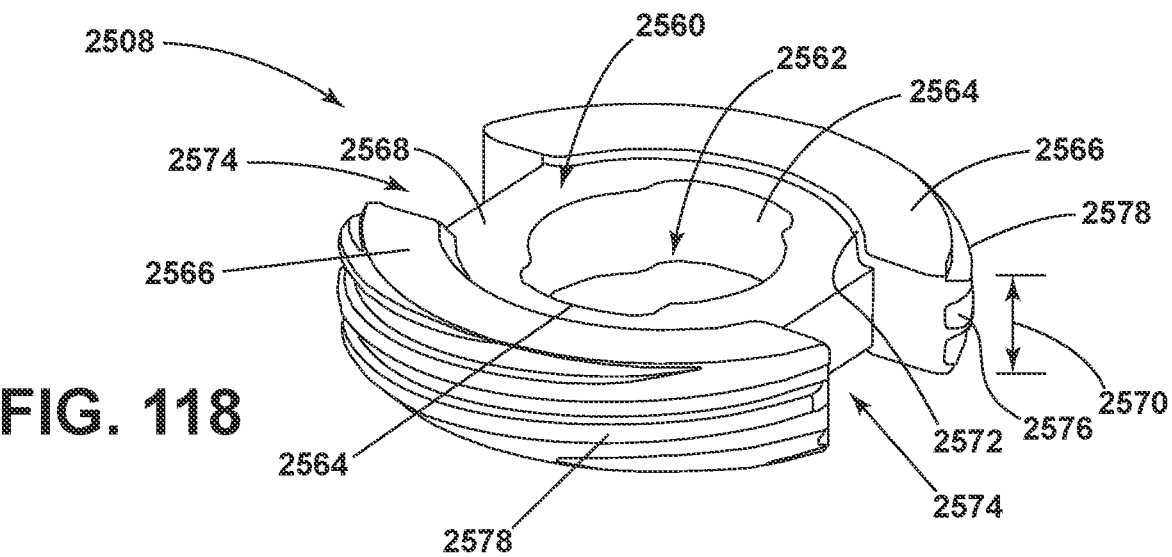
FIG. 118 is a perspective view of a bushing of the motor adapter assembly of FIG. 117.

Referring now to FIG. 118, the bushing 2508 can include a body 2560 having a central opening 2562. The central opening 2562 can be substantially annular, with a pair of notches 2564 formed in the central opening 2562. A pair of curved, shoulders 2566 can be formed as a portion of the body 2560, extending from a central portion 2568 of the body 2560 in which the central opening 2562 is provided. The shoulders 2566 can include a thickness 2570 that is greater than that of the central portion 2568, defining a lip 2572 at the junction between the shoulders 2566 and the central portion 2568 of the body 2560. The shoulders 2566 extend only partially around the central portion 2568 of the body 2560, defining a pair of channels 2574 between the shoulders 2566 with and exterior of the central portion 2568. Furthermore, the shoulders 2566 can include an exterior sidewall 2576 which is threaded 2578. In one example, the threads 2578 can be a quadruple-start acme thread, such as having a 29-degree thread face angle. The quadruple-start thread 2578 permits ease of threading when a user is installing the motor adapter assembly 2500.

Figure 119:
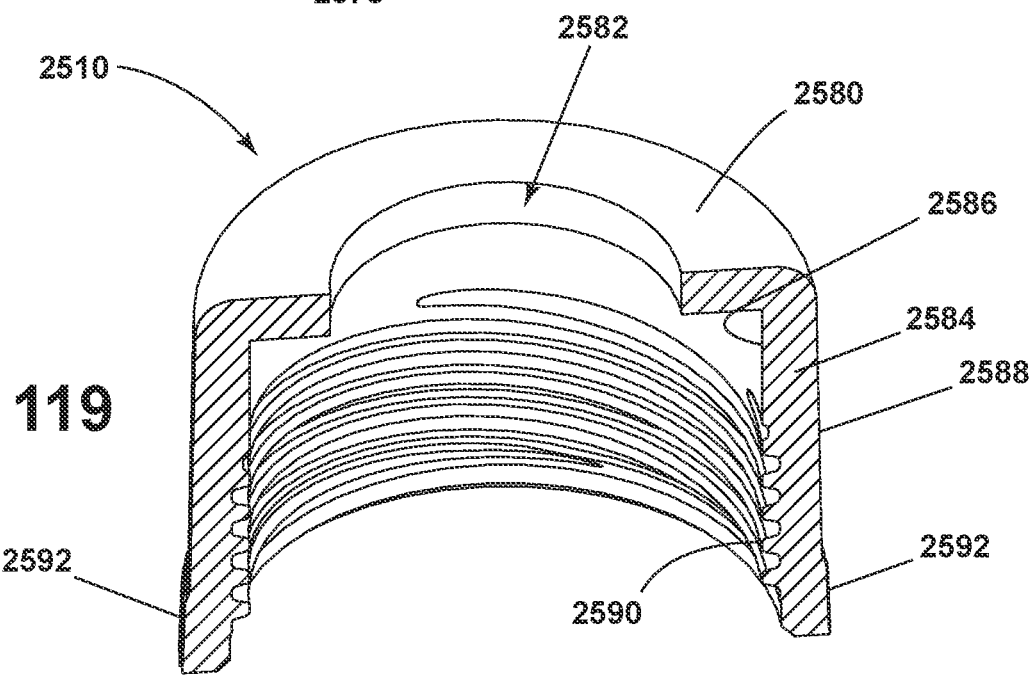

Referring now to FIG. 119, the cap 2510 can include a top wall 2580 with a downrod aperture 2582. A sidewall 2584 extends from the top wall 2580 having an interior surface 2586 and an exterior surface 2588. A set of threads 2590, complementary to the threads 2578 on the shoulders 2566 of the bushing 2508, can be formed on the interior surface 2586, configured to thread to the bushing 2508. Additionally, a set of teeth 2592 can be provided on the exterior surface 2588 at a bottom of the sidewall 2584, configured to secure to the tab 2550 of FIG. 117 in a ratcheting manner.

Figure 120:
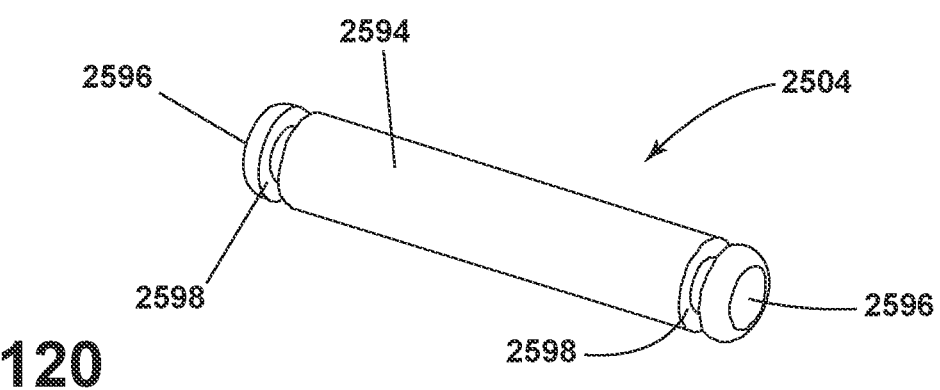

Referring now to FIG. 120, the pin 2504 includes a body 2594 having opposing ends 2596. A pair of grooves 2598 are provided in the body 2594, spaced from the opposing ends 2596, and can be sized complementary to the spring pin 2556 of FIG. 117. The opposing ends 2596 can be somewhat truncated, or shortened, particularly in comparison to other pins as described herein, to permit the cap 2510 to rotate around the pin 2504 without contacting the pin 2504.

Figure 121:
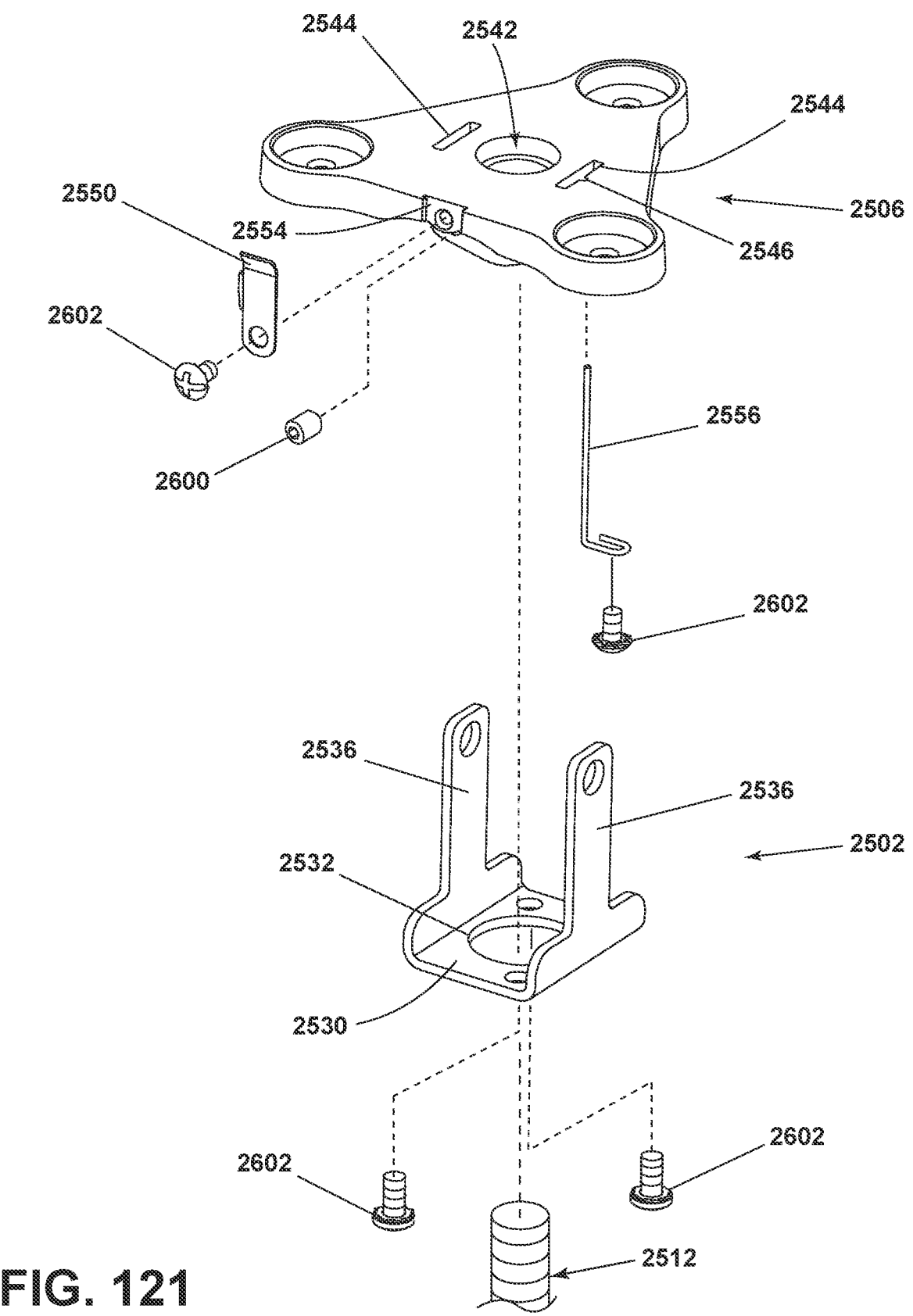

Referring now to FIG. 121-125, an assembly sequence for the motor adapter assembly 2500 can be described. Referring to FIG. 121 in particular, the motor shaft 2512 can insert through the motor shaft aperture 2532 in the cradle 2502 and can secure to the base plate 2506, such as threading into the base plate 2506, for example. A set screw 2600 or other fastener can be used to secure the motor shaft 2512 within the central shaft aperture 2542 of the base plate 2506.

The arms 2536 of the cradle 2502 can insert through the slots 2544 of the base plate 2506 until the bottom wall 2530 abuts the bottom of the base plate 2506. Fasteners 2602 can be used to secure the cradle 2502 to the base plate 2506. The spring pin 2556 can insert through the channel 2546 in one slot 2544, arranged next to one of the arms 2536 of the cradle 2502. Another fastener 2602 can secure the spring pin 2556 to the base plate 2506. Additionally, yet another fastener 2602 can secure the tab 2550 to the base plate 2506 at the tab recess 2554.

Figure 122:
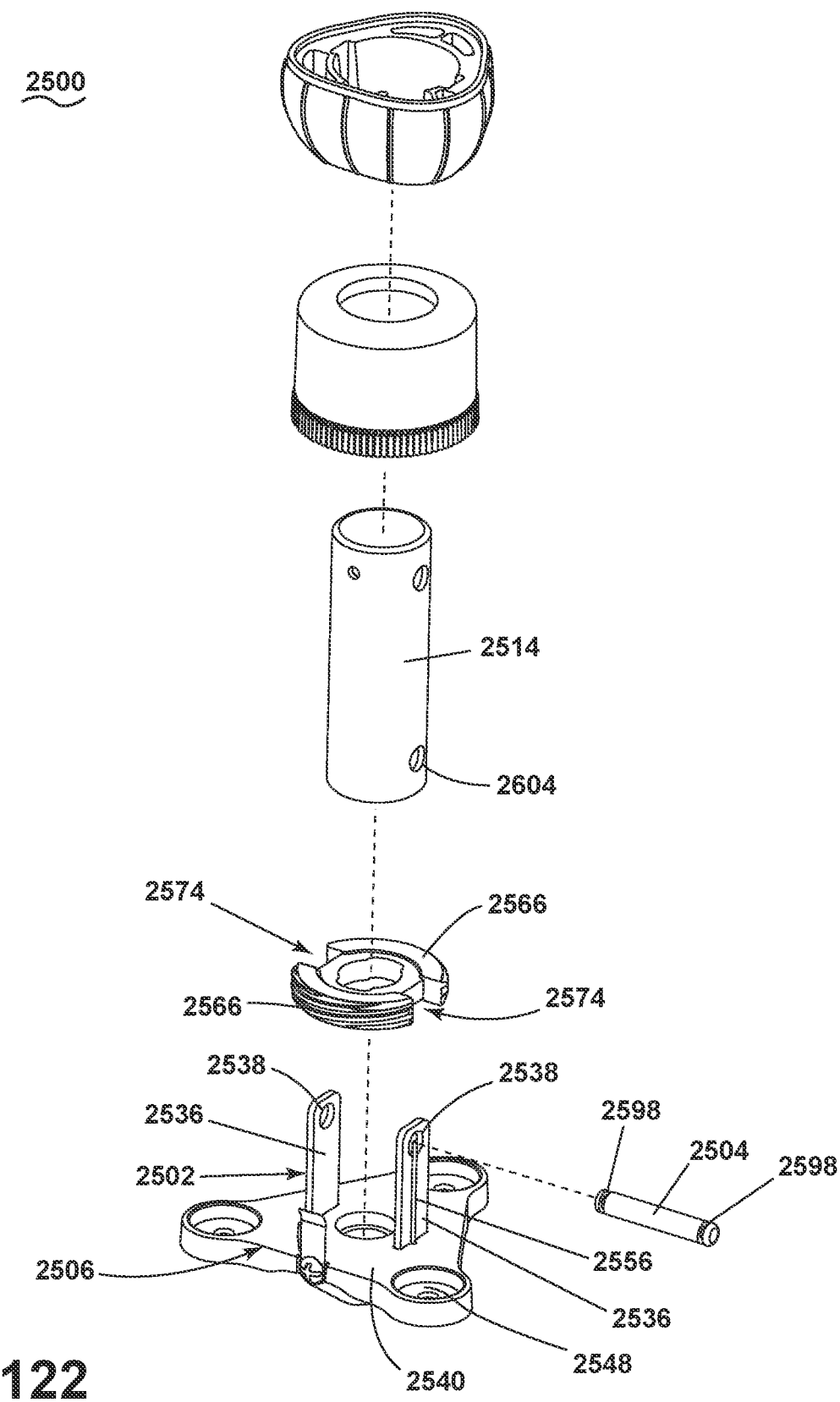

Referring now to FIG. 122, continuing the assembly sequence of FIG. 121, the arms 2536 of the cradle 2502 extend above the top wall 2540 of the base plate 2506. Optionally, the motor housing (not shown), such as the motor housing 2516 of FIG. 117, can fasten to the base plate 2506 at the housing mounts 2548. The bushing 2508 can insert between the arms 2536 of the cradle 2502, positioning the arms 2536 within the channels 2574 between the shoulders 2566 of the bushing 2508. Once inserted, the bushing 2508 rests on the top wall 2540 of the base plate 2506.

The downrod 2514 can insert between the arms 2536 of the cradle 2502, aligning apertures 2604 of the downrod 2514 with the arm apertures 2538 of the cradle 2502. The pin 2504 can insert through the arm apertures 2538 of the arms 2536, and through the apertures 2604 of the downrod 2514 to secure the downrod 2514 to the motor adapter assembly 2500. The spring pin 2556 can insert into one groove 2598 of the pin 2504 to secure the pin within the downrod 2514 and the cradle arms 2536. In this assembled position, the downrod 2514 can pivot relative to the cradle arms 2536 about the pin 2504.

Figure 123:
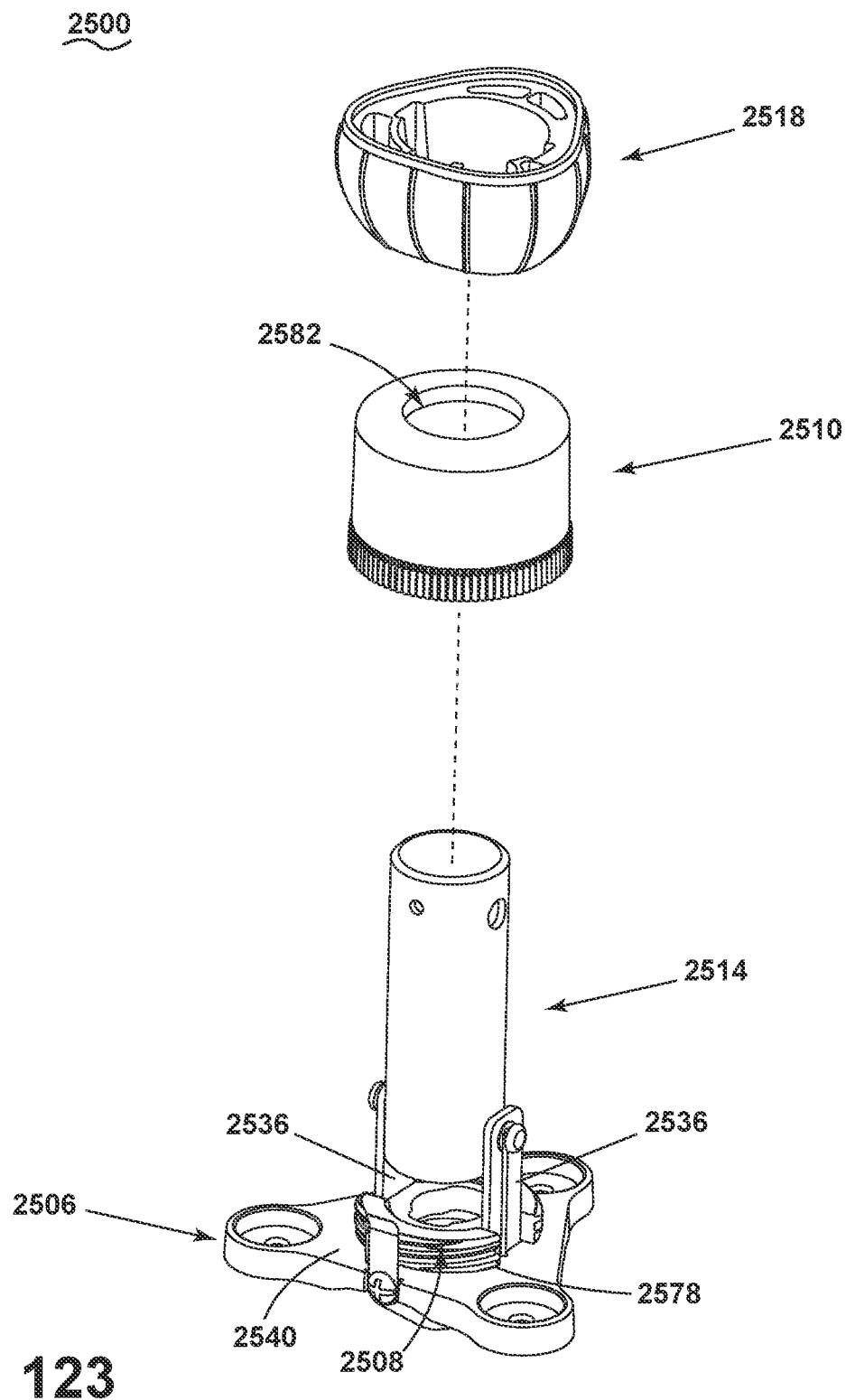

Referring now to FIG. 123, continuing the assembly sequence of FIG. 122, the cap 2510 can insert over the downrod 2514, inserting the downrod 2514 through the downrod aperture 2582 in the cap 2510 until the cap 2510 rests on the bushing 2508. Additionally, the ball mount 2518 can secure to the downrod 2514 opposite of the cradle arms 2536.

Once the cap 2510 abuts the bushing 2508, the cap 2510 can be turned or rotated. Rotation of the cap 2510 threads the cap 2510 about the bushing 2508, threading the threads 2578 of the bushing into the threads 2590 on the cap 2510. Such threading lowers the cap 2510 toward the top wall 2540 of the base plate 2506, while raising the bushing 2508 away from the top wall 2540 of the base plate 2506.

Figure 124:
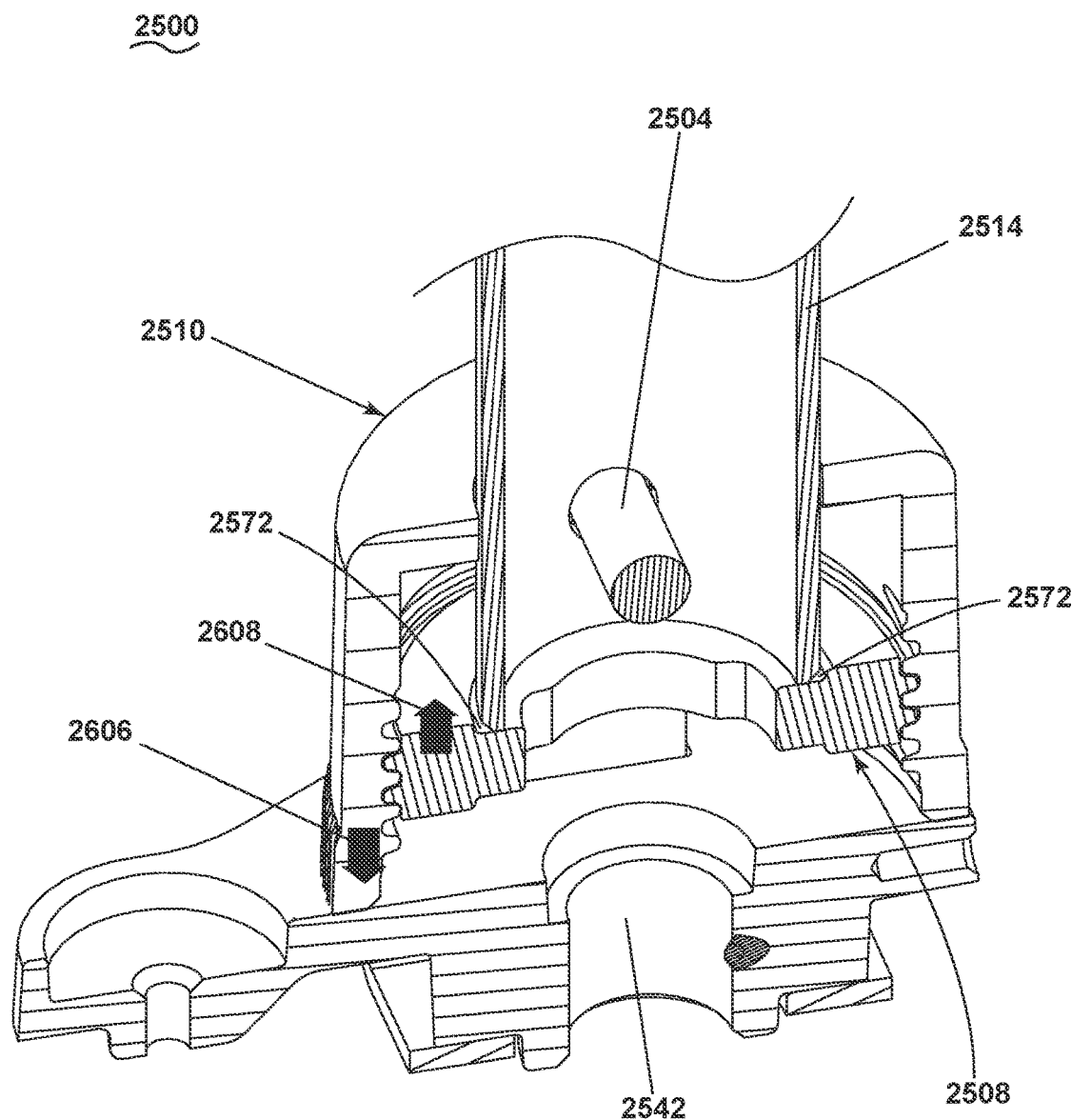

Referring now to FIG. 124, continuing the assembly sequence of FIG. 123, rotation of the cap 2510 about the bushing 2508 lowers the cap 2510 to the base plate 2506, as illustrated by arrow 2606, while raising the bushing 2508, as illustrated by arrow 2608. The bushing 2508 is raised until it abuts the downrod 2514, effectively seating the downrod 2514 at the lip 2572 of the bushing 2508. In this way, the bushing 2508 provides a compression fit for the downrod 2514 with the pin 2504, and secures the downrod 2514 in the upright position. The height of the lip 2572 prevents pivoting of the downrod 2514 about the pin 2504 to secure the downrod 2514 in the upright position. Additionally, the lip 2572 can be sized to industry standard downrods, including but not limited to threaded downrods, unthreaded downrods, and tapered downrods, for example. In this way, the motor adapter assembly 2500 provides for use with any ceiling fan or downrod, and can be used to retrofit current ceiling fans or substitute different downrods. Tightening of the cap 2510 tightens the bushing 2508 against the downrod 2514, which also minimizes vibration or rattling at the motor adapter assembly 2500. Such tightening provides for removing any "slack" from the assembly, where slack can be described as a loose or non-snug fit. It is further contemplated that a gasket can be utilized between any of the junctions of the separate elements of the motor adapter assembly 2500, such as between the bushing 2508 and the downrod 2514, to further reduce vibration. Additionally, a seal, such as silicone, can be provided at any junction as well as within the central shaft aperture 2542 of the base plate 2506 to provide for water resistance as well as a water rating for the motor adapter assembly 2500 and respective ceiling fan.

When a user wants to disassemble the motor adapter assembly 2500, the cap 2510 can be rotated in the opposite direction, loosening the compression between the bushing 2508 and the downrod 2514. This loosening permits removal of the cap 2510 and pivoting movement of the downrod 2514 about the pin 2504.

Figure 125:
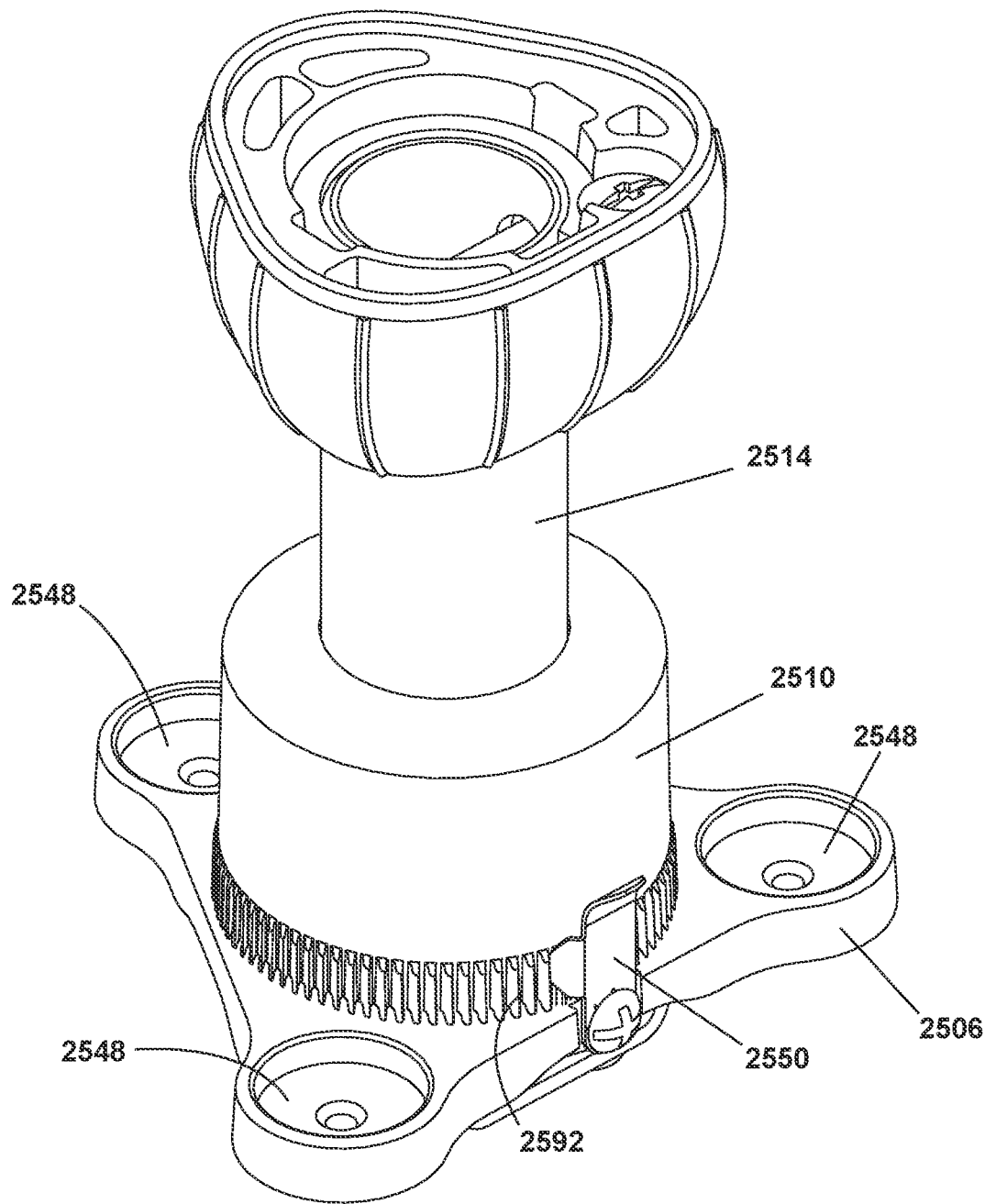

FIG. 125 can continue the assembly sequence of FIG. 124 depicting the completed motor adapter assembly 2500 orienting the downrod 2514 in the upright position. The tab 2550 secures the cap 2510 at the teeth 2592 to prevent loosening of the cap 2510 during use of the fan. To remove the cap 2510, the user can depress the tab 2550 and rotate the cap 2510. Additionally, it should be appreciated that FIG. 125 is shown without a motor housing 2516 for clarity, but it should be appreciated that a motor housing can mount to the base plate 2506 between the cap 2510 and the base plate 2506, and can secure at the housing mounts 2548.

Figure 126:
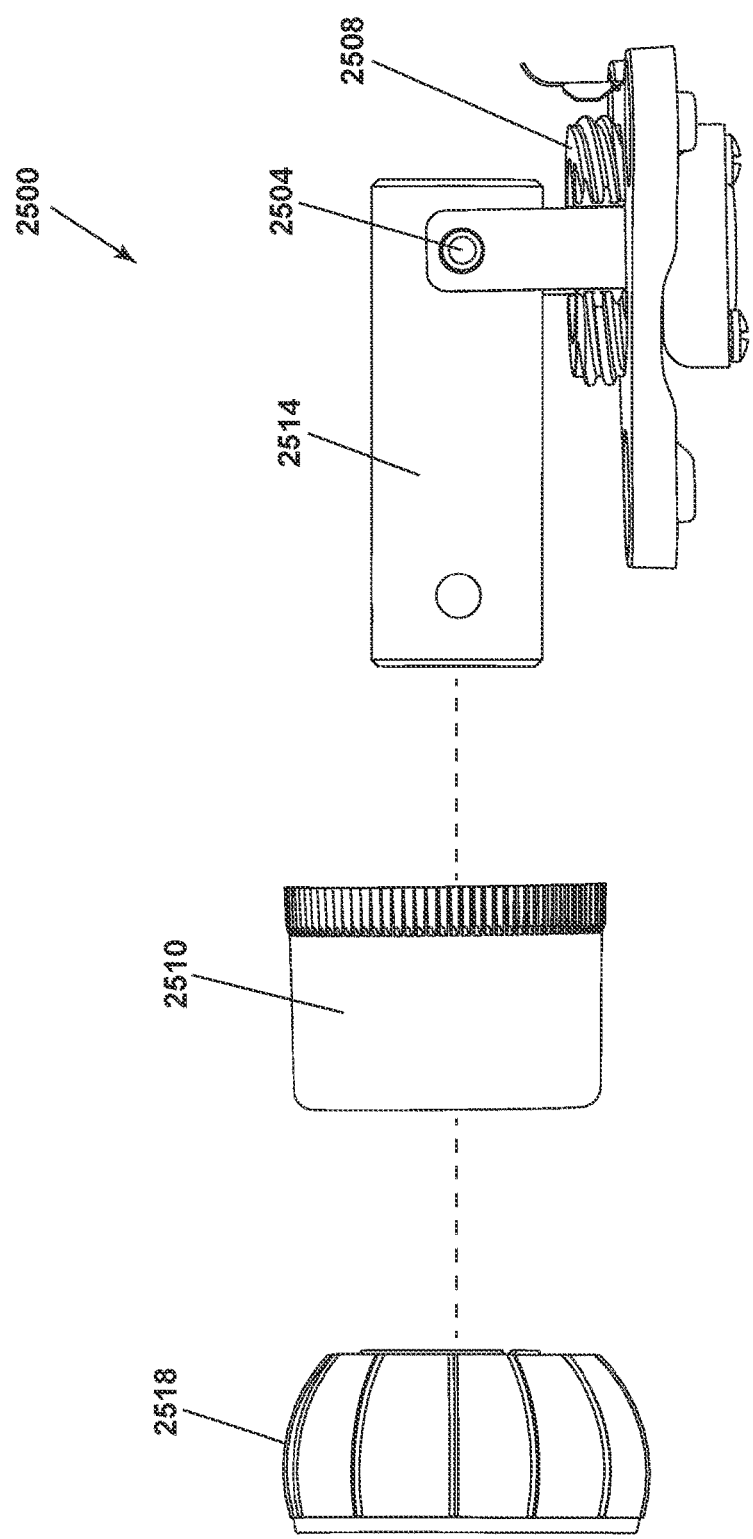

Referring now to FIG. 126, the ball mount 2518 and the cap 2510 are shown exploded from the downrod 2514. The downrod 2514 has been pivoted into a pivoted position about the pin 2504. In the pivoted position, storage space can be saved for packaging. The assembly as shown can be completed by the manufacturer. During assembly, the user need only orient the downrod 2514 in the upright position, tighten the cap 2510 at the bushing 2508, and mount the ball mount 2518 to the downrod 2514. The ceiling fan can then be quickly and easily suspended from a ceiling mount (not shown) at the ball mount 2518, facilitating assembly and installation of the ceiling fan. It should be appreciated that while the cap 2510 and the ball mount 2518 are shown exploded from the downrod 2514, the manufacturer can preassemble the cap 2510 and the ball mount 2518 to the downrod 2514, while storing the motor adapter assembly 2500 in the pivoted position, and is only shown as exploded in FIG. 126 for clarity.

It should be appreciated that the motor adapter assembly 2500 as described herein can provide for moving the downrod 2514 into the pivoted position to save space for storage and shipping of the ceiling fan. Additionally, the motor adapter assembly 2500 can be at least partially preassembled by a manufacturer, and facilitates installation of the ceiling fan by the consumer or end user. In this way, user installation is improved, while storage, packaging, and shipping costs can be reduced.

Referring now to FIGS. 127-130, another motor adapter assembly 2700 is described, which can be substantially similar to the motor adapter assembly of FIGS. 117-126. As such, similar numerals will be used to described similar elements, increased by a value of two hundred, and the discussion will be limited to differences between the two.

Figure 127:
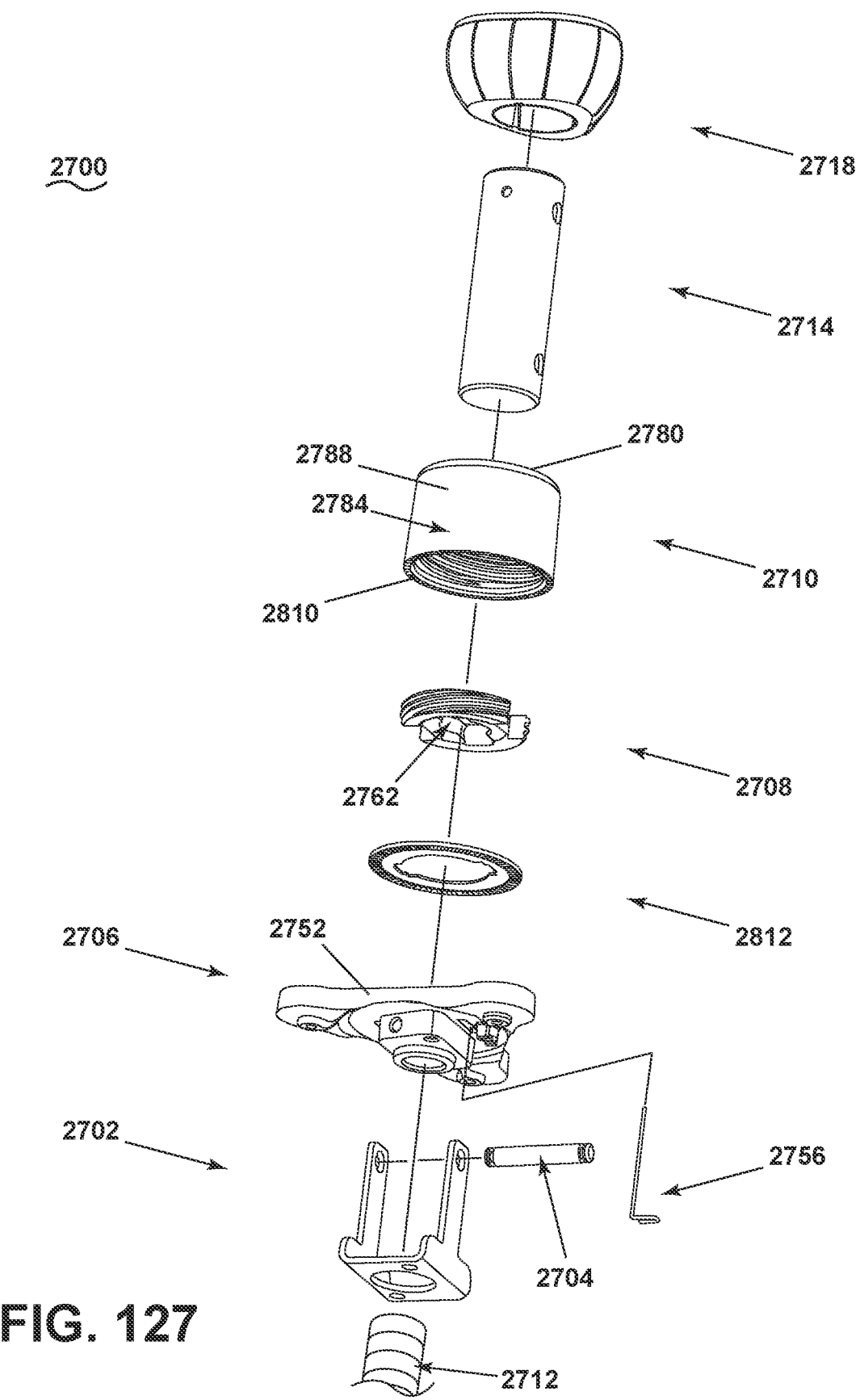

Referring now to FIG. 127 in particular, the motor adapter assembly 2700 includes a cap 2710 having a sidewall 2784 with a bottom edge 2810 opposite of a top wall 2780. The cap 2710 does not include the teeth provided on the exterior surface 2788, as compared to that of the cap 2510 of FIG. 119 having the set of teeth 2592 provided on the exterior surface 2588. The motor adapter assembly 2700 further includes a lock washer 2812 configured to position between the bushing 2708 and the base plate 2706. The base plate 2706 includes a uniform side 2752 and does not include the tab recess 2554 as in the base plate 2506 of FIG. 117. The remaining portions of the motor adapter assembly 2700, including the cradle 2702, the pin 2704, the bushing 2708, as well as the downrod 2714 and ball mount 2718 can be substantially similar to those of FIG. 117.

Figure 128:
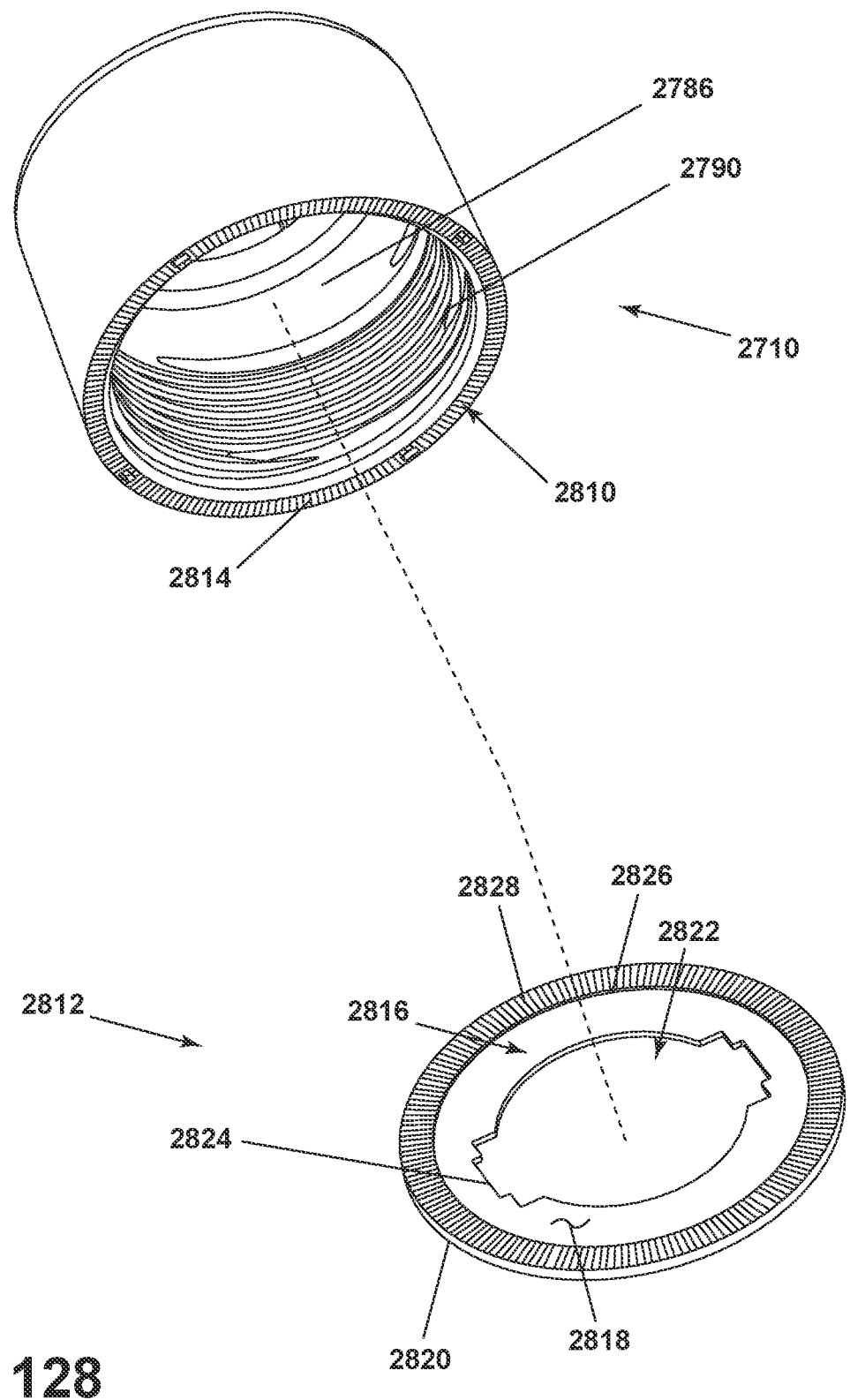

Referring now to FIG. 128, the interconnection between the cap 2710 and the lock washer 2812 can be described. The bottom edge 2810 of the cap 2710 can include a plurality of teeth 2814. A thread 2790 can be provided on the interior surface 2786 similar to that of FIG. 119.

The lock washer 2812 includes a body 2816 having an upper surface 2818 and a lower surface 2820 A central aperture 2822 is provided in the body 2816 and can include two channels 2824 shaped and sized similar to the central opening 2762 of the bushing 2708. A rim 2826 can be formed around the periphery of the body 2816. A set of lock teeth 2828 can be provided in the rim 2826 on the upper surface 2818. The lock teeth 2828 on the lock washer 2812 can be formed complementary to the teeth 2814 on the bottom edge 2810 of the cap 2710. In this way, the cap 2710 can fasten to the lock washer 2812 with a ratcheting connection between the teeth 2814 in the cap 2710 and the lock teeth 2828 on the lock washer 2812.

Figure 129:
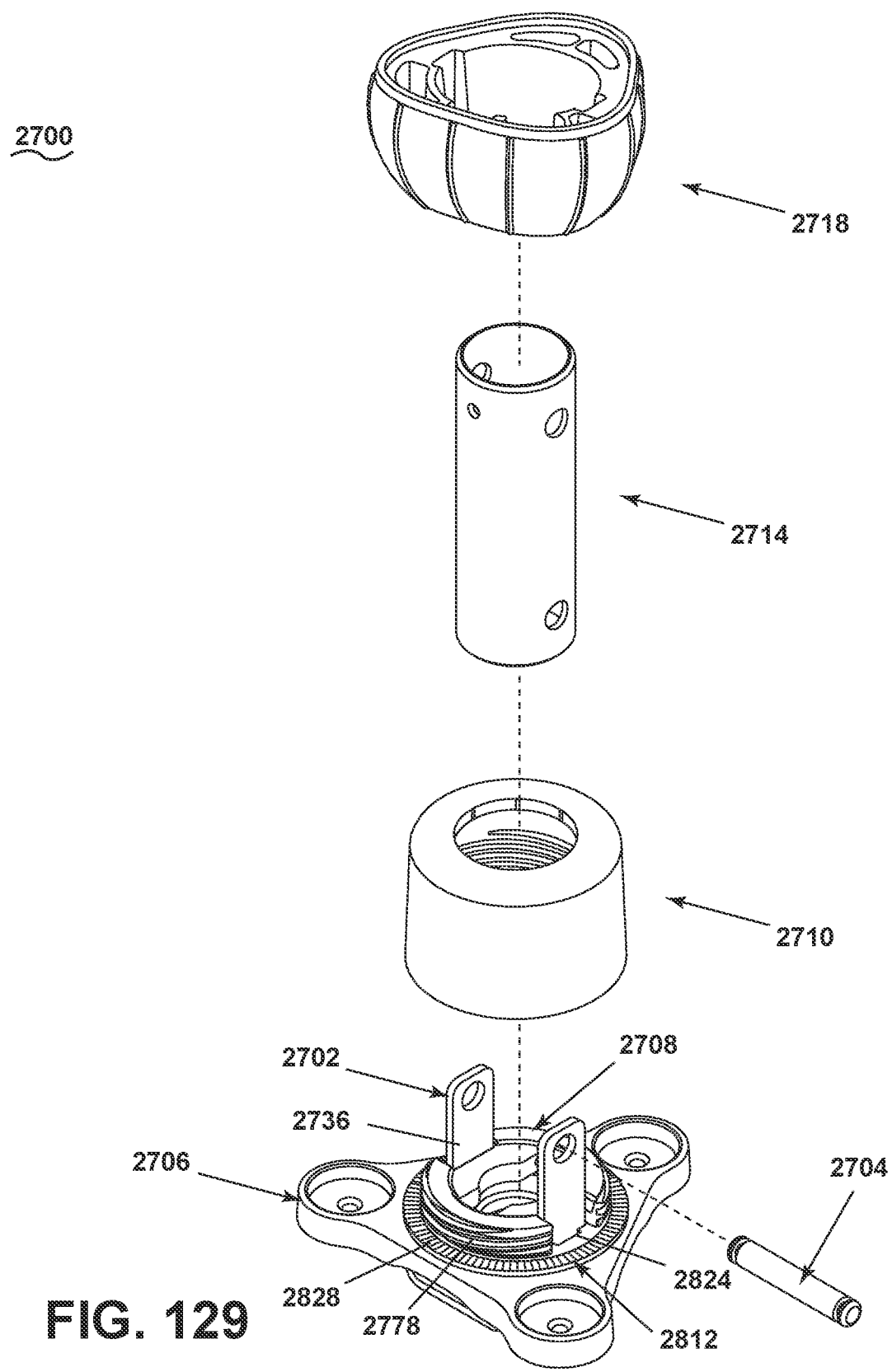

Referring now to FIG. 129, the assembly of the motor adapter assembly 2700 can be appreciated, specifically with regard to fastening the cap 2710 at the lock washer 2812. The downrod 2714 can fasten to the cradle 2702 with the pin 2704, similar to that of FIG. 123. The cap 2710 can slide over the downrod 2714 with the downrod 2714 passing through the downrod aperture 2782 in the cap 2710.

The cap 2710 can couple to the bushing 2708 with a threaded connection between the threads 2790 of the cap 2710 and the threads 2778 of the bushing 2708. As the cap 2710 threads to the bushing 2708, the bottom edge 2810 of the cap 2710 abuts the lock washer 2812. The teeth 2814 on the cap 2710 can fasten to the lock teeth 2828 on the lock washer 2812 in a ratcheting manner. In the way, the lock teeth 2828 of the lock washer 2812 secure the cap 2710, preventing rotation of the cap 2710 in the opposite direction, preventing undesired loosening of the cap 2710 during operation of a ceiling fan. The channels 2824 of the lock washer 2812 receive the arms 2736 of the cradle 2702 to prevent rotation of the lock washer 2812 during fastening of the cap 2710.

Figure 130:
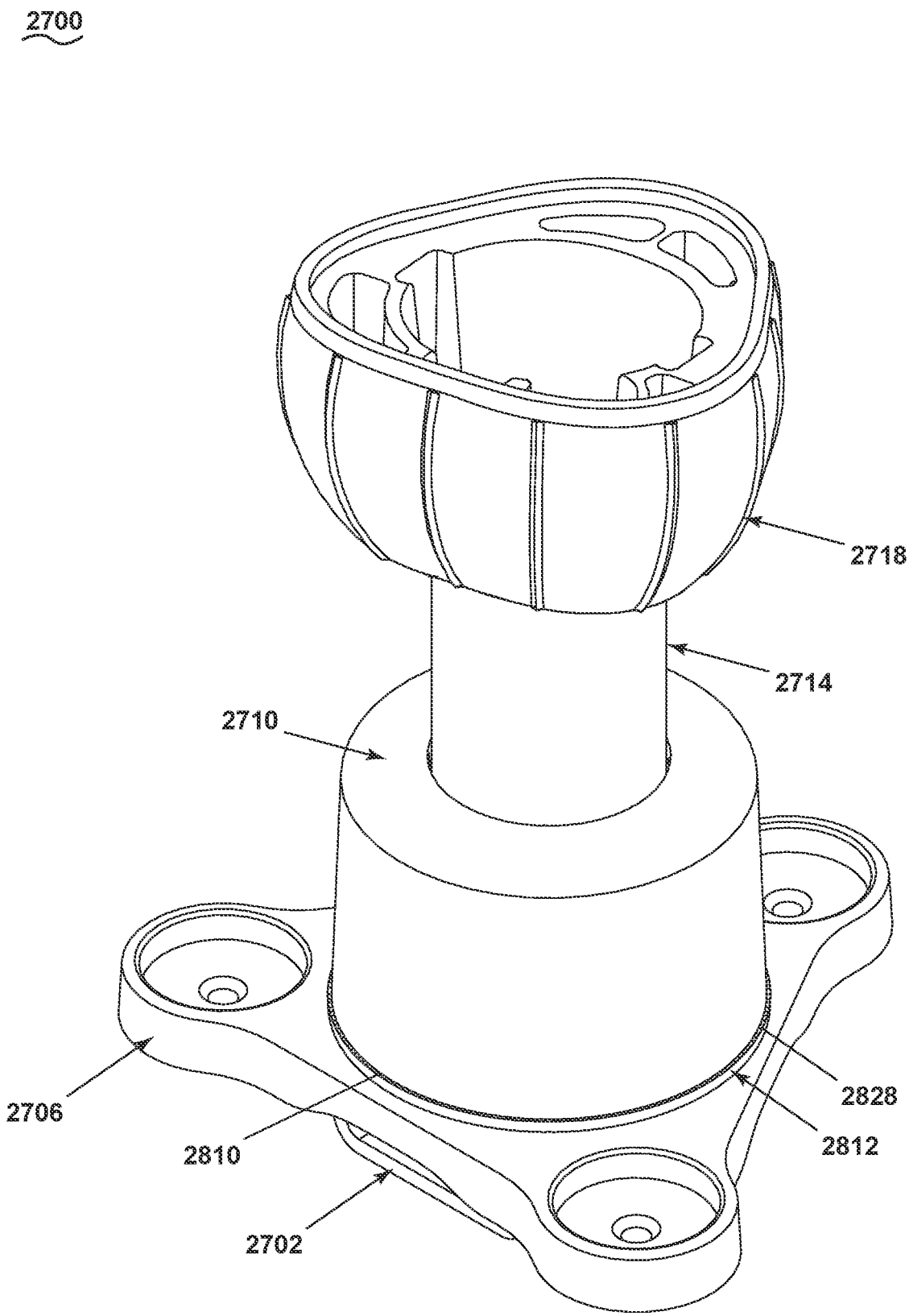

Referring now to FIG. 130, the assembled motor adapter assembly 2700 is shown in the upright position, while it is contemplated that the motor adapter assembly 2700 can position in the pivoted position, similar to that shown in FIG. 126. In the assembled, upright position, the bottom edge 2810 of the cap 2710 abuts the lock washer 2812 having the teeth 2814 of the cap 2710 locked to the lock teeth 2828 of the lock washer 2812.

The motor adapter assembly 2700 of FIGS. 127-130 removes the need for the tab recess 2554 formed in the base plate 2506 and the complementary tab 2550 of FIG. 117. The locking means for ratcheting the cap 2710 to the lock washer 2812 simplifies the cap 2710 locking assembly, which provides for easier installation for the user, as well as requires less parts for the motor adapter assembly 2700 as compared to the motor adapter assembly 2500 of FIG. 117.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to explain the disclosure, including the best mode, and to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor adapter assembly for coupling a motor shaft of a ceiling fan to a downrod having opposing downrod apertures through a motor housing and adapted to pivot between an upright position and a pivoted position, the motor adapter assembly comprising:
    a wedge having an peripheral wall defining a passage configured to receive the downrod and the peripheral wall including opposing wedge apertures;
    a cradle with a body having two spaced arms that at least partially define a seat, which receives the wedge, with an arm aperture in each arm that are aligned with the wedge apertures when the wedge is received within the seat;
    a pin extending through the aligned wedge apertures and the arm apertures to couple the cradle and the wedge and configured to couple the wedge and the cradle to the downrod; and
    a threaded cap provided around the wedge and threadably engaging the pin wherein rotation of the cap draws the wedge into engagement with the pin thereby preventing rotation of the wedge relative to the pin.

2. The motor adapter assembly of claim 1 further comprising a first plate having a set of slots adapted to receive the arms of the cradle, wherein the first plate couples the cradle to the motor housing.

3. The motor adapter assembly of claim 2 further comprising a second plate coupled to one of the motor housing or the first plate, adapted to couple to the cap.

4. The motor adapter assembly of claim 1 wherein the pin includes a spring finger configured to retain the pin within the downrod, the wedge, and the arms of the cradle.

5. The motor adapter assembly of claim 1 further comprising a fastener retained in the seat and adapted to couple to the motor shaft.

6. The motor adapter assembly of claim 1 wherein the pin forms a rotational axis for the wedge relative to the cradle.

7. The motor adapter assembly of claim 1 wherein the pin includes a spring member that secures the pin within the wedge and the cradle, and wherein the spring member is depressible to release the pin from the wedge and the cradle.

8. The motor adapter assembly of claim 1 wherein the cap threads about the pin.

9. A motor adapter assembly for coupling a motor shaft of a ceiling fan to a downrod having opposing downrod apertures through a motor housing and adapted to pivot between an upright position and a pivoted position, the motor adapter assembly comprising:
    a wedge having an peripheral wall defining a passage configured to receive the downrod and the peripheral wall including opposing wedge apertures;
    a cradle with a body having two spaced arms that at least partially define a seat, with an arm aperture in each arm that are aligned with the wedge apertures;
    a pin extending through the wedge apertures and the arm apertures to couple the cradle and the wedge and configured to couple the wedge and the cradle to the downrod;
    a cap provided around the wedge and covering the pin; and
    a first plate having a set of slots adapted to receive the arms of the cradle, wherein the first plate couples the cradle to the motor housing.

10. The motor adapter assembly of claim 9 further comprising a second plate coupled to one of the motor housing or the first plate, adapted to couple to the cap.

11. The motor adapter assembly of claim 9 wherein the pin includes a spring finger configured to retain the pin within the downrod, the wedge, and the arms of the cradle.

12. The motor adapter assembly of claim 9 further comprising a fastener retained in the seat and adapted to couple to the motor shaft.

13. The motor adapter assembly of claim 9 wherein the pin forms a rotational axis for the wedge relative to the cradle.

14. The motor adapter assembly of claim 9 wherein the pin includes a spring member that secures the pin within the wedge and the cradle, and wherein the spring member is depressible to release the pin from the wedge and the cradle.

15. The motor adapter assembly of claim 9 wherein the cap threads about the pin.

* * * * *